US011250367B2

(12) United States Patent
Santhanam et al.

(10) Patent No.: US 11,250,367 B2
(45) Date of Patent: Feb. 15, 2022

(54) SUPPLY CHAIN FINANCIAL ORCHESTRATION SYSTEM

(71) Applicant: Oracle International Corporation, Redwood Shores, CA (US)

(72) Inventors: Shyam Sundar Santhanam, Redwood City, CA (US); Kalyana Chakravarthy Dande, Hyderabad (IN); Balaji Duvaragamani, Hyderabad (IN); Siddharth Khanna, Austin, TX (US); Jatinder Gogna, Baldwin Place, NY (US); Sunil Sama Reddy, San Carlos, CA (US); Srinath Reddy Kayitha, Foster City, CA (US); Karthik Natarajan, Bangalore (IN); Kalyani Manda, Hyderabad (IN); Prabha Seshadri, San Jose, CA (US); Nitish Dave, Bilaspur (IN); Girish Jha, Hyderabad (IN); Amit Ranjan Kumar, Hyderabad (IN); Chandu Chinthala, Narasimharao Palem (IN); Raveesh Yadav, Kukatpally (IN)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 16/860,643

(22) Filed: Apr. 28, 2020

(65) Prior Publication Data

US 2020/0258016 A1 Aug. 13, 2020

Related U.S. Application Data

(63) Continuation of application No. 14/968,403, filed on Dec. 14, 2015, now Pat. No. 10,679,166, which is a (Continued)

(51) Int. Cl.
*G06Q 10/06* (2012.01)
*G06Q 40/00* (2012.01)
(Continued)

(52) U.S. Cl.
CPC ....... *G06Q 10/0637* (2013.01); *G06F 16/258* (2019.01); *G06Q 10/06316* (2013.01);
(Continued)

(58) Field of Classification Search
CPC .............................. G06Q 40/12; G06F 16/258
See application file for complete search history.

(56) References Cited

U.S. PATENT DOCUMENTS 6,868,401 B1 3/2005 Carpenter et al.
7,590,587 B2 9/2009 Duquette
(Continued)

OTHER PUBLICATIONS

"BASIC", Wikipedia, the free encyclopedia, https://en.wikipedia.org/w/index.php?title=BASIC&oldid=450897077, last downloaded on Aug. 31, 2015.
(Continued)

*Primary Examiner* — Scott S Trotter
(74) *Attorney, Agent, or Firm* — Potomac Law Group, PLLC

(57) ABSTRACT

A system is provided that determines a transfer price based on a transfer pricing rule. The system receives a request to calculate a transfer price for a transaction between a first entity and a second entity of a supply chain financial orchestration flow, where the supply chain financial orchestration flow defines a trade relationship between the first entity and the second entity. The system further receives transaction information associated with the transaction. The system further selects a transfer pricing rule from a plurality of transfer pricing rules, where the transfer pricing rule defines a rule to calculate a transfer price. The system further (Continued)

calculates the transfer price for the transaction based on the received transaction information and the selected transfer pricing rule. The system further provides the transfer price.

20 Claims, 95 Drawing Sheets

Related U.S. Application Data continuation-in-part of application No. 14/040,627, filed on Sep. 28, 2013, now abandoned, and a continuation-in-part of application No. 14/036,063, filed on Sep. 25, 2013, now abandoned, and a continuation-in-part of application No. 14/036,169, filed on Sep. 25, 2013, now abandoned, and a continuation-in-part of application No. 14/034,683, filed on Sep. 24, 2013, now abandoned, and a continuation-in-part of application No. 14/034,792, filed on Sep. 24, 2013, now abandoned, and a continuation-in-part of application No. 14/032,268, filed on Sep. 20, 2013, now abandoned, and a continuation-in-part of application No. 14/028,686, filed on Sep. 17, 2013, now abandoned.

(60) Provisional application No. 61/707,630, filed on Sep. 28, 2012.

(51) Int. Cl.
*G06Q 20/10* (2012.01)
*G06Q 20/38* (2012.01)
*G06F 16/25* (2019.01)

(52) U.S. Cl.
CPC .......... *G06Q 20/10* (2013.01); *G06Q 20/389* (2013.01); *G06Q 40/12* (2013.12)

(56) References Cited

U.S. PATENT DOCUMENTS

| | | | |
|---|---|---|---|
| 7,720,809 | B2 | 5/2010 | Knudsen et al. |
| 7,761,357 | B2 | 7/2010 | Yu et al. |
| 7,983,971 | B1 | 7/2011 | McLuckie et al. |
| 8,326,754 | B2 | 12/2012 | Bandych et al. |
| 8,326,773 | B1 | 12/2012 | Bellamy et al. |
| 8,402,064 | B2 | 3/2013 | Addala et al. |
| 8,412,621 | B2 | 4/2013 | Madhavan et al. |
| 8,762,322 | B2 | 6/2014 | Sridharan et al. |
| 2002/0188702 | A1 | 12/2002 | Short et al. |
| 2004/0138954 | A1 | 7/2004 | Norton et al. |
| 2004/0267674 | A1 | 12/2004 | Feng et al. |
| 2005/0218221 | A1 | 10/2005 | Nark et al. |
| 2008/0103871 | A1 | 5/2008 | Ruehl et al. |
| 2008/0313024 | A1 | 12/2008 | Kunichika et al. |
| 2009/0307152 | A1 | 12/2009 | Gogna et al. |
| 2010/0049634 | A1 | 2/2010 | Gogna et al. |
| 2010/0217692 | A1 | 8/2010 | Goodbody et al. |
| 2010/0257082 | A1 | 10/2010 | Foster |
| 2010/0332355 | A1 | 12/2010 | Lopez et al. |
| 2011/0021892 | A1 | 1/2011 | Addison et al. |
| 2011/0218813 | A1 | 9/2011 | Addala et al. |
| 2011/0218842 | A1 | 9/2011 | Addala et al. |
| 2011/0218921 | A1 | 9/2011 | Addala et al. |
| 2011/0218922 | A1 | 9/2011 | Addala et al. |
| 2011/0218924 | A1 | 9/2011 | Addala et al. |
| 2011/0218925 | A1 | 9/2011 | Addala et al. |
| 2011/0218926 | A1 | 9/2011 | Addala et al. |
| 2011/0218927 | A1 | 9/2011 | Addala et al. |
| 2011/0219218 | A1 | 9/2011 | Addala et al. |
| 2011/0249612 | A1 | 10/2011 | Kubo et al. |
| 2011/0257082 | A1 | 10/2011 | Levin et al. |
| 2012/0089486 | A1 | 4/2012 | Mahakian et al. |
| 2012/0124584 | A1 | 5/2012 | Addala et al. |
| 2012/0259677 | A1 | 10/2012 | Bennett et al. |
| 2013/0197976 | A1 | 8/2013 | Mahakian et al. |
| 2014/0006216 | A1 | 1/2014 | Malapati et al. |
| 2014/0095238 | A1 | 4/2014 | Dande et al. |
| 2014/0095246 | A1 | 4/2014 | Natarajan et al. |
| 2014/0095247 | A1 | 4/2014 | Natarajan et al. |
| 2014/0095248 | A1 | 4/2014 | Duvaragamani et al. |
| 2014/0095261 | A1 | 4/2014 | Johnson |
| 2014/0095266 | A1 | 4/2014 | Dande et al. |
| 2014/0095373 | A1 | 4/2014 | Natarajan et al. |

OTHER PUBLICATIONS

"Microsoft Excel", Wikipedia, the free encyclopedia, https://en.wikipedia.org/w/index.php?title=Microsoft_Excel&oldid-344559749, last downloaded on Aug. 20, 2015.
"Sorting", Wikipedia, the free encyclopedia, https://en.wikipedia.org/w/index.php?title=Sorting&oldid=446412081, last downloaded on Aug. 31, 2015.
A.T. Kearney, "Integrated Value Chains in Aerospace and Defense", http://www.aia-aerospace.org/assets/smc_wp-valuechains.pdf, 2008.
Arkieva, "ARKIEVA™ Solutions Overview", http://www.arkieva.com/Files/Admin/ArkievaSolutionsOverview.pdf, last downloaded Aug. 15, 2013.
David Lucking-Reiley et al., "Business—to—Business Electronic Commerce", Working Paper No. 00-W16, http://www.accessecon.com/pubs/VUECON/vu00-w16.pdf, Jun. 2000.
Mishkin, "The Harper Collins Series in economics", 4th edition, pp. 69-72, 1995.
Ryszard Barcik et al., "E-LOGISTICS—Aspects of Functioning", http://www.opf.slu.cz/aak/2012/01/Barcik.pdf, last downloaded Aug. 15, 2013.
Swanand Sahasrabuddhe, "System Separation Approach a Methodology for Planning Systems", Infosys, http://www.infosys.com/supply-chain/white-papers/Documents/system-separation-approach.pdf, Nov. 2008.
Vehicle Title—Wikipedia, the free encyclopedia, Mar. 10, 2011, https://en.wikipedia.org/w/index.php?title=Vehicletitle&oldid=41810054 7.
Virtual Trader Overview, "Virtual Trader: Rule based solution to bridge the functionality gaps within ERP solutions", http://www.virtualtrader.net/product_functionality.php, last downloaded Aug. 15, 2013.

SUPPLY CHAIN FINANCIAL ORCHESTRATION SYSTEM

CROSS-REFERENCE TO RELATED APPLICATIONS

This application is a continuation of U.S. patent application Ser. No. 14/968,403, filed Dec. 14, 2015, issued as U.S. Pat. No. 10,679,166, which is a continuation-in-part of U.S. patent application Ser. No. 14/028,686 filed Sep. 17, 2013, now abandoned; Ser. No. 14/034,683, filed Sep. 24, 2013, now abandoned; Ser. No. 14/034,792, filed Sep. 24, 2013, now abandoned; Ser. No. 14/032,268, filed Sep. 20, 2013, now abandoned; Ser. No. 14/036,063 filed Sep. 25, 2013, now abandoned; Ser. No. 14/036,169, filed Sep. 25, 2013, now abandoned; and Ser. No. 14/040,627, filed Sep. 28, 2013, now abandoned, all of which claim priority to U.S. Provisional Patent Application Ser. No. 61/707,630, filed on Sep. 28, 2012. The subject matter of all of the foregoing applications are hereby incorporated by reference in their entireties.

FIELD

One embodiment is directed to a computer system, and more particularly, to a computer system that orchestrates supply chain financial processes.

BACKGROUND

Large multi-national companies, or other enterprises, often operate through a number of subsidiary companies, or other legal entities, spread across the globe. These subsidiary companies can be further divided into business units or lines of businesses. The intersection of each subsidiary company and line of business (identified as a "profit center business unit") can become a supply chain entity that engages in manufacturing, purchase, and/or sale of goods and services.

The profit center business units typically engage commercially with an external supply chain, such as a collection of suppliers and customers. They can also engage in internal trades, or internal transfers, within the subsidiary company. One example type of an internal trade is an "inter-company trade," where a profit center business unit belonging to one subsidiary company trades with a profit center business unit belonging to another subsidiary company, at arm's length terms and conditions. Another example type of an internal trade is an "intra-company trade," where two profit center business units belonging to the same subsidiary company trade among each other on a competitive basis. These types of trades typically fall under "management accounting" based performance management, where each profit center business unit is rewarded for the value it adds to the supply chain.

Unlike external transactions, internal trades or transfers are not market-driven. Thus, a transfer price for the internal trade is typically calculated, using methods such as a "cost-plus" method, a comparable uncontrolled price method, a resale price method, a profit split method, etc. Because a transfer price determines the allocation of profit and loss among different entities of a company, and the different entities of the company may fall into different tax regimes, many jurisdictions have implemented transfer pricing regulations and enforcements. This has made transfer pricing a major tax compliance issue for large multi-national companies.

In any supply chain flow consisting of a buy, sell or transfer of goods, the buyer and seller agree upon the event of events when the cost of carrying the goods, risk and the title of the goods are transferred from the buyer to the seller. This may be explicitly agreed upon through a contract, usually using internationally accepted commercial terms. When an event that results in title transfer of goods occurs, it is expected that the seller accounts for the cost, revenue, and receivables in his books of account, and the buyer accounts for the inventory cost and liability for payment in his books. Generally, an invoice is generated, and sent by the seller to the buyer which can become the legal document for accounting and payments.

As the world economy becomes more integrated, company supply chains inherently become more international and complex. As a result, companies often look to less traditional ways to gain supply chain efficiencies. Reducing labor cost, transportation cost, and inventory cost, as well as improving customer service, are always a priority. However, optimizing a financial flow of goods across international markets is an area where companies have significant financial and taxation benefits.

One of the common ways to optimize or reduce costs when distributing goods internationally is to establish a legal entity in a lower tax jurisdiction to centrally buy and sell goods to move them through the supply chain in a tax-efficient manner to the end customer. However, the geographic location of the legal entity often does not fit in the optimal physical flow. The financial flow of the goods typically deviates from the physical flow. While the financial benefit can be significant, enabling this type of distribution model can be challenging due to the increased complexity companies are required to manage.

When distributing goods internationally, companies are careful to consider their operating structure and strategy for physical flow of goods as equally important as the financial flow. A common approach to managing the distribution of goods across multiple companies spread out in different countries is through a principal company, which is established in a lower tax jurisdiction. The structuring of the relationship and terms between the principal company and the local selling companies takes into account a level of added value performed by each party and levels of risk assumed by each party.

Beyond tax savings, companies often look to gain operational efficiencies through centralizing key business functions at the principal company. Some of these types of business functions include: (a) sourcing and procurement—a multi-national company can gain operational efficiencies by centralizing sourcing and procurement and potentially reducing overall spending; (b) customer service—centralizing customer service can help achieve economies of scale while making it easier to present a single face to the customer; (c) demand and production planning—because the principal company is often the main distribution intermediary, it is in a good position to forecast demand and production requirements at an aggregate level; and (d) back office accounting—centralizing accounting functions such as accounts payable and receivables can lower transaction costs and create opportunities for outsourcing.

In addition, companies typically need to identify financial routes for their internal trades/transfers. Further, to support customized trades/transfers, companies also typically require flexibility to use their own information sources to identify a financial route. Such tasks may require that messages be sent to target external systems, in order for the tasks to be executed at the target external systems. Such target external systems can each have different task payload formats.

SUMMARY

One embodiment is a system that processes trade events. The system receives events associated with a supply chain financial orchestration flow, where a supply chain financial orchestration flow defines a trade relationship between a first entity and a second entity. The system further determines whether at least one event indicates an ownership change of an item between the first entity and the second entity. The system further generates trade events where at least one event indicates an ownership change. The system further sends the trade events to a cost accounting system. The cost accounting system further performs accounting based on the trade events and generates trade accounting events.

One embodiment is a system that determines a transfer price based on a transfer pricing rule. The system receives a request to calculate a transfer price for a transaction between a first entity and a second entity of a supply chain financial orchestration flow, where the supply chain financial orchestration flow defines a trade relationship between the first entity and the second entity. The system further receives transaction information associated with the transaction. The system further selects a transfer pricing rule from a plurality of transfer pricing rules, where the transfer pricing rule defines a rule to calculate a transfer price. The system further calculates the transfer price for the transaction based on the received transaction information and the selected transfer pricing rule. The system further provides the transfer price.

One embodiment is a system that processes supply chain events. The system defines a supply chain event type. The system further configures a supply chain event of the supply chain event type as a task generating event, where the task generating event indicates that one or more tasks that are defined for a supply chain financial orchestration flow are to be executed, and where the supply chain financial orchestration flow defines a trade relationship between a first entity and a second entity. The system further receives a supply chain event associated with the supply chain financial orchestration flow. The system further determines whether the supply chain event is a task generating event. The system further executes the one or more tasks that are defined for the supply chain financial orchestration flow where the supply chain event is a task generating event.

One embodiment is a system that orchestrates a supply chain event. The system receives a supply chain event from an external source system. The system further retrieves a source document referenced by the supply chain event. The system further retrieves a supply chain financial orchestration flow assigned to the source document, where the supply chain financial orchestration flow defines a trade relationship between a first entity and a second entity. The system further selects one or more tasks defined for the supply chain financial orchestration flow. The system further initiates execution of the one or more tasks, where each task is executed at an external target system.

One embodiment is a system that orchestrates tasks for a supply chain financial orchestration flow. The system selects tasks to be executed for an event. The system further creates a task group that includes the tasks. The system further assigns a task sequence identifier for each task, where there is a gap between two task sequence identifiers. The system further initiates an execution of a task of the plurality of tasks where the task is eligible for execution. The system further submits a task completion acknowledgement when the execution of the task is complete, where the task completion acknowledgement makes a subsequent task eligible for execution.

One embodiment is a system that implements a qualifier. The system selects a qualifier definition that defines the qualifier; where the qualifier definition includes a computer program code definition including one or more conditions. The system further selects a condition from one or more conditions, where the condition includes a parameter. The system further determines that the parameter is a custom parameter, where a custom parameter indicates that an external computer program is used to generate a value for the custom parameter. The system further invokes the external computer program to generate a value for the custom parameter. The system further evaluates the condition using the generated value. The system further evaluates the qualifier definition using the evaluated condition.

One embodiment is a system that communicates tasks. The system generates a task including task payload data, where the task payload data is in a task payload format. The system further transforms the task payload data from the task payload format to a universal format. The system further sends the task payload data and a system parameter to an external interface layer, where the task payload data is sent in the universal format, and where the system parameter identifies an external target system. The system further identifies an external target system and connector service based on the system parameter. The system further sends the task payload data to the connector service, where the task payload data is sent in the universal format.

BRIEF DESCRIPTION OF THE DRAWINGS

Further embodiments, details, advantages, and modifications will become apparent from the following detailed description of the preferred embodiments, which is to be taken in conjunction with the accompanying drawings as shown in the Figures in Sections 1-7 as described below.

Section 1 Drawings:

FIG. 1-2 illustrates an example enterprise structure, an example inter-company trade agreement, and an example intra-company trade agreement, according to an embodiment of the invention.

FIG. 1-3 illustrates an example integration of a supply chain financial orchestration system with a cost accounting system, according to an embodiment of the invention.

FIG. 1-4 illustrates an example diagram of a supply chain financial orchestration system that processes trade events, according to an embodiment of the invention.

FIG. 1-5 illustrates an example diagram of a cost accounting system that performs accounting based on trade events received from a supply chain financial orchestration system, according to an embodiment of the invention.

FIG. 1-6A illustrates trade accounting events generated for a forward flow of a global procurement flow, according to an embodiment of the invention.

FIG. 1-6B illustrates trade accounting events generated for a return flow of a global procurement flow, according to an embodiment of the invention.

FIG. 1-7A illustrates trade accounting events generated for a forward flow and a return flow of a customer shipment flow, according to an embodiment of the invention.

FIG. 1-7B illustrates forward and return variations of a customer shipment flow, according to an embodiment of the invention.

FIG. 1-8A illustrates trade accounting events generated for a forward flow and a return flow of a customer drop shipment flow where there is a single business unit drop shipment, according to an embodiment of the invention.

FIG. 1-8B illustrates trade accounting events generated for a forward flow and a return flow of a customer drop shipment flow where the selling legal entity is also the requisitioning legal entity, according to an embodiment of the invention.

FIG. 1-8C illustrates trade accounting events generated for a forward flow and a return flow of a customer drop shipment flow where the requisitioning legal entity is also the "sold-to" legal entity, according to an embodiment of the invention.

FIG. 1-8D illustrates trade accounting events generated for a forward flow and a return flow of a customer drop shipment flow where the sold-to legal entity, requisitioning legal entity, and selling legal entity are all different, according to an embodiment of the invention.

FIG. 1-9A illustrates trade accounting events generated for a forward flow of an internal transfer flow, according to an embodiment of the invention.

FIG. 1-9B illustrates trade accounting events generated for a return flow of an internal transfer flow, according to an embodiment of the invention.

FIG. 1-9C illustrates trade accounting events generated for a forward flow of an internal transfer flow within a single profit center business unit, according to an embodiment of the invention.

FIG. 1-9D illustrates trade accounting events generated for a return flow of an internal transfer flow within a single profit center business unit, according to an embodiment of the invention.

FIG. 1-9E illustrates forward and return variations of an internal transfer flow, according to an embodiment of the invention.

FIG. 1-10 illustrates an example gross margin reporting data model, according to an embodiment of the invention.

FIG. 1-11 illustrates a flow diagram for a process that collects COGS and revenue data for a COGS object and a revenue object of a gross margin reporting data model, according to an embodiment of the invention.

FIG. 1-12 illustrates an example user interface of a gross margin reporting data model, according to an embodiment of the invention.

FIG. 1-13 illustrates another example user interface of a gross margin reporting data model, according to an embodiment of the invention.

FIG. 1-14 illustrates a flow diagram of the functionality of a supply chain financial trade accounting module, according to an embodiment of the invention.

FIG. 1-15 illustrates a flow diagram of the functionality of a supply chain financial trade accounting module that utilizes a unified gross margin computation model for intercompany trade events as well as physical sales order flows, according to another embodiment of the invention.

FIG. 1-16 illustrates an example supply chain financial orchestration flow, according to an embodiment of the invention.

FIG. 1-17 illustrates a block diagram of an example architecture of a supply chain financial orchestration system, according to an embodiment of the invention.

Section 2 Drawings:

FIG. 2-1 illustrates a block diagram of a system that can implement an embodiment of the invention.

FIG. 2-2 illustrates an example supply chain financial orchestration flow, according to an embodiment of the invention.

FIG. 2-3 illustrates a block diagram of an example architecture of a supply chain financial orchestration system, according to an embodiment of the invention.

FIG. 2-4 illustrates an example user interface for creating a transfer pricing rule, according to an embodiment of the invention.

FIG. 2-5 illustrates another example user interface for creating a transfer pricing rule, according to an embodiment of the invention.

FIG. 2-6 illustrates an example user interface for selecting a transfer pricing rule from an external pricing system, according to an embodiment of the invention.

FIG. 2-7 illustrates a block diagram of a calculate transfer price service, according to an embodiment of the invention.

FIG. 2-8 illustrates a flow diagram of the functionality of a supply chain financial orchestration transfer pricing module, according to an embodiment of the invention.

Section 3 Drawings:

FIG. 3-1 illustrates a block diagram of a system that can implement an embodiment of the invention.

FIG. 3-2 illustrates an example supply chain financial orchestration flow, according to an embodiment of the invention.

FIG. 3-3 illustrates a block diagram of an example architecture of a supply chain financial orchestration system, according to an embodiment of the invention.

FIG. 3-4 illustrates an example user interface for defining a supply chain event type, according to an embodiment of the invention.

FIG. 3-5 illustrates an example user interface for assigning a sequence number to a supply chain event type, according to an embodiment of the invention.

FIG. 3-6 illustrates an example supply chain financial orchestration flow, according to an embodiment of the invention.

FIG. 3-7 illustrates an example user interface for configuring a supply chain event as an ownership change event by defining a documentation and accounting rule, according to an embodiment of the invention.

FIG. 3-8 illustrates an example user interface for defining one or more tasks for a documentation and accounting rule, according to an embodiment of the invention.

FIG. 3-9 illustrates an example user interface for configuring a supply chain event as a supplier ownership change event, according to an embodiment of the invention.

FIG. 3-10 illustrates a block diagram of an event framework that receives and processes supply chain events, according to an embodiment of the invention.

FIG. 3-11 illustrates an example user interface for manually creating an ownership change event, according to an embodiment of the invention.

FIG. 3-12 illustrates an example user interface for managing supply chain event exceptions, according to an embodiment of the invention.

FIG. 3-13 illustrates a flow diagram of the functionality of a supply chain financial orchestration event module, according to an embodiment of the invention.

Section 4 Drawings:

FIG. 4-1 illustrates a block diagram of a system that can implement an embodiment of the invention.

FIG. 4-2 illustrates an example supply chain financial orchestration flow, according to an embodiment of the invention.

FIG. 4-3 illustrates a block diagram of an example architecture of a supply chain financial orchestration system, according to an embodiment of the invention.

FIG. 4-4 illustrates an example enterprise structure, according to an embodiment of the invention.

FIG. 4-5 illustrates a flow diagram of the functionality of a supply chain financial orchestration flow module, according to an embodiment of the invention.

FIG. 4-6 illustrates an example user interface for defining a documentation and accounting rule, according to an embodiment of the invention.

FIG. 4-7 illustrates an example user interface for defining a transfer pricing rule, according to an embodiment of the invention.

FIG. 4-8 illustrates an example user interface for defining an agreement, according to an embodiment of the invention.

FIG. 4-9 illustrates another example user interface for defining an agreement, according to another embodiment of the invention.

FIG. 4-10 illustrates an example user interface for defining a qualifier, according to an embodiment of the invention.

FIG. 4-11A illustrates a portion of an example user interface for defining a supply chain financial orchestration flow, according to an embodiment of the invention.

FIG. 4-11B illustrates another portion of an example user interface for defining a supply chain financial orchestration flow, according to an embodiment of the invention.

FIG. 4-12 illustrates a flow diagram of the functionality of a supply chain financial orchestration flow module, according to another embodiment of the invention.

FIG. 4-13 illustrates an example user interface for managing supply chain event exceptions, according to an embodiment of the invention.

FIG. 4-14 illustrates a portion of an example user interface for managing supply chain event exceptions, where the portion can display a supply chain event exception message, according to an embodiment of the invention.

FIG. 4-15 illustrates a portion of an example user interface for managing supply chain event exceptions, where the portion can submit supply chain events for re-processing, according to an embodiment of the invention.

FIG. 4-16 illustrates an example user interface for confirming an assignment of a supply chain financial orchestration flow, according to an embodiment of the invention.

FIG. 4-17 illustrates an example user interface for monitoring an execution of a supply chain financial orchestration flow, according to an embodiment of the invention.

FIG. 4-18 illustrates a portion of an example user interface for monitoring an execution of a supply chain financial orchestration flow, where the portion can display details of a monitored supply chain financial orchestration flow, according to an embodiment of the invention.

FIG. 4-19 illustrates a portion of an example user interface for monitoring an execution of a supply chain financial orchestration flow, where the portion can display one or more exception messages for a monitored supply chain financial orchestration flow, according to an embodiment of the invention.

FIG. 4-20 illustrates a portion of an example user interface for monitoring an execution of a supply chain financial orchestration flow, where the portion can perform a recover action for a supply chain financial orchestration flow, according to an embodiment of the invention.

Section 5 Drawings:

FIG. 5-1 illustrates a block diagram of a system that can implement an embodiment of the invention.

FIG. 5-2 illustrates an example supply chain financial orchestration flow, according to an embodiment of the invention.

FIG. 5-3 illustrates a block diagram of an example architecture of a supply chain financial orchestration system, according to an embodiment of the invention.

FIG. 5-4 illustrates a block diagram of an event triggering an execution of tasks, according to an embodiment of the invention.

FIG. 5-5 illustrates a block diagram of tasks that are submitted to a task group with a sequence identifier, according to an embodiment of the invention.

FIG. 5-6 illustrates a flow diagram of the task sequencer functionality of a supply chain financial orchestration sequencer module, according to an embodiment of the invention.

FIG. 5-7 illustrates a block diagram of a sequence of occurrence of events and their occurrence timings, according to an embodiment of the invention.

FIG. 5-8 includes a block diagram of an event group that includes events and event completion acknowledgments, according to an embodiment of the invention.

FIG. 5-9 illustrates a flow diagram of the event sequencer functionality of a supply chain financial orchestration sequencer module, according to another embodiment of the invention.

FIG. 5-10 illustrates a block diagram of a repetitive event occurrence hierarchy and the events' occurrence timings, according to an embodiment of the invention.

FIG. 5-11 illustrates a block diagram of event groups that include events and event completion acknowledgments, according to an embodiment of the invention.

FIG. 5-12 illustrates a flow diagram of the repetitive event sequencer functionality of a supply chain financial orchestration sequencer module, according to another embodiment of the invention.

Section 6 Drawings:

FIG. 6-1 illustrates a block diagram of a system that can implement an embodiment of the invention.

FIG. 6-2 illustrates an example supply chain financial orchestration flow, according to an embodiment of the invention.

FIG. 6-3 illustrates a block diagram of an example architecture of a supply chain financial orchestration system, according to an embodiment of the invention.

FIG. 6-4 illustrates an example user interface for defining a qualifier, according to an embodiment of the invention.

FIG. 6-5 illustrates an example user interface for defining a qualifier with a custom parameter, according to an embodiment of the invention.

FIG. 6-6 illustrates a flow diagram of the functionality of a supply chain financial orchestration qualifier module, according to an embodiment of the invention.

Section 7 Drawings:

FIG. 7-1 illustrates a block diagram of a system that can implement an embodiment of the invention.

FIG. 7-2 illustrates an example supply chain financial orchestration flow, according to an embodiment of the invention.

FIG. 7-3 illustrates a block diagram of an example architecture of a supply chain financial orchestration system, according to an embodiment of the invention.

FIG. 7-4 illustrates a block diagram of a task communication pattern for a system.

FIG. 7-5 illustrates a block diagram of an input payload of an external interface layer.

FIG. 7-6 illustrates a block diagram of a task communication pattern after payload modification to the task layer services of a system.

FIG. 7-7 illustrates a block diagram of a task communication pattern that includes a universal format, according to an embodiment of the invention.

FIG. 7-8 illustrates a block diagram of a connector service that transforms a universal format to an external target system format, according to an embodiment of the invention.

FIG. 7-9 illustrates a flow diagram of the functionality of a supply chain financial orchestration task communication module, according to an embodiment of the invention.

DETAILED DESCRIPTION—SECTION 1

According to an embodiment, a supply chain financial orchestration system is provided that can capture, process, and perform an accounting of the buy-sell trade events that emanate from complex supply chain financial flows, such as internal trades within an enterprise. The system can receive buy-sell trade events, where a buy-sell trade event (or trade event) is a buy, sell, or in-transit movement event that results from a complex supply chain inter-/intra-company business flow. The system can further generate and process buy-sell trade accounting events that are independent from the physical movement of goods and/or services related to the supply chain financial flows, where a buy-sell trade accounting event (or trade accounting event) is an accounting event for a trade event. The system can standardize a trade accrual and trade cost accounting information, and can provide a unified mechanism to perform the accounting of the trade accounting events arising from supply chain financial flow, such as global procurement of goods and/or services, drop shipments of goods and/or services, and inter-organizational transfers of goods and/or services.

Figure 1:
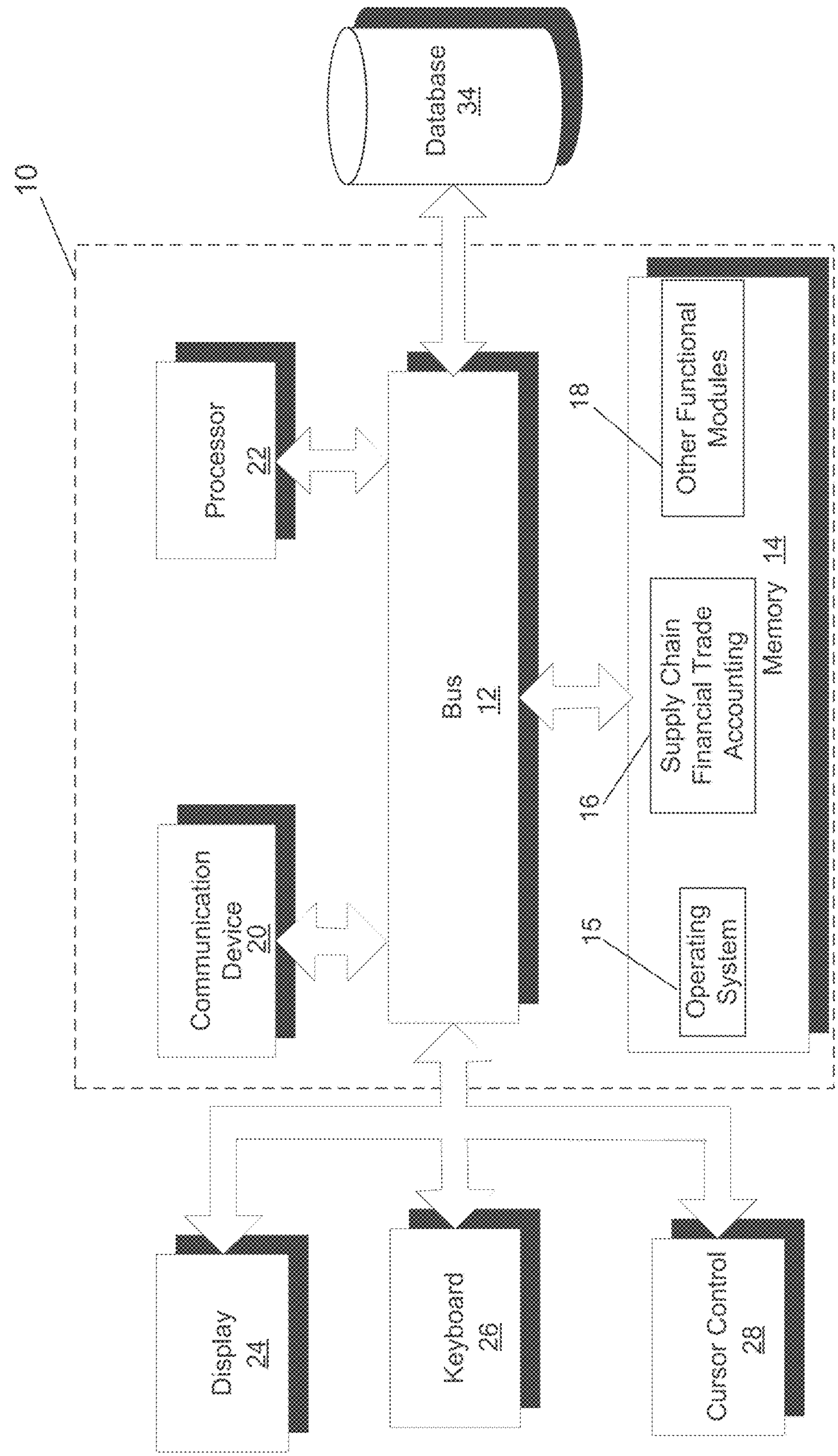
FIG. 1-1 illustrates a block diagram of a system that can implement an embodiment of the invention.

FIG. 1-1 illustrates a block diagram of a supply chain financial orchestration system 10 that may implement one embodiment of the invention. Supply chain financial orchestration system 10 includes a bus 12 or other communications mechanism for communicating information between components of supply chain financial orchestration system 10. Supply chain financial orchestration system 10 also includes a processor 22, operatively coupled to bus 12, for processing information and executing instructions or operations. Processor 22 may be any type of general or specific purpose processor. Supply chain financial orchestration system 10 further includes a memory 14 for storing information and instructions to be executed by processor 22. Memory 14 can be comprised of any combination of random access memory ("RAM"), read only memory ("ROM"), static storage such as a magnetic or optical disk, or any other type of machine or computer-readable medium. Supply chain financial orchestration system 10 further includes a communication device 20, such as a network interface card or other communications interface, to provide access to a network. As a result, a user may interface with supply chain financial orchestration system 10 directly, or remotely through a network or any other method.

A computer-readable medium may be any available medium that can be accessed by processor 22. A computer-readable medium may include both a volatile and nonvolatile medium, a removable and non-removable medium, a communication medium, and a storage medium. A communication medium may include computer readable instructions, data structures, program modules or other data in a modulated data signal such as a carrier wave or other transport mechanism, and may include any other form of information delivery medium known in the art. A storage medium may include RAM, flash memory, ROM, erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

Processor 22 can also be operatively coupled via bus 12 to a display 24, such as a Liquid Crystal Display ("LCD"). Display 24 can display information to the user. A keyboard 26 and a cursor control device 28, such as a computer mouse, can also be operatively coupled to bus 12 to enable the user to interface with supply chain financial orchestration system 10.

According to one embodiment, memory 14 can store software modules that may provide functionality when executed by processor 22. The modules can include an operating system 15, a supply chain financial trade accounting module 16, as well as other functional modules 18. Operating system 15 can provide an operating system functionality for supply chain financial orchestration system 10. Supply chain financial trade accounting module 16 can provide functionality for processing trade events, as is described in more detail below. In certain embodiments, supply chain financial trade accounting module 16 can comprise a plurality of modules that each provide specific individual functionality for processing trade events. Supply chain financial orchestration system 10 can also be part of a larger system. Thus, supply chain financial orchestration system 10 can include one or more additional functional modules 18 to include the additional functionality. For example, functional modules 18 may include modules that provide additional functionality, such as one or more "Oracle Fusion Applications" from Oracle Corporation. In another example, functional modules 18 may include enterprise resource planning ("ERP") modules of an ERP system, where an ERP system is a computer system that integrates several data sources and processes of an organization into a unified system.

Processor 22 can also be operatively coupled via bus 12 to a database 34. Database 34 can store data in an integrated collection of logically-related records or files. Database 34 can be an operational database, an analytical database, a data warehouse, a distributed database, an end-user database, an external database, a navigational database, an in-memory database, a document-oriented database, a real-time database, a relational database, an object-oriented database, or any other database known in the art.

Figures 1, 2:
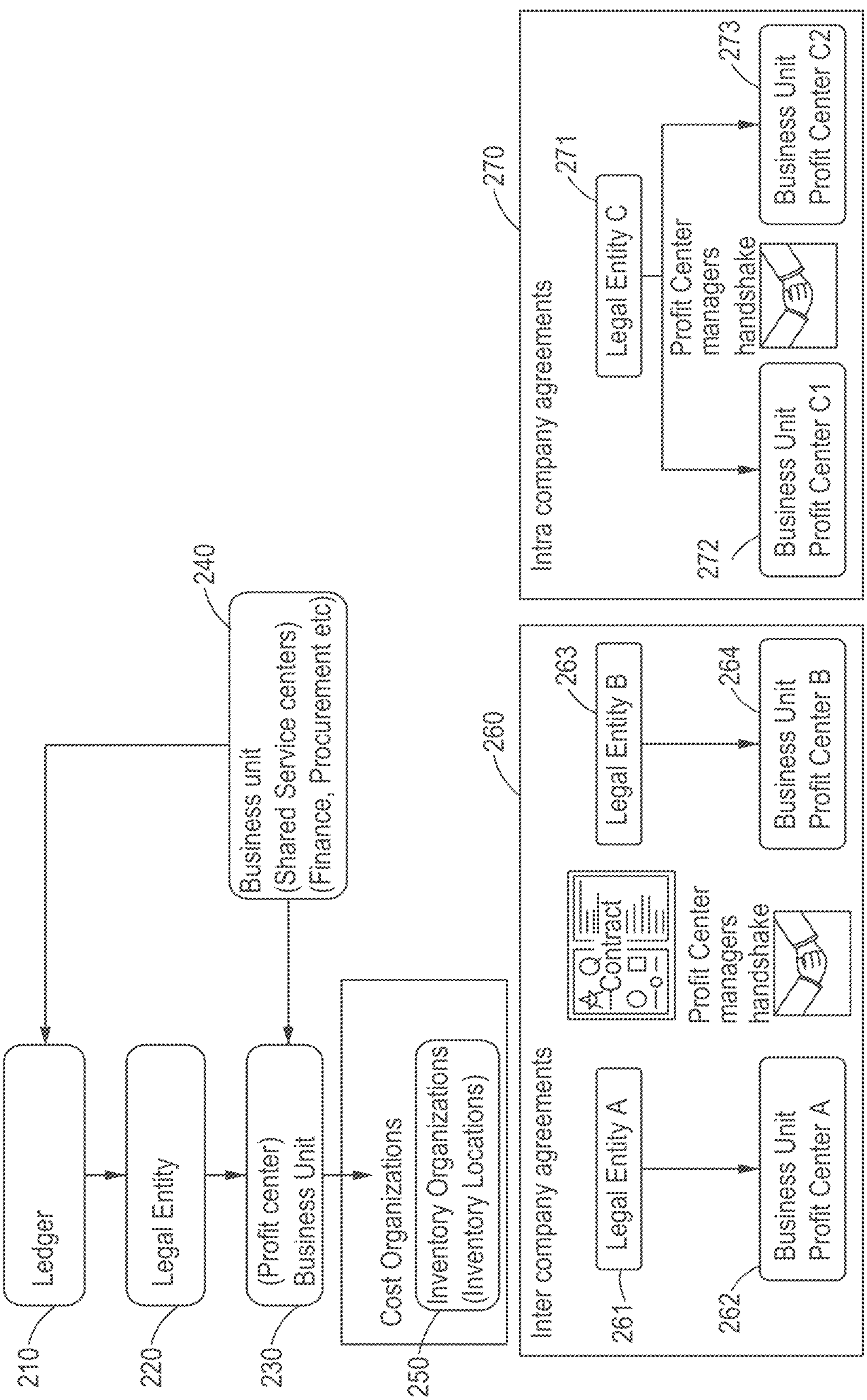

FIG. 1-2 illustrates an example enterprise structure, an example inter-company trade agreement, and an example intra-company trade agreement, according to an embodiment of the invention. As previously described, a large enterprise can operate through a number of legal entities. According to the embodiment, an enterprise can operate under an enterprise structure, such as the enterprise structure illustrated in FIG. 1-2, where an enterprise can be divided into one or more legal entities (or alternatively, business entities), represented by legal entity 220 in FIG. 1-2, where the financial transactions of each legal entity are recorded against a ledger, represented by ledger 210 in FIG. 1-2. Further, a legal entity can be divided into one or more business units, where a business unit can either be a profit unit, represented by business unit 230 in FIG. 1-2, or a shared service center, represented by business unit 240 in FIG. 1-2. Each business unit can be divided into one or more cost/inventory organizations, represented by inventory organization 250 in FIG. 1-2, where an inventory organization represents an organization level within a business unit where information regarding all inventory (such as goods and/or services) is consolidated. A profit center business unit (or business unit), and all of its inventory organizations, belong to the corresponding legal entity.

As also previously described, an enterprise can engage in internal trades. In these types of internal trades, the enterprise does not trade with another legal entity (or alternatively, a business entity). Instead, a legal entity (or sub-entity) of the enterprise engages in a trade with another legal entity (or sub-entity) of the enterprise. An example of an internal trade is an inter-company trade, represented by inter-company trade agreement 260 in FIG. 1-2. In an inter-company trade, a first legal entity of an enterprise, represented by legal entity 261 in FIG. 1-2, owns a first profit center business unit, represented by business unit 262 in FIG. 1-2. Further, a second legal entity of the enterprise, represented by legal entity 263 in FIG. 1-2, owns a second profit center business unit, represented by business unit 264 in FIG. 1-2. The first profit center business unit enters into a trade agreement with the second profit center business unit. Thus, the trade agreement is between two legal entities within the enterprise.

A real-world example of an inter-company trade agreement is a trade agreement between a manufacturing plant of a company located in China, and a sales office of the company located in the United States. The Chinese manufacturing plant can enter in a trade agreement with the United States sales office to transfer ownership of goods physically located in a warehouse of the Chinese manufacturing plant to the Unites States sales office, so that the goods can be sold to customers located in the United States. The Chinese manufacturing plant represents a first legal entity of the company, where the Chinese manufacturing plant owns its own profit center business unit. The United States sales office represents a second legal entity of the company, where the United States sales office also owns its own profit center business unit. The profit center business unit of the Chinese manufacturing plant can enter into the trade agreement with the profit center business unit of the United State sales office, and thus, the trade agreement is between two legal entities within the company.

Another example of an internal trade is an intra-company trade, represented by intra-company trade agreement 270 in FIG. 1-2. In an intra-company trade, a legal entity (or alternatively, a business entity) of an enterprise, represented by legal entity 271 in FIG. 1-2, owns a first profit center business unit, represented by business unit 272 in FIG. 1-2, and owns a second profit center business unit, represented by business unit 273 in FIG. 1-2. The first profit center business unit enters into a trade agreement with the second profit center business unit. Thus, the trade agreement is within a single legal entity of the enterprise.

A real-world example of an intra-company trade agreement is a trade agreement between a first profit center business unit of a company's manufacturing plant located in China, and a second profit center business unit of the company's manufacturing plant located in China. The two profit center business units can be focused on different target markets of the relevant industry. The first profit center business unit can enter into a trade agreement with the second profit center business unit to transfer ownership of goods physically located in a warehouse of the Chinese manufacturing plant. Because both profit center business units belong to the Chinese manufacturing plant, the trade agreement is within a single legal entity of the company.

Both inter-company trade agreements and intra-company trade agreements have unique business challenges. Such challenges include: (1) an ability to define a buy-sell business relationship between the two profit center business units in a transparent way; (2) an ability to track and maintain an audit trail of ownership of goods, as well as physical custody of goods; (3) an ability to maintain an original cost of goods separate from mark-ups added to them as part of a transfer price; (4) an ability to account for financial ownership changes without changes to physical custody of goods; (5) an ability to account for in-transit goods independent of goods whose physical movements are tracked; (6) an ability to standardize the accounting into a unified set of accounting events, even though the events may be originating out of many types of inter-/intra-company flows; and (7) an ability to configure the accounting entries to be created based on a nature of the trade, a nature of the goods, parties involved and documentation required.

Many of the aforementioned challenges arise from the fact that, in inter-company trade agreements and intra-company trade agreements, physical goods typically follow a supply path that is different from an ownership path. Taking the aforementioned example of the company that includes a Chinese manufacturing plant and a United States sales office, when the United States sales office books a sale in the United States, the physical goods associated with the sale can be delivered from the Chinese manufacturing plant directly to the customer in the United States. However, the ownership path of the goods is not the same as the physical movement path of the goods. Instead, the ownership path starts at the Chinese manufacturing plant, proceeds to the United States sales office, and then proceeds to the customer. This is because, as part of the sale, the Chinese manufacturing plant and the United States sales office enters into an inter-company trade agreement, where the Chinese manufacturing plant transfers ownership of the goods to the United States sales office, so that the United States sales office can sell the goods to the customer. However, while there is an ownership transaction between the Chinese manufacturing plant and the United States sales office, there is no corresponding physical transaction between these two legal entities, because there is no physical movement of the goods between the two legal entities. For example, the Chinese manufacturing plant may ship the goods to a Singapore subsidiary, the Singapore subsidiary may ship the goods to a United States subsidiary (which is separate from the United State sales office), and the United States subsidiary may ship the goods directly to the customer. In the aforementioned example, there is no physical movement of the goods from the Chinese manufacturing plant to the United States sales office. Because most conventional ERP systems perform accounting based on physical movement of goods, these systems typically cannot accurately track trades where the ownership movement of the goods is independent of the physical movement of the goods. Thus, such ERP systems are not complete and robust in accounting for internal trades.

Conventional ERP systems typically resort to one or more of the following approaches to handle internal trades. One approach is to synthesize physical movement (e.g., artificial legs of purchase orders or sales order) that mirror the ownership movement. However, this approach leads to inaccurate reporting, as the ERP systems indicate physical movements of the goods that the goods did not, in fact, make. Further, the approach leads to increased inventory cost accounting, as inventory cost accounting is required to be performed for physical movement of goods that did not actually happen. Another approach is to customize the ERP systems and add software modules, such as plug-in modules, to handle internal trades, or buy "off-the-shelf" software that provides functionality for handling internal trades. However, such customizations, and off-the-shelf software, are typically investment-intensive projects that take a number of years to build and stabilize, which increases design time to design new business flows. Further, the customizations, and the off-the-shelf software, often are not scalable to business changes, and can severely restrict companies in adopting new business models and upgrades to new ERP versions. Finally, such customizations, and off-the-shelf-software, are typically incomplete and do not meet all the requirements described above.

In order to address these problems, and to meet the requirements previously described, in one embodiment, a supply chain financial orchestration system is provided that includes a distinct trade accounting model. The supply chain financial orchestration system can receive trade events from one or more external applications. The supply chain financial orchestration system can enrich each trade event with cost accounting information in order to create a trade accounting event for each trade event, and can send each trade accounting event to an external cost accounting system, where the external cost accounting system can create accounting entries based on each trade accounting event, using the cost accounting information included within each trade accounting event.

More specifically, the supply chain financial orchestration system can provide inter-company and intra-company financial setup for supply chain business flows. The supply chain financial orchestration system can orchestrate the execution of trade events through trade routes by creating appropriate trade accounting events in external costing, payable, and receivable systems, as well as creating appropriate trade documents in external purchasing and sales order systems. The external costing, payable, and receivable systems can process the trade accounting events to create the appropriate accounting entries, and the external purchasing and sales order systems can process the trade documents.

Thus, the supply chain financial orchestration system can provide a way to track an intercompany transaction that is independent of a physical movement of goods. This allows for trade accounting to be performed, where the trade accounting is separate from inventory transaction cost accounting. This independent tracking is part of a trade accounting model that can establish a cost structure, and perform cost accounting, based on a trade event, as if the trade event is an actual physical transaction. The cost accounting can be rule-based, where one or more documentation and accounting rules are applied based on configured settings and captured relevant accounting attributes, as described below in greater detail. Further, in contrast to previous ERP systems where transactions were typically executed in an inventory execution system, and accounted in a cost accounting system, a separate system can produce trade events that can be independent of physical events, such as buy-sell trade accounting events that emanate from inter-/intra-company business flows. Thus, events that are not part of an inventory execution system can be accounted for.

As a real-world example, taking the aforementioned scenario of the company that includes a Chinese manufacturing plant and a United States sales office, there can be two paths: an ownership path where ownership moves from the Chinese manufacturing plant, to the United States sales office, and to the U.S. customer; and a physical custody path where the goods physically move from the Chinese manufacturing plant to the U.S. customer. In this scenario, a trade accounting model of the supply chain financial orchestration system can book a trade agreement between the Chinese manufacturing plant and the United States sales office. The supply chain financial orchestration system can receive trade events associated with the change of ownership of the goods, enrich the trade events with cost accounting information to create trade accounting events, and can send the trade accounting events to an external cost accounting application to create appropriate accounting entries based on the trade accounting events.

According to an embodiment, the trade accounting model of the supply chain financial orchestration system can provide significant new capabilities. One significant capability is a separation of trade events from an inventory execution system. In previous ERP systems, trade events were almost always part of an inventory execution system. In order for the inventory execution system to process a trade event, a trade event would have to be categorized as a physical inventory transaction, which was not always correct, as the trade event did not necessarily require physical movement of goods. This frustrated some customers of the ERP systems, as they did not always want to have trade events forming part of the inventory system. The trade accounting model separates the trade events from the physical inventory transaction events, where trade accounting events that correspond to the trade events can be directly created in an external cost accounting system.

Another significant capability is an ability to enable a physical execution to be performed without a concern about any ownership changes. By separating out trade events from an inventory system, and modeling the trade events in a costing system, a physical execution, such as a sale shipment, is no longer dependent on a creation of a trade event as a prerequisite.

Yet another significant capability is a separation of a trade accounting model from a core cost accounting model for physical inventory transactions. This is a major design improvement that can enable costing of trade events at actual costs. Prior ERP systems could be influenced by a cost method used for inventory valuation of physical goods. In these systems, the accounting for trade events could potentially be held back because of a pending cost accounting of a physical inventory transaction. This separation can facilitate an independent cost processing of these trade events.

Another significant capability is a true cost accounting for trade events. Many earlier ERP systems were not able to establish a cost structure for trade events. They were not able to add additional costs such as overheads to incoming costs. The trade accounting model can enable mapping of incoming costs into cost elements, as well as providing an ability to configure overhead rules on top of the incoming costs. The trade events can have an in-depth cost structure that is similar to a cost structure of any other physical inventory transaction. Thus, this is a capability not commonly found in previous ERP systems.

Yet another significant capability is configurable accounting templates for trade events. The trade accounting model can carry the accounting attributes that dictate the accounting debits and credits that are required. For example, if inter-company invoicing is enabled, the accounting can require the use of an inter-company cost of goods sold ("COGS") accounting. The trade accounting model can capture these accounting attributes efficiently, which is a new capability.

Another significant capability is an ability to establish a linkage among trade events. An important requirement is an ability to track costs and internal mark-ups separately in a cost structure. Typically, ERP systems do not have the capability to separate these in a cost structure. In the trade accounting model, the trade events can be stamped with certain common accounting attributes, as well as attributes that chain the trade events from one to another. This can facilitate seamless tracking of costs and internal mark-ups as a product moves through a supply chain.

Figures 1, 2, 3:
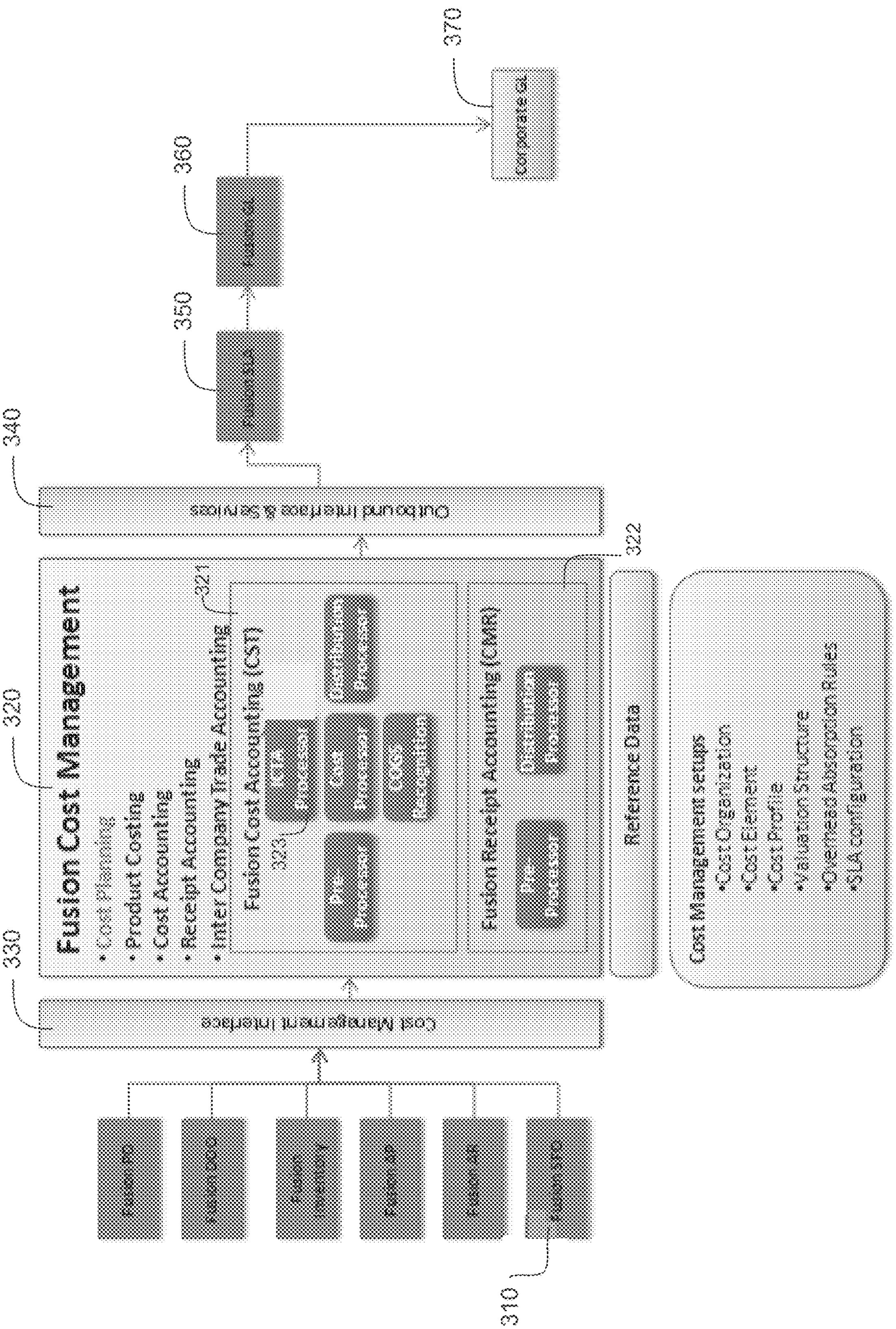

FIG. 1-3 illustrates an example integration of a supply chain financial orchestration system 310 with a cost accounting system 320, according to an embodiment of the invention. According to an embodiment, one or more legal/business entities can be defined as entities for a supply chain financial orchestration flow within supply chain financial orchestration system 310. A supply chain financial orchestration flow defines a trade relationship between a first entity and a second entity. The trade relationship can be an inter-company trade, and the first entity can be a profit center business unit of a first legal entity, and the second entity can be a profit center business unit of a second legal entity. Alternatively, the trade relationship can be an intra-company trade, and the first entity can be a profit center business unit of a legal entity, and the second entity can be a profit center business unit of the same legal entity. An example supply chain financial orchestration flow is further described below in conjunction with FIG. 1-16, and example architecture of a supply chain financial orchestration system is further described below in conjunction with FIG. 1-17. Further, one or more terms and/or conditions can be defined for the supply chain financial orchestration flow within supply chain financial orchestration system 310. Such terms and/or conditions can include documentation and accounting rules that can define one or more tasks to be performed in response to an event. Further, such terms and/or conditions can include transfer pricing rules that can define a transfer price used in a transaction between one or more entities of the supply chain financial orchestration flow. Example transfer pricing rules can include "cost+10%" (which sets a transfer price to a cost of an item plus 10% of the cost of the item), "fixed transfer pricing" (which sets a transfer price to a fixed amount), etc. Further, an accounting policy can be defined for the supply chain financial orchestration flow within supply chain financial orchestration system 310. Example accounting policies include whether an invoice should be generated, whether to track profits based on markups for internal transactions between two inter-company entities or two intra-company entities, etc.

In one embodiment, an ownership change definition can be defined within supply chain financial orchestration system 310. More specifically, an event, such as a physical execution event (also identified as a physical transaction) that determines an ownership change can be defined within supply chain financial orchestration system 310. An example ownership change definition can include a definition that ownership changes when physical goods are shipped from a first legal entity to a second legal entity. Another example ownership change definition can include a definition that ownership changes from a first legal entity to an intermediate legal entity when physical goods are shipped from the first legal entity to the intermediate legal entity, that ownership remains with the intermediate legal entity until the physical goods arrive at a second legal entity, and that ownership changes from the intermediate legal entity to the second legal entity when the physical goods arrive at the second legal entity.

According to the embodiment, an inventory system can record transactions associated with a supply chain financial orchestration flow, where a transaction can raise an event, such as a physical execution event. In certain embodiments, the transaction can be an internal transaction. Supply chain financial orchestration system 310 can listen for, and receive, the event, and determine from the recorded transaction, and one or more configurations that are defined within supply chain financial orchestration system 310 (such as an ownership change definition), whether the event indicates an ownership change. Where an event indicates an ownership change, supply chain financial orchestration system 310 can generate one or more trade events and send the trade event(s) to external cost accounting system 320 using cost management interface 330. In one embodiment, supply chain financial orchestration system 310 can also send one or more accounting attributes used for cost accounting. Such accounting attributes can include one or more pricing attributes (which define a transfer price), one or more accounting template attributes (which define an accounting template, where an accounting template includes one or more documentation and accounting rules and/or one or more transfer pricing rules), one or more profit tracking attributes (which define whether to track mark-ups), etc. As illustrated in FIG. 1-3, cost accounting system 320 can also receive events sent by other systems.

Example supply chain financial orchestration flows include: a global procurement flow; a customer shipment flow; and an internal transfer flow. A global procurement flow is a supply chain financial orchestration flow where a central buying entity buys goods from suppliers on behalf of one or more internal entities. The supplier liability is borne by the purchasing entity. The purchasing and requesting entity settle the transaction among themselves using a transfer price (sometimes through one or more intermediary entities). A customer shipment flow is a supply chain financial orchestration flow in which a selling business unit is different from a profit center business unit of the entity that owns and ships the goods. The selling entity receives an order from a customer, and the shipping entity ships the goods directly to the customer. The shipping entity is settled financially by the selling entity (sometimes through one or more intermediary entities). A customer shipment flow can be an internal drop shipment flow, which is a forward customer shipment flow, or a customer drop shipment flow, which is a return customer shipment flow. An internal transfer flow is a supply chain financial orchestration flow in which physical movement of goods happens between internal entities. The internal entities settle the financial transactions among themselves using a transfer price.

Further, example trade events include: a trade receipt accrual; a trade in-transit receipt; a trade in-transit issue; a trade sales issue; a trade return accrual; a trade in-transit return; a trade in-transit return receipt; and a trade sales return. A trade receipt accrual is a trade event that represents a possession of ownership of goods independent of a physical position of the goods. A trade in-transit receipt is a trade event that represents goods entering in-transit status. A trade in-transit issue is a trade event that represents goods moving out of in-transit status. A trade sales issue is a trade event that represents a sale transaction that records a cost (or deferred cost) of goods sold. Trade receipt accruals, trade in-transit receipts, trade in-transit issues, and trade sales issues are associated with a forward flow for a supply chain financial orchestration flow. A trade return accrual is a trade event that represents a reversal of ownership of goods independent of a physical position of the goods due to a return transaction.

A trade in-transit return is a trade event that represents goods exiting in-transit status due to a return transaction. A trade in-transit return receipt is a trade event that represents a possession of ownership of goods due to a return transaction. A trade sales return is a trade event that represents a sales return transaction that records a reversal of cost (or deferred cost) of goods sold due to a return transaction. Trade return accruals, trade in-transit returns, trade in-transit return receipts, and trade sales returns are associated with a return flow for a supply chain financial orchestration flow.

Even further, for a global procurement flow, example physical execution events include a purchase order ("PO") receipt, a PO delivery, a PO return, a match, a correction, or a PO return to receiving. For a customer shipment flow, example physical execution events include a sales order issue, a return merchandise authorization ("RMA") receipt, a drop shipment receipt, or a drop shipment delivery. For an internal transfer flow, example physical execution events include an in-transit shipment, an in-transit receipt, an in-transit receipt delivery, a transfer order shipment, a transfer order receipt, a transfer order delivery, a transfer order return to receiving, a transfer order return to shipping entity, or a transfer order return receipt.

According to the embodiment, cost accounting system 320 receives the trade events sent by supply chain financial orchestration 310, performs accounting for the received trade events, and generates one or more trade accounting events based on the received trade events. The accounting can include accounting for an item whose ownership is transformed from a first legal entity to a second legal entity. The accounting can also be based on a transfer price agreed upon by the two legal entities. The transfer price can be defined as part of an agreement (also identified as "buy and sell terms") between the two legal entities. More specifically, cost accounting system 320 includes cost accounting component 321 and receipt accounting component 322. Cost accounting component 321 receives a first set of trade events, performs accounting for the first set of trade events, and generates one or more trade accounting events based on the first set of trade events. According to the embodiment, the first set of trade events can include trade events used to book a buy-sell trade agreement (e.g., trade in-transit receipts, trade in-transit issues, trade sales issues, trade in-transit returns, trade in-transit return receipts, and/or trade sales returns). Further, according to the illustrated embodiment, cost accounting component 321 includes an inter-company trade accounting ("ICTA") processor 323 configured to process the first set of trade events, perform the accounting of the first set of trade events and generate the one or more trade accounting events based on the first set of trade events. ICTA processor 323 can be a stand-alone component that is agnostic to a specific cost method. This way, ICTA processor 323 can be run as an individual sub-processor within cost accounting system 320. Receipt accounting component 322 can receive a second set of trade events, perform an accounting of the second set of trade events, and generate one or more trade accounting events based on the second set of trade events. According to the embodiment, the second set of trade events can include trade events used to create inter-/intra-company accruals (e.g., trade receipt accruals and/or trade return accruals). Receipt accounting component 322 can further include one or more interfaces for trade events received from supply chain financial orchestration system 310.

According to the embodiment, cost accounting system 320 can, in parallel, receive events, such as physical execution events, from one or more other systems. Cost accounting system 320 can further, in parallel, process the physical execution events, and perform accounting for the received physical execution events. Thus, an accounting of trade events can be independent of an accounting of the physical execution events.

In accordance with the embodiment, cost accounting system 320 sends the trade accounting events to external cost accounting systems 350, 360, and 370 via outbound interface 340. The trade accounting events are further processed by external cost accounting systems 350, 360, and 370.

FIG. 1-4 illustrates an example diagram of a supply chain financial orchestration system 410 that processes trade events, according to an embodiment of the invention. The diagram illustrated in FIG. 1-4 includes execution systems 420, which represent systems that can execute supply chain financial orchestration flows. In the illustrated embodiment, execution systems include receiving execution system 421 which is an execution system that can record and transact receipts, and inventory execution system 422 which is an execution system that can manage inventory items as the move through a supply chain. However, in alternate embodiments, execution systems 420 can include any type of execution system (or any number of execution systems) that can execute supply chain financial orchestration flows.

According to the embodiment, during execution of supply chain financial orchestration flows, execution systems 420 (such as receiving execution system 421 and inventory execution system 422) can raise events associated with supply chain financial orchestration flows (represented in FIG. 1-4 as new events 423). Some of these events can be physical execution events. These physical execution events are represented in FIG. 1-4 as physical execution events 424, 425, and 426. Further, some of these events can indicate an ownership change of an item. Supply chain financial orchestration system 410 can receive the raised events, and determine whether each raised event indicates an ownership change of an item. If a raised event indicates an ownership change of an item, supply chain financial orchestration system 410 can generate one or more trade events. These trade events represented in FIG. 1-4 as trade events 411, 412, 413, 414, 415, 416, 417, 418, and 419.

According to the embodiment, once supply chain financial orchestration system 410 has generated the trade events, supply chain financial orchestration system 410 can divide the trade events into a set of accrual trade events and a set of costing trade events. The set of accrual trade events can include trade events used to create inter-/intra-company accruals (e.g., trade receipt accruals and/or trade return accruals). The set of costing trade events can include trade events used to book a buy-sell trade agreement (e.g., trade in-transit receipts, trade in-transit issues, trade sales issues, trade in-transit returns, trade in-transit return receipts, and/or trade sales returns).

Supply chain financial orchestration system 410 can send the set of accrual trade events to receipt accounting system 430. Receipt accounting system 430 can receive the accrual trade events from supply chain financial orchestration system 410, perform accounting for the received accrual trade events, and generate one or more trade accounting events based on the received accrual trade events. These trade accounting events are represented in FIG. 1-4 as trade accounting events 431. Supply chain financial orchestration system 410 can further send the set of costing trade events to cost accounting system 440. Cost accounting system 440 can receive the costing trade events from supply chain financial orchestration system 410, perform accounting for the received costing trade events, and generate one or more trade accounting events based on the received costing trade events. These trade accounting events are represented in FIG. 1-4 as trade accounting events 441 and 442.

According to the embodiment, inventory execution system 422 can also send one or more physical execution events to cost accounting system 440 via inventory interface 450. Cost accounting system 440 can receive the physical execution events, perform accounting for the received physical execution events, and generate one or more accounting events based on the received physical execution events. These accounting events are represented in FIG. 1-4 as physical execution events 443. Thus, an accounting of trade events can be independent of an accounting of the physical execution events.

Further, according to the illustrated embodiment, reference data 460 can be sent to cost accounting system 440 via inventory interface 450. Reference data 460 can include one or more accounting attributes used for cost accounting, where the one or more accounting attributes are defined for an agreement (i.e., buy and sell terms) between two entities of a supply chain financial orchestration flow. The one or more accounting attributes can include one or more pricing attributes (which can define a transfer price), one or more accounting template attributes (which can define an accounting template), one or more profit tracking attributes (which can define whether to track mark-ups), etc. Cost accounting system 440 can use the one or more accounting attributes to perform the accounting for the received trade accounting events and/or physical execution events.

FIG. 1-5 illustrates an example diagram of a cost accounting system that performs accounting based on trade events received from a supply chain financial orchestration system, according to an embodiment of the invention. The diagram illustrated in FIG. 1-5 illustrates a trade events interface (i.e., costing trade events interface 530) as a single gateway to get various trade accounting events into a costing system. From the trade events interface, the diagram branches into three different transaction processing models representing different functional states of the trade. The diagram illustrated in FIG. 1-5 includes supply chain financial orchestration task layer service 510, inter-company trade accounting pre-processor 520, and costing trade events interface 530. Supply chain financial orchestration task layer service 510 is a task layer service of a supply chain financial orchestration system that can send trade events created by the supply chain financial orchestration system to costing trade events interface 530, where the trade events can represent a change in ownership of an item associated with a supply chain financial orchestration flow. Inter-company trade accounting pre-processor 520 is a processing function that can generate trade events that represent a physical execution event associated with a supply chain financial orchestration flow, and that can send the generated trade events to costing trade events interface 530. Costing trade events interface 530 is an interface that can hold all trade events to be accounted by the cost accounting system.

The diagram illustrated in FIG. 1-5 further includes receipt accounting process 540, intercompany trade accounting process 550, and cost accounting process 560. Receipt accounting process 540 can produce receipt accounting transactions 570, which represent a state of the trade where ownership moves to an entity in a supply chain. Accrued liability can be booked awaiting recognition of an in-transit state of inventory. More specifically, receipt accounting process 540 can receive trade events used to create inter-/intra-company accruals (e.g., trade receipt accruals and/or trade return accruals), and can create and process trade accounting events (more specifically, receipt accounting events). These receipt accounting events are represented in FIG. 1-5 as accrual accounting events 571, 572, and 573. Intercompany trade accounting process 550 can produce accounting in-transit transactions 580, which represent a state of the trade where the goods are physically in-transit in the physical supply chain, and where the ownership of the goods can potentially pass through one or more entities within the supply chain. This model can identify a current owner of the goods and services irrespective of physical custody of the goods and services. More specifically, intercompany trade accounting process 550 can receive trade events used to book in-transit buy-sell trade agreements (e.g., trade in-transit receipts, trade in-transit issues, trade in-transit returns, and/or trade in-transit return receipts), and can create trade accounting events (more specifically, in-transit cost accounting events). These in-transit cost accounting events are represented in FIG. 1-5 as in-transit cost accounting events 581 and 582. Cost accounting process 560 can produce cost accounting transactions 590, which represent a state of the trade where the goods are physically received in a location tracked by an overall enterprise. At this point, the inventory valuation can be established. Further, when the goods are eventually sold to an end customer, the inventory can be moved out of the supply chain financial orchestration system, and a COGS can be recorded. More specifically, cost accounting process 560 can receive trade events used to book buy-sell trade agreements (e.g., trade sales issues, and/or trade sales returns), and can create and process trade accounting events (more specifically, cost accounting events). These cost accounting events are represented in FIG. 1-5 as trade accounting events 591. Cost accounting process 560 can further receive physical execution events, and can create and process accounting events associated with the physical execution events, not shown in FIG. 1-5.

FIG. 1-6A illustrates trade accounting events generated for a forward flow of a global procurement flow, according to an embodiment of the invention. A global procurement flow is a supply chain financial orchestration flow where the goods are physically delivered by a supplier to a requesting inventory location of an enterprise. However, the financial obligations are borne by a different entity from the entity where the goods are delivered. According to the embodiment, the global procurement flow includes a "sold-to" legal entity, an intermediate legal entity, and a destination legal entity. A sold-to legal entity represents a legal entity and profit center business unit that pays a supplier for the goods purchased. An intermediate legal entity represents a legal entity and profit center business unit that purchases the goods from the sold-to legal entity, and that sells the goods to a downstream entity. A destination legal entity represents a legal entity and profit center business unit that purchases the goods from the intermediate entity, and receives the final physical possession and ownership of goods. Most typically, the trade between the sold-to legal entity and the intermediate legal entity, and the trade between the intermediate legal entity and the destination legal entity happens at a transfer price different from a purchase order price. As described below in greater detail, ownership of the goods moves from the supplier to the sold-to legal entity, from the sold-to legal entity to the intermediate legal entity, and from the intermediate legal entity to the destination legal entity. Further, the flow of costs through the supply chain entities is illustrated in FIG. 1-6A.

First, a physical execution event, vendor shipment 601, is generated. At this point in the global procurement flow, the ownership of an item associated with the global procurement flow belongs to the sold-to legal entity. Thus, a receipt accounting event, trade receipt accrual 602, is generated, and two cost accounting events, trade in-transit receipt 603 and trade in-transit issue 604, are generated. Subsequently, the ownership of the item is transferred to the intermediate legal entity. Thus, a receipt accounting event, trade receipt accrual 605, is generated, and two cost accounting events, trade in-transit receipt 606 and trade in-transit issue 607, are generated. Subsequently, the ownership of the item is transferred to the destination legal entity. Thus, a receipt accounting event, trade receipt accrual 608, and a cost accounting event, trade in-transit receipt 609, are generated. Further, two physical execution events, PO receipt 610 and PO Delivery 611, are generated. At the destination legal entity, the trade events move the goods out of in-transit, and physical events bring the goods into inventor valuation.

FIG. 1-6B illustrates trade accounting events generated for a return flow of a global procurement flow, according to an embodiment of the invention. This is the return flow of the forward flow of the global procurement flow, illustrated in FIG. 1-6A. The main difference, as discussed below in greater detail, is that the goods are physically returned from an original inventory location to a supplier directly, but a refund happens along a different financial path. Financially, the return flow reverses what occurred in the forward flow that is illustrated in FIG. 1-6A. Similar to the embodiment illustrated in FIG. 1-6A, the global procurement flow includes a "sold-to" legal entity, an intermediate legal entity, and a destination legal entity. First, a receipt accounting event, trade return accrual 612, and a physical execution event, PO return to vendor 613, are generated. Further, a cost accounting event, trade in-transit return 614, and a physical execution event, PO return to receiving 615, are generated. At this point in the global procurement flow, the ownership of an item associated with the global procurement flow belongs to the destination legal entity. Subsequently, the ownership of the item is transferred back to the intermediate legal entity. Thus, a receipt accounting event, trade return accrual 616, is generated, and two cost accounting events, trade in-transit return 617 and trade in-transit return receipt 618, are generated. Subsequently the ownership of the item is transferred back to the sold-to legal entity. Thus, a receipt accounting event, trade return accrual 619, is generated, and two cost accounting events, trade in-transit return 620 and trade in-transit return receipt 621, are generated.

FIG. 1-7A illustrates trade accounting events generated for a forward flow and a return flow of a customer shipment flow, according to an embodiment of the invention. A customer shipment flow is a supply chain financial orchestration flow where the goods are physically delivered to a customer from a shipping location of an enterprise. However, the financial obligations are borne by a different entity from the entity where the goods are shipped from. According to the embodiment, the customer shipment flow includes a selling legal entity, an intermediate legal entity, and a shipping legal entity. A selling legal entity represents a legal entity and profit center business unit that sells to an end customer. An intermediate legal entity represents a legal entity and profit center business unit that purchases the goods from a shipping legal entity, and that sells the goods to an upstream entity. A shipping legal entity represents a legal entity and profit center business unit that purchases the goods from the intermediate entity, and sells the goods to an end customer. Most typically, the trade between the selling legal entity and the intermediate legal entity, and the trade between the intermediate legal entity and the shipping legal entity happens at a transfer price different from a sales order price. As described below in greater detail, ownership of the goods moves from the shipping legal entity to the intermediate legal entity, from the intermediate legal entity to the selling legal entity, and from the selling legal entity to the end customer. Further, the flow of costs through the supply chain entities is illustrated in FIG. 1-7A.

First, for a forward flow, a cost accounting event, trade sales issue 701, and a physical execution event, sales order issue 702, are generated. At this point in the customer shipment flow, the ownership of an item associated with the customer shipment flow belongs to the shipping legal entity. Subsequently, the ownership of the item is transferred to the intermediate legal entity. Thus, a receipt accounting event, trade receipt accrual 703, is generated, and two cost accounting events, trade in-transit issue 704 and trade in-transit receipt 705, are generated. Subsequently the ownership of the item is transferred to the selling legal entity. Thus, a receipt accounting event, trade receipt accrual 706, is generated, and two cost accounting events, trade sales issue 707 and trade in-transit receipt 708, are generated. Subsequently, a physical execution event, customer receipt 709, is generated.

For the return flow, a physical execution event, customer return 710, is generated. At this point in the customer shipment flow, the ownership of an item associated with the return flow of the customer shipment flow belongs to the selling legal entity. Thus, a receipt accounting event, trade return accrual 711, is generated, and two cost accounting events, trade sales return 712 and trade in-transit return receipt 713, are generated. Subsequently, the ownership of the item is transferred to the intermediate legal entity. Thus, a receipt accounting event, trade return accrual 714, is generated, and two cost accounting events, trade in-transit return 715 and trade in-transit return receipt 716, are generated. Subsequently, the ownership of the item is transferred to the shipping legal entity. Thus, a cost accounting event, trade sales return 717, and a physical execution event, RMA receipt 718, are generated.

FIG. 1-7B illustrates forward and return variations of a customer shipment flow, according to an embodiment of the invention. The customer shipment flow is a supply chain financial orchestration flow where the goods are physically returned by an end customer to a location of an enterprise. However, the financial obligation is borne by an entity that is different from an entity where the goods are returned to. According to the embodiment, the customer shipment flow includes two legal entities of a China trade ops business unit, legal entities 720 and 721, a legal entity of a Singapore trade ops business unit, legal entity 722, a legal entity of a United States ops business unit, legal entity 723, and a customer location, customer location 724. As illustrated in FIG. 1-7B, a forward flow of a customer shipment flow can proceed from legal entity 720 to legal entity 722 to legal entity 723 to legal entity 724. However, as also illustrated in FIG. 1-7B, a return flow of a customer shipment flow can proceed in one of four manners. First, a return flow can proceed from legal entity 724 to legal entity 723. Second, a return flow can proceed from legal entity 724 to legal entity 722. Third, a return flow can proceed from legal entity 724 to legal entity 721. Fourth, a return flow can proceed from legal entity 724 to legal entity 720.

FIGS. 1-8A, 1-8B, 1-8C, and 1-8D illustrate trade accounting events for a forward flow and a return flow of a customer drop shipment flow for four different scenarios. A customer shipment flow is a supply chain financial orchestration flow where the goods are physically delivered to a customer by the supplier. However, the financial obligations are borne by a different entity from the entity that pays for the purchase. For FIGS. 1-8A, 1-8B, 1-8C, and 1-8D, the definitions of a shipping legal entity, selling legal entity, intermediate legal entity, and sold-to legal entity are the same as the definitions previously described. Based on the four different scenarios, different legal entities are involved, and are illustrated in the respective figures. A strength of this trade accounting model is that the same trade accounting events remain valid irrespective of the scenario. In other words, each scenario only involves the modification of trading entities, but the trade accounting events remain the same set of trade accounting events.

FIG. 1-8A illustrates trade accounting events generated for a forward flow and a return flow of a customer drop shipment flow where there is a single business unit drop shipment, according to an embodiment of the invention. According to the embodiment, the single business unit of the customer drop shipment flow is a sold-to legal entity, a requisitioning legal entity, and a selling legal entity. First, for a forward flow, a physical execution event, vendor shipment 801, is generated. At this point in the customer drop shipment flow, the ownership of an item associated with the customer drop shipment flow belongs to the sold-to/requisitioning/selling legal entity. Thus, a receipt accounting event, trade receipt accrual 808, is generated, and a cost accounting event, trade in-transit receipt 809, are generated. Further, two physical execution events, drop shipment receipt 810 and drop shipment delivery 811, are generated. Subsequently, a cost accounting event, trade sales issue 812, and a physical execution event, customer receipt 819, are generated.

For the return flow, a physical execution event, RMA receipt 826, and a cost accounting event, trade sales return 827, are generated. Subsequently, a receipt accounting event, trade return accrual 828, and a cost accounting event, trade in-transit return 829, are generated. Further, two physical execution events, drop shipment PO return to vendor 830, and drop shipment PO return to receiving 831, are generated.

FIG. 1-8B illustrates trade accounting events generated for a forward flow and a return flow of a customer drop shipment flow where the selling legal entity is also the requisitioning legal entity, according to an embodiment of the invention. According to the embodiment, the customer drop shipment flow includes a sold-to legal entity, an intermediate legal entity, and a selling legal entity (which is also a requisitioning legal entity). First, for a forward flow, a physical execution event, vendor shipment 801, is generated. At this point in the customer drop shipment flow, the ownership of an item associated with the customer drop shipment flow belongs to the sold-to legal entity. Thus, a receipt accounting event, trade receipt accrual 802, is generated, and two cost accounting events, trade in-transit receipt 803 and trade in-transit issue 804, are generated. Subsequently, the ownership of the item is transferred to the intermediate legal entity. Thus, a receipt accounting event, trade receipt accrual 805, is generated, and two cost accounting events, trade in-transit receipt 806 and trade in-transit issue 807, are generated. The ownership of the item is further transitioned to the requisitioning/selling legal entity. Subsequently, a receipt accounting event, trade return accrual 808, and a cost accounting event, trade in-transit receipt 809, are generated. Further, two physical execution events, drop shipment receipt 810, and drop shipment delivery 811, are generated. Subsequently, a cost accounting event, trade sales issue 812, and a physical execution event, customer receipt 819, are generated.

For the return flow, a physical execution event, RMA receipt 826, and a cost accounting event, trade sales return 827, are generated. Subsequently, a receipt accounting event, trade return accrual 828, and a cost accounting event, trade in-transit return 819, are generated. Further, two physical execution events, drop shipment PO return to vendor 830, and drop shipment PO return to receiving 831, are generated. Subsequently, the ownership of the item is transferred to the intermediate legal entity. Thus, a receipt accounting event, trade return accrual 832, is generated, and two cost accounting events, trade in-transit return 833 and trade in-transit return receipt 834, are generated. The ownership of the item is further transitioned to the sold-to legal entity. Thus, a receipt accounting event, trade return accrual 835, is generated, and two cost accounting events, trade in-transit return 836 and trade in-transit return receipt 837, are generated.

FIG. 1-8C illustrates trade accounting events generated for a forward flow and a return flow of a customer drop shipment flow where the requisitioning legal entity is also the "sold-to" legal entity, according to an embodiment of the invention. According to the embodiment, the customer drop shipment flow includes a sold-to legal entity (which is also a requisitioning legal entity), an intermediate legal entity, and a selling legal entity. First, for a forward flow, a physical execution event, vendor shipment 801, is generated. At this point in the customer drop shipment flow, the ownership of an item associated with the customer drop shipment flow belongs to the sold-to legal entity. Thus, a receipt accounting event, trade return accrual 808, and a cost accounting event, trade in-transit receipt 809, are generated. Further, two physical execution events, drop shipment receipt 810, and drop shipment delivery 811, are generated. Subsequently, a cost accounting event, trade sales issue 812, is generated. The ownership of the item is subsequently transitioned to the intermediate legal entity. Thus, a receipt accounting event, trade receipt accrual 813, is generated, and two cost accounting events, trade in-transit receipt 814 and trade in-transit issue 815, are generated. The ownership of the item is subsequently transitioned to the selling legal entity. Thus, a receipt accounting event, trade receipt accrual 816, is generated, and two cost accounting events, trade in-transit receipt 817 and trade in-transit issue 818, are generated. Subsequently, a physical execution event, customer receipt 819, is generated.

For the return flow, a receipt accounting event, trade return accrual 820, is generated, and two cost accounting events, trade sales return 821 and trade in-transit return receipt 822, are generated. The ownership of the item is subsequently transitioned to the intermediate legal entity. Thus, receipt accounting event, trade return accrual 823, is generated, and two cost accounting events, trade in-transit return 824 and trade in-transit return receipt 825, are generated. The ownership of the item is further transitioned to the requisitioning/sold-to legal entity. Thus, a physical execution event, RMA receipt 826, and a cost accounting event, trade sales return 827, are generated. Subsequently, a receipt accounting event, trade return accrual 828, and a cost accounting event, trade in-transit return 819, are generated. Further, two physical execution events, drop shipment PO return to vendor 830, and drop shipment PO return to receiving 831, are generated.

FIG. 1-8D illustrates trade accounting events generated for a forward flow and a return flow of a customer drop shipment flow where a sold-to legal entity, requisitioning legal entity, and selling legal entity are all different, according to an embodiment of the invention. First, for a forward flow, a physical execution event, vendor shipment 801, is generated. At this point in the customer drop shipment flow, the ownership of an item associated with the customer drop shipment flow belongs to the sold-to legal entity. Thus, a receipt accounting event, trade receipt accrual 802, is generated, and two cost accounting events, trade in-transit receipt 803 and trade in-transit issue 804, are generated. Subsequently, the ownership of the item is transferred to a first intermediate legal entity. Thus, a receipt accounting event, trade receipt accrual 805, is generated, and two cost accounting events, trade in-transit receipt 806 and trade in-transit issue 807, are generated. The ownership of the item is further transitioned to the requisitioning legal entity. Subsequently, a receipt accounting event, trade return accrual 808, and a cost accounting event, trade in-transit receipt 809, are generated. Further, two physical execution events, drop shipment receipt 810, and drop shipment delivery 811, are generated. Subsequently, a cost accounting event, trade sales issue 812, is generated. The ownership of the item is subsequently transitioned to a second intermediate legal entity. Thus, a receipt accounting event, trade receipt accrual 813, is generated, and two cost accounting events, trade in-transit receipt 814 and trade in-transit issue 815, are generated. The ownership of the item is subsequently transitioned to the selling legal entity. Thus, a receipt accounting event, trade receipt accrual 816, is generated, and two cost accounting events, trade in-transit receipt 817 and trade in-transit issue 818, are generated. Subsequently, a physical execution event, customer receipt 819, is generated.

For the return flow, a receipt accounting event, trade return accrual 820, is generated, and two cost accounting events, trade sales return 821 and trade in-transit return receipt 822, are generated. The ownership of the item is subsequently transitioned to the second intermediate legal entity. Thus, receipt accounting event, trade return accrual 823, is generated, and two cost accounting events, trade in-transit return 824 and trade in-transit return receipt 825, are generated. The ownership of the item is further transitioned to the requisitioning legal entity. Thus, a physical execution event, RMA receipt 826, and a cost accounting event, trade sales return 827, are generated. Subsequently, a receipt accounting event, trade return accrual 828, and a cost accounting event, trade in-transit return 819, are generated. Further, two physical execution events, drop shipment PO return to vendor 830, and drop shipment PO return to receiving 831, are generated. Subsequently, the ownership of the item is transferred to the first intermediate legal entity. Thus, a receipt accounting event, trade return accrual 832, is generated, and two cost accounting events, trade in-transit return 833 and trade in-transit return receipt 834, are generated. The ownership of the item is further transitioned to the sold-to legal entity. Thus, a receipt accounting event, trade return accrual 835, is generated, and two cost accounting events, trade in-transit return 836 and trade in-transit return receipt 837, are generated.

Figures 1, 2, 3, 4:
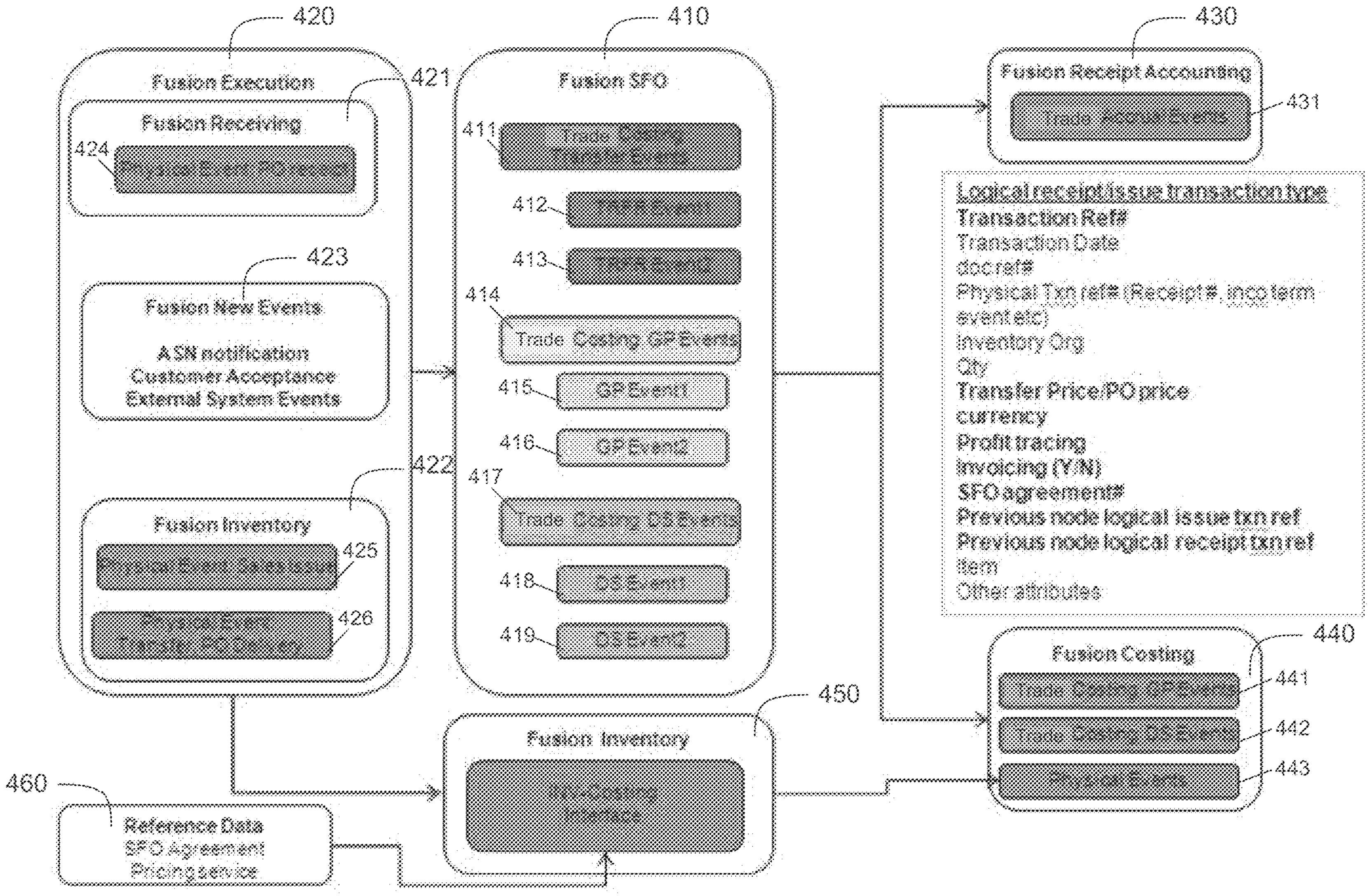
Figures 1, 2, 3, 4, 5:
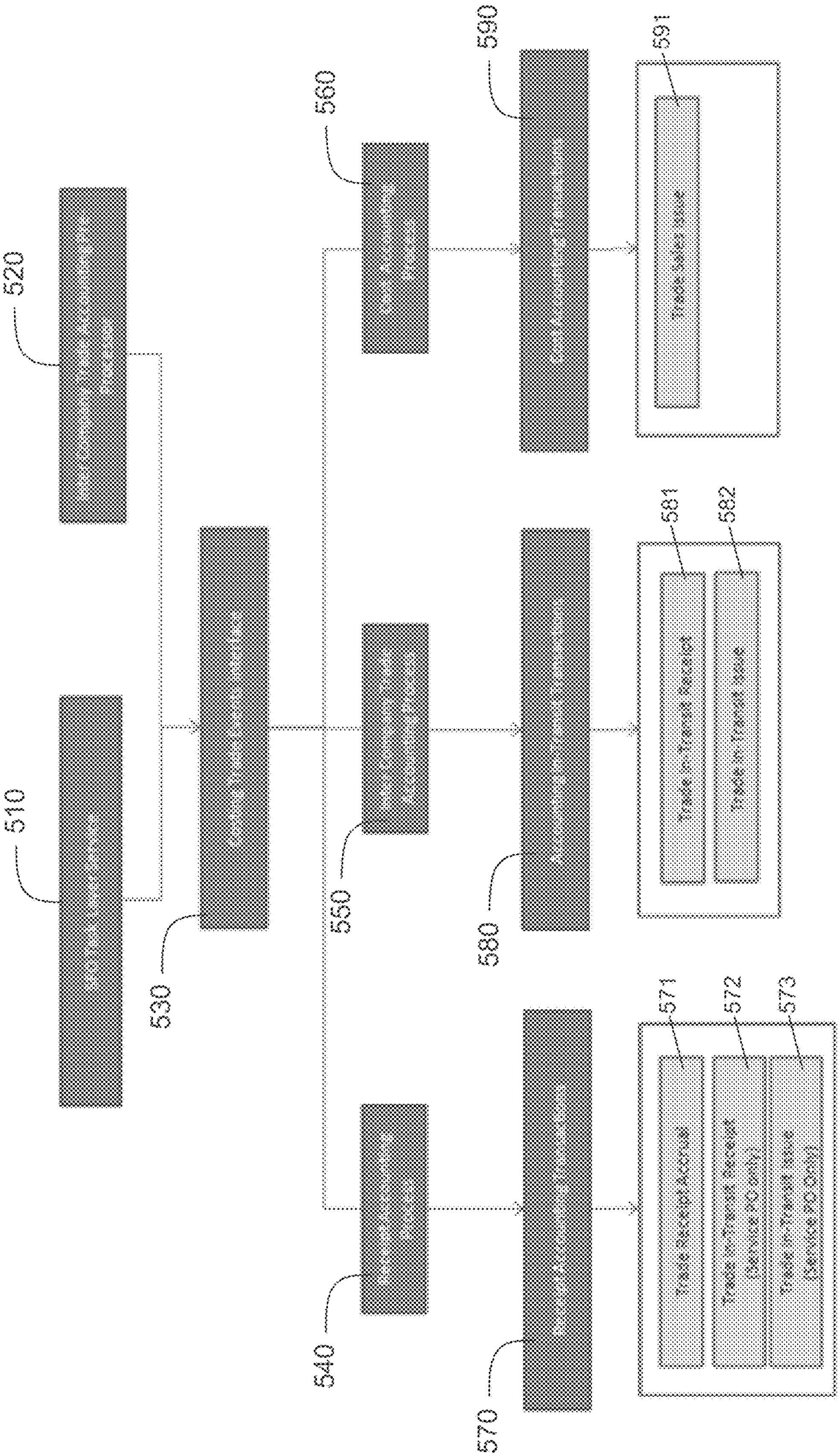
Figures 1, 2, 3, 4, 5, 6, 6A:
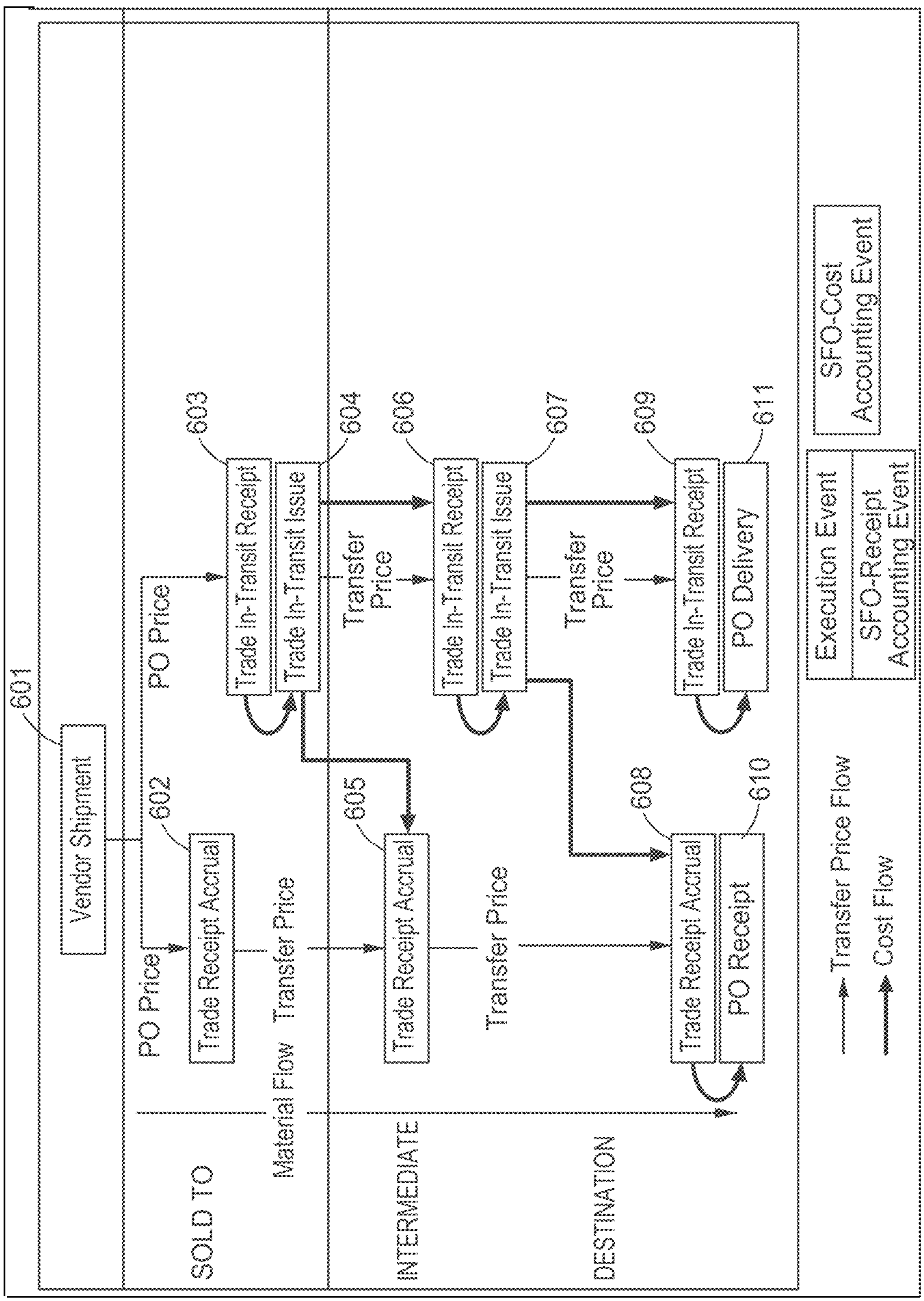
Figures 1, 2, 3, 4, 5, 6, 6B:
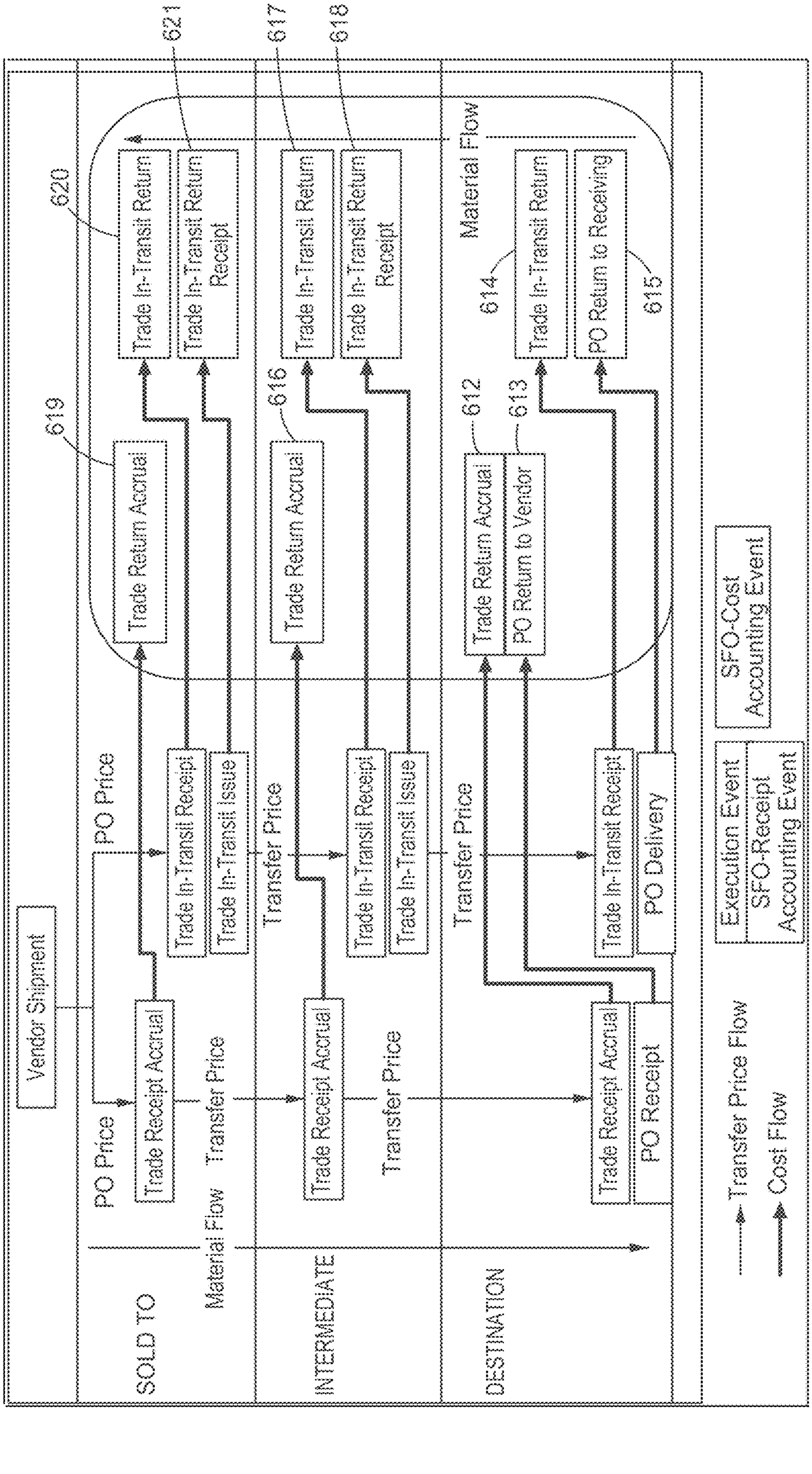
Figures 1, 2, 3, 4, 5, 6, 7, 7A:
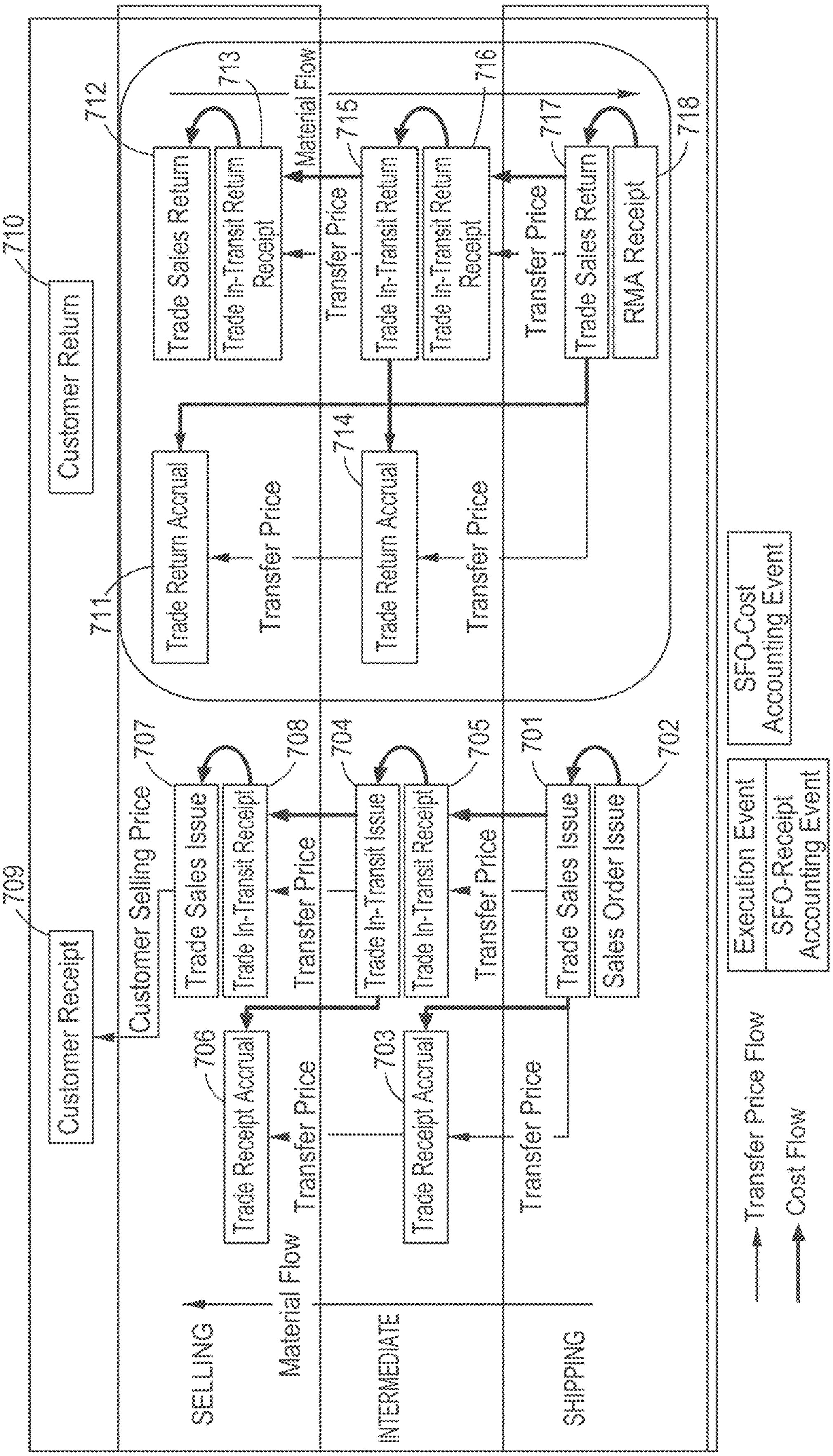
Figures 1, 2, 3, 4, 5, 6, 7, 7B:
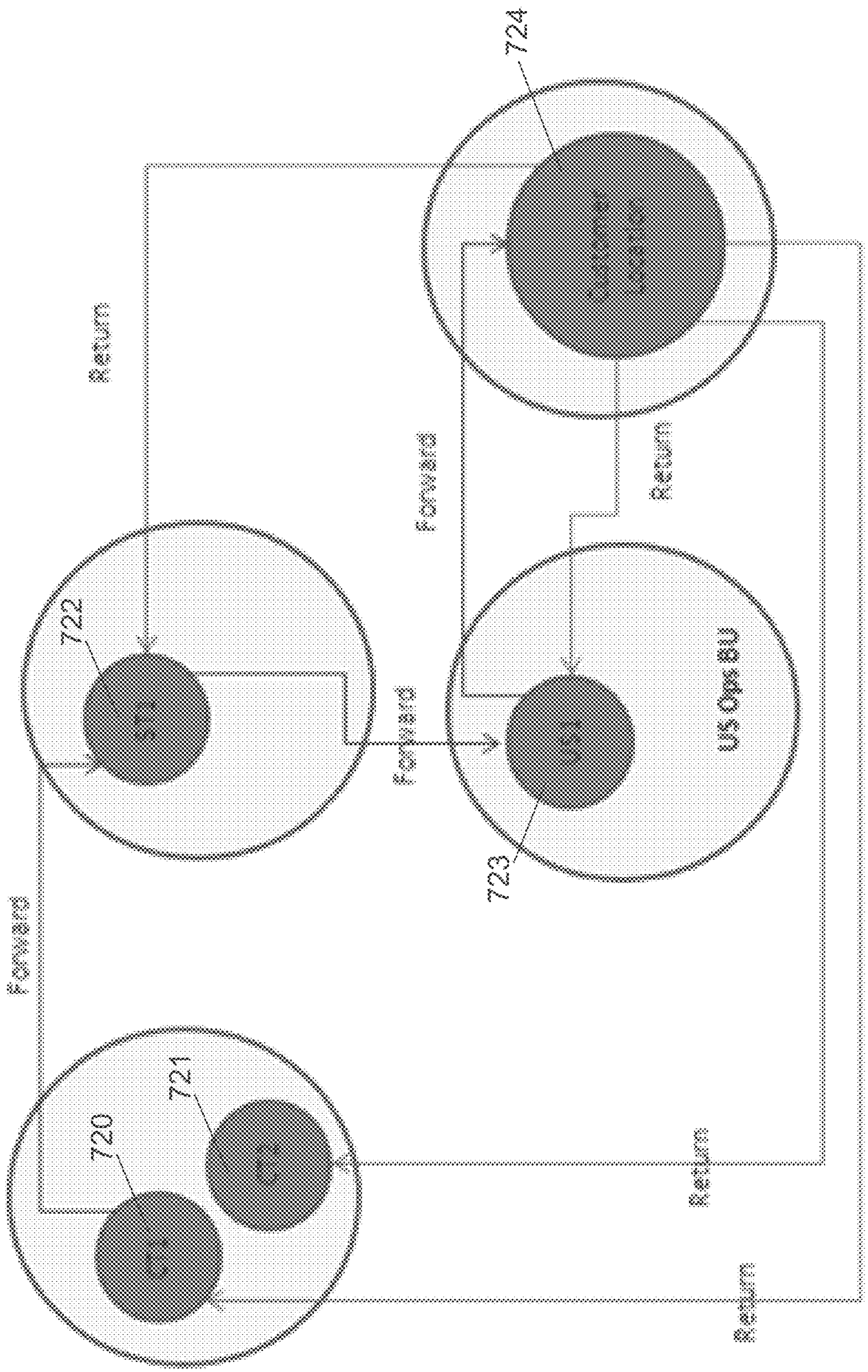
Figures 1, 2, 3, 4, 5, 6, 7, 8, 8A:
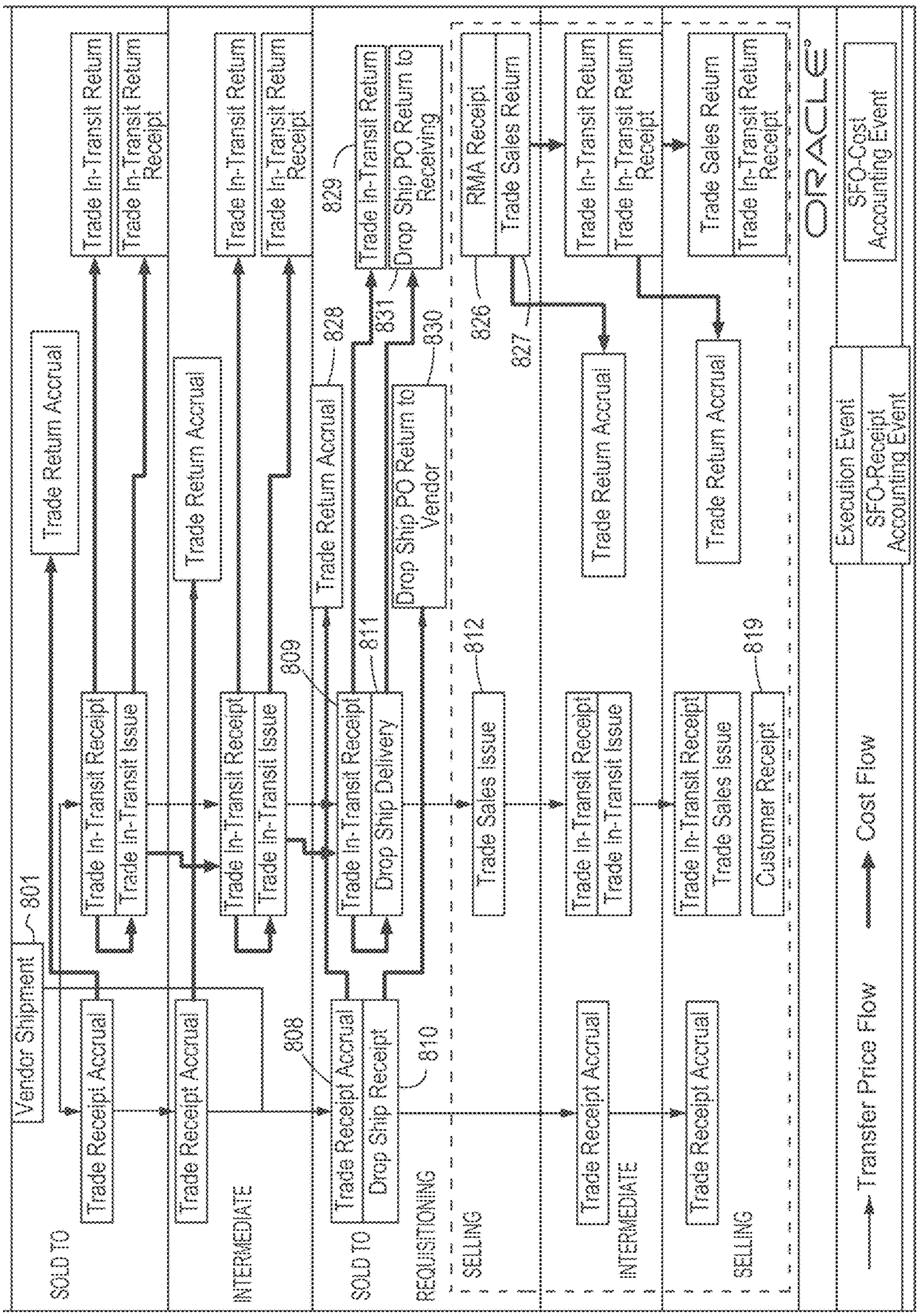
Figures 1, 2, 3, 4, 5, 6, 7, 8, 8B:
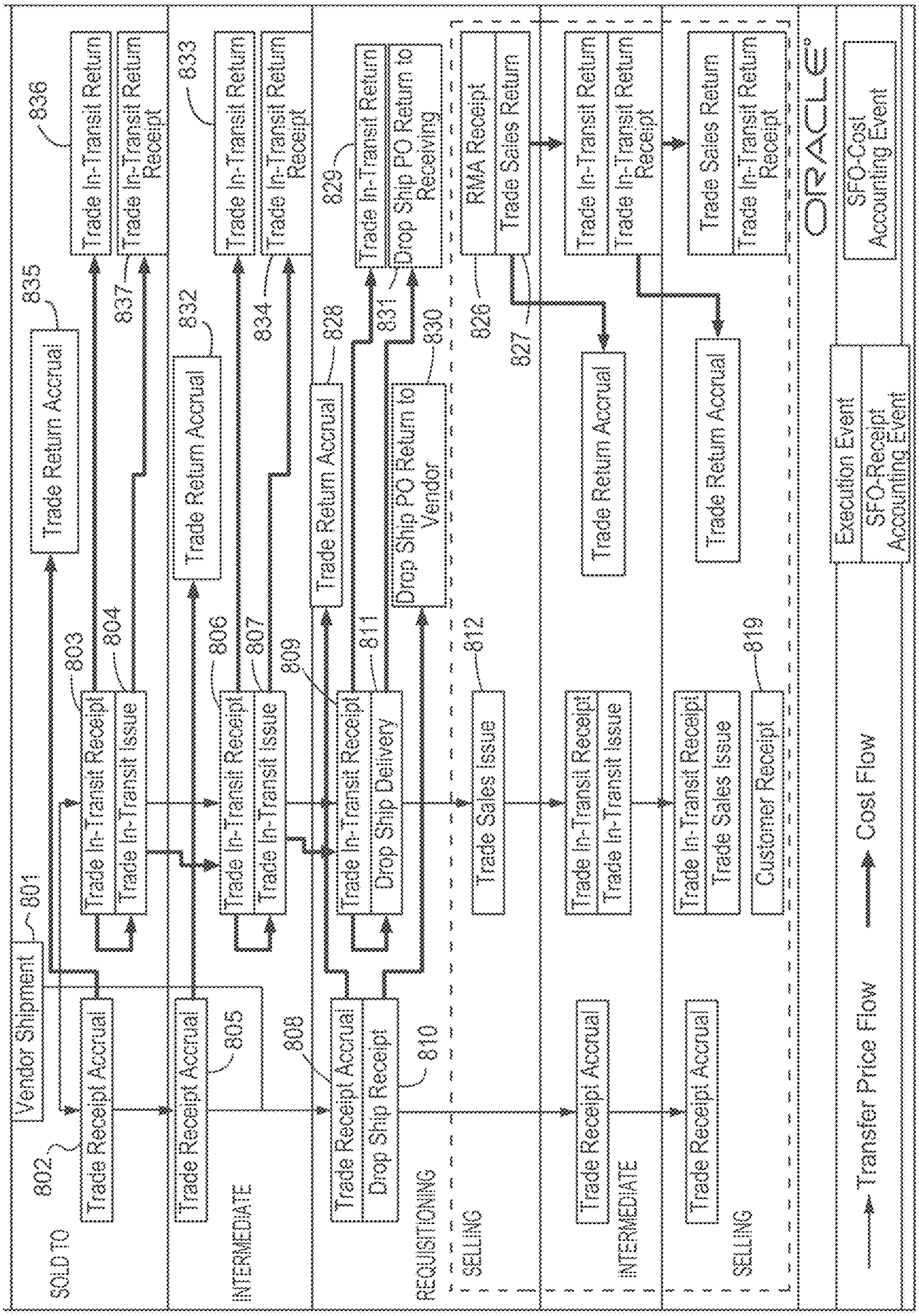
Figures 1, 2, 3, 4, 5, 6, 7, 8, 8C:
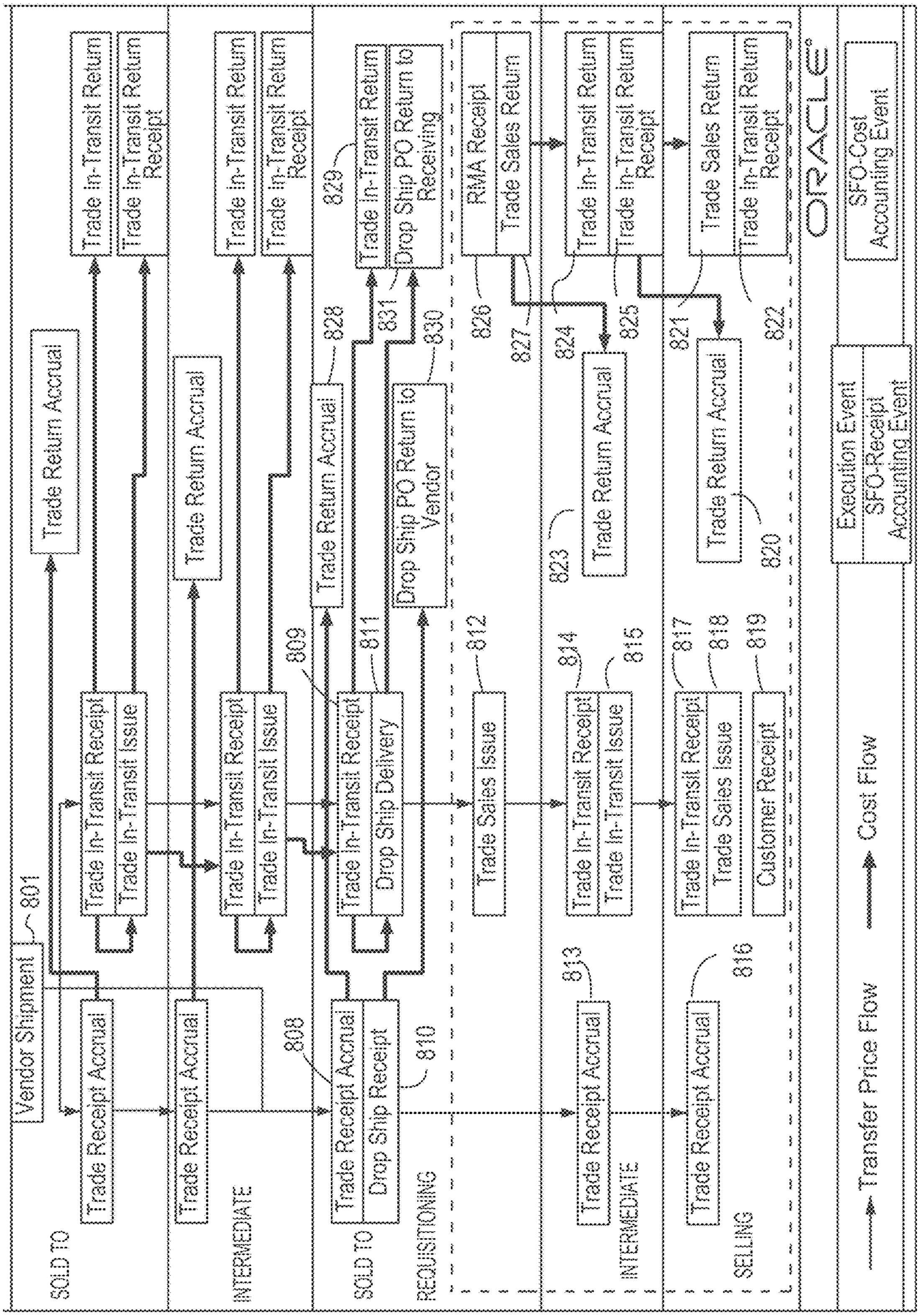
Figures 1, 2, 3, 4, 5, 6, 7, 8, 8D:
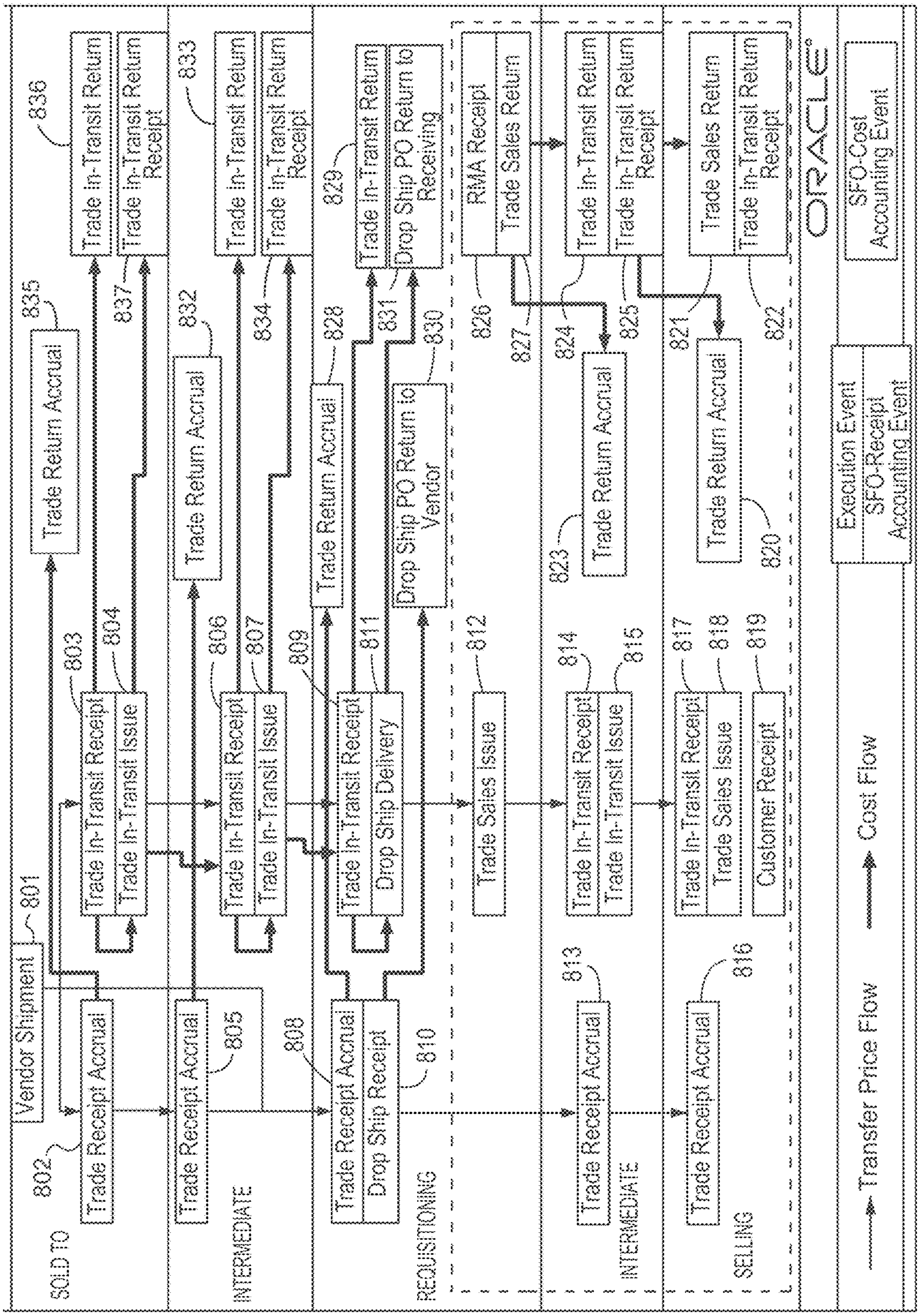
Figures 1, 2, 3, 4, 5, 6, 7, 8, 9, 9A:
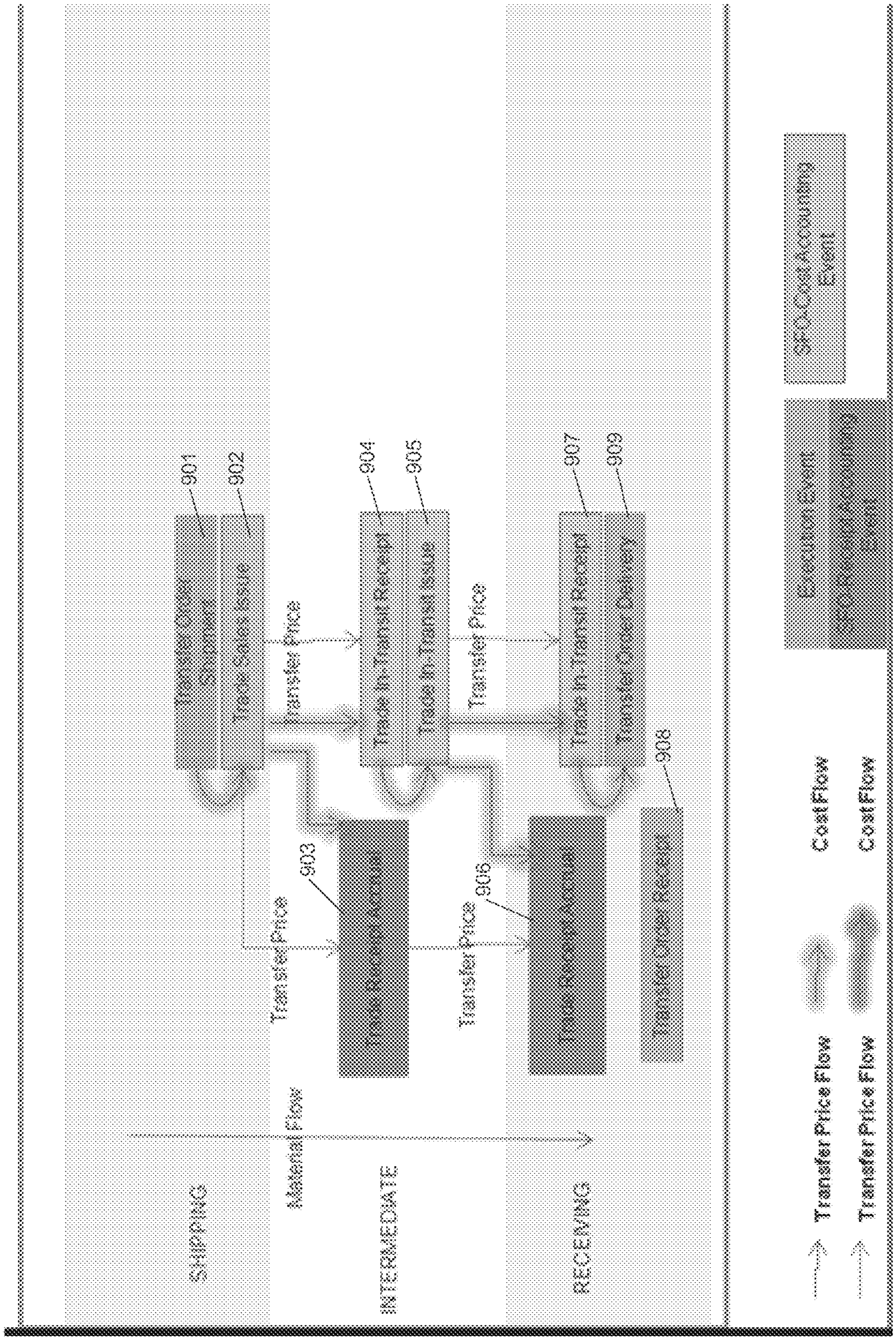
Figures 1, 2, 3, 4, 5, 6, 7, 8, 9, 9B:
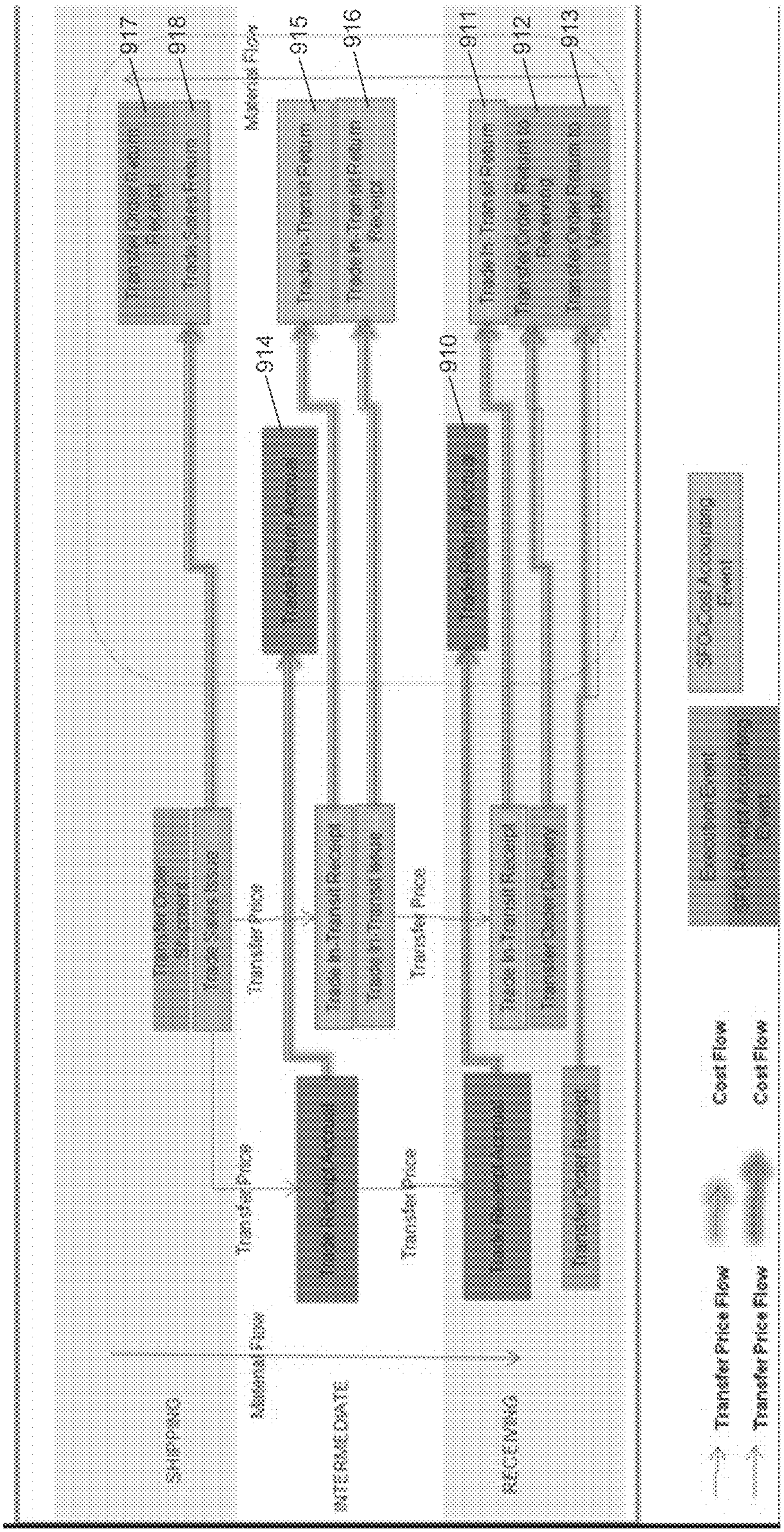
Figures 1, 2, 3, 4, 5, 6, 7, 8, 9, 9C:
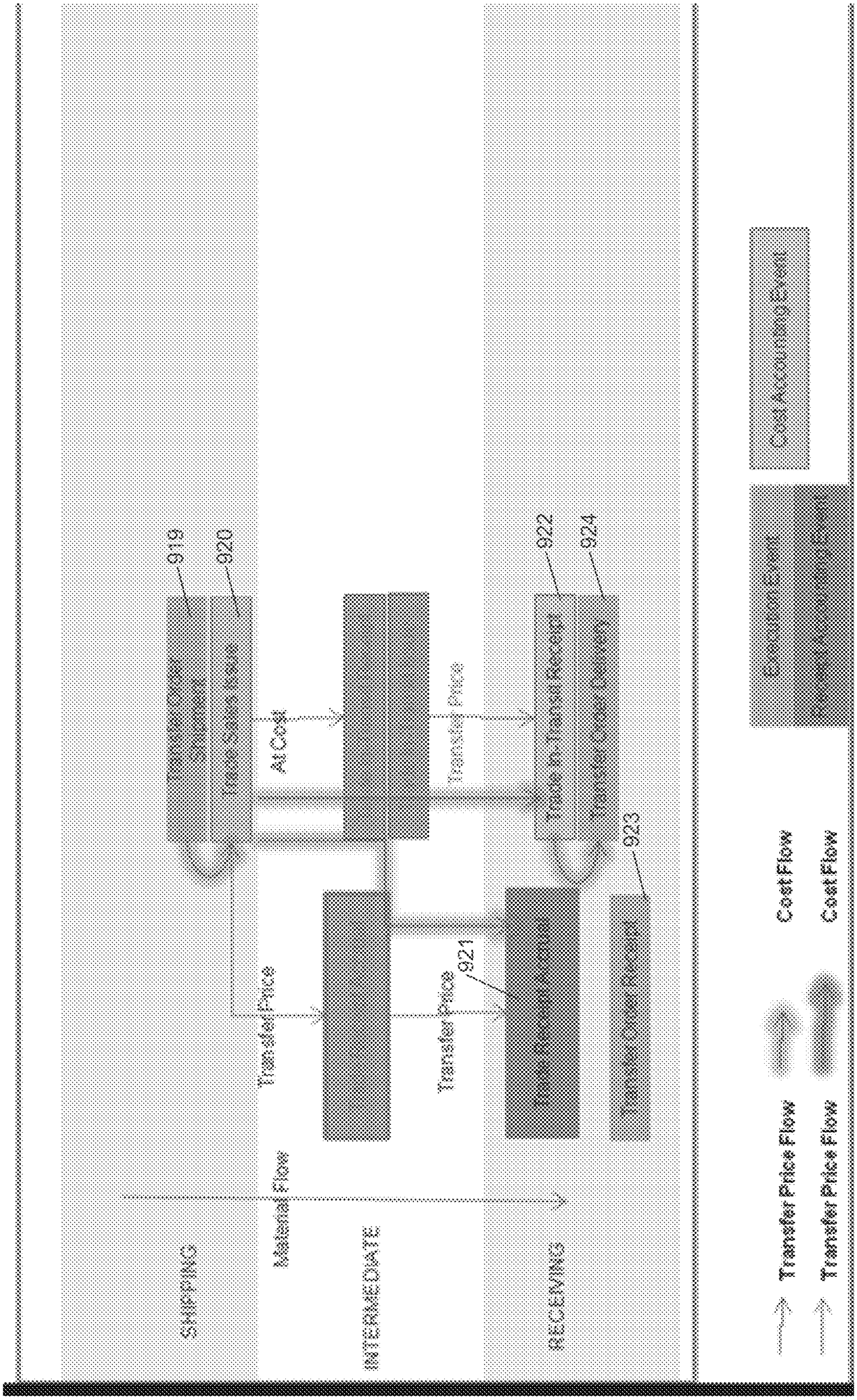
Figures 1, 2, 3, 4, 5, 6, 7, 8, 9, 9D:
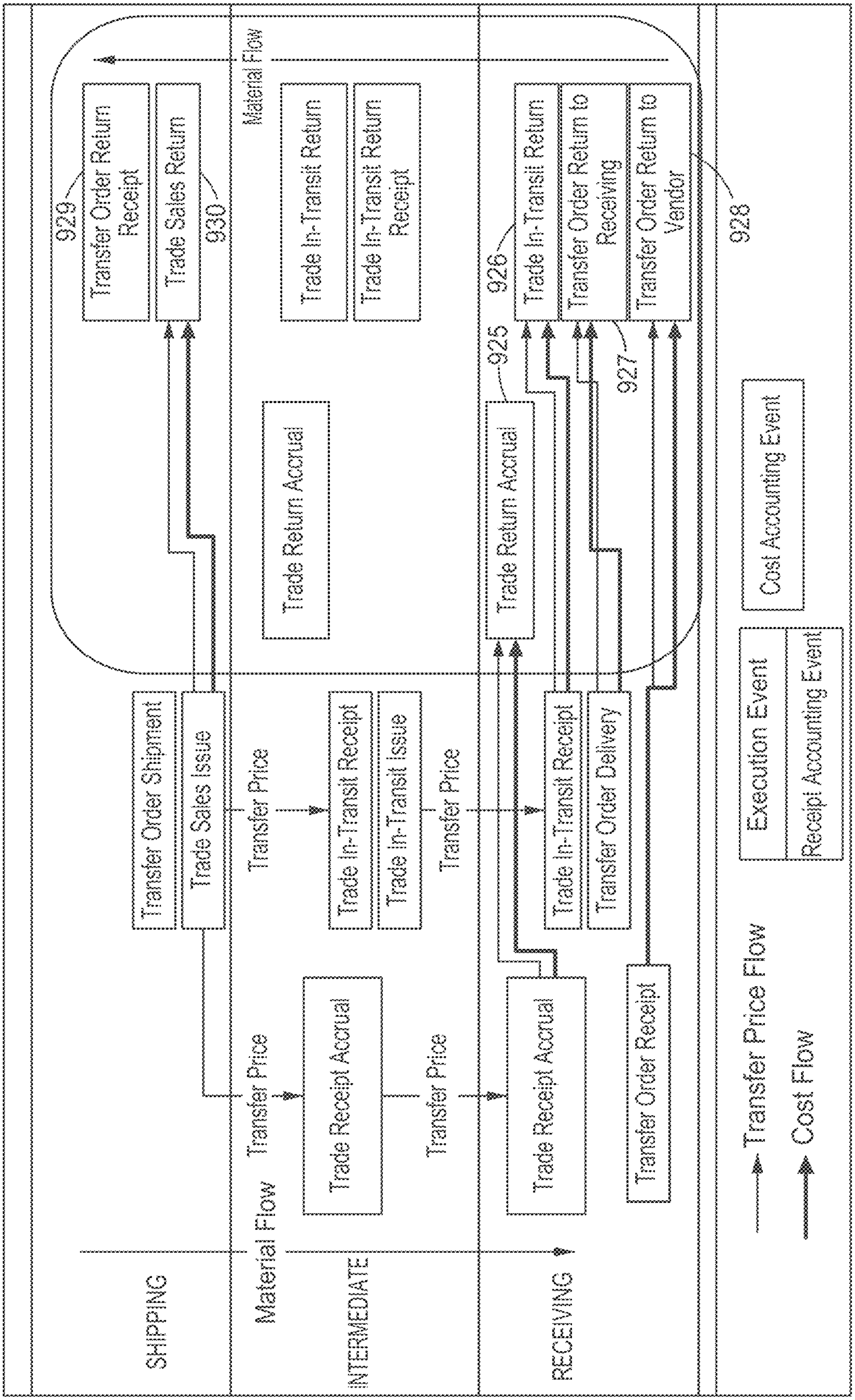
Figures 1, 2, 3, 4, 5, 6, 7, 8, 9, 9E:
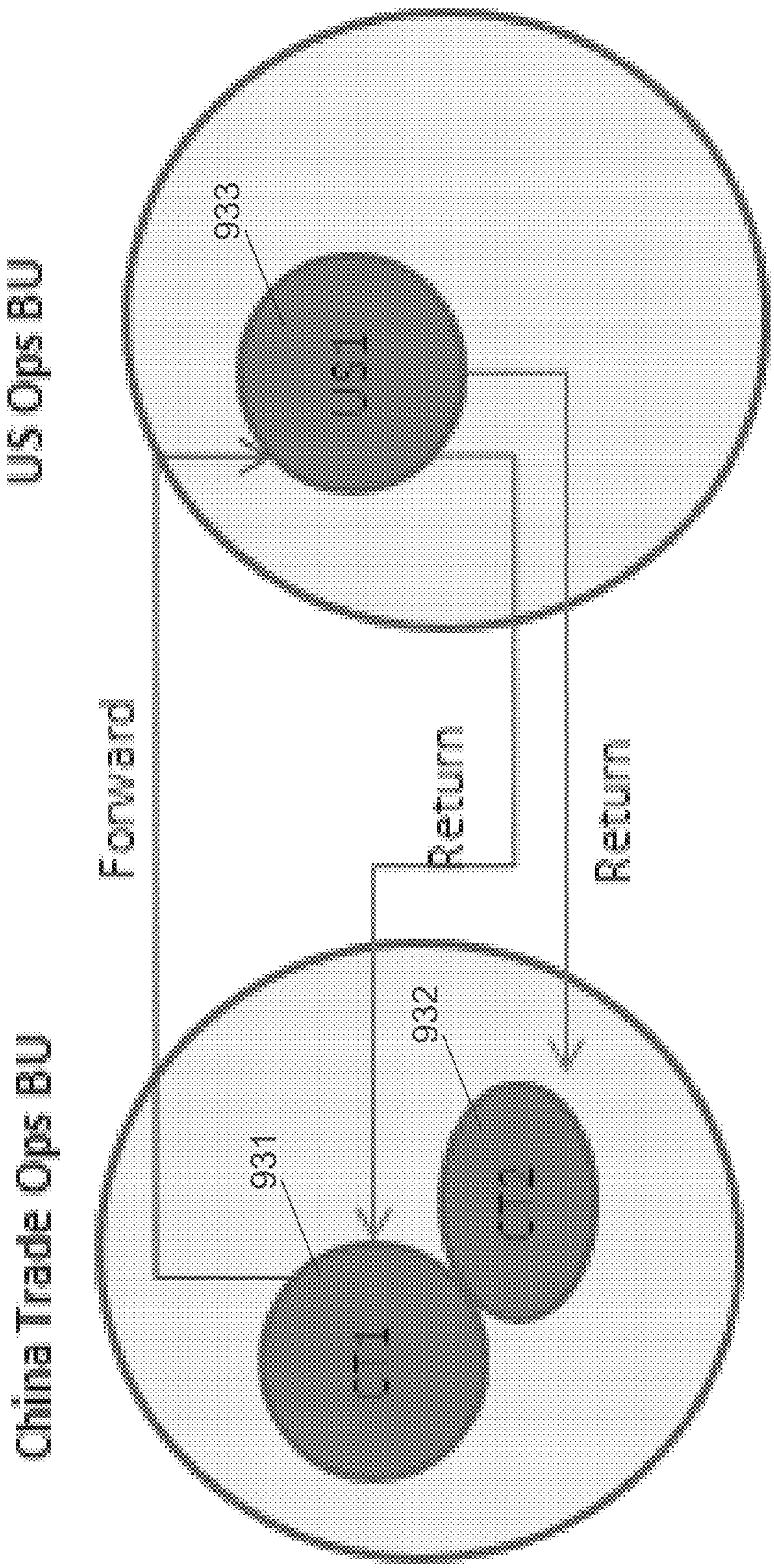
Figures 1, 2, 3, 4, 5, 6, 7, 8, 9, 10:
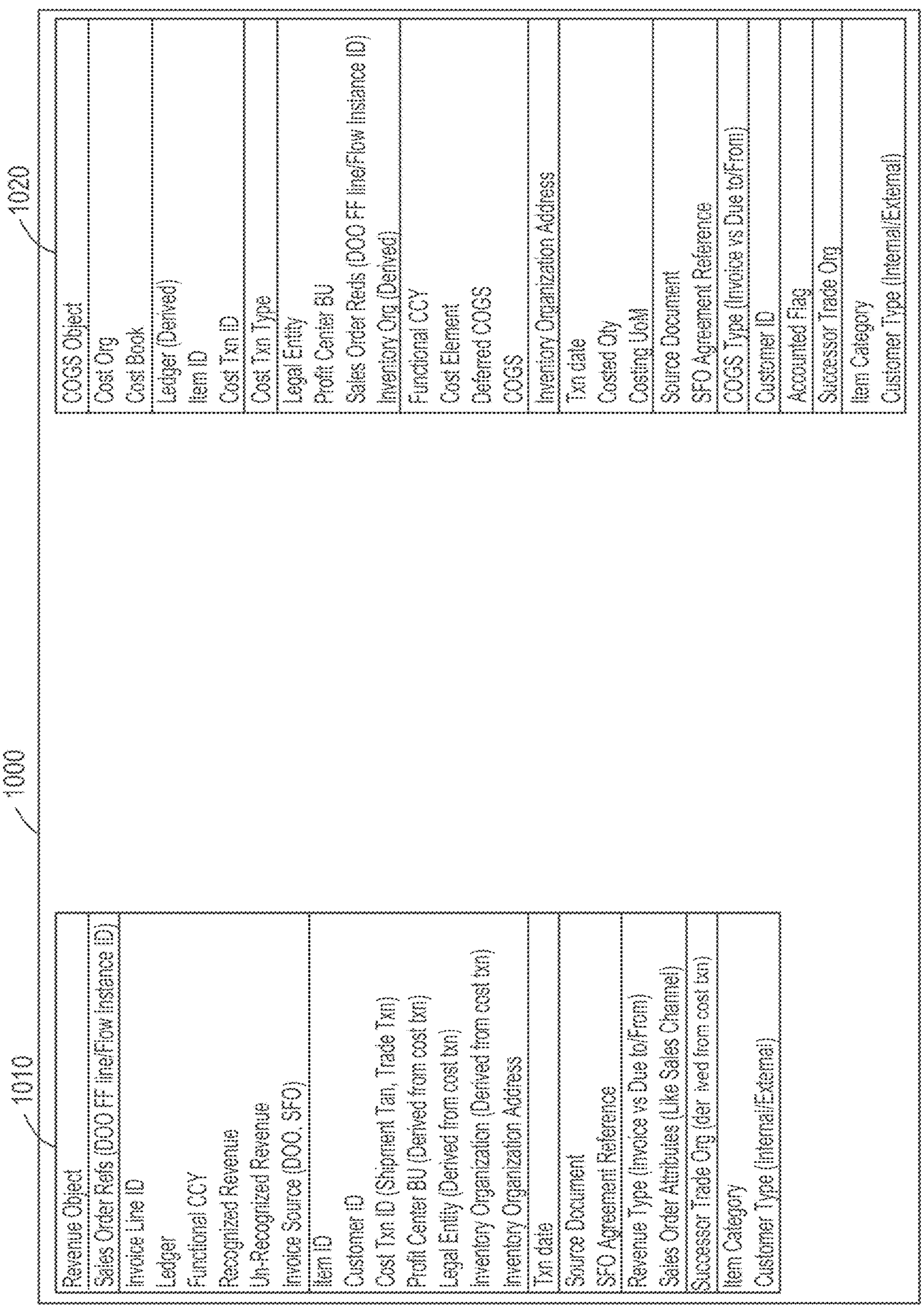
Figures 1, 2, 3, 4, 5, 6, 7, 8, 9, 10, 11:
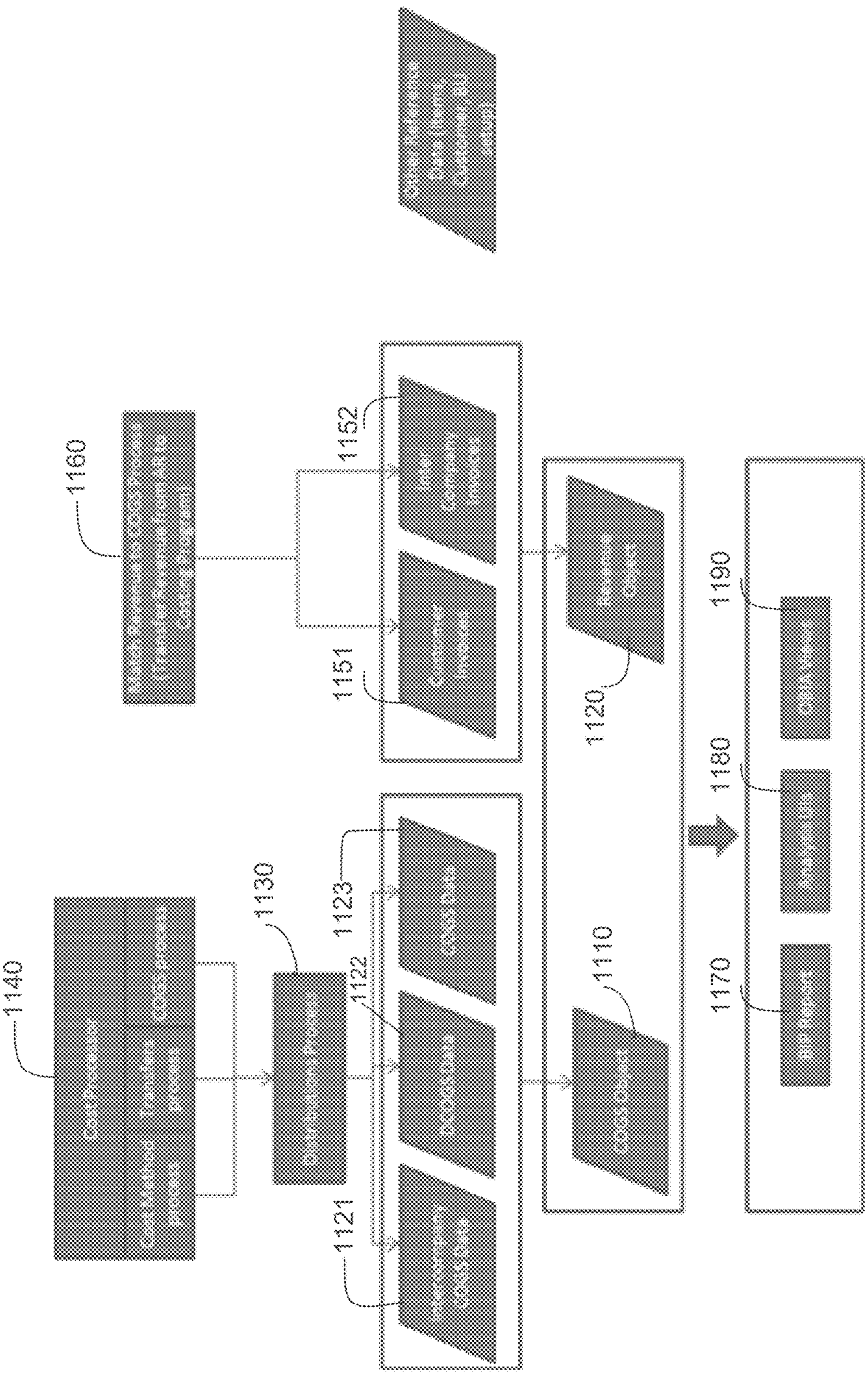
Figures 1, 2, 3, 4, 5, 6, 7, 8, 9, 10, 11, 12:
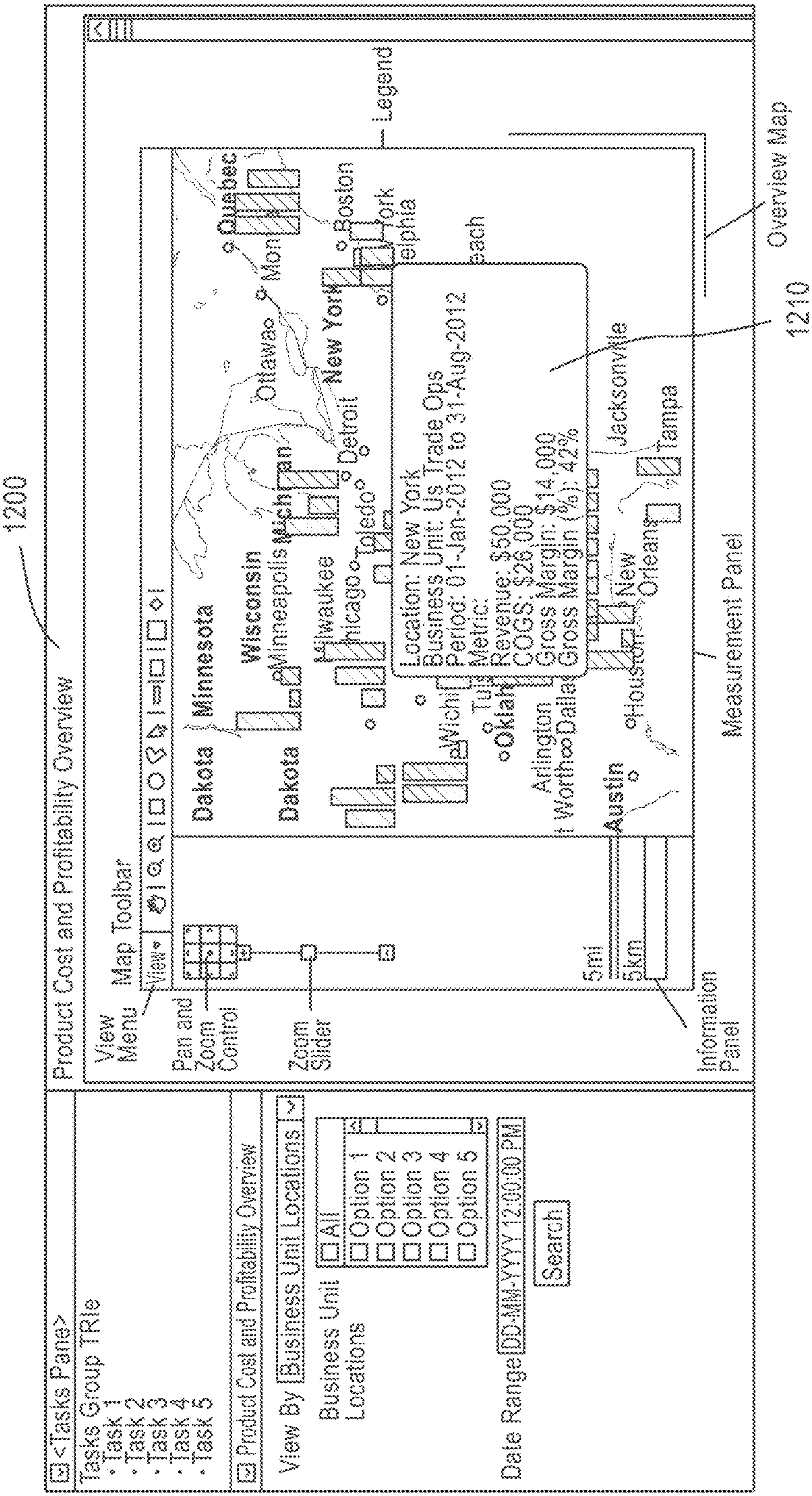
Figures 1, 2, 3, 4, 5, 6, 7, 8, 9, 10, 11, 12, 13:
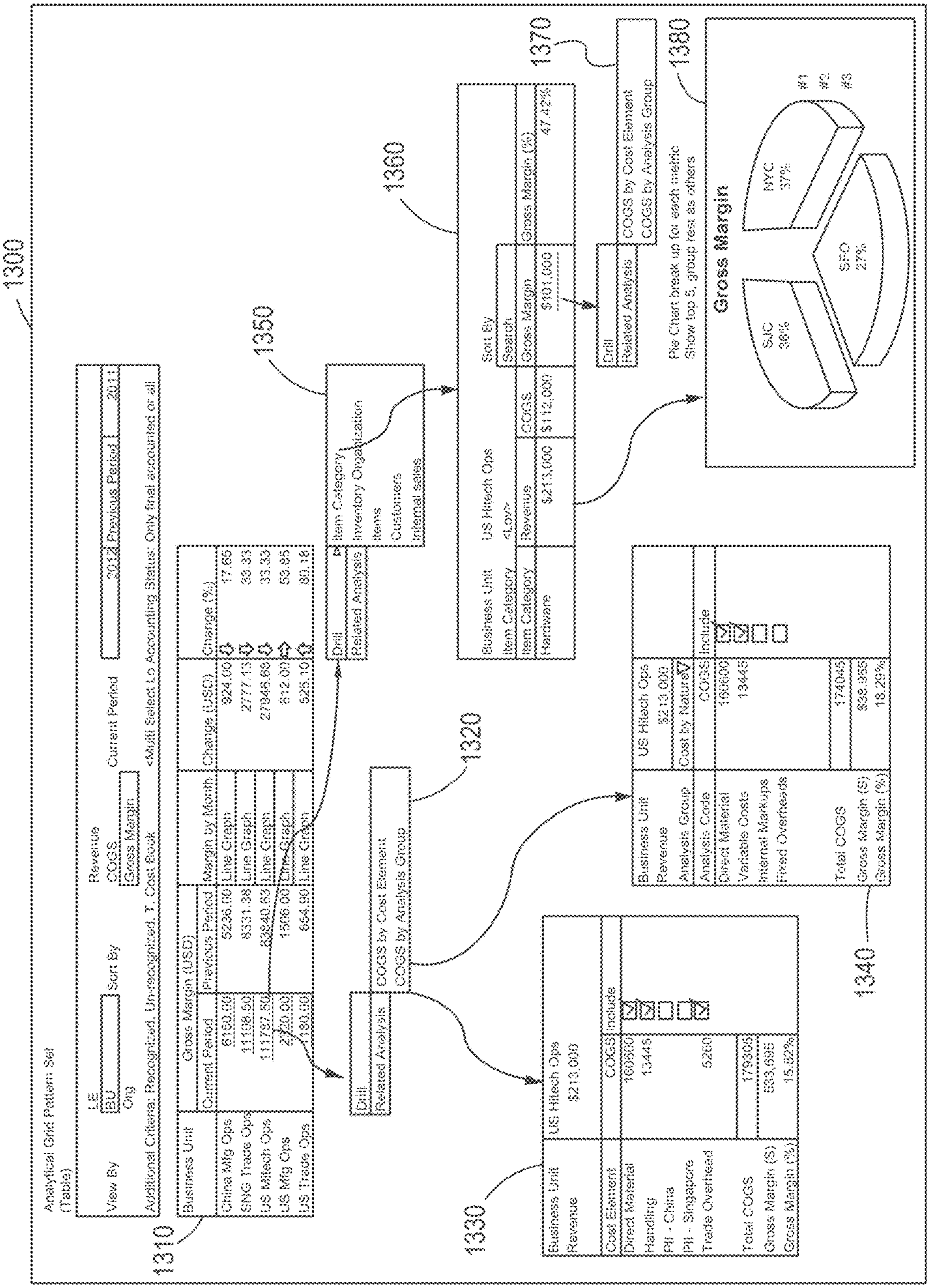
Figures 1, 2, 3, 4, 5, 6, 7, 8, 9, 10, 11, 12, 13, 14:
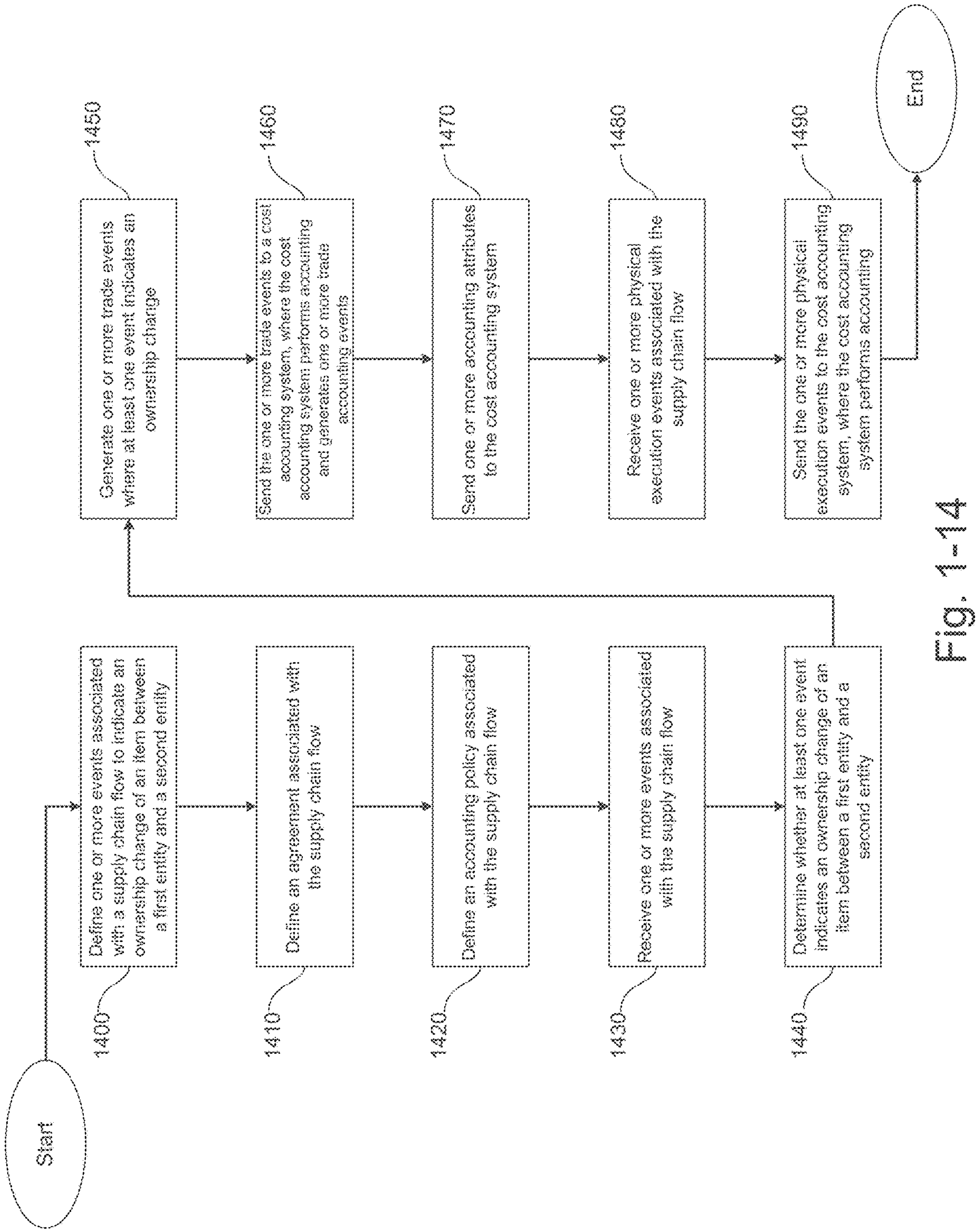
Figures 1, 2, 3, 4, 5, 6, 7, 8, 9, 10, 11, 12, 13, 14, 15:
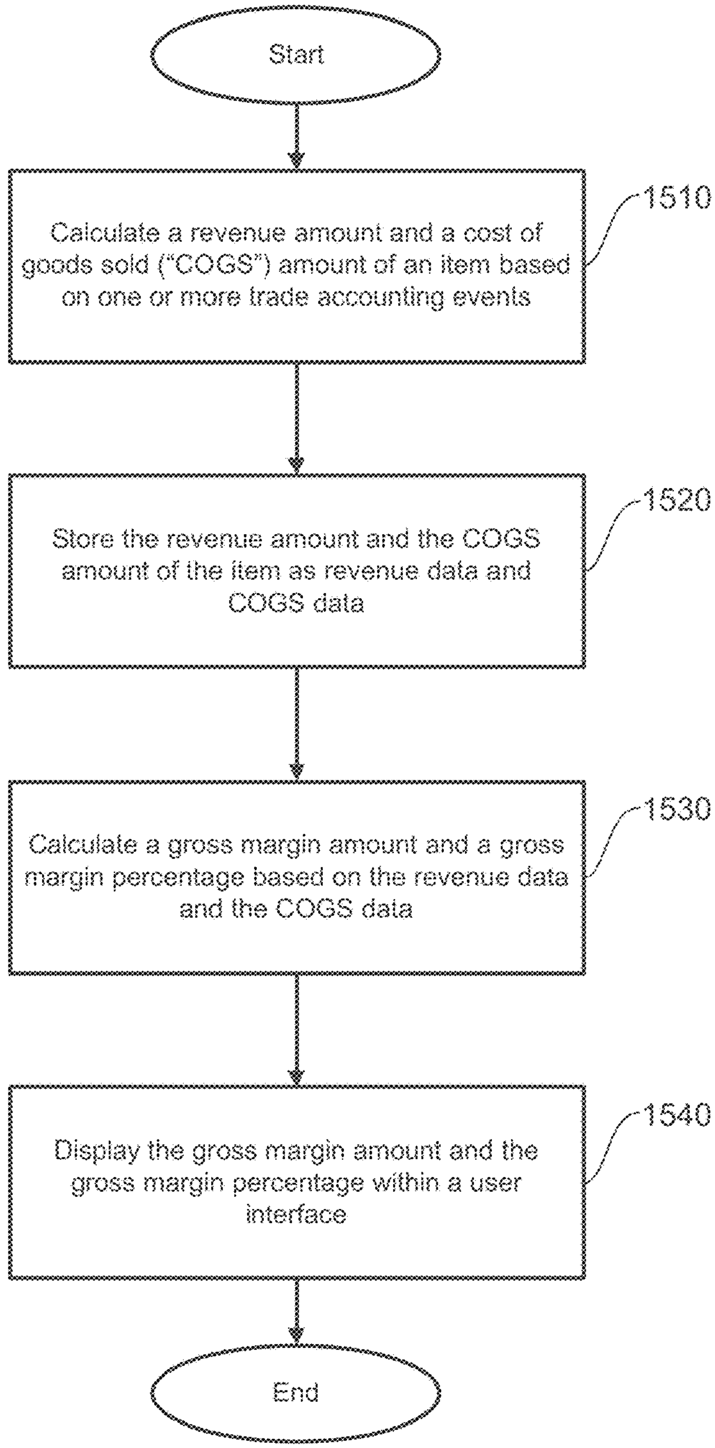
Figures 1, 2, 3, 4, 5, 6, 7, 8, 9, 10, 11, 12, 13, 14, 15, 16:
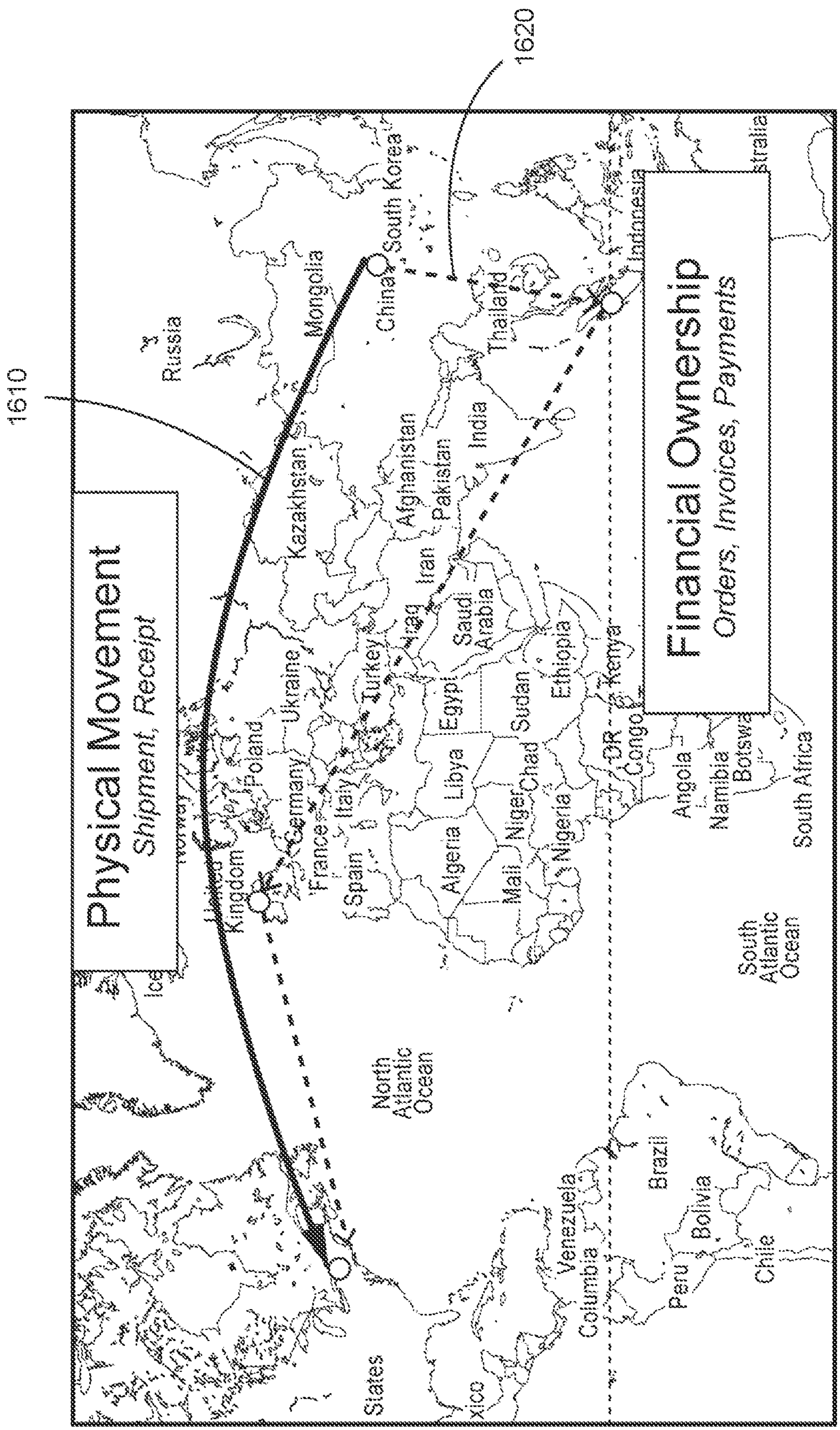
Figures 1, 2, 3, 4, 5, 6, 7, 8, 9, 10, 11, 12, 13, 14, 15, 16, 17:
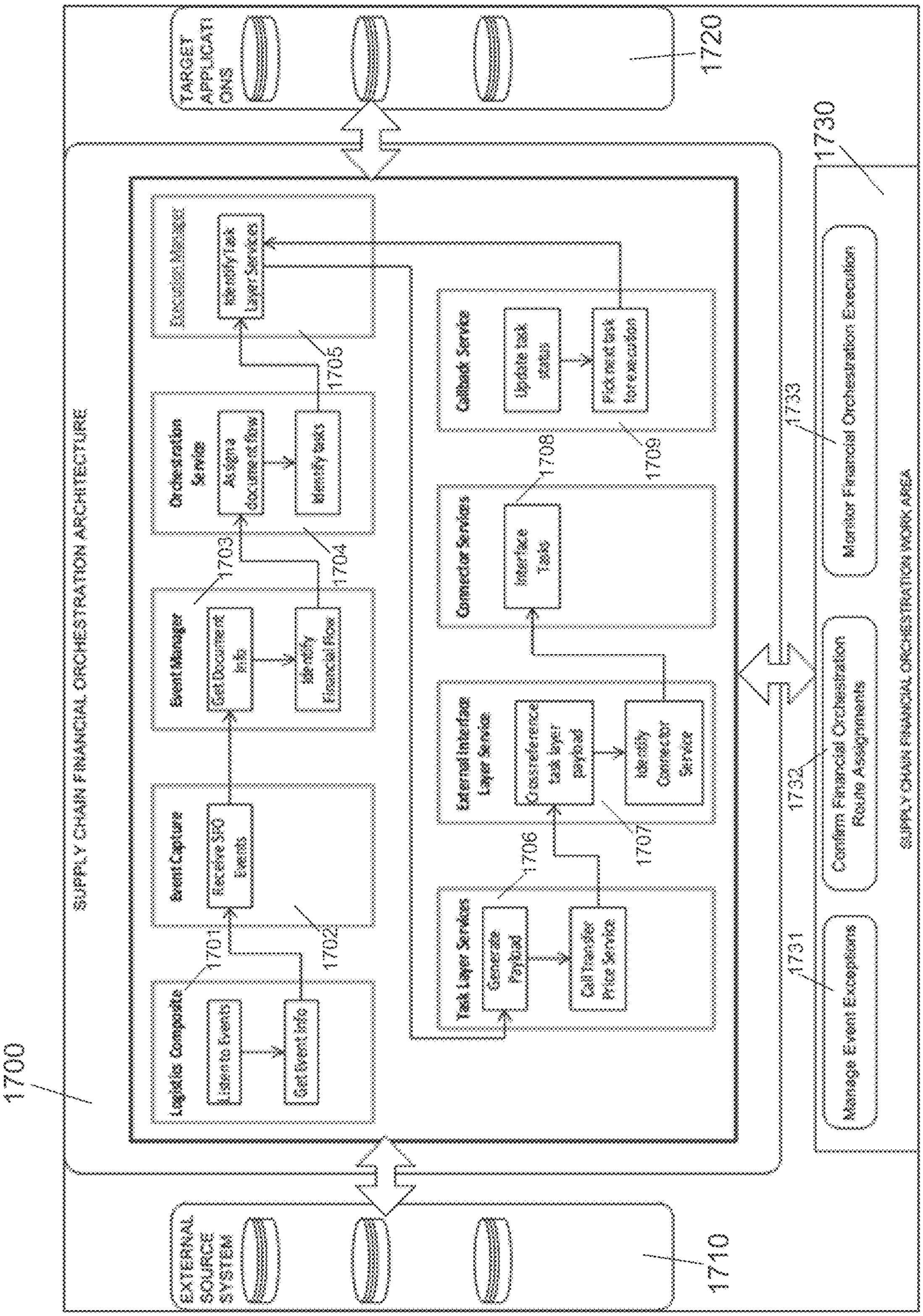
Figures 1, 2:
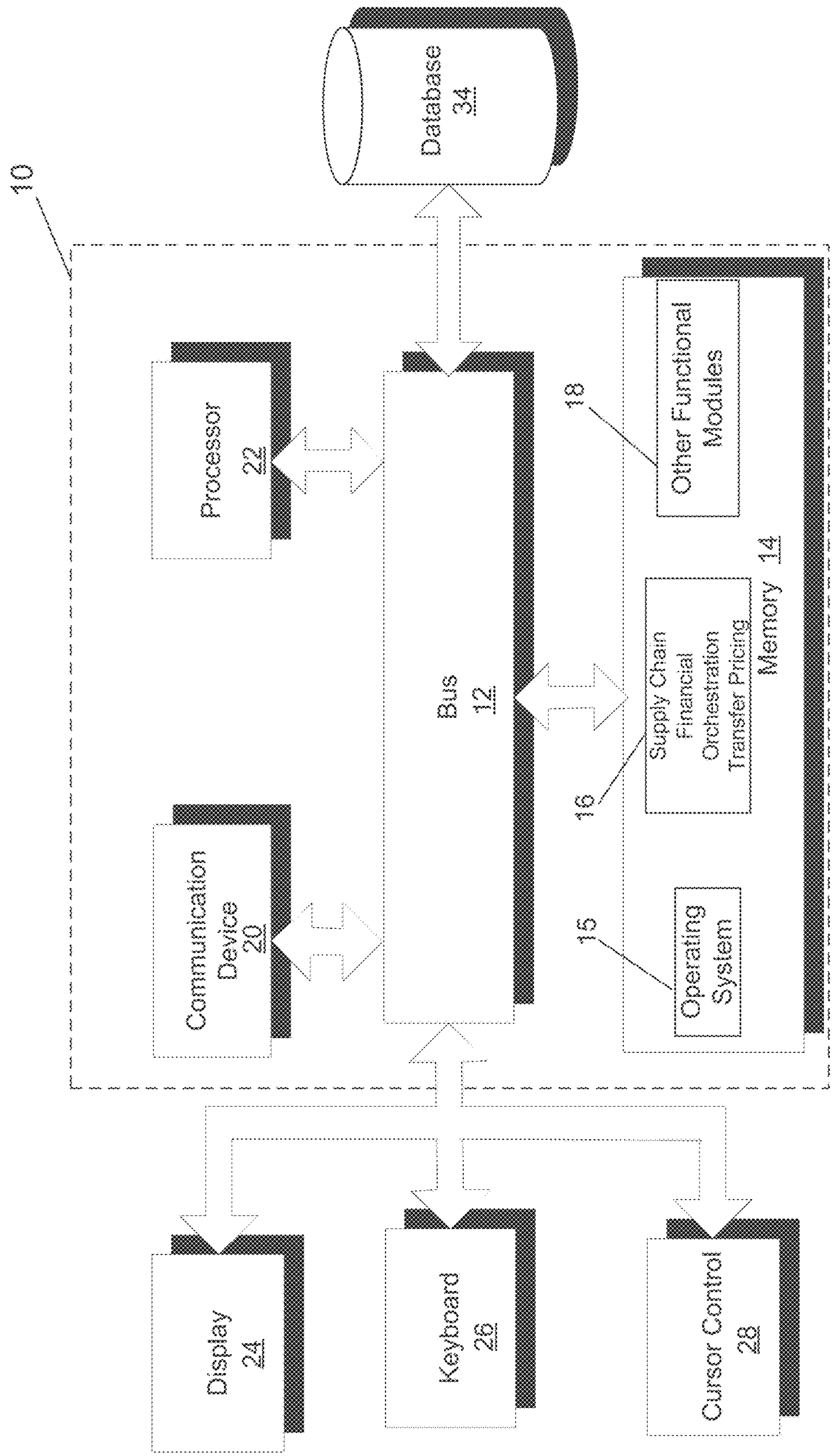
Figure 2:
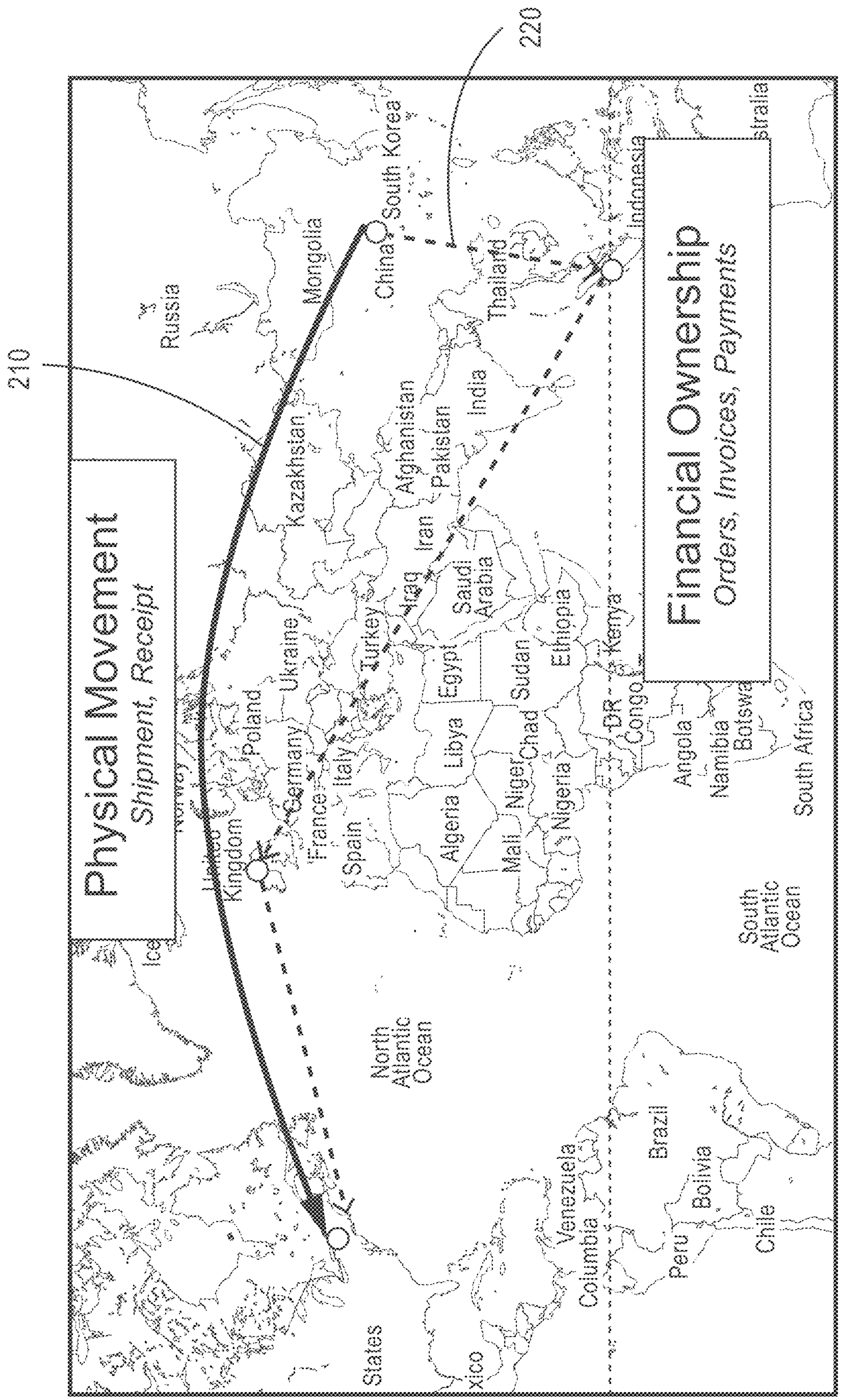
Figures 2, 3:
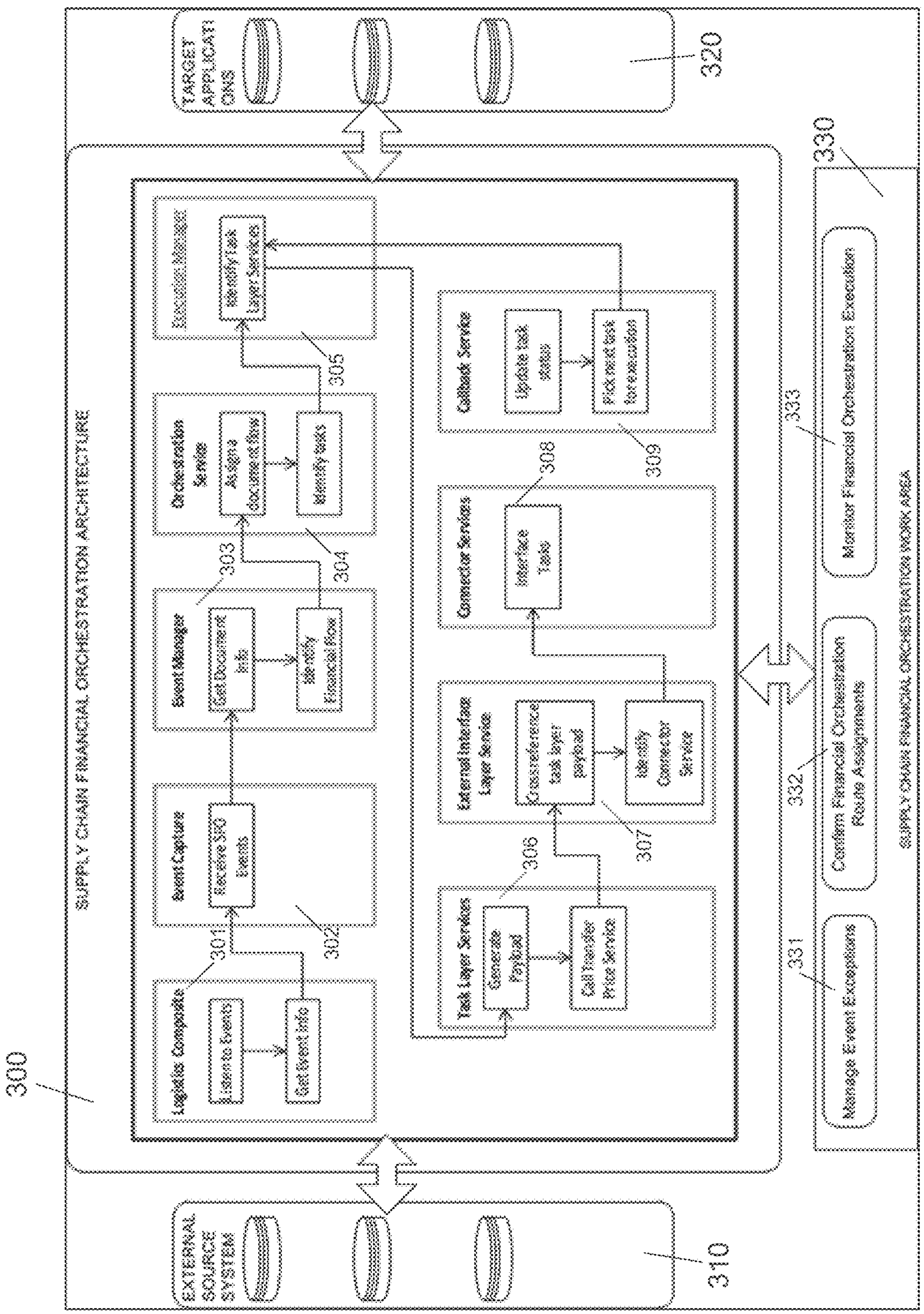
Figures 2, 3, 4:
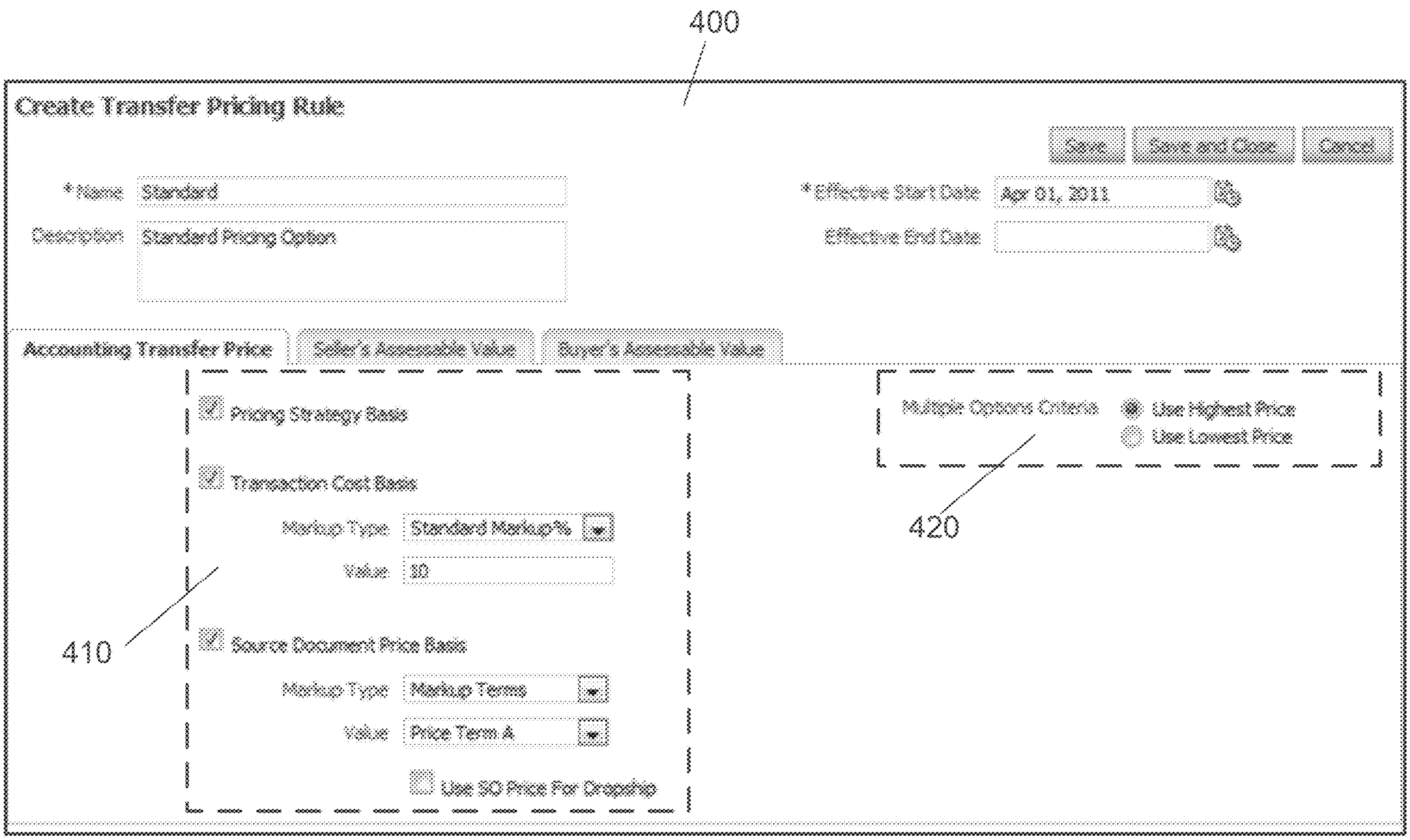
Figures 2, 3, 4, 5:
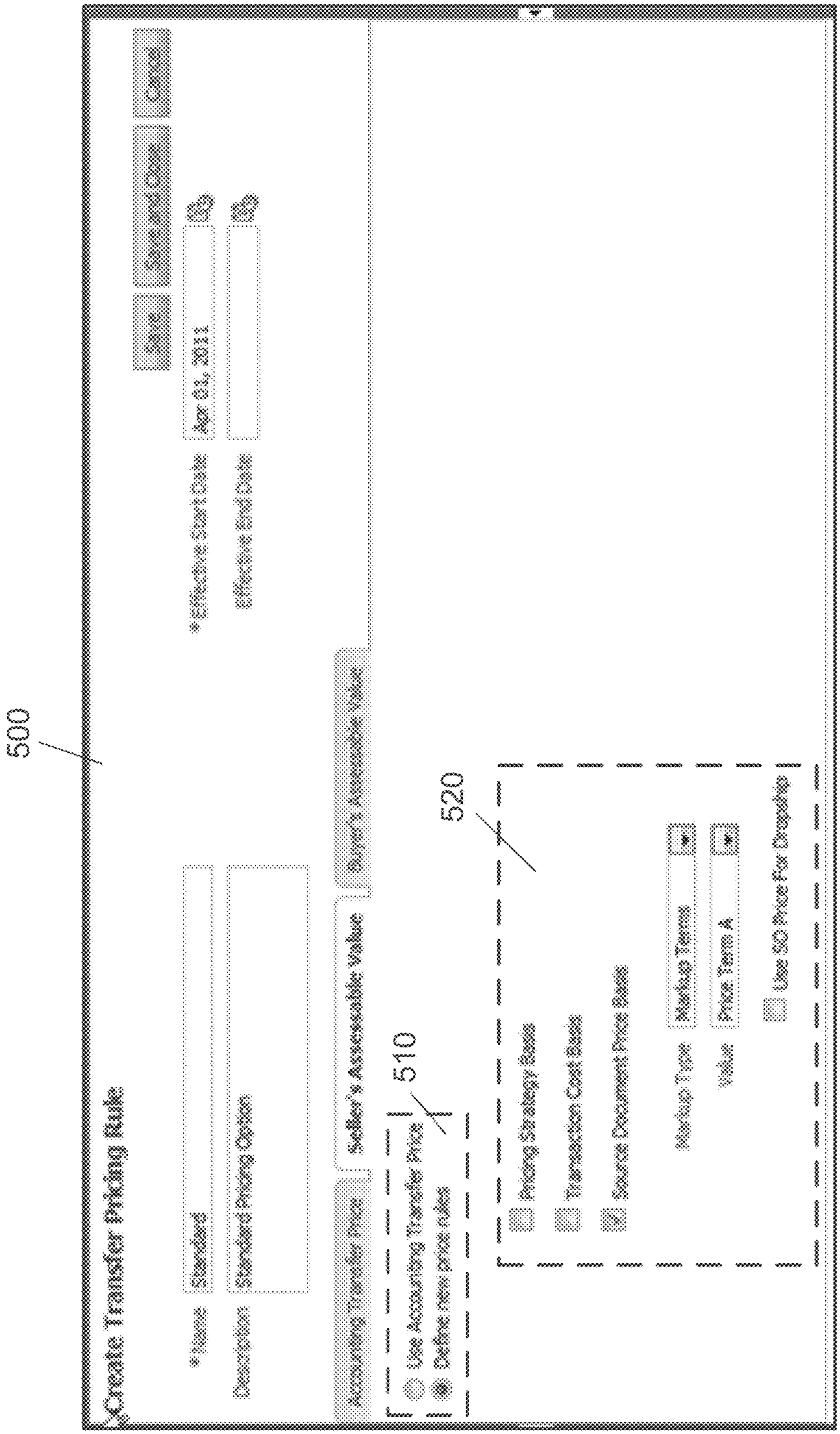
Figures 2, 3, 4, 5, 6:
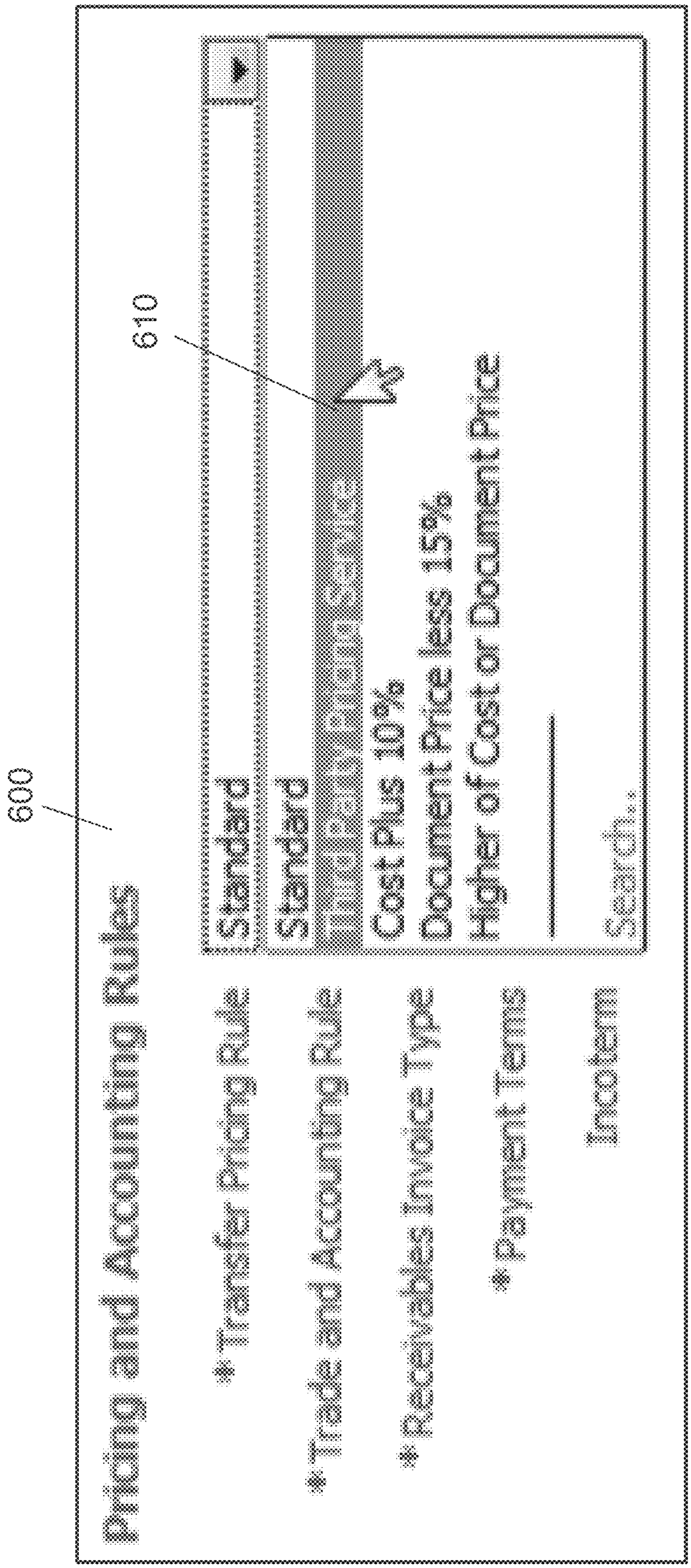
Figures 2, 3, 4, 5, 6, 7:
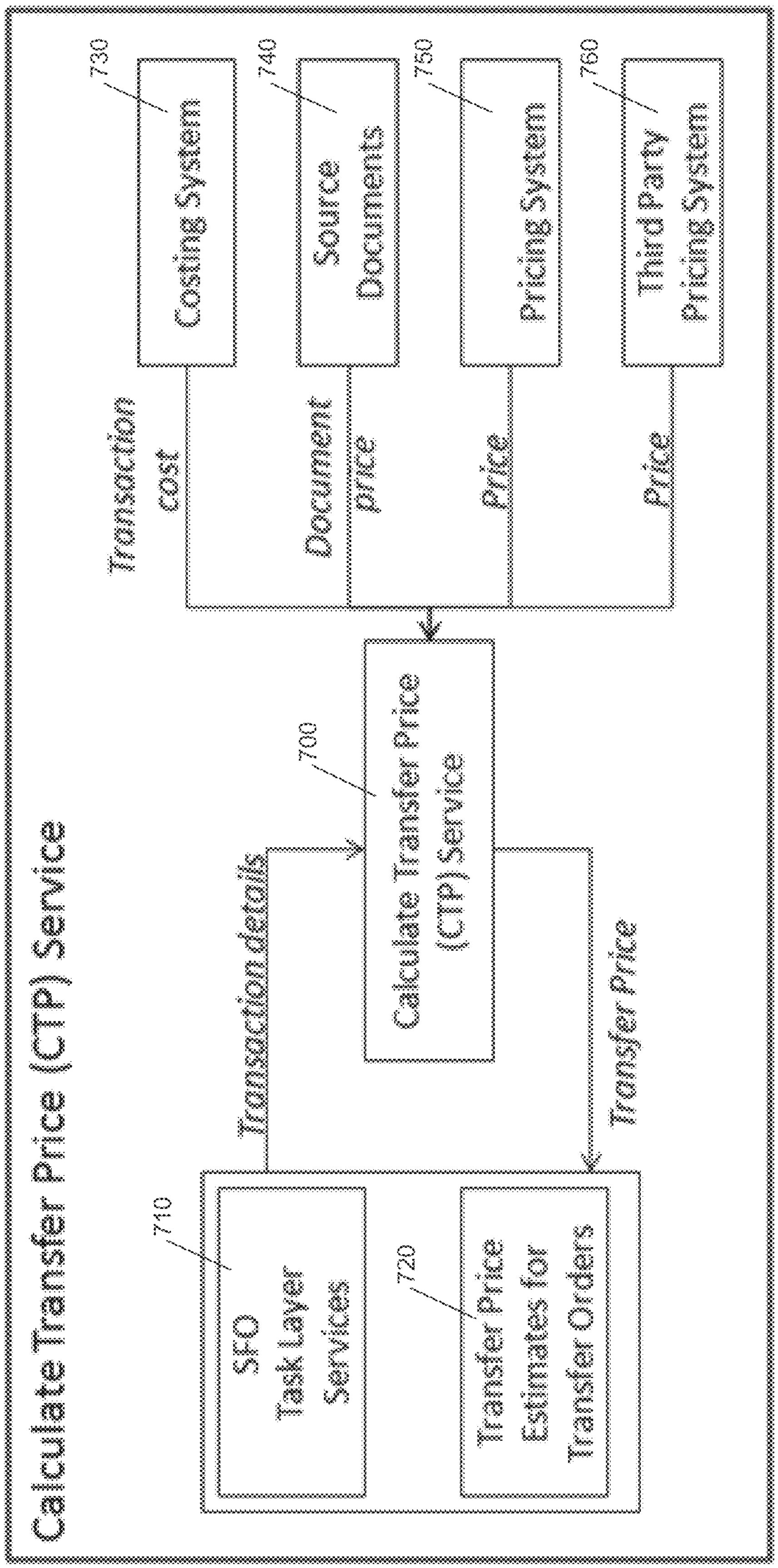
Figures 2, 3, 4, 5, 6, 7, 8:
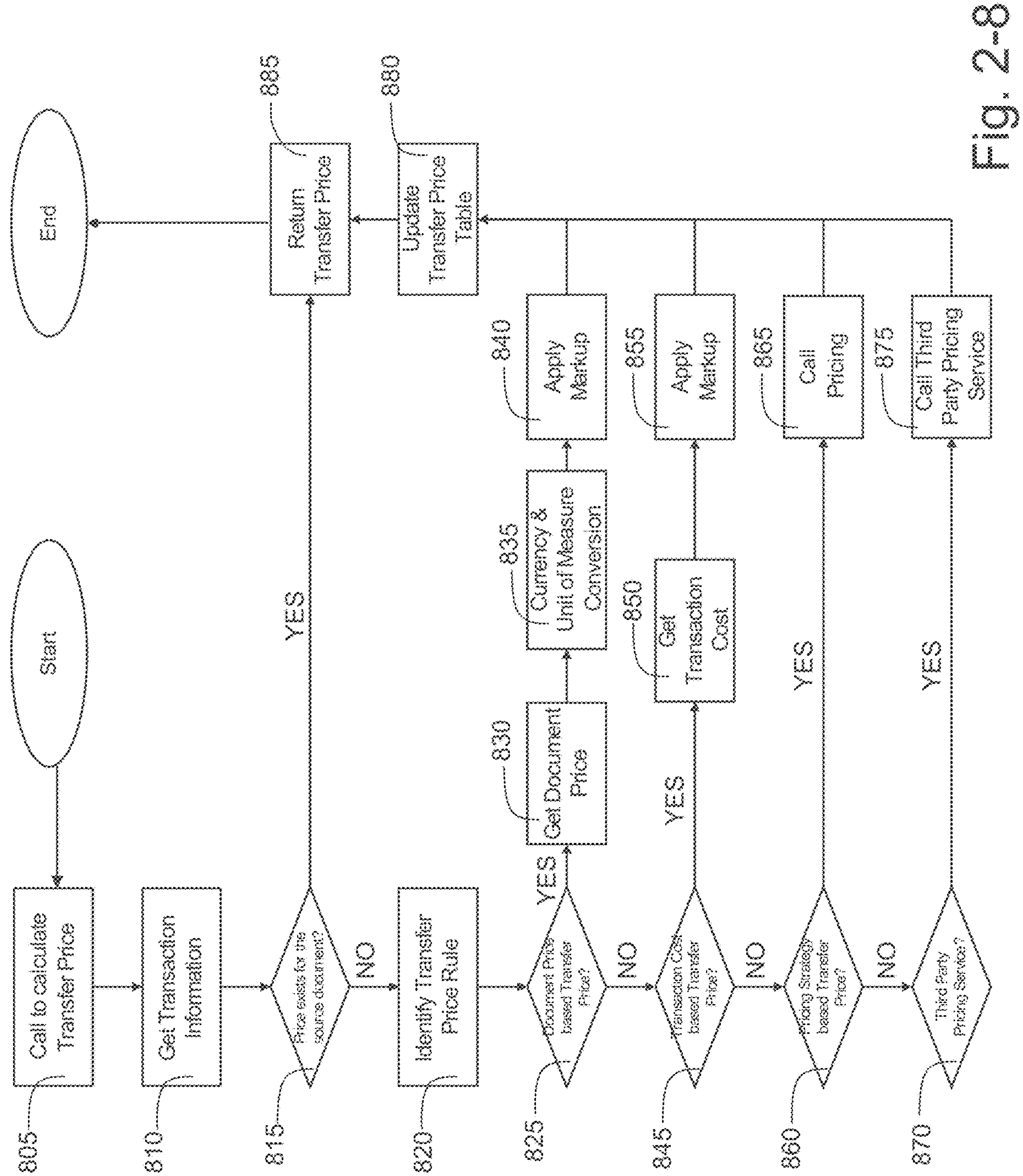
Figures 1, 3:
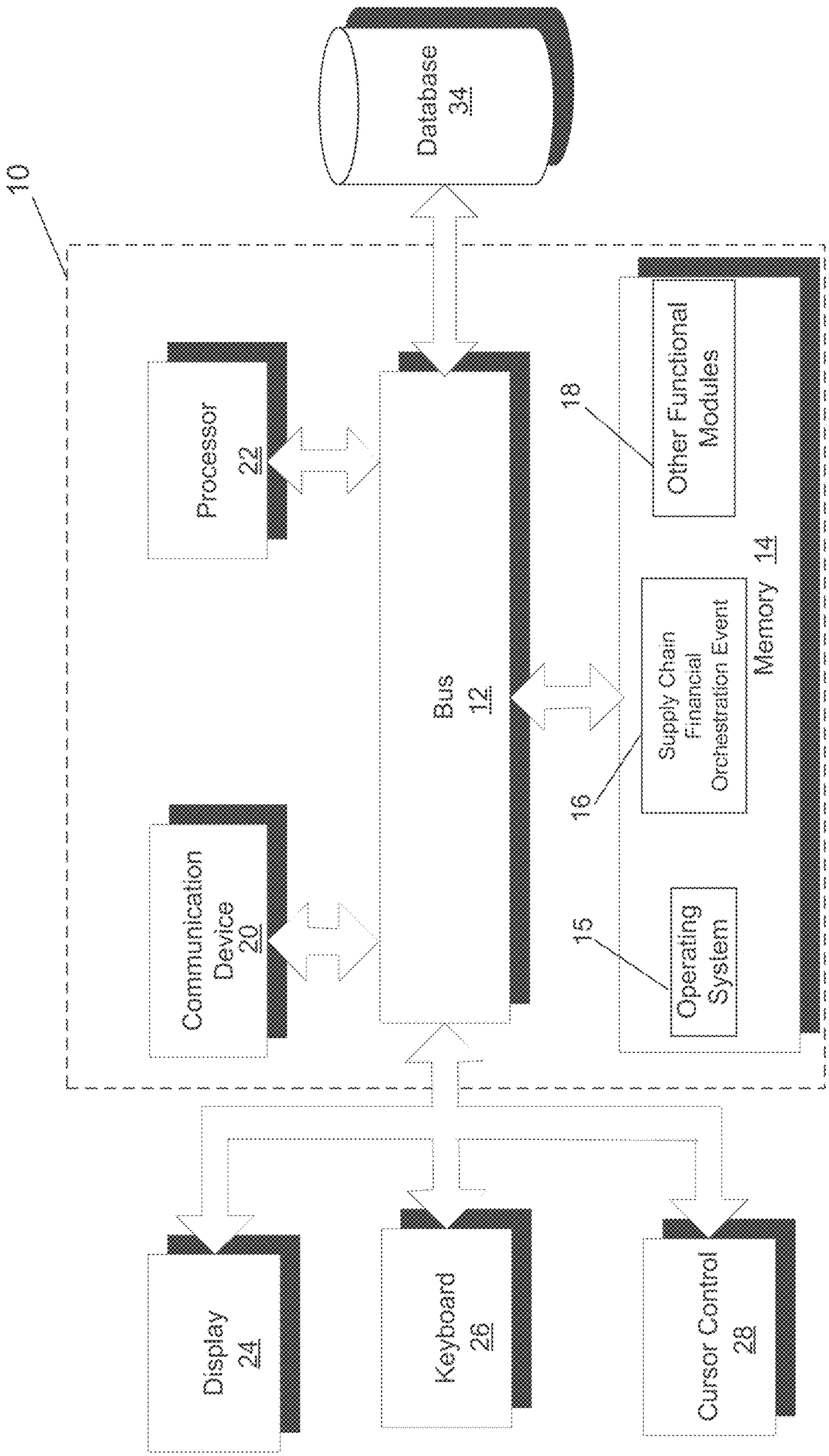
Figures 2, 3:
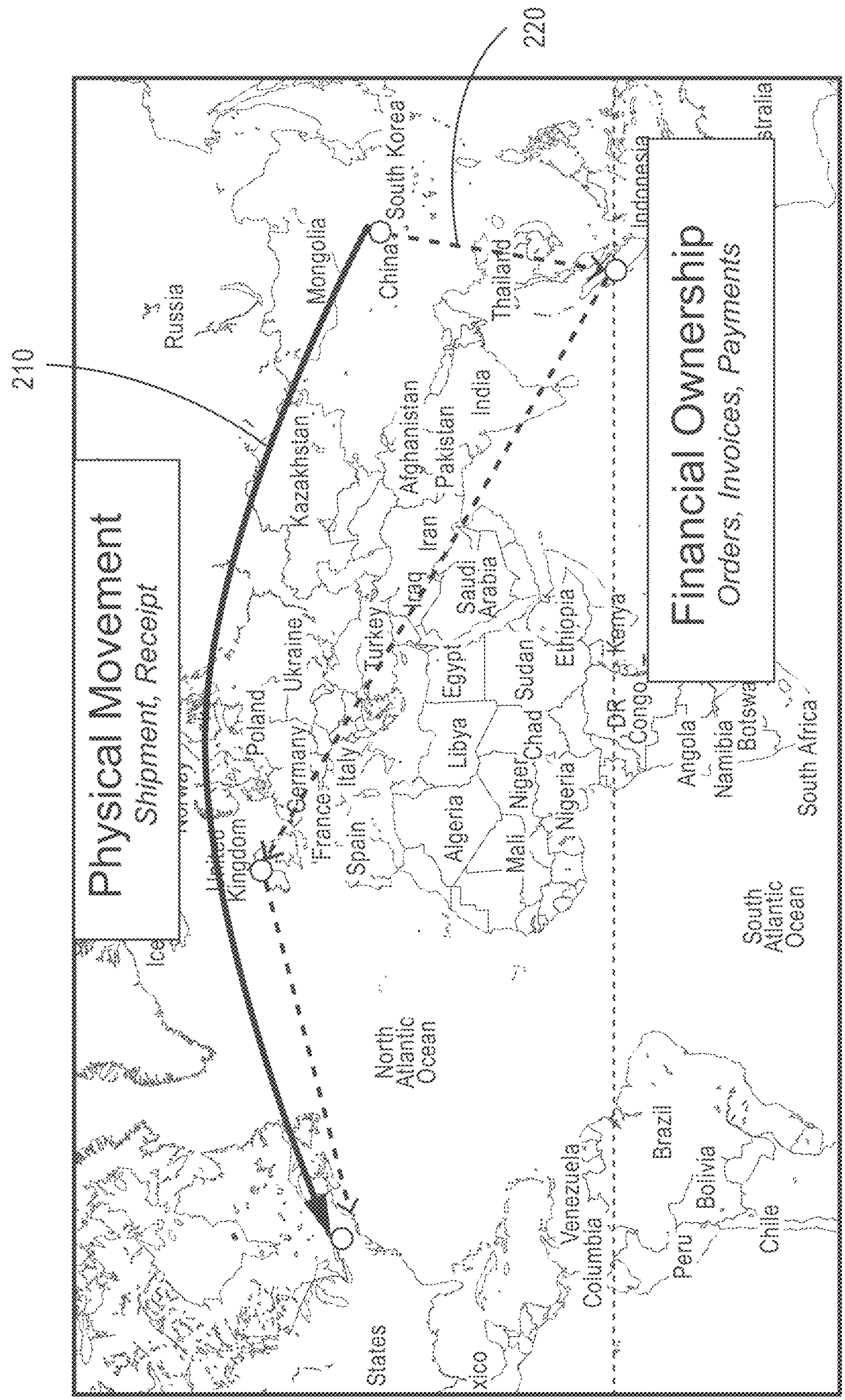
Figure 3:
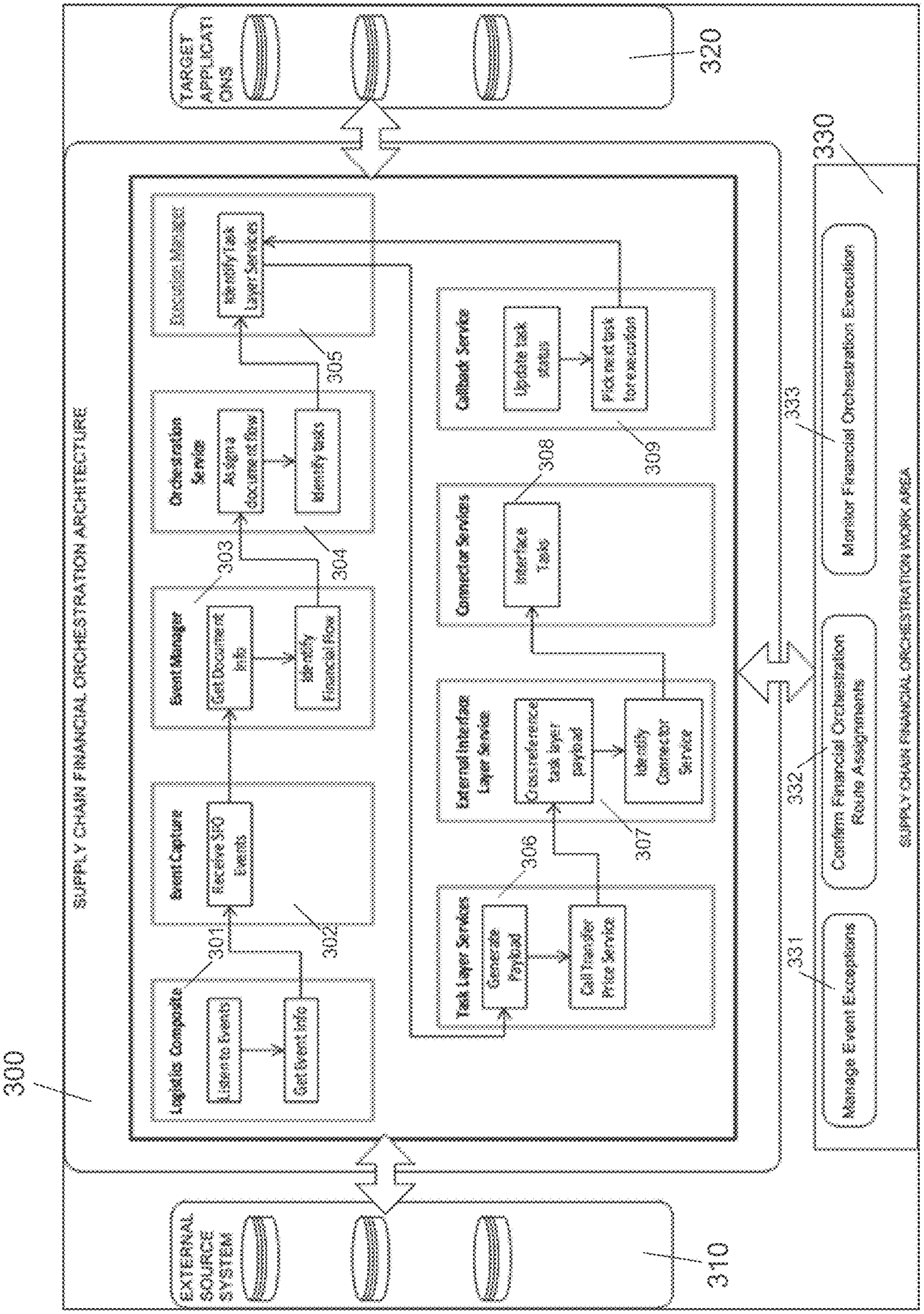
Figures 3, 4:
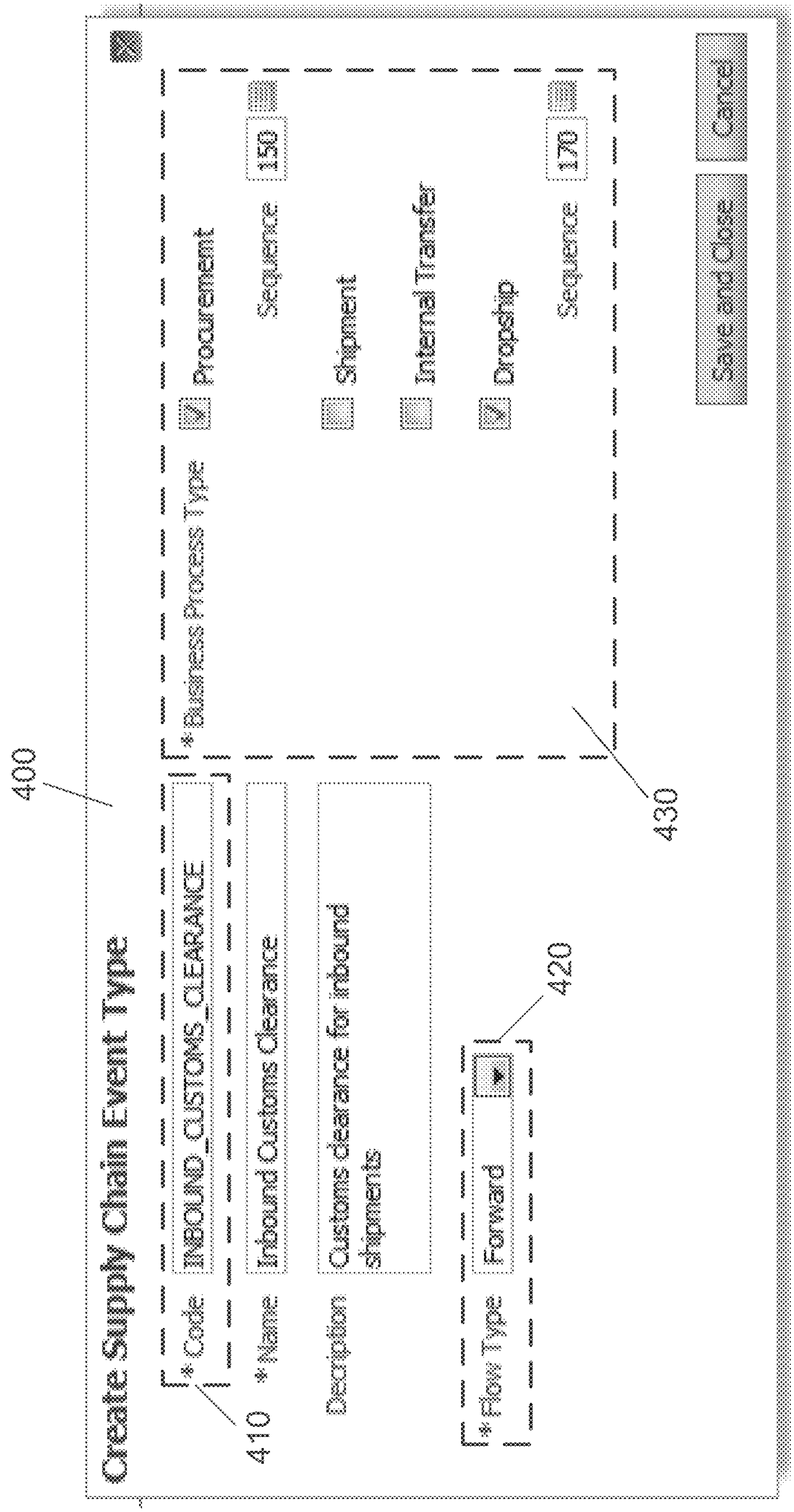
Figures 3, 4, 5:
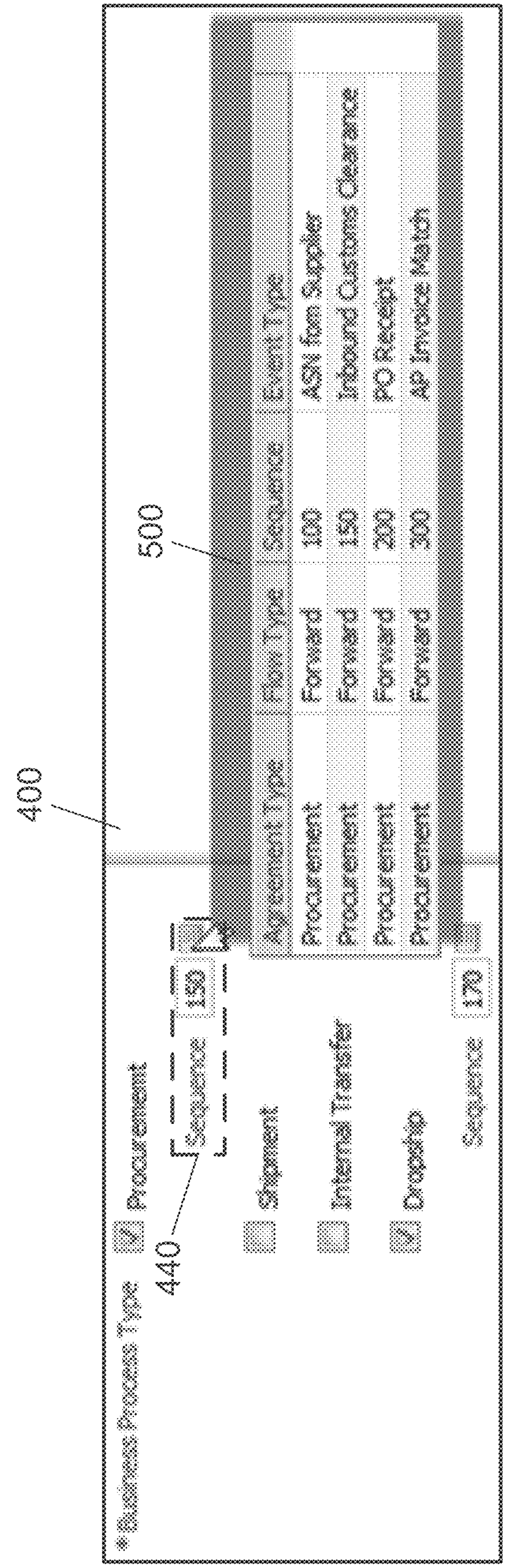
Figures 3, 4, 5, 6:
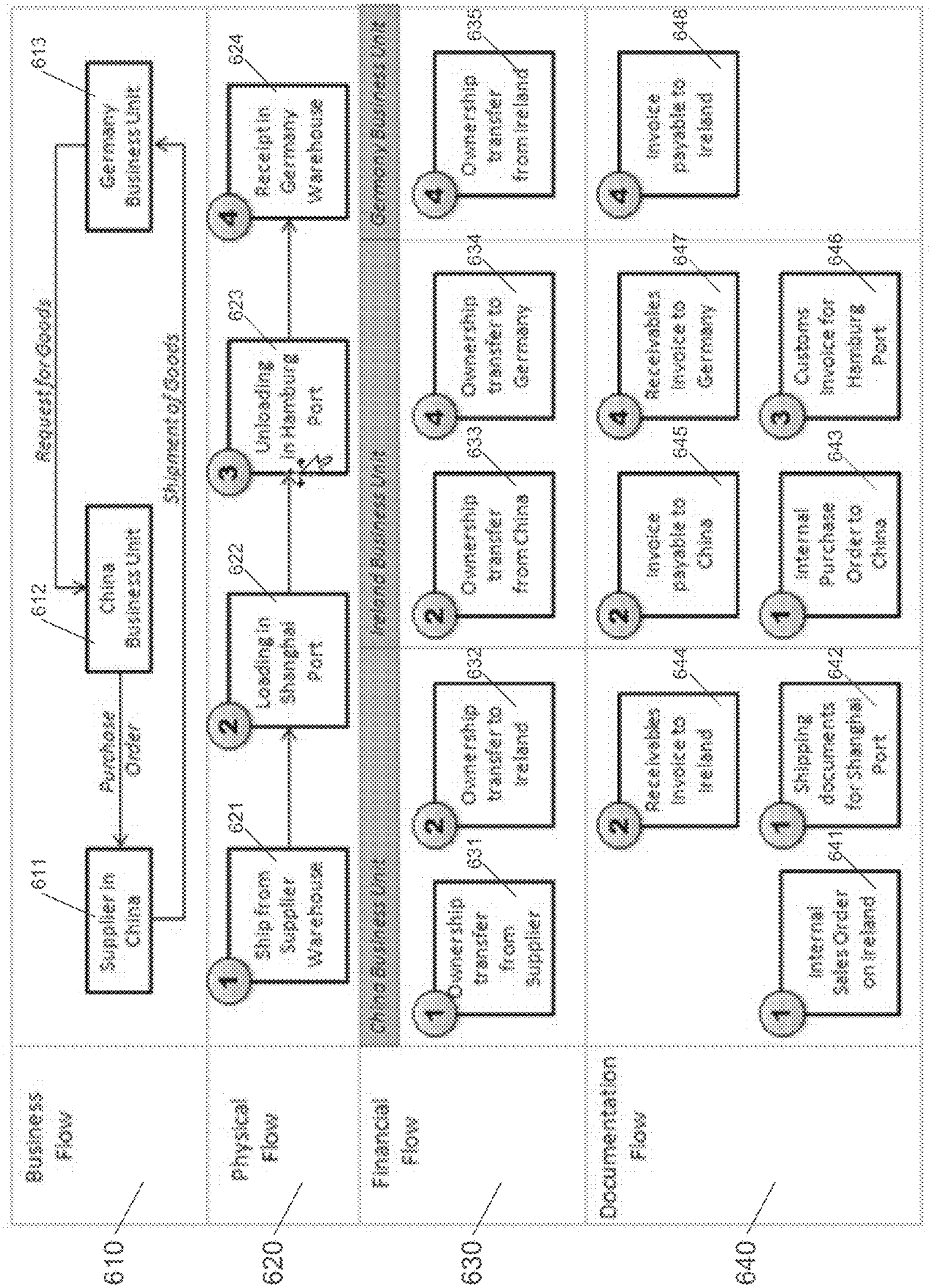
Figures 3, 4, 5, 6, 7:
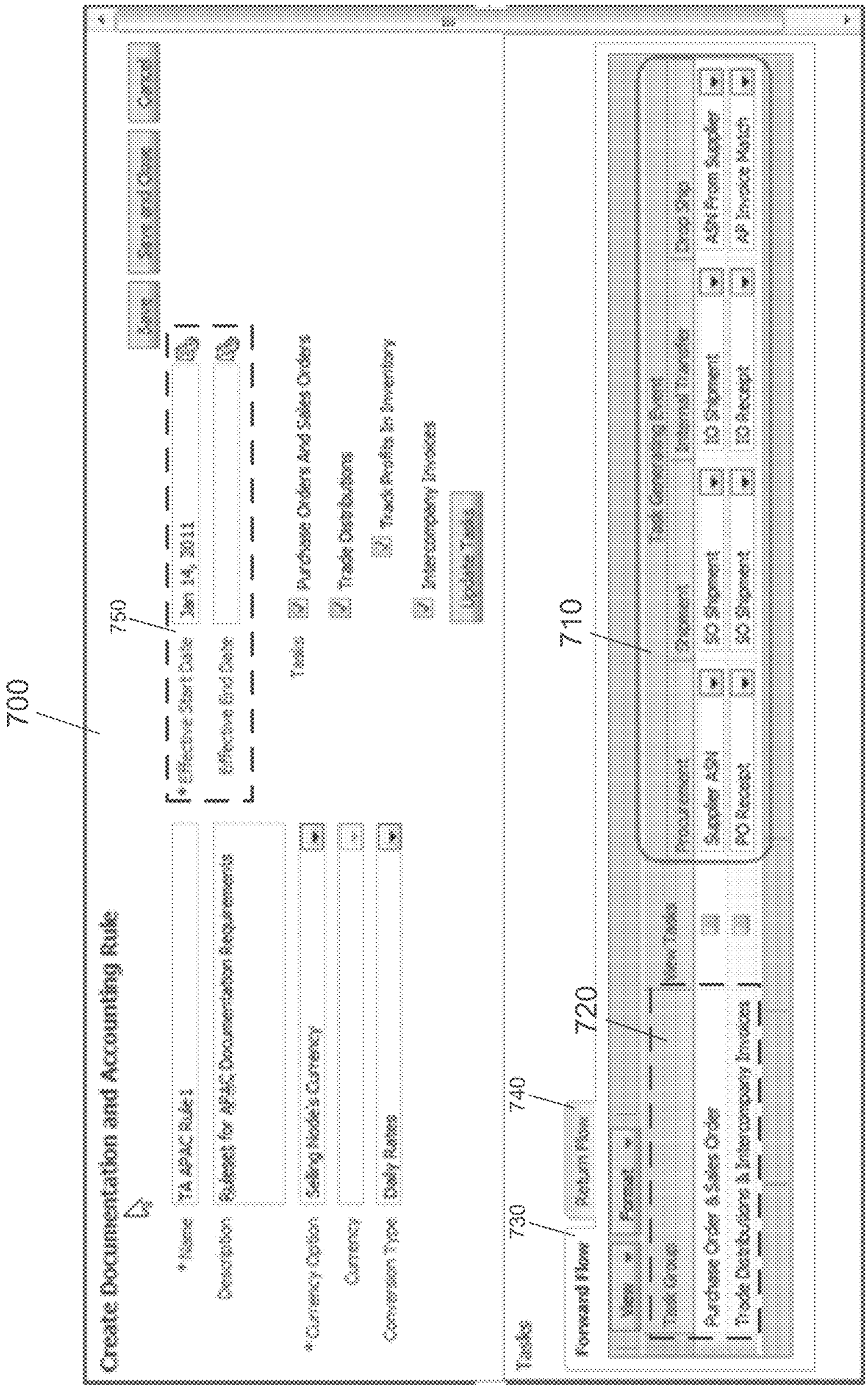
Figures 3, 4, 5, 6, 7, 8:
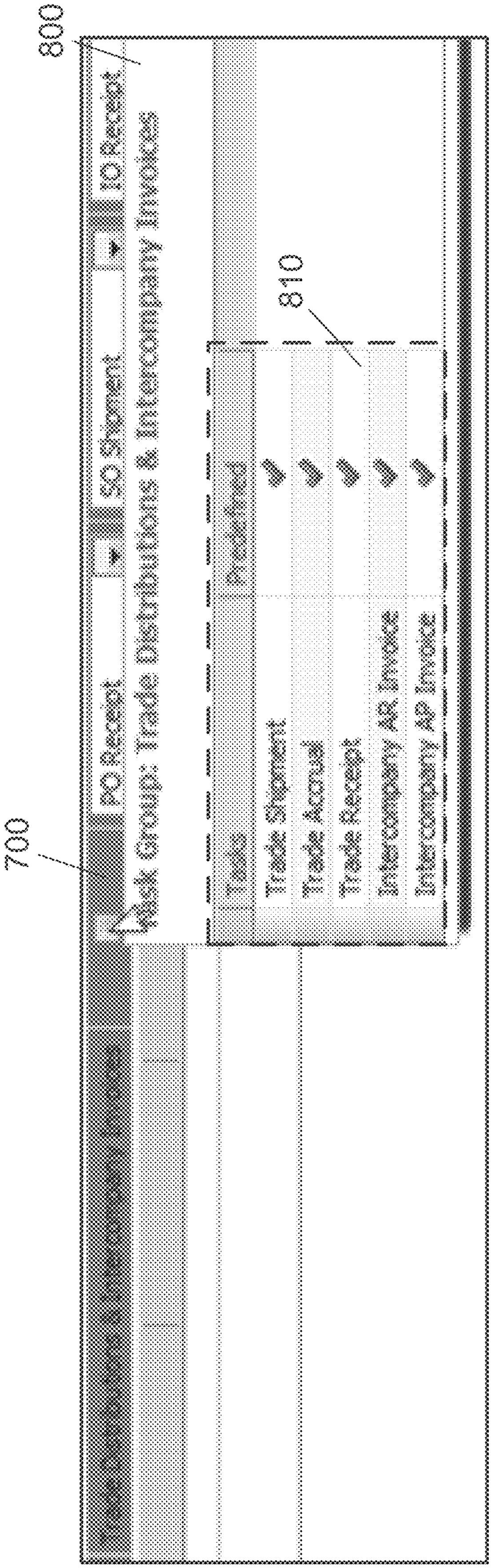
Figures 3, 4, 5, 6, 7, 8, 9:
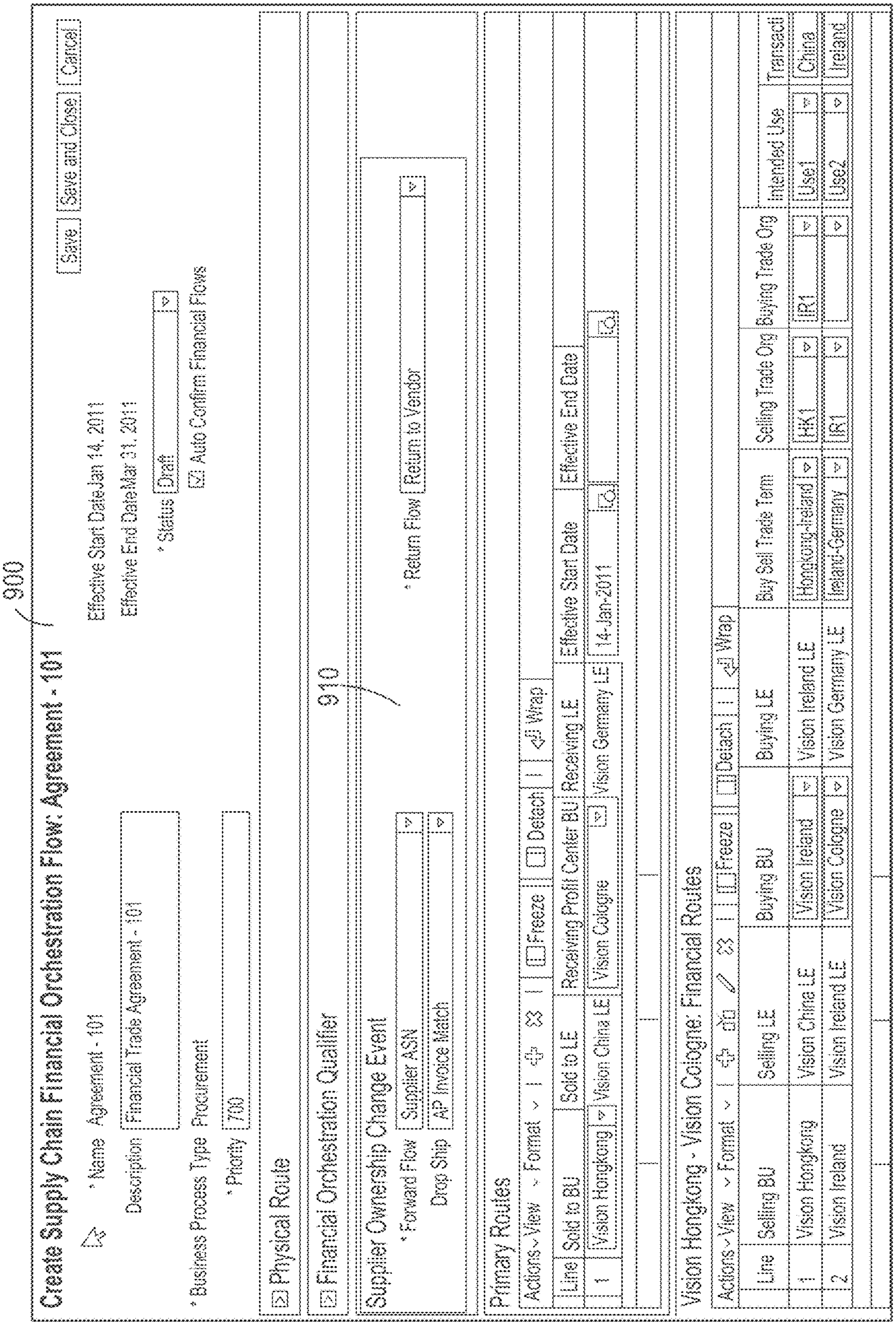
Figures 3, 4, 5, 6, 7, 8, 9, 10:
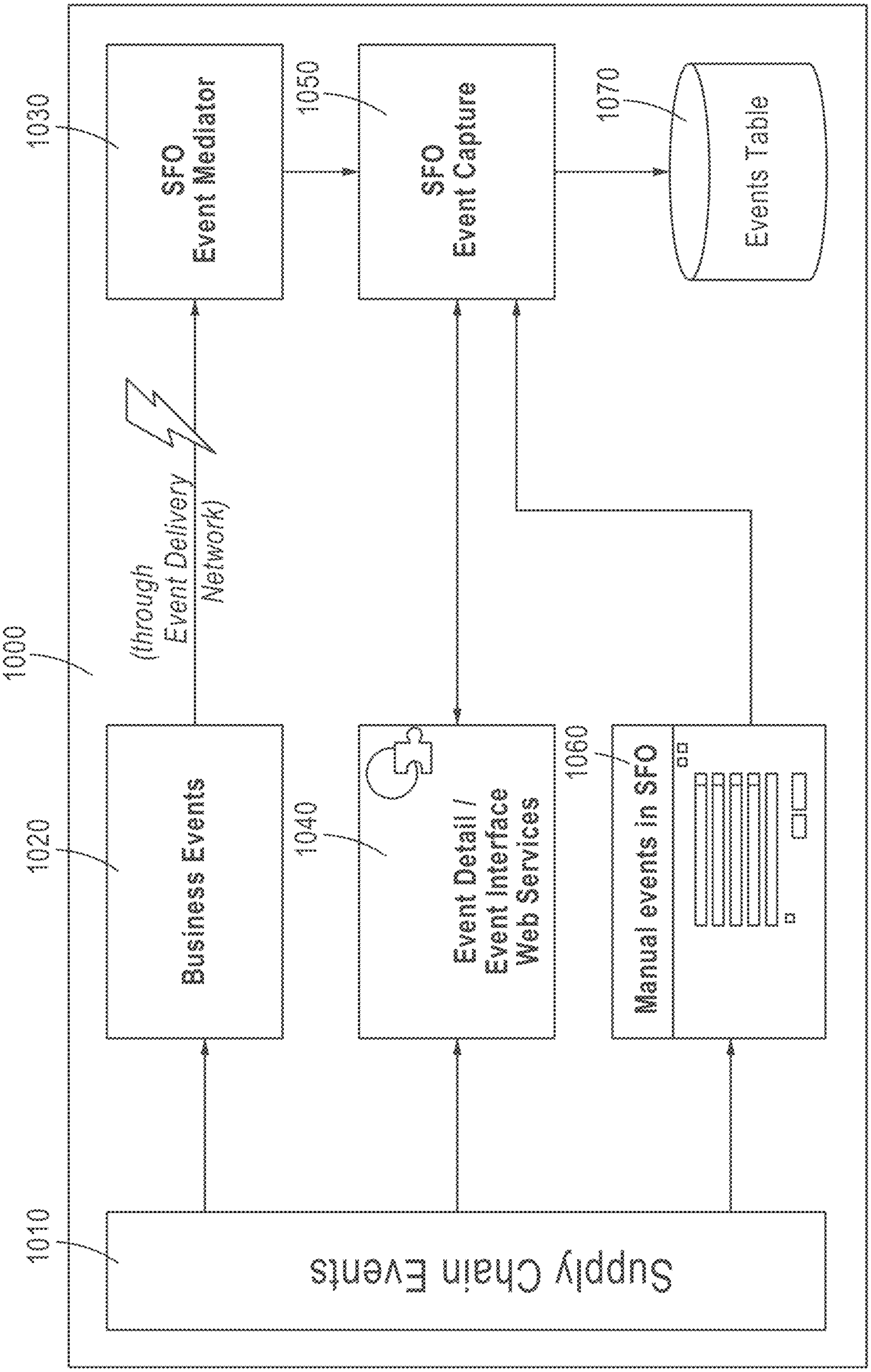
Figures 3, 4, 5, 6, 7, 8, 9, 10, 11:
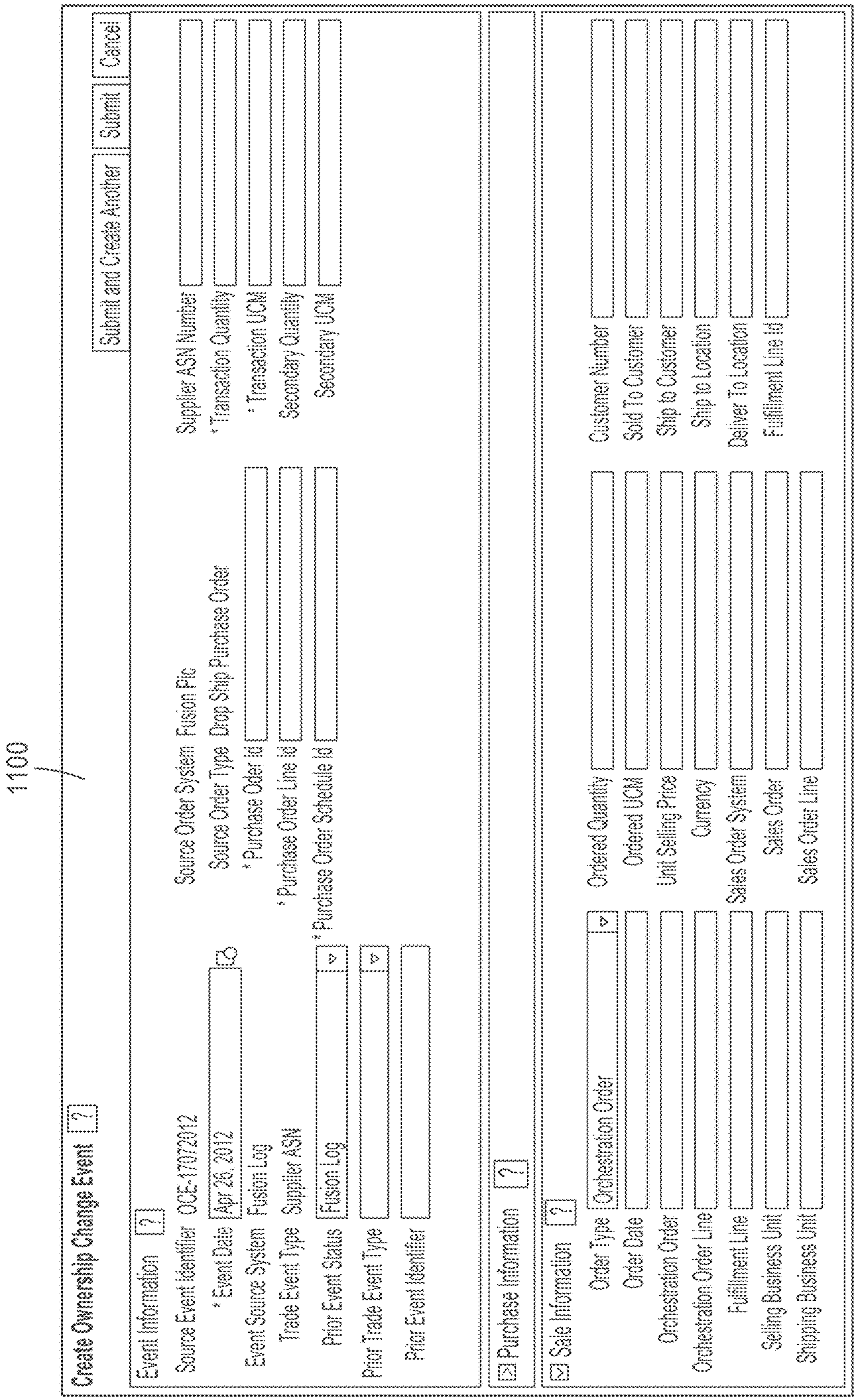
Figures 3, 4, 5, 6, 7, 8, 9, 10, 11, 12:
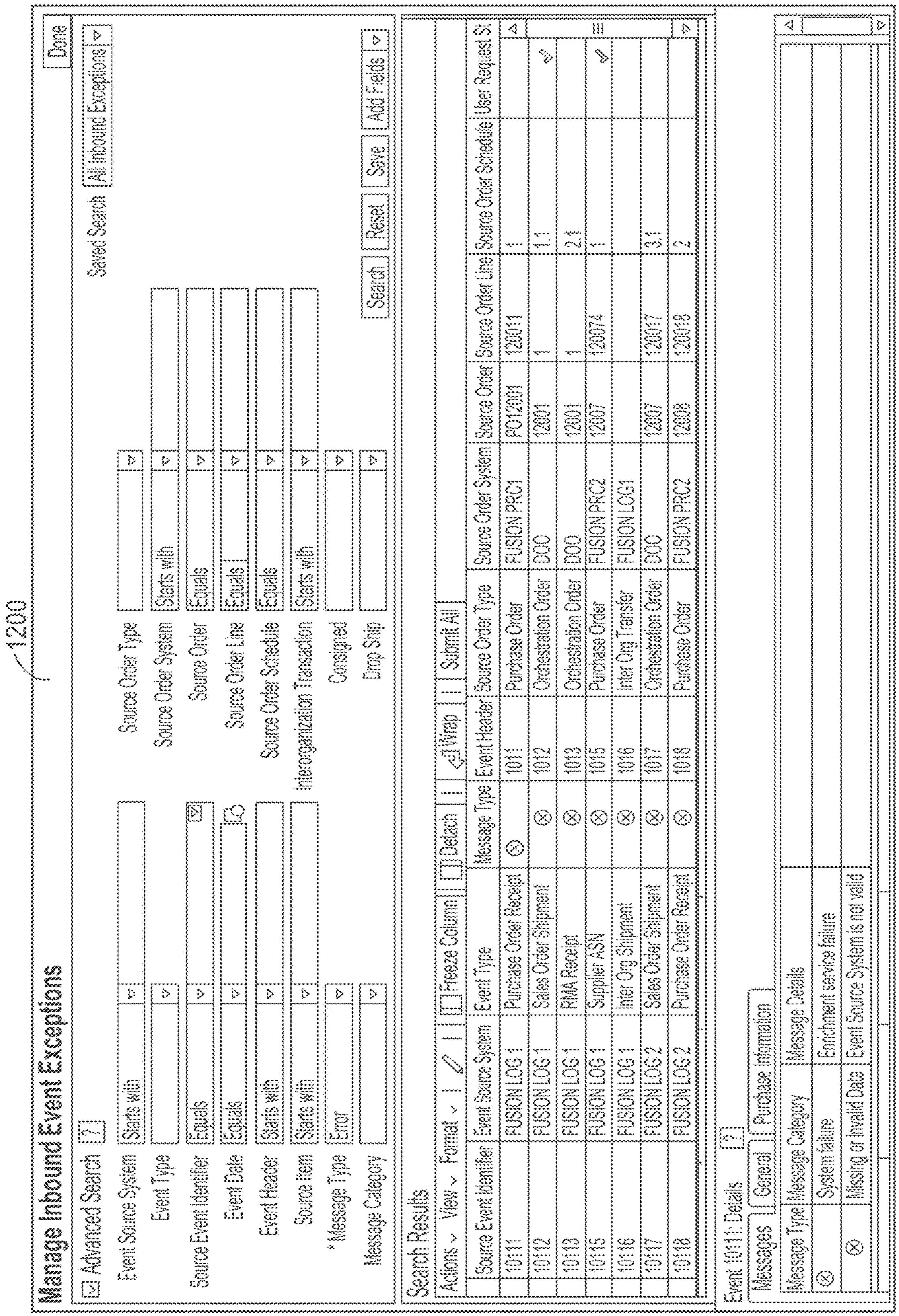
Figures 3, 4, 5, 6, 7, 8, 9, 10, 11, 12, 13:
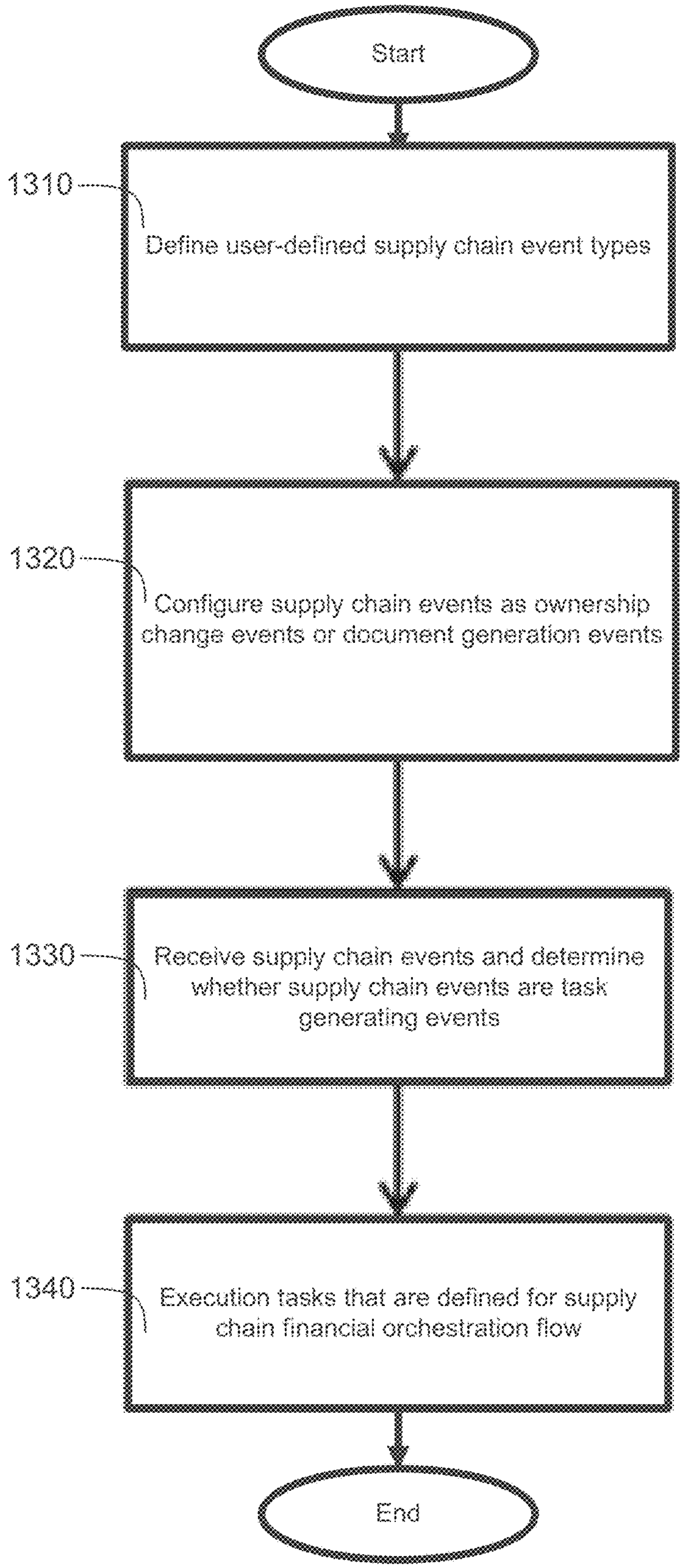
Figures 1, 4:
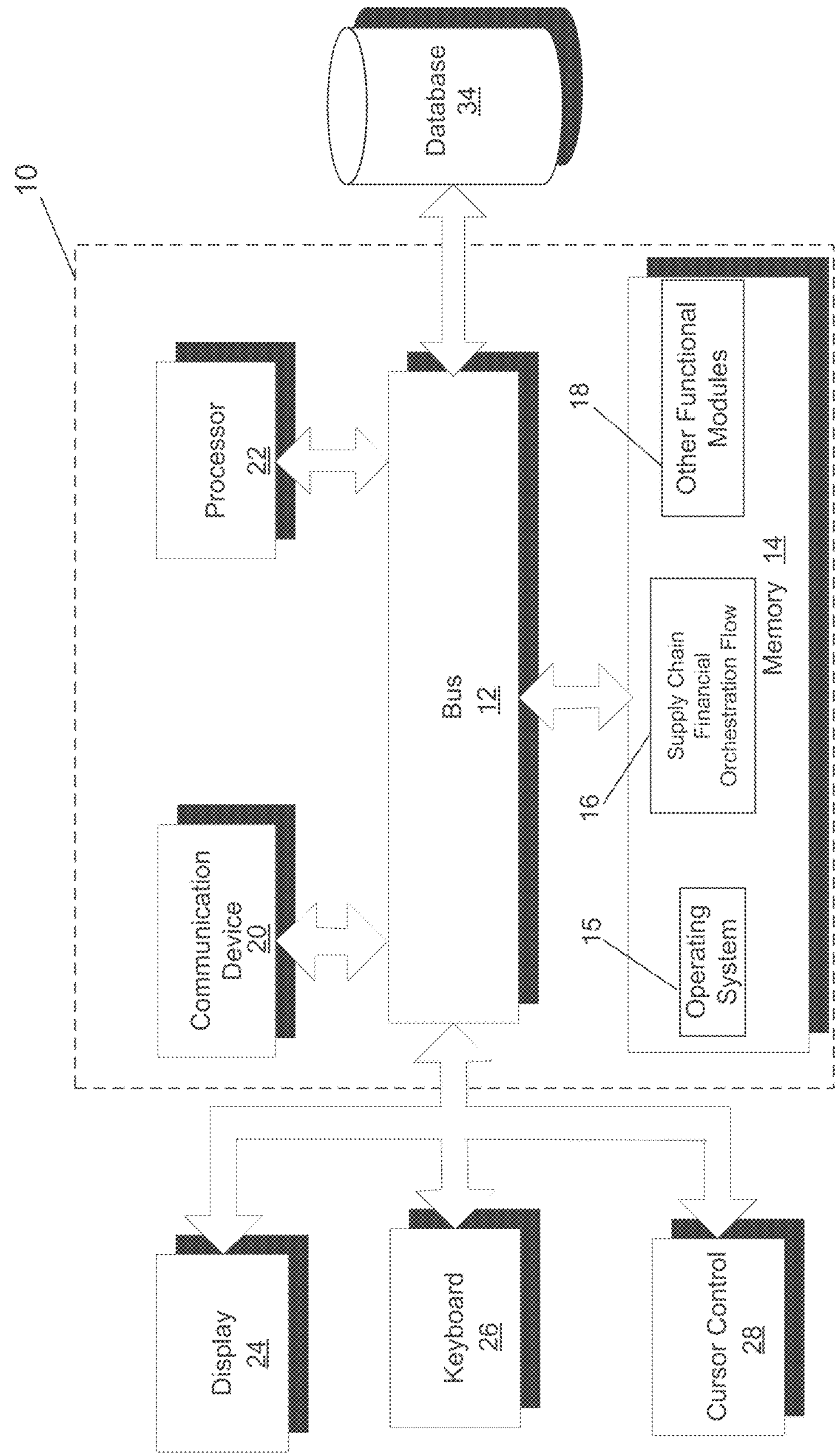
Figures 2, 4:
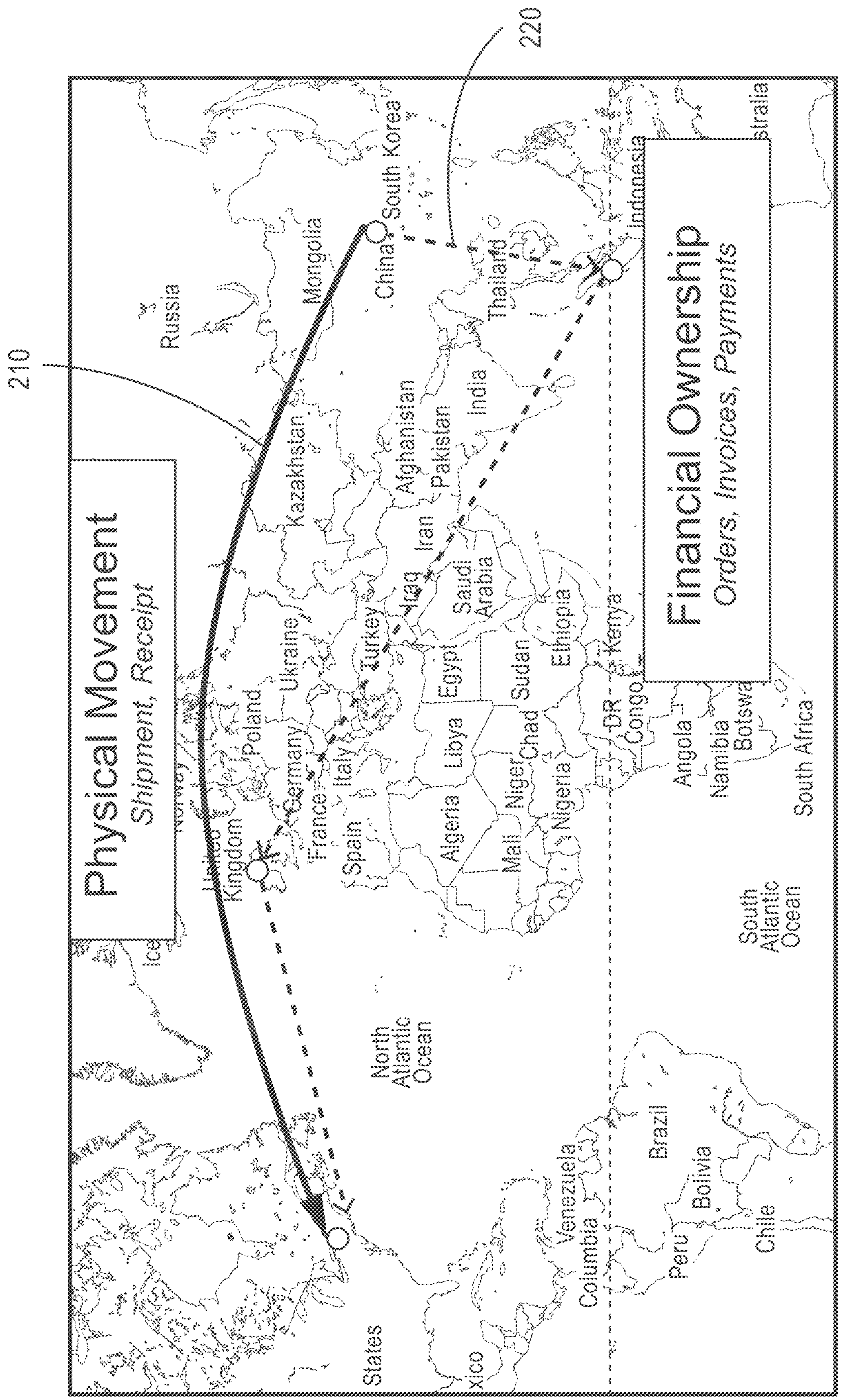
Figures 3, 4:
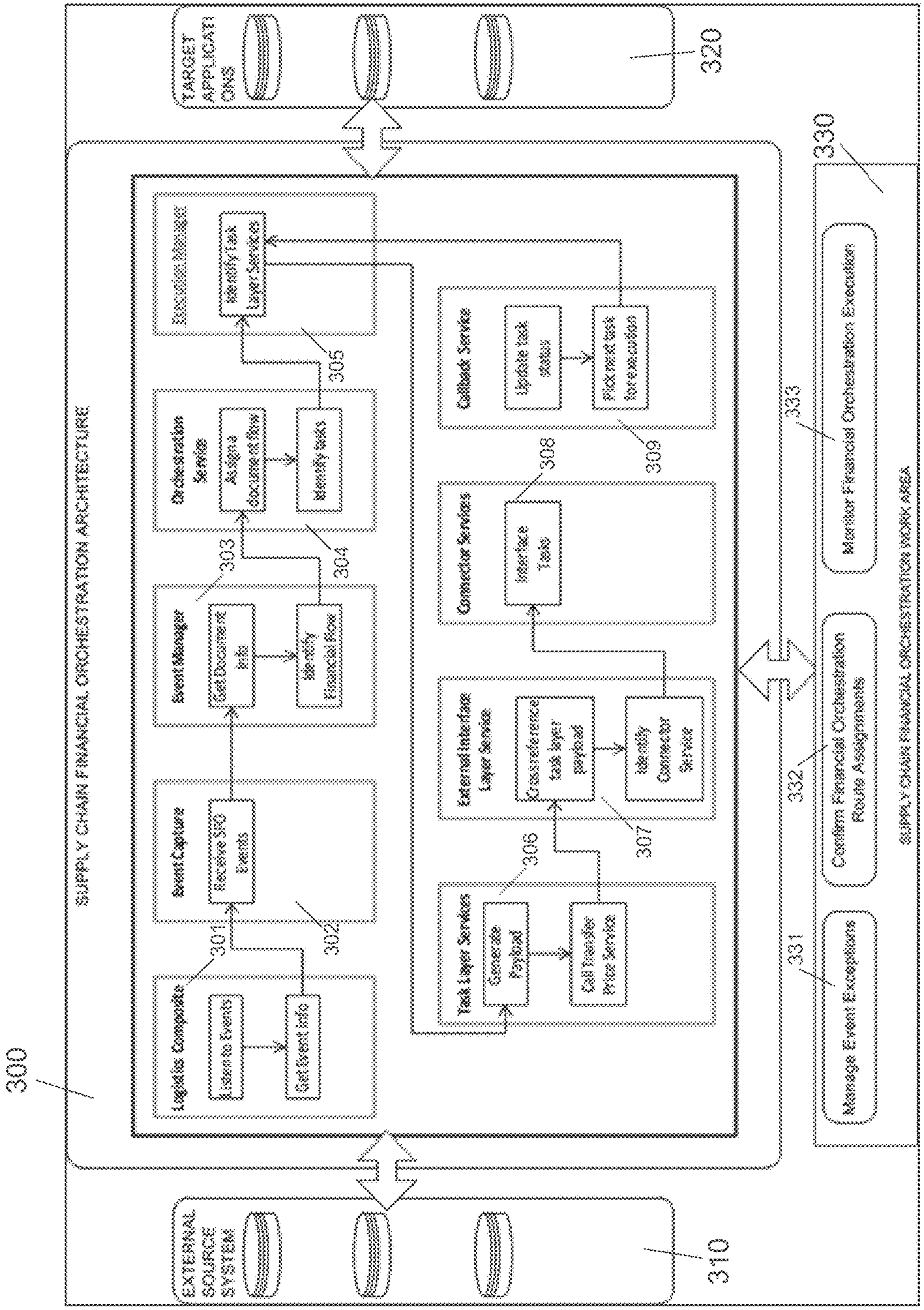
Figure 4:
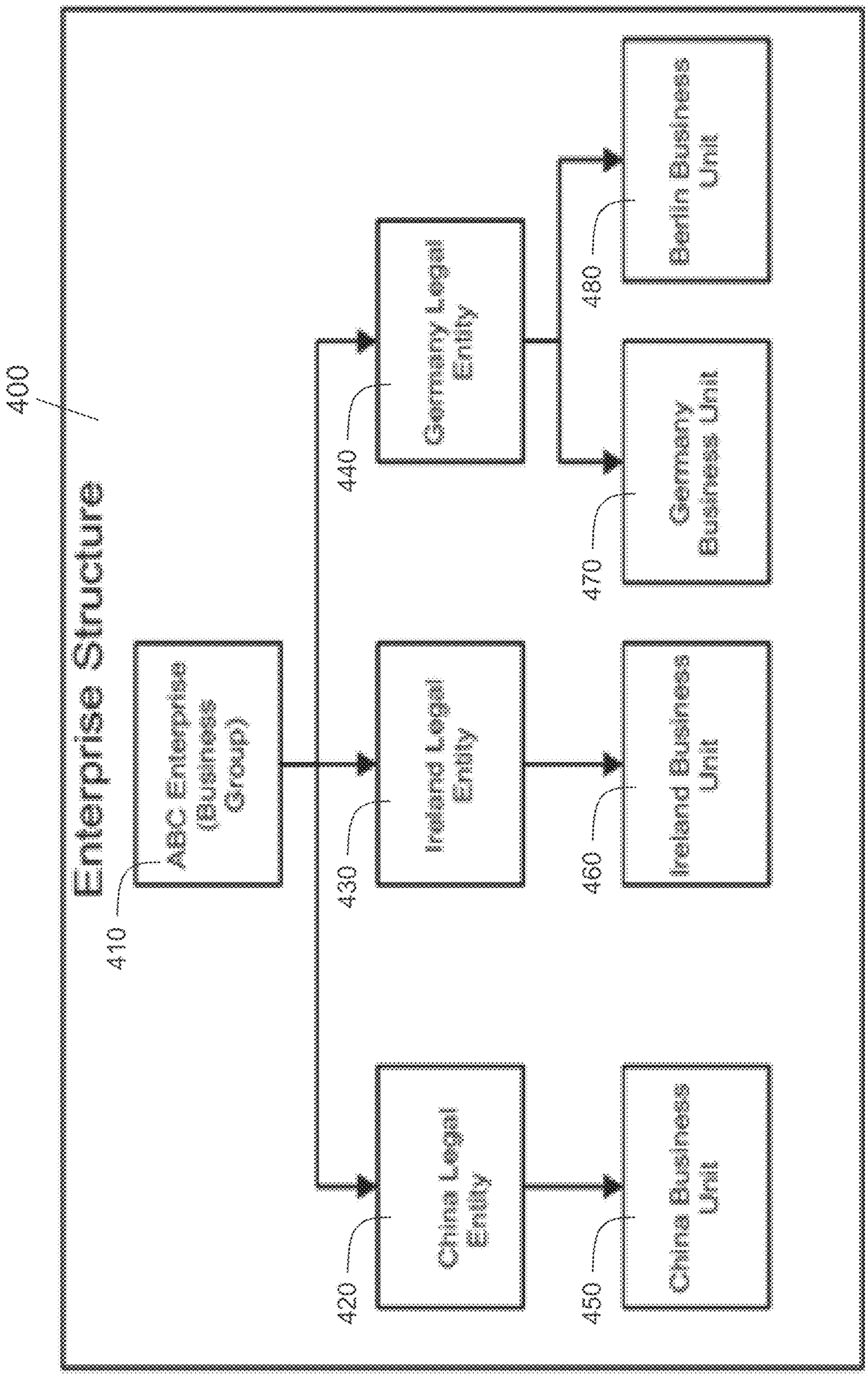
Figures 4, 5:
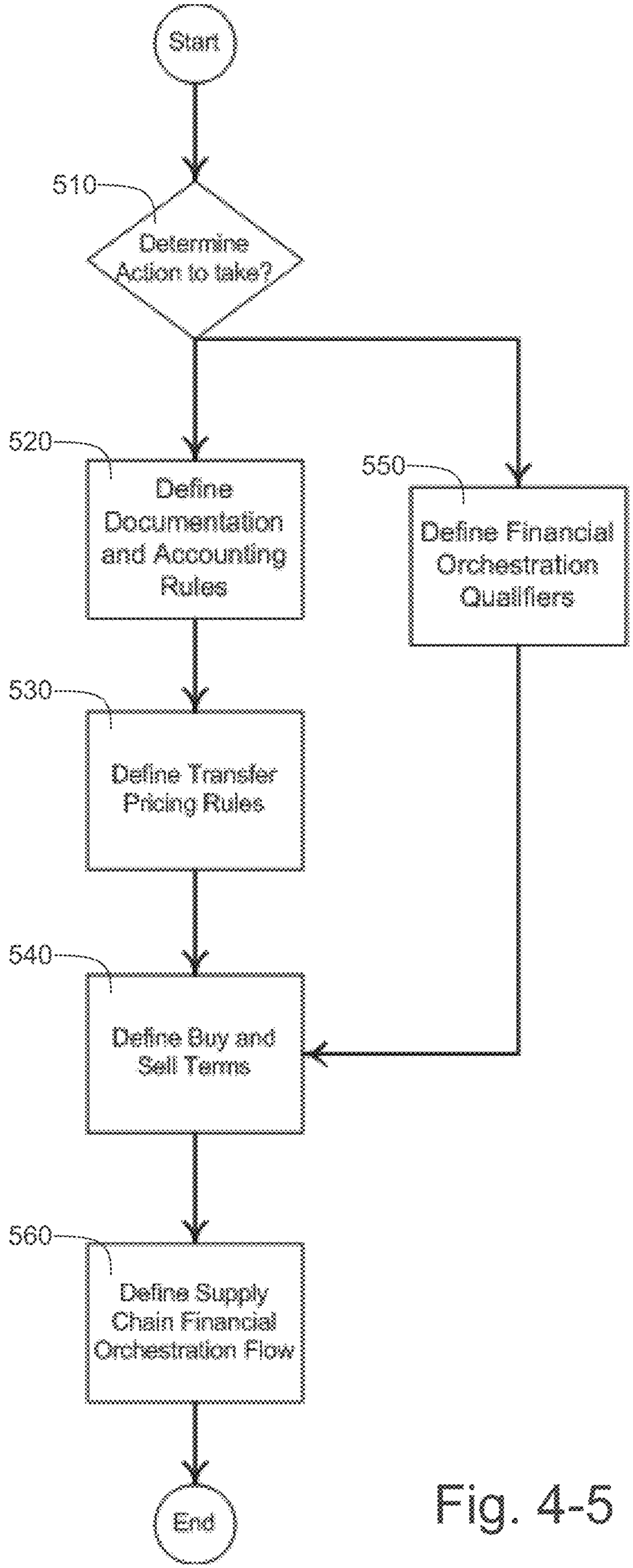
Figures 4, 5, 6:
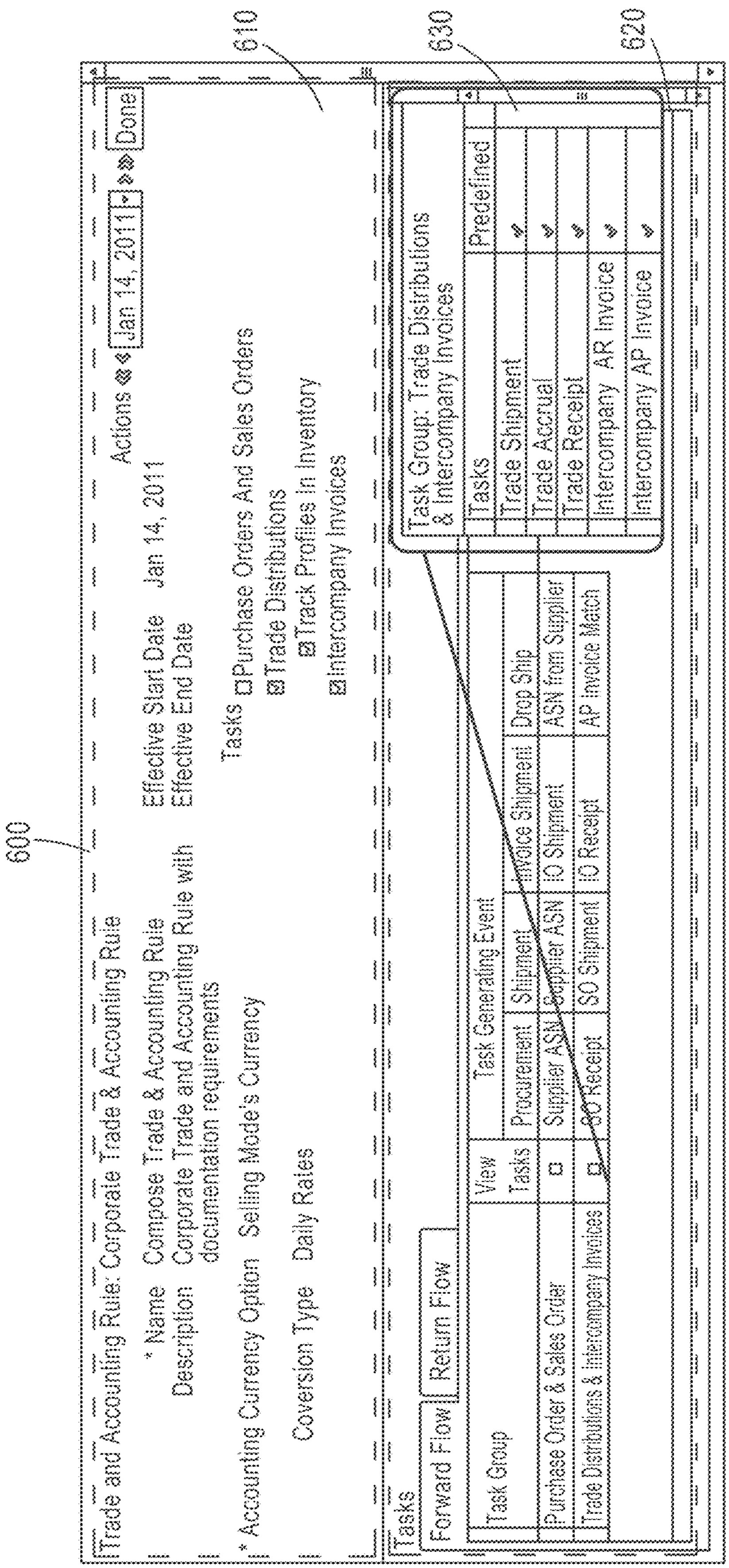
Figures 4, 5, 6, 7:
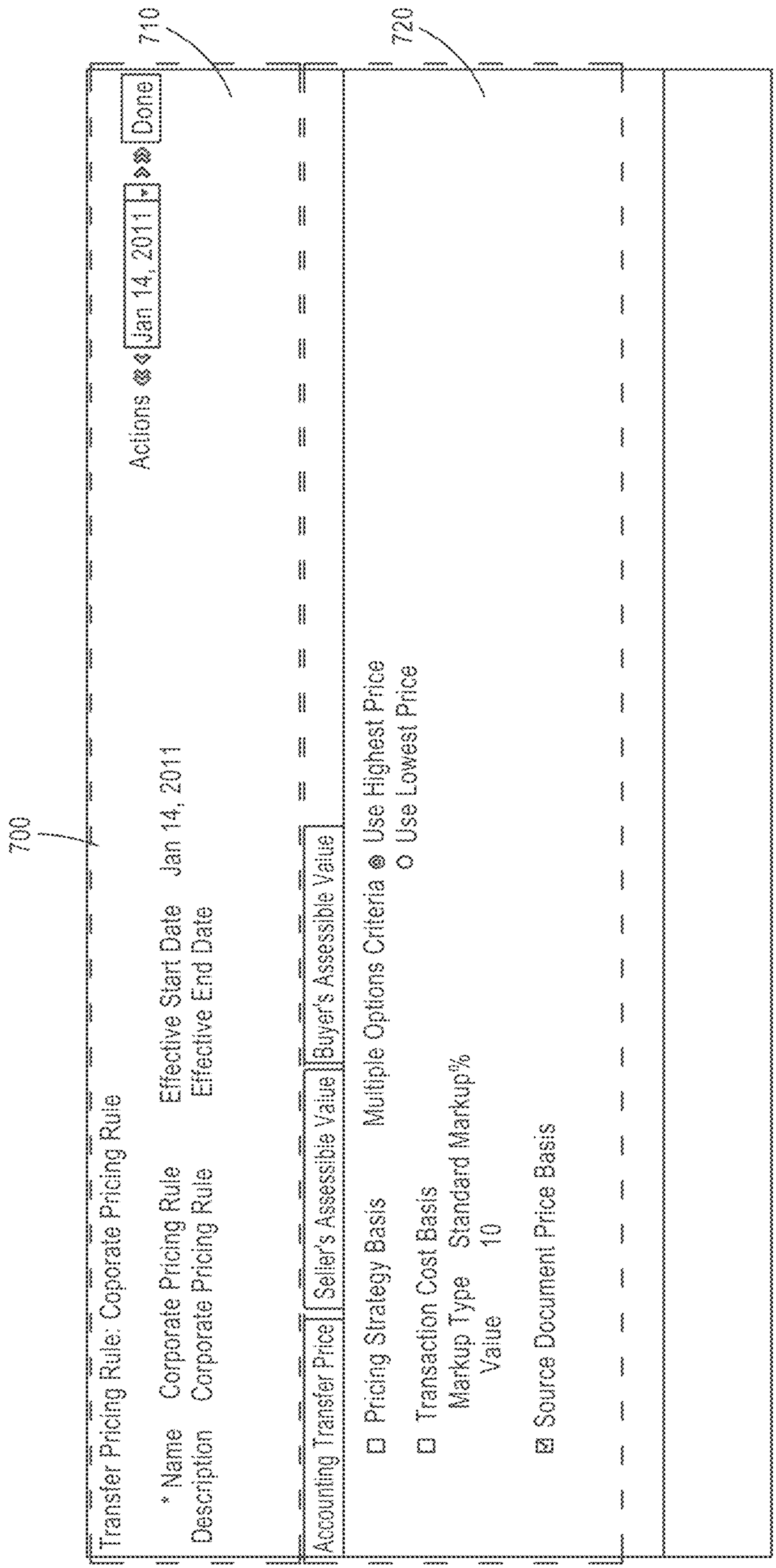
Figures 4, 5, 6, 7, 8:
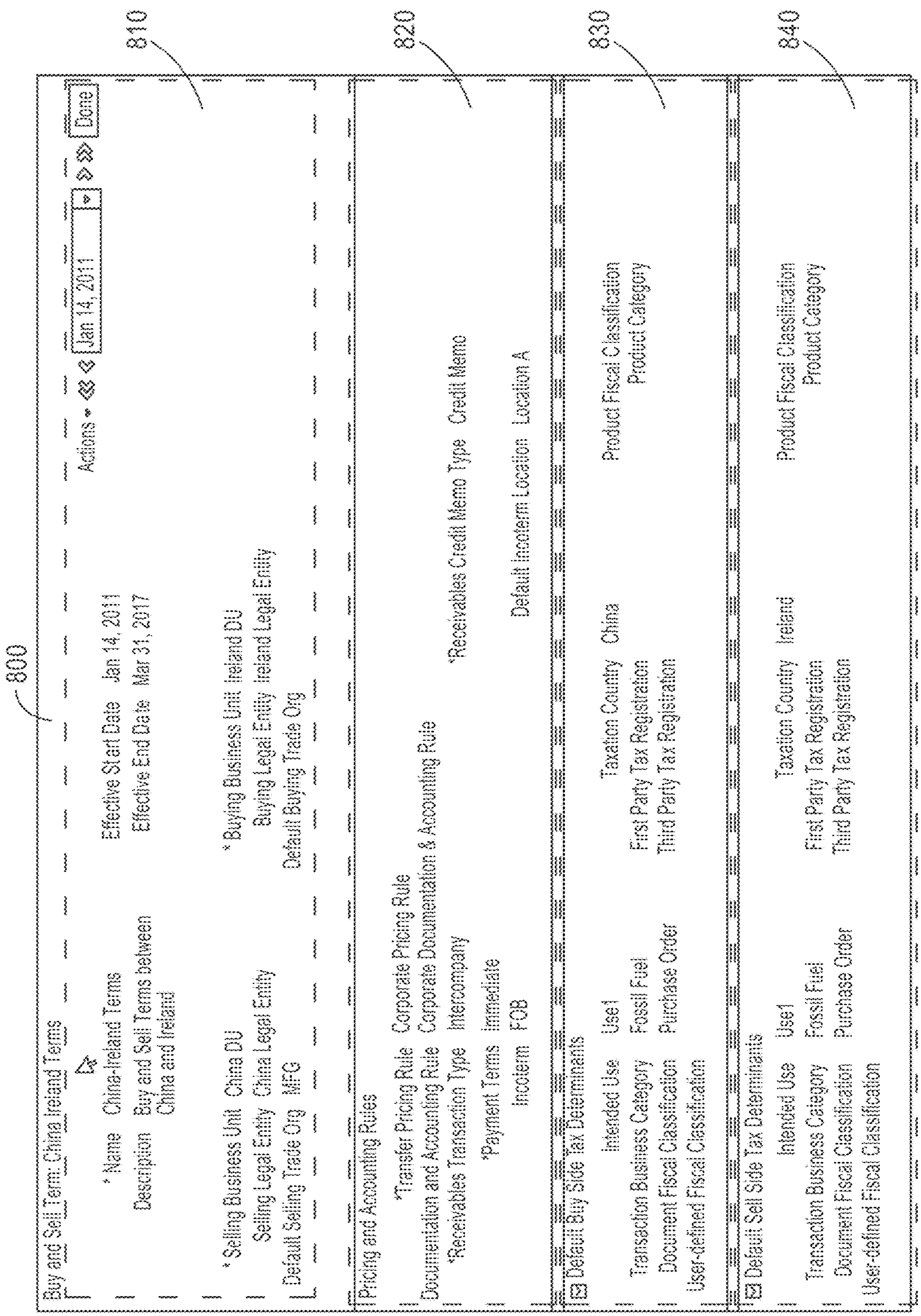
Figures 4, 5, 6, 7, 8, 9:
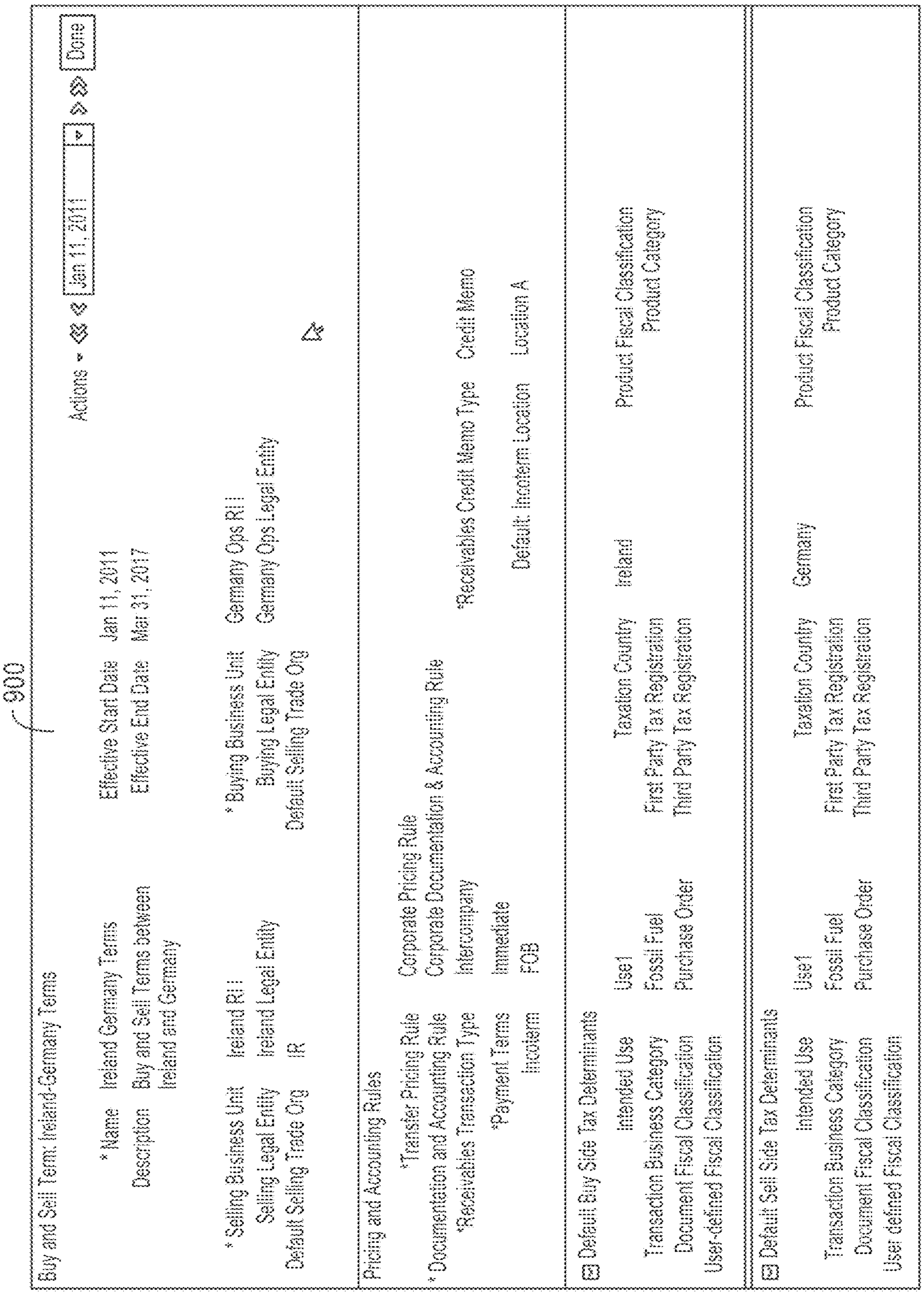
Figures 4, 5, 6, 7, 8, 9, 10:
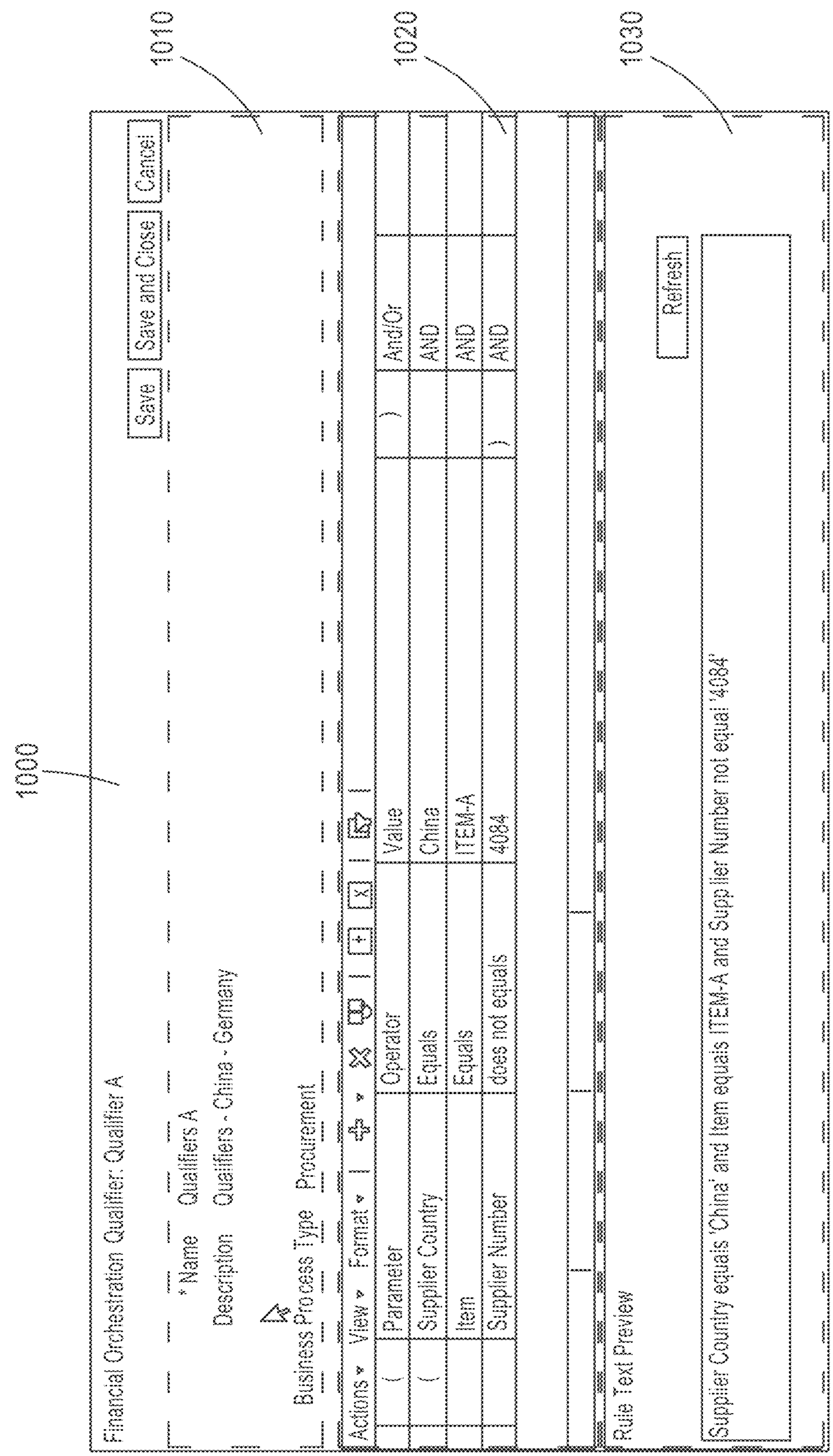
Figures 4, 5, 6, 7, 8, 9, 10, 11, 11A:
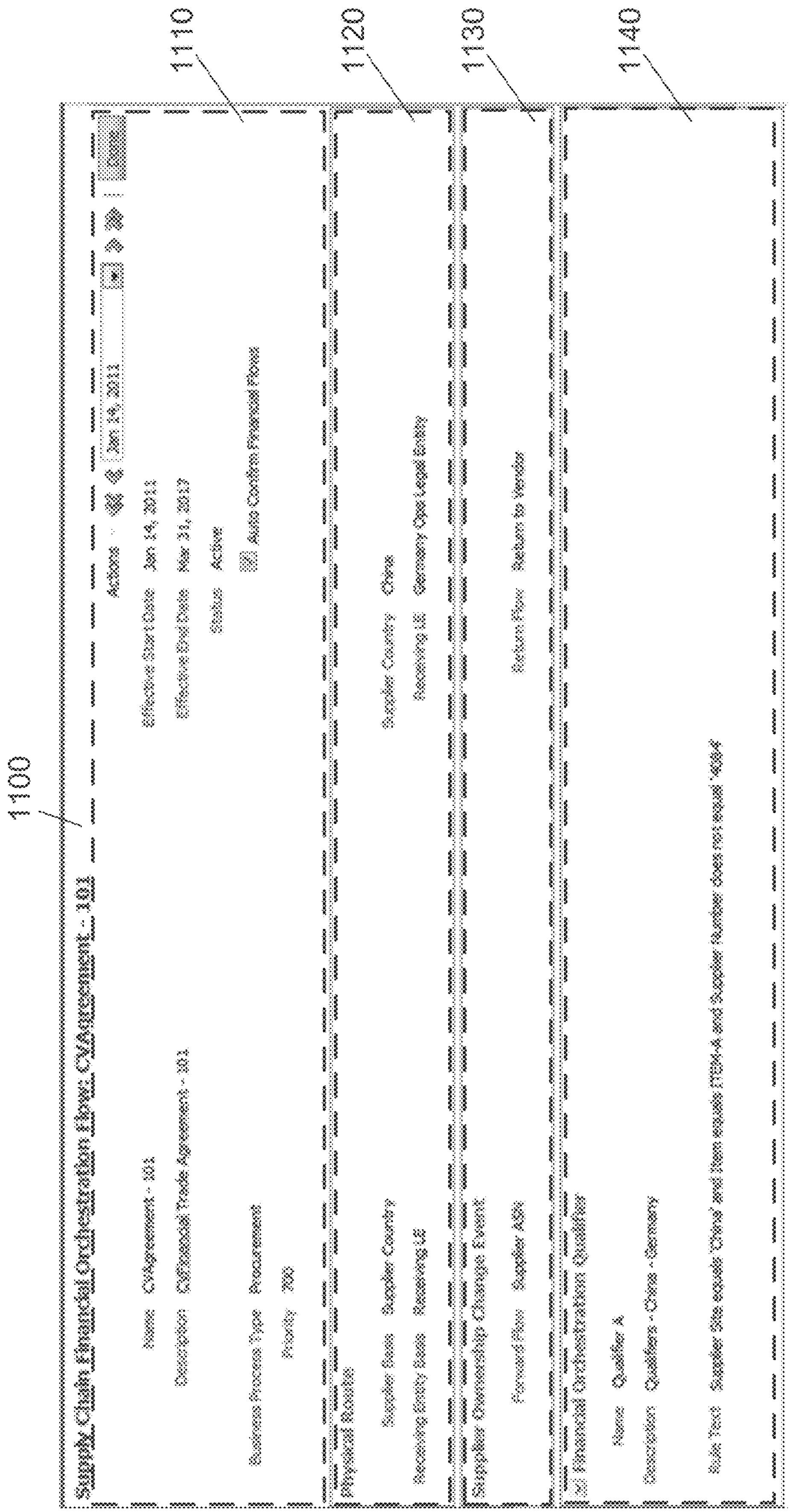
Figures 4, 5, 6, 7, 8, 9, 10, 11, 11B:
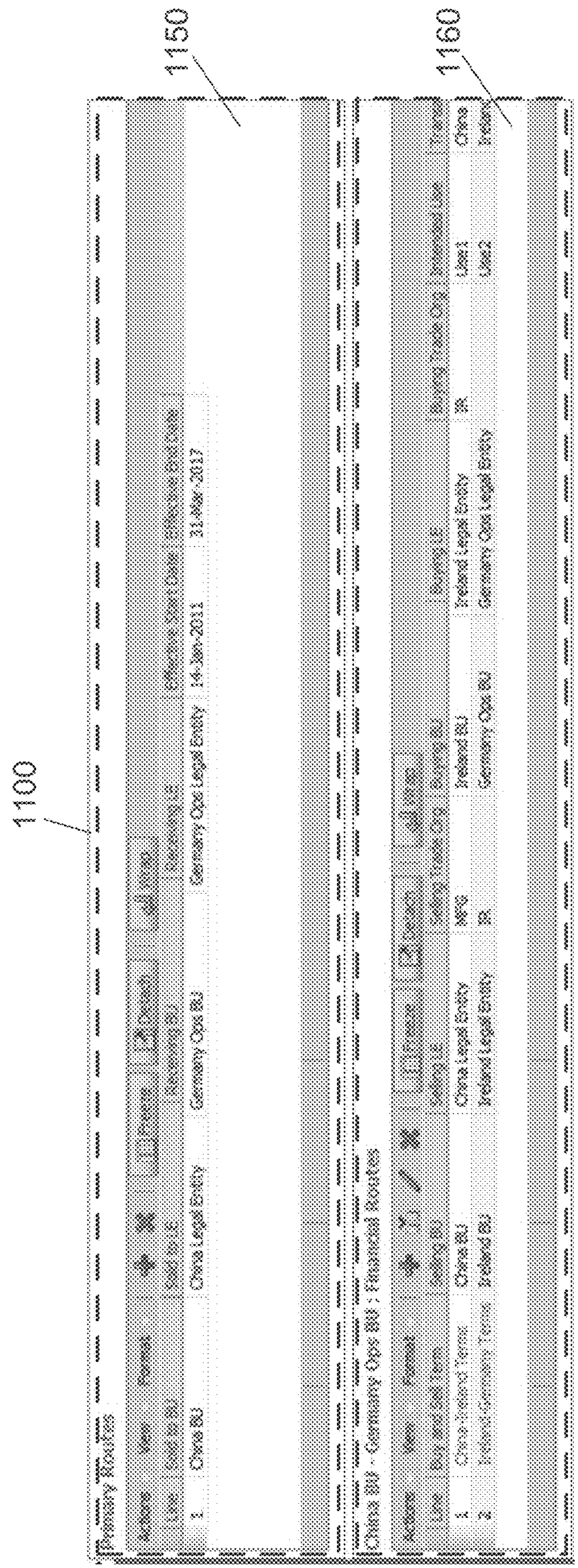
Figures 4, 5, 6, 7, 8, 9, 10, 11, 12:
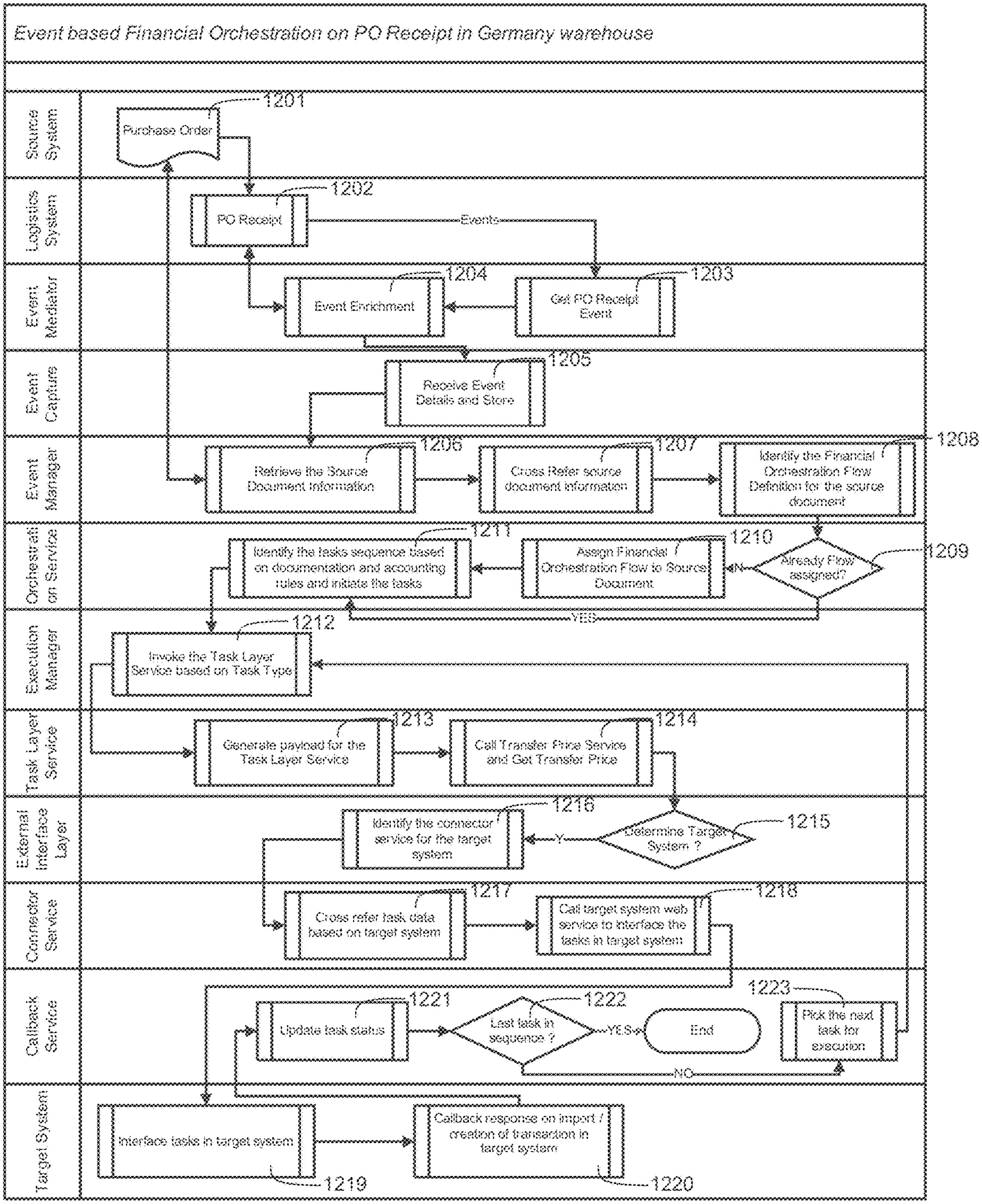
Figures 4, 5, 6, 7, 8, 9, 10, 11, 12, 13:
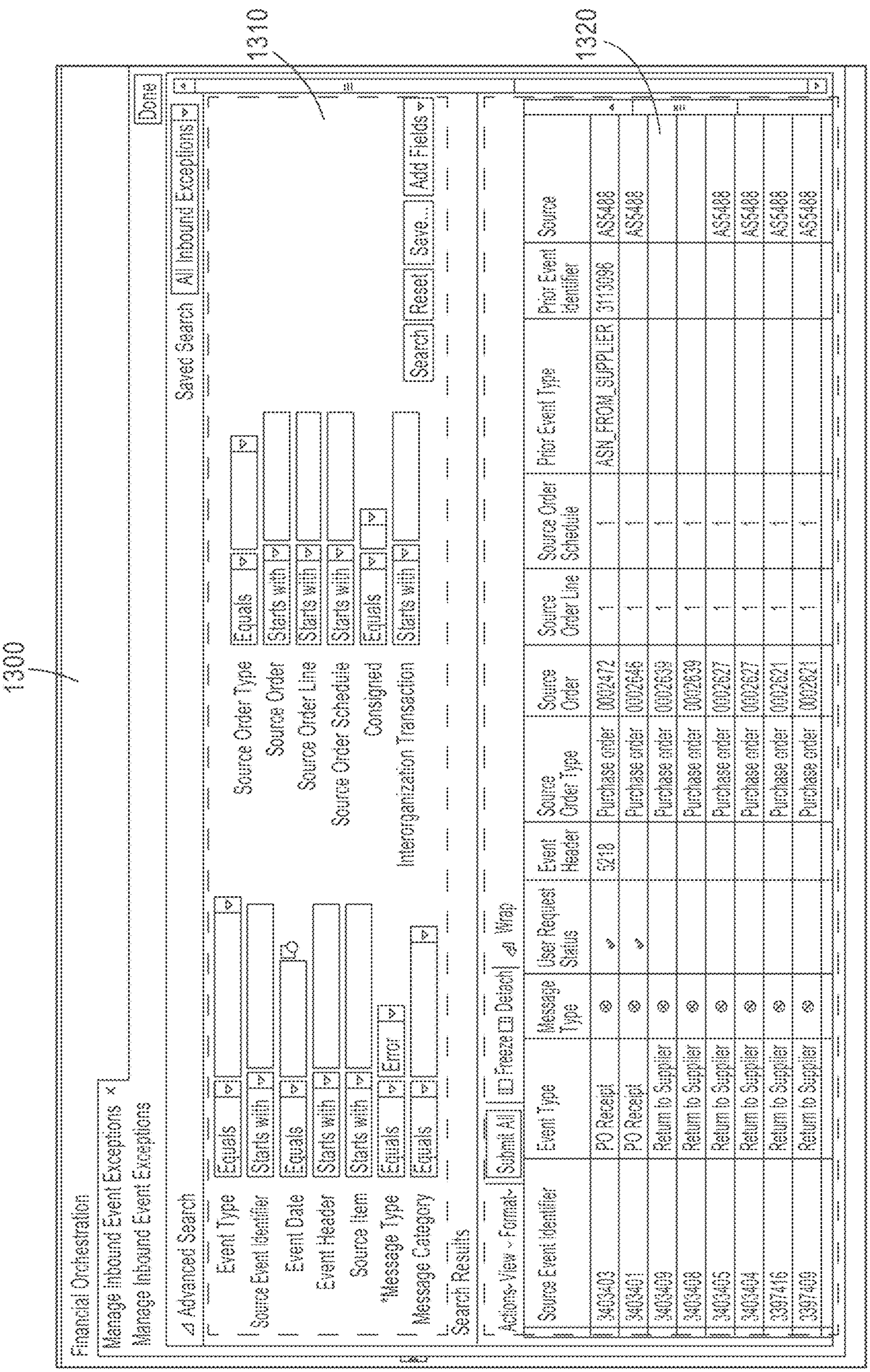
Figures 4, 5, 6, 7, 8, 9, 10, 11, 12, 13, 14:
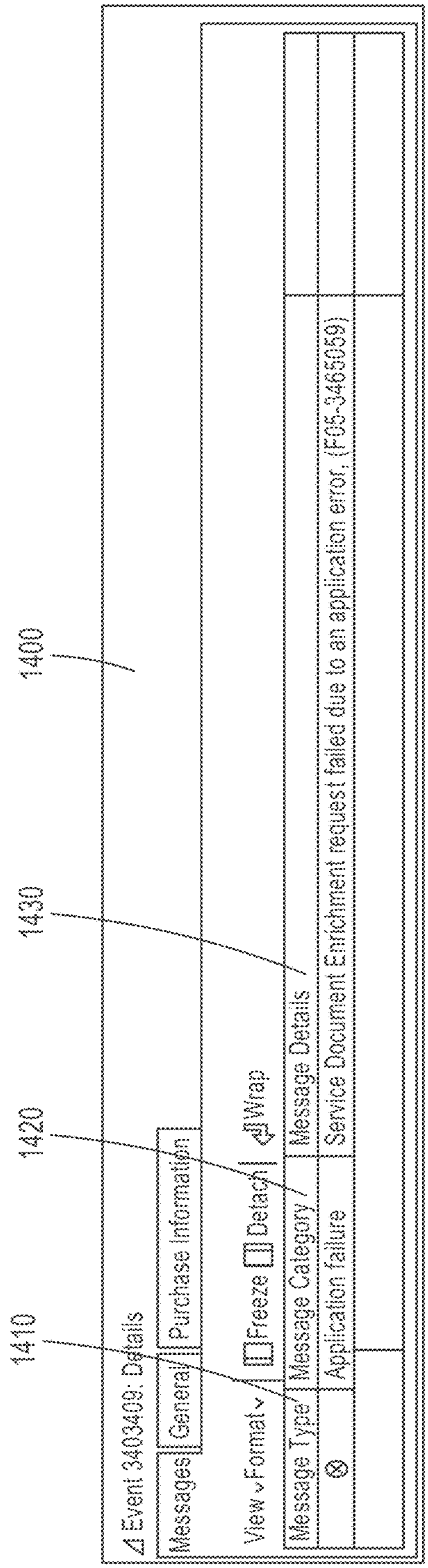
Figures 4, 5, 6, 7, 8, 9, 10, 11, 12, 13, 14, 15:
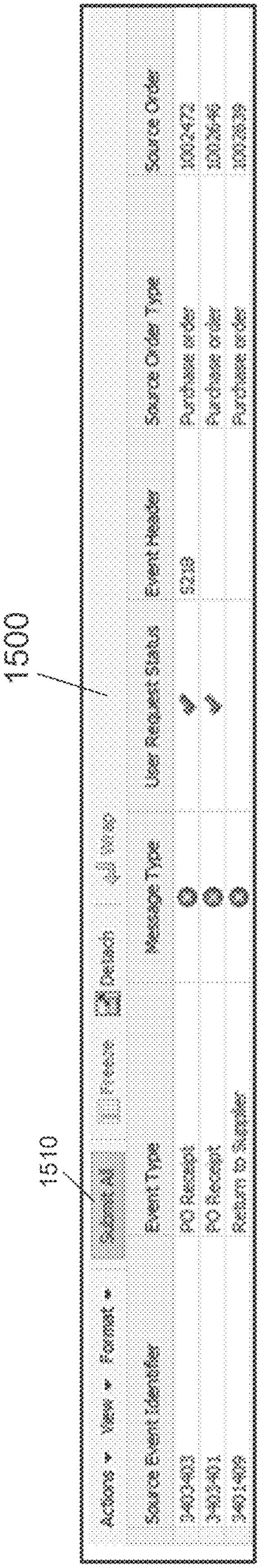
Figures 4, 5, 6, 7, 8, 9, 10, 11, 12, 13, 14, 15, 16:
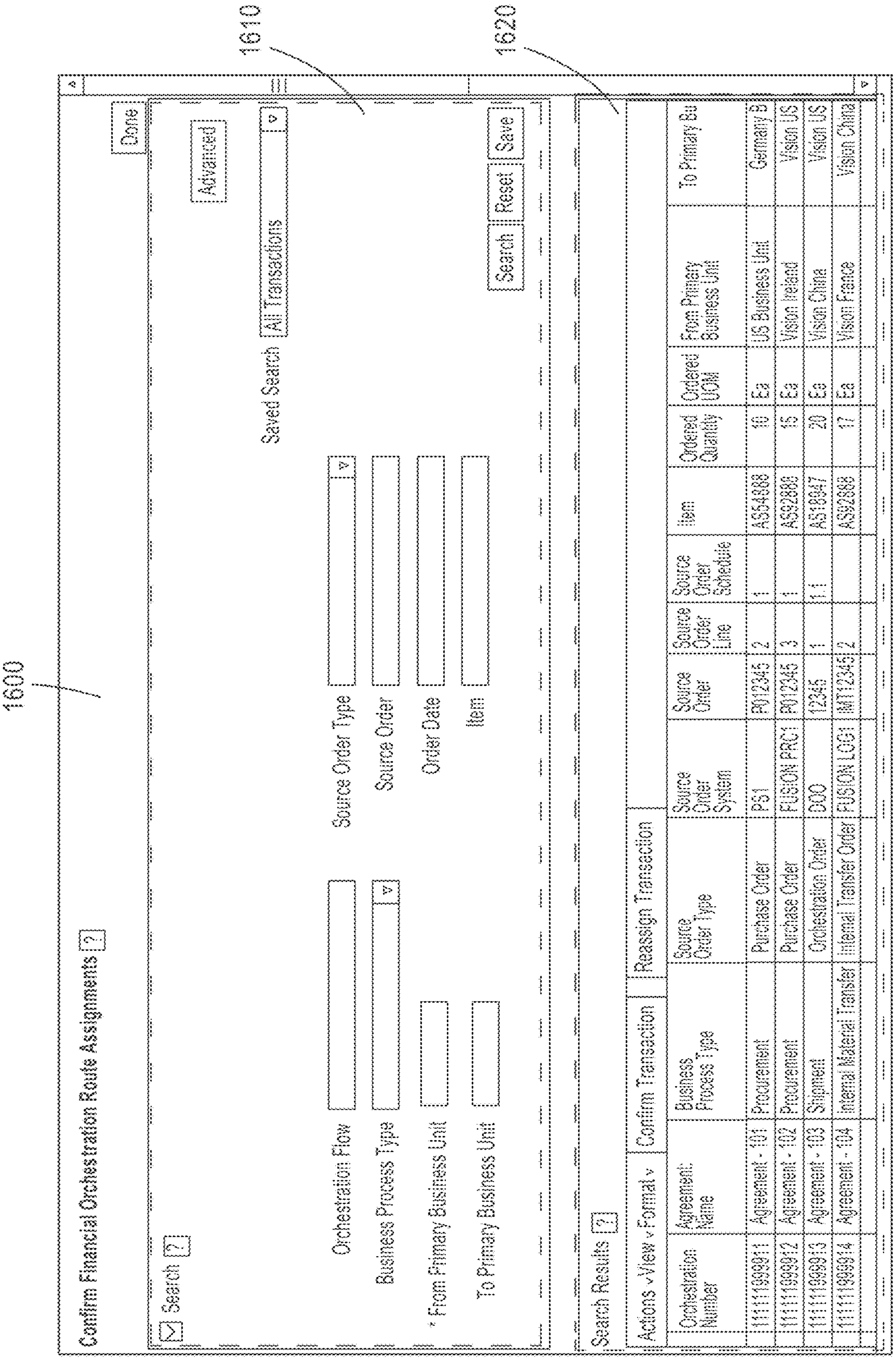
Figures 4, 5, 6, 7, 8, 9, 10, 11, 12, 13, 14, 15, 16, 17:
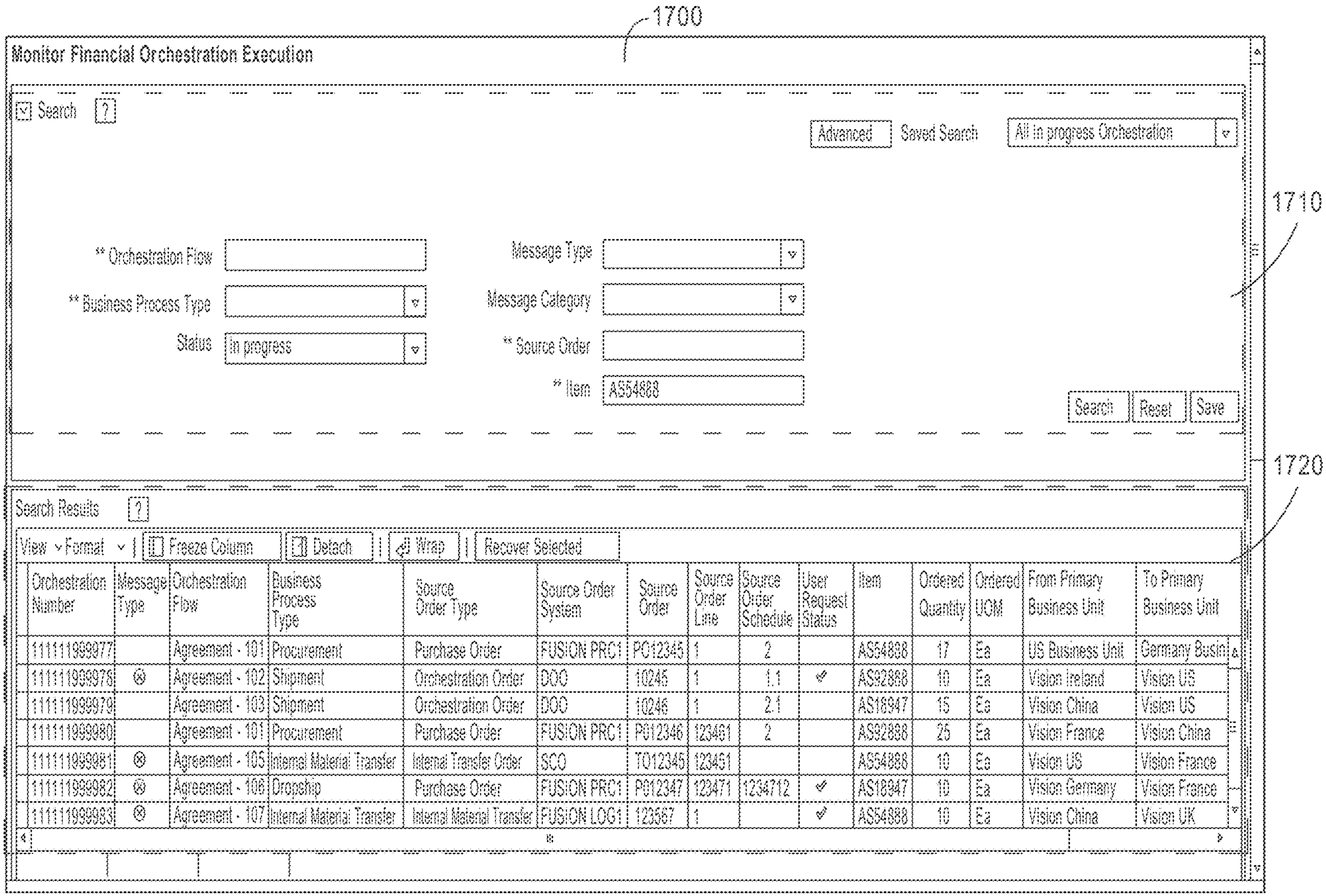
Figures 4, 5, 6, 7, 8, 9, 10, 11, 12, 13, 14, 15, 16, 17, 18:
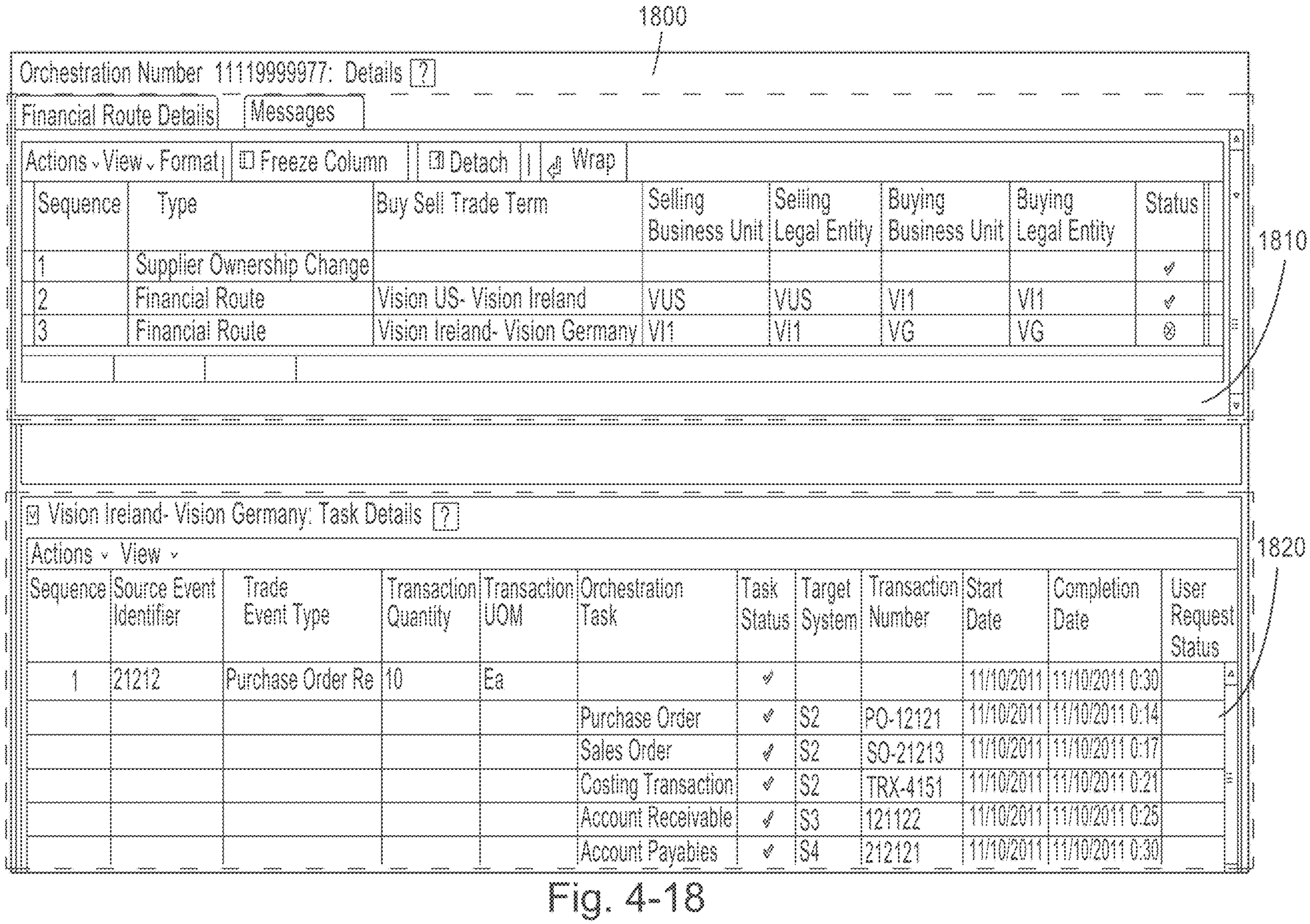
Figures 4, 5, 6, 7, 8, 9, 10, 11, 12, 13, 14, 15, 16, 17, 18, 19:
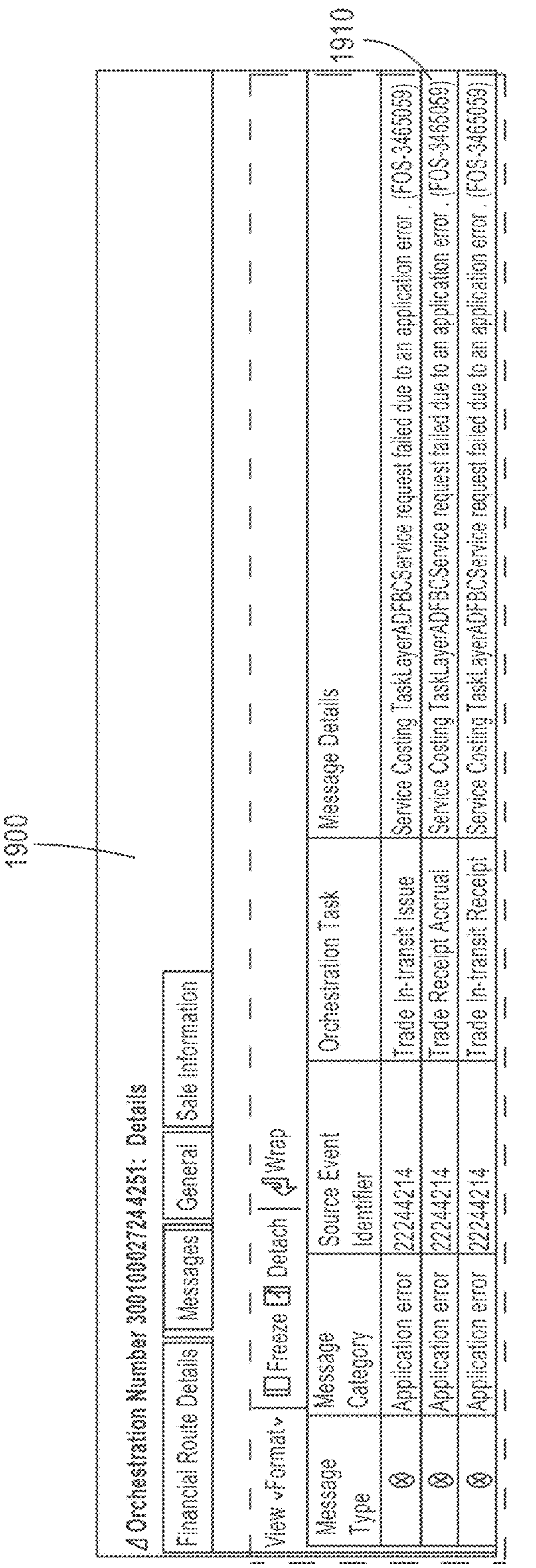
Figures 4, 5, 6, 7, 8, 9, 10, 11, 12, 13, 14, 15, 16, 17, 18, 19, 20:
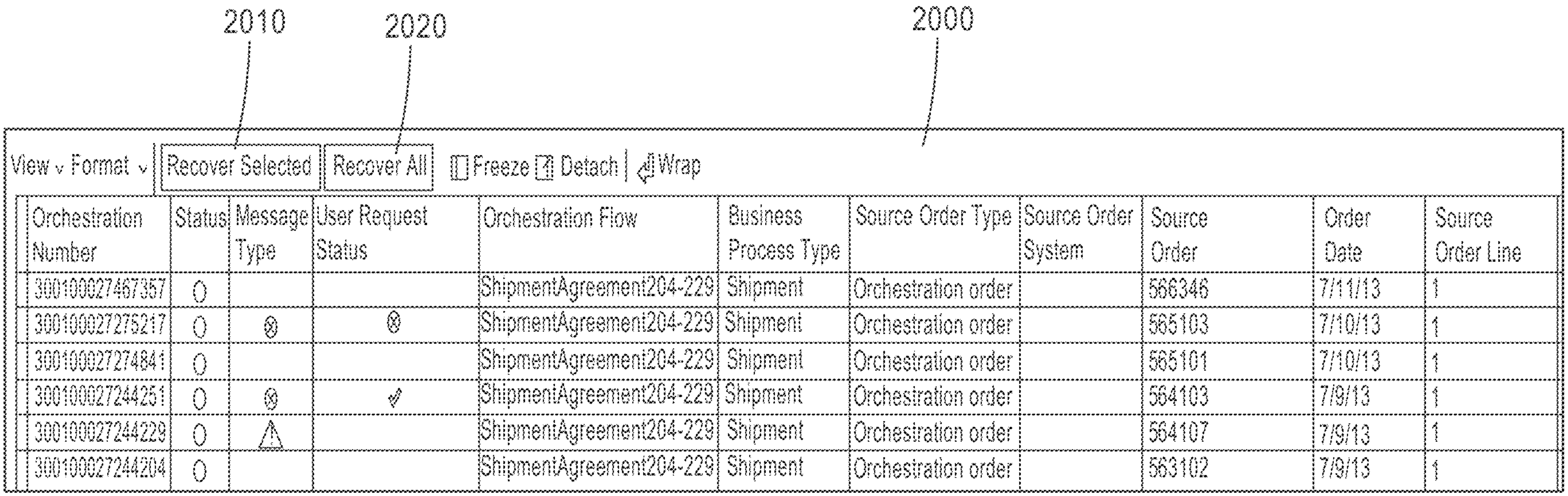
Figures 1, 5:
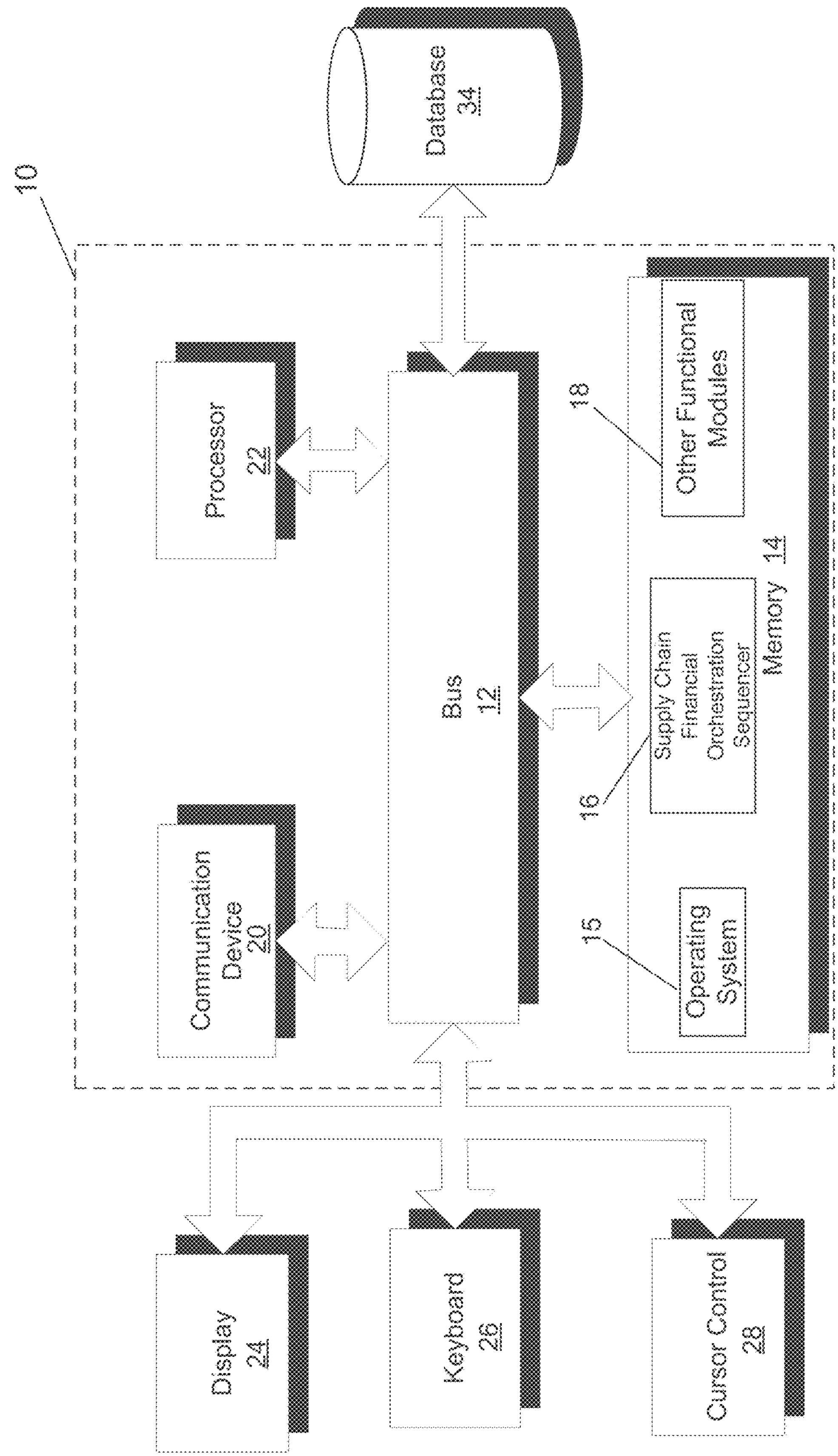
Figures 2, 5:
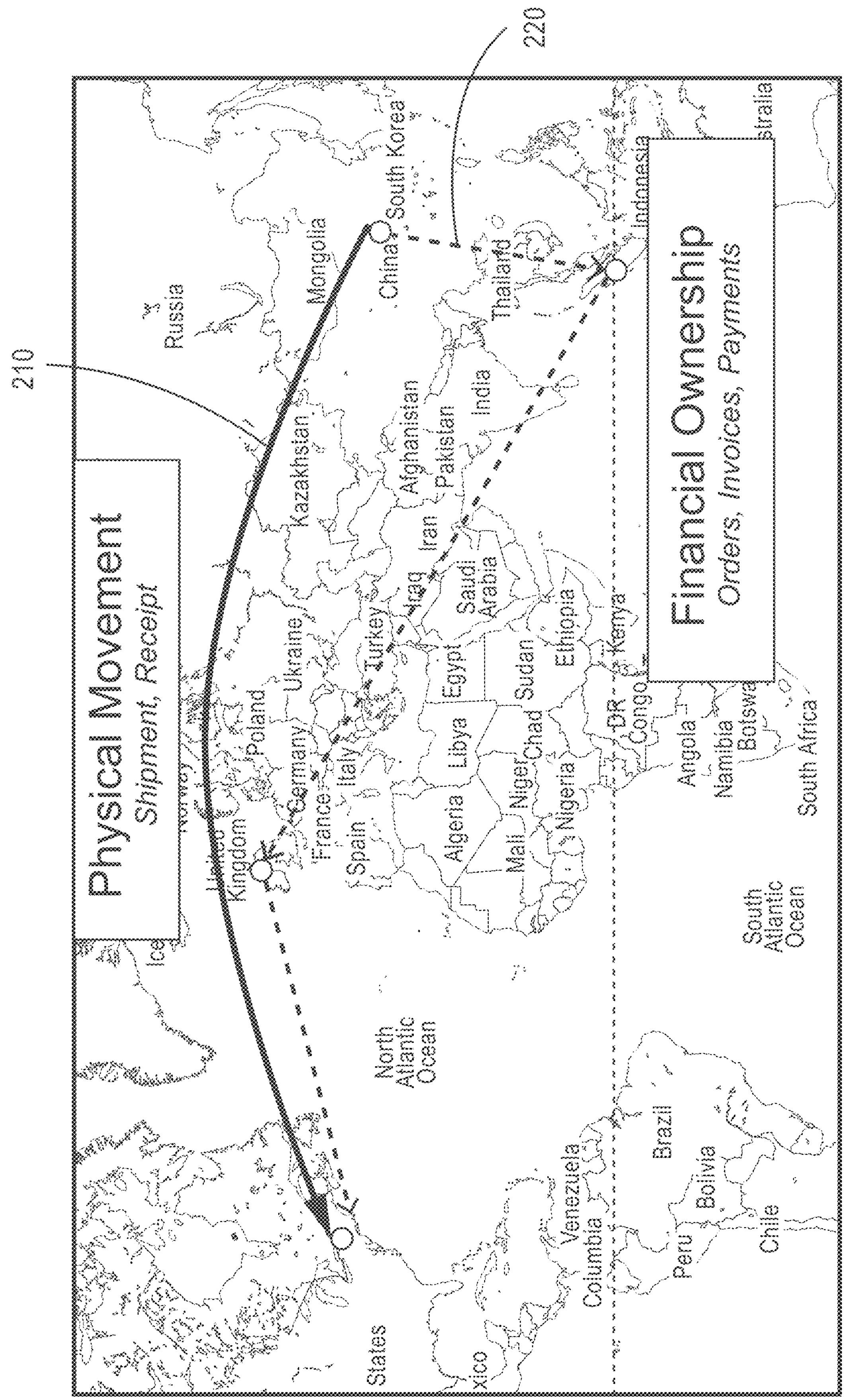
Figures 3, 5:
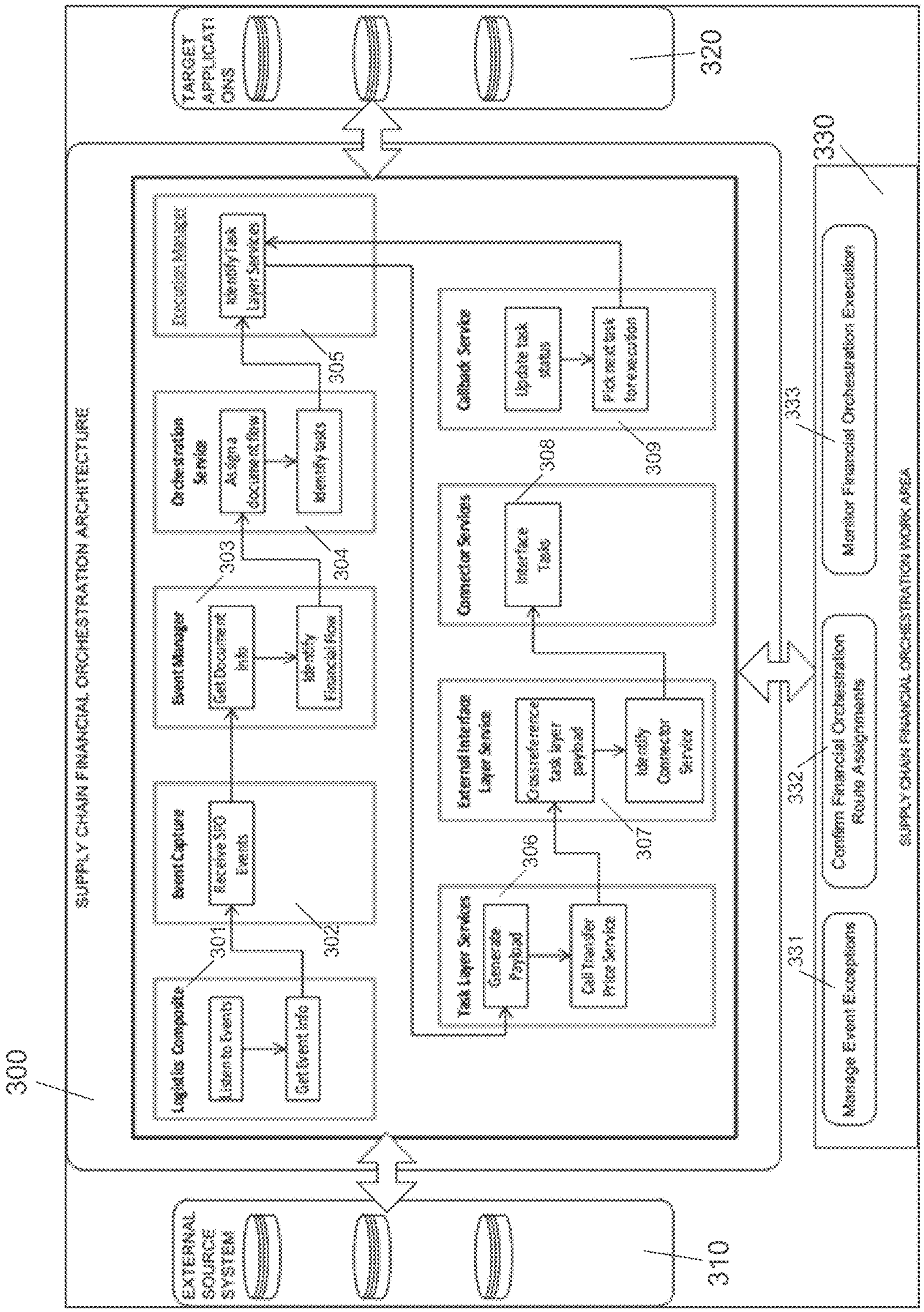
Figures 4, 5:
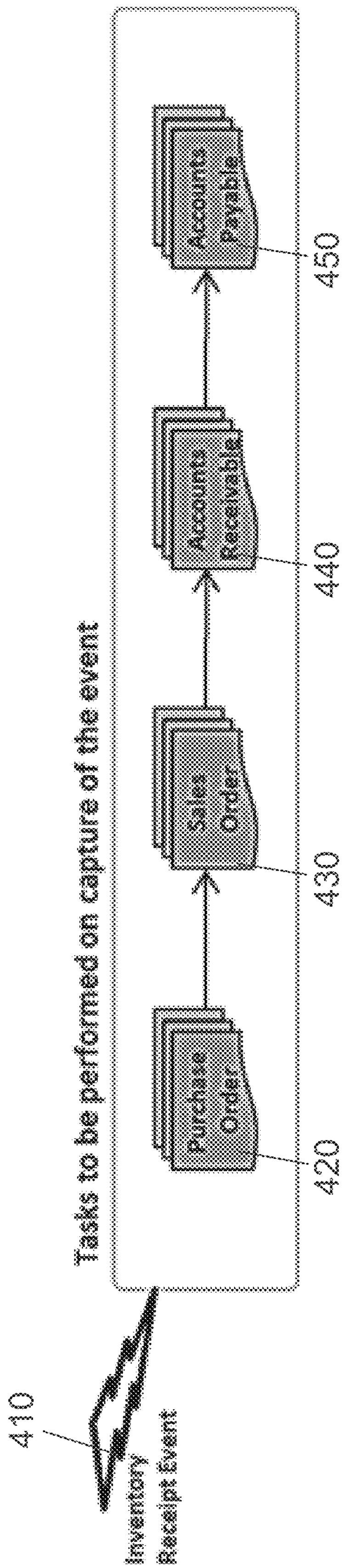
Figure 5:
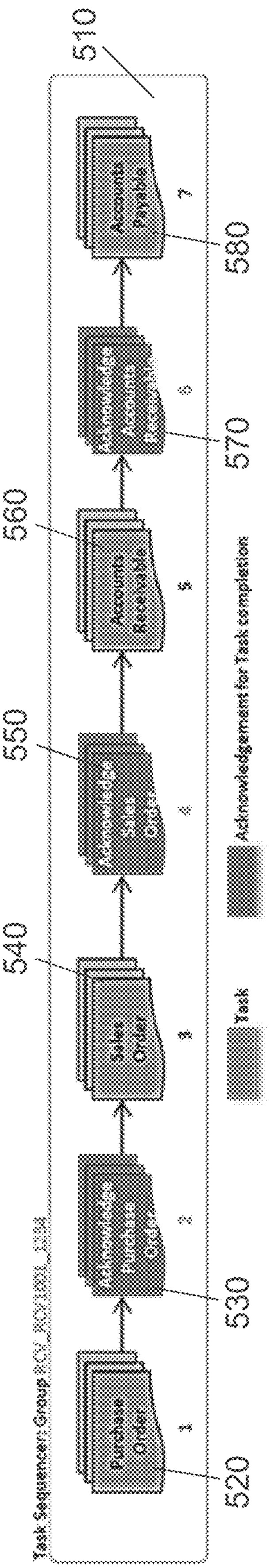
Figures 5, 6:
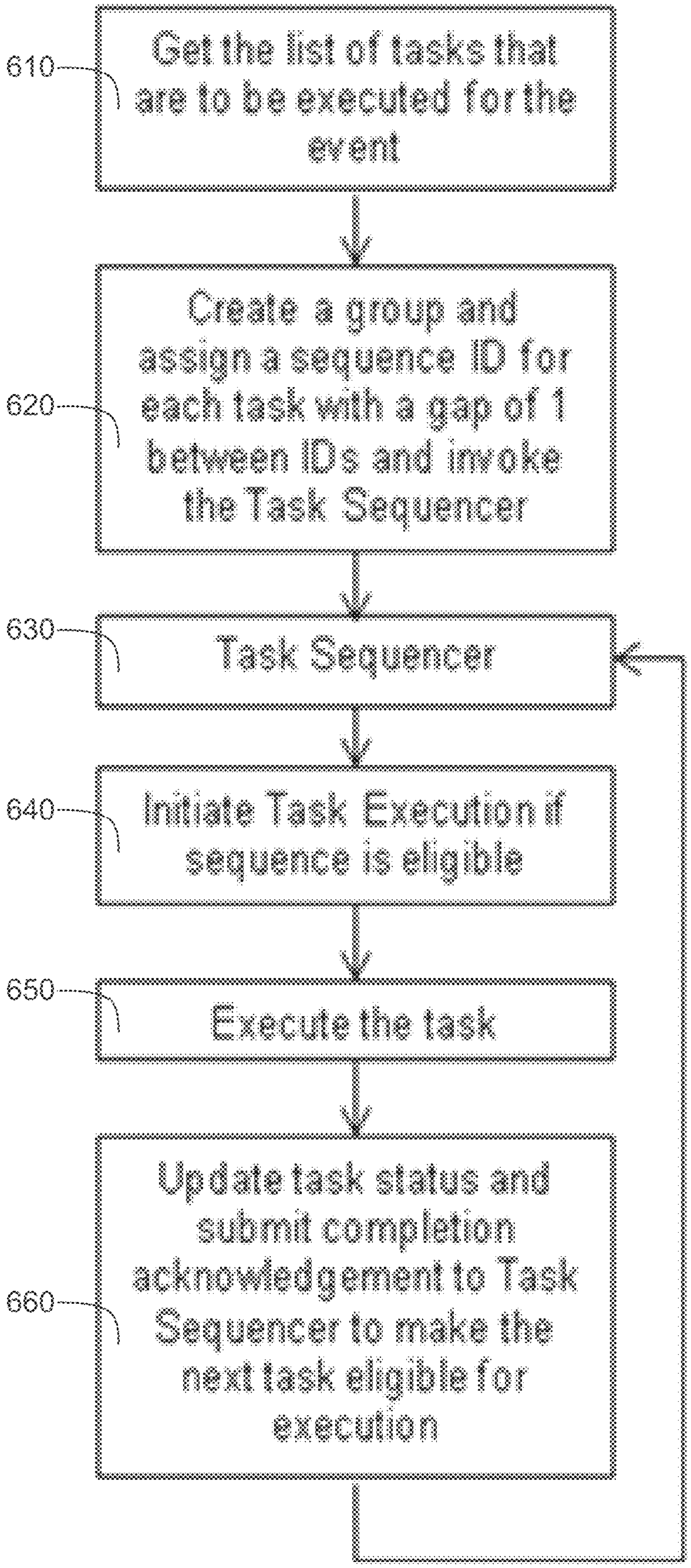
Figures 5, 6, 7:
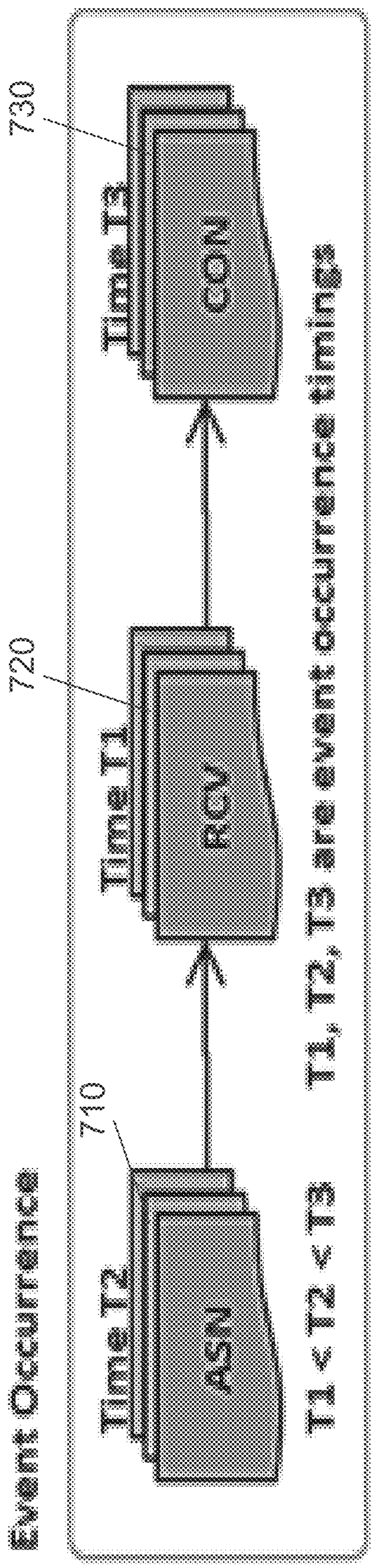
Figures 5, 6, 7, 8:
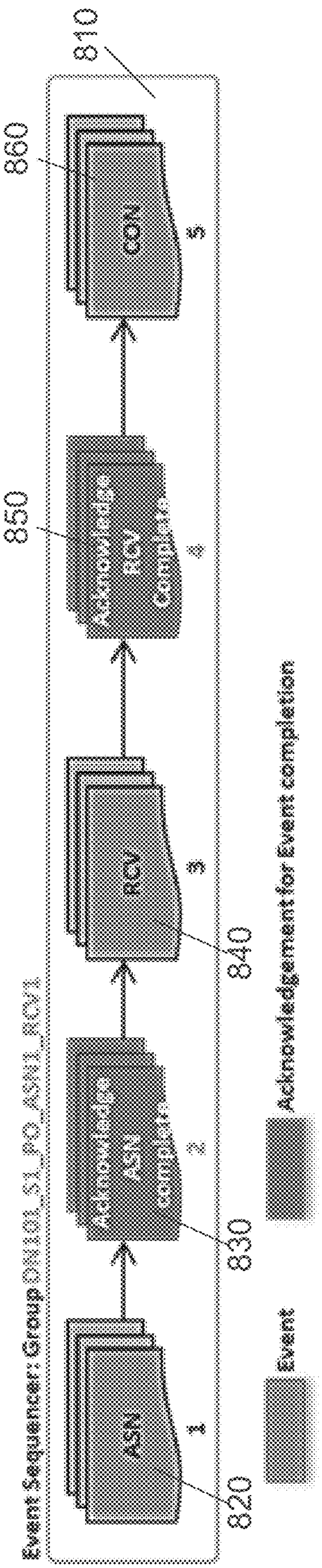
Figures 5, 6, 7, 8, 9:
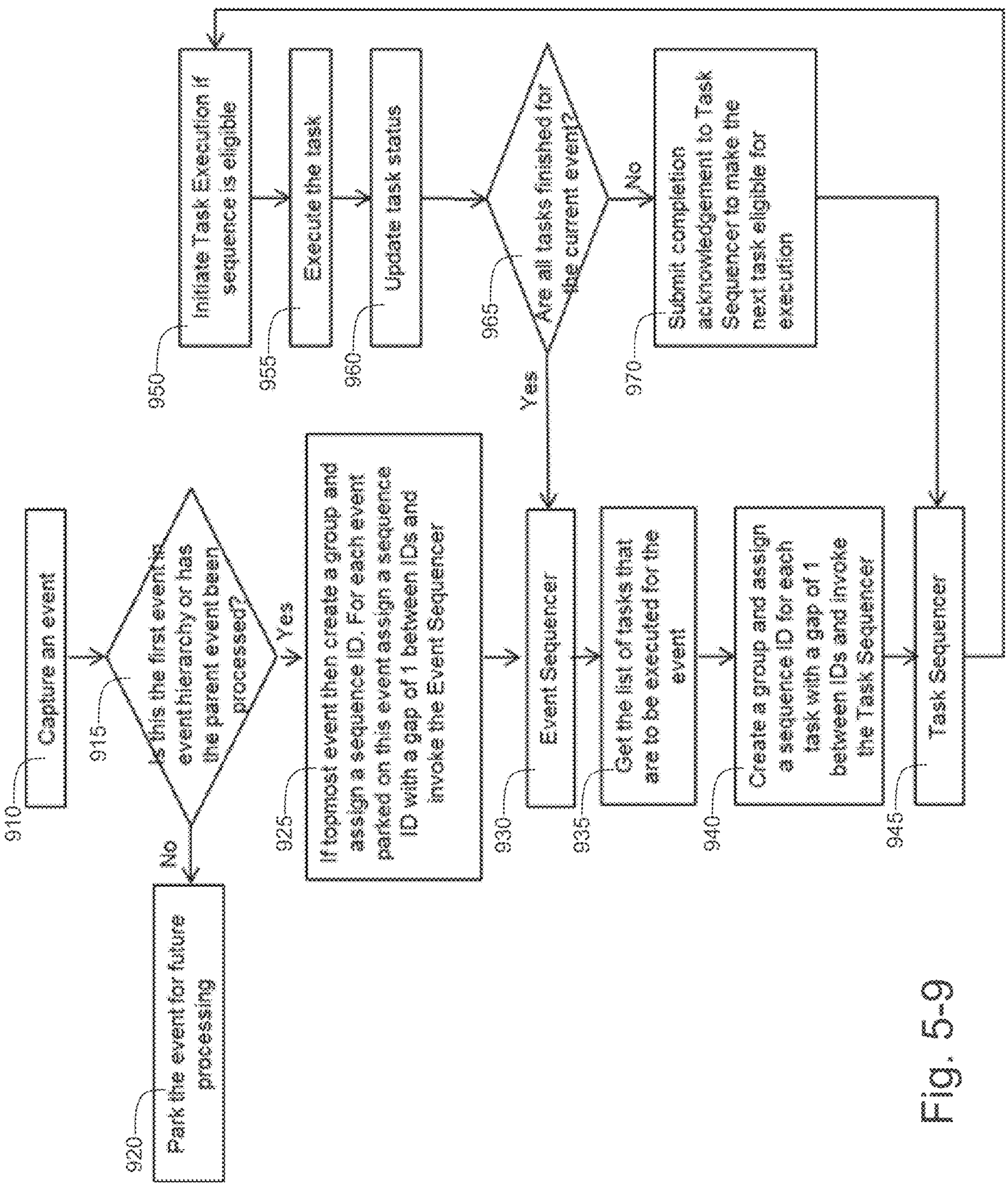
Figures 5, 6, 7, 8, 9, 10:
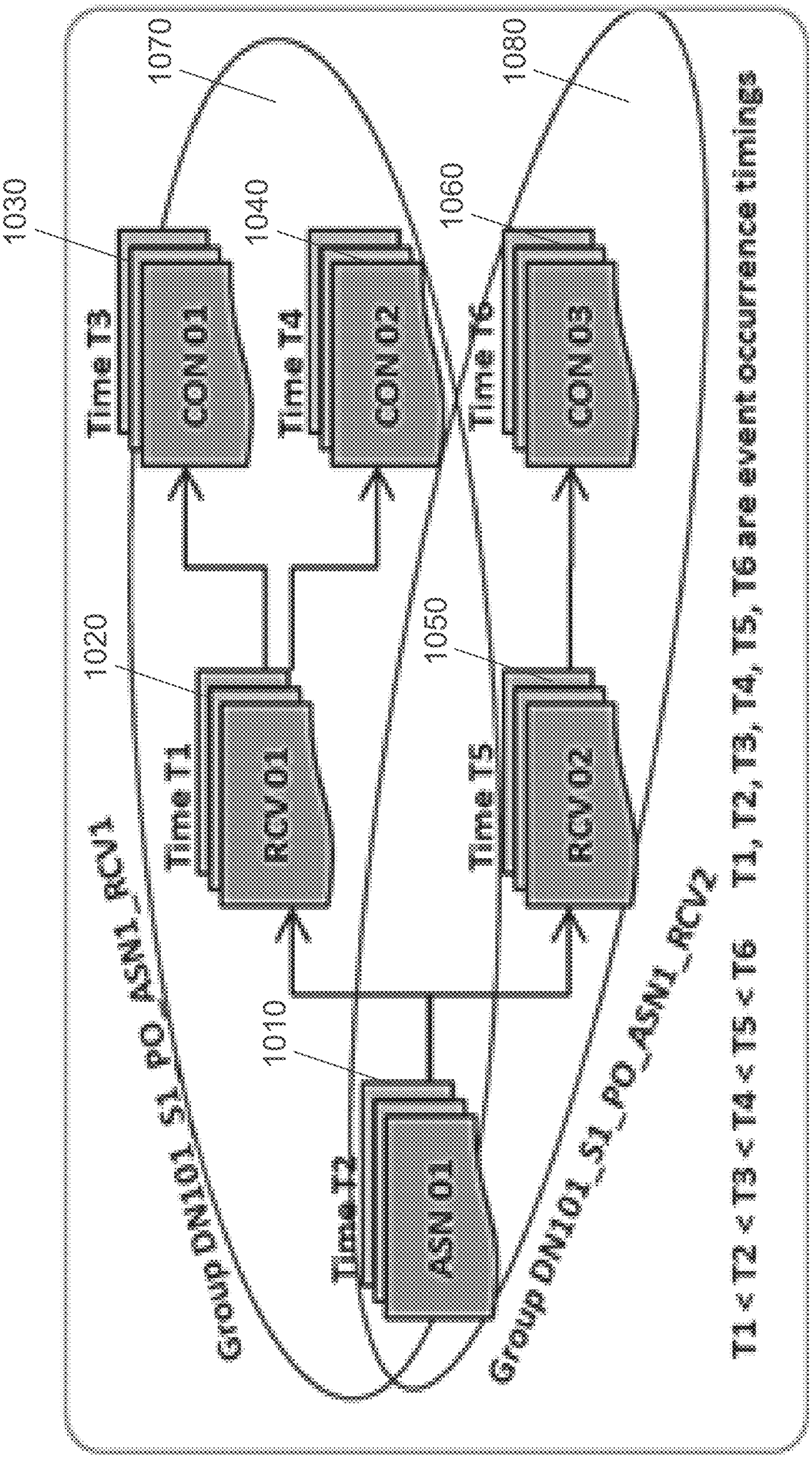
Figures 5, 6, 7, 8, 9, 10, 11:
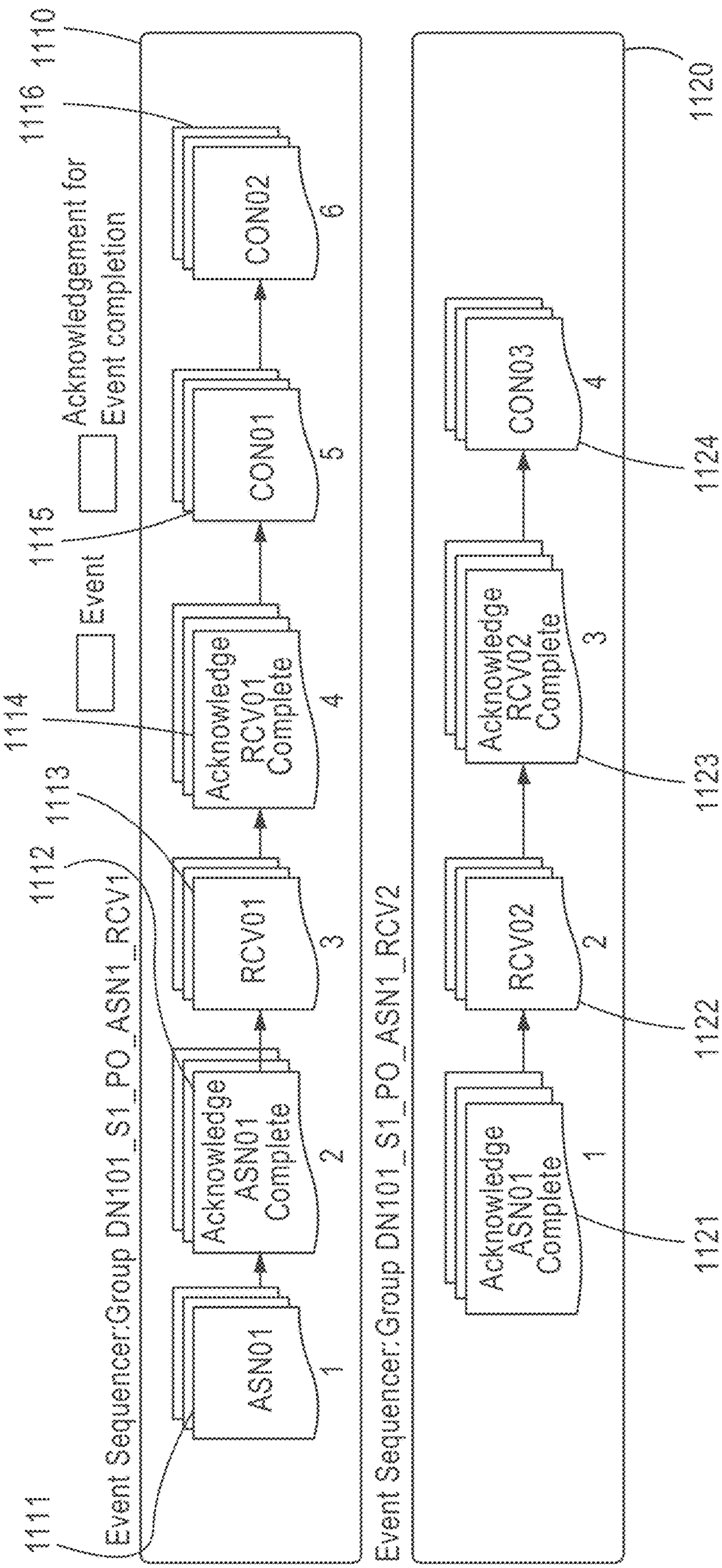
Figures 5, 6, 7, 8, 9, 10, 11, 12:
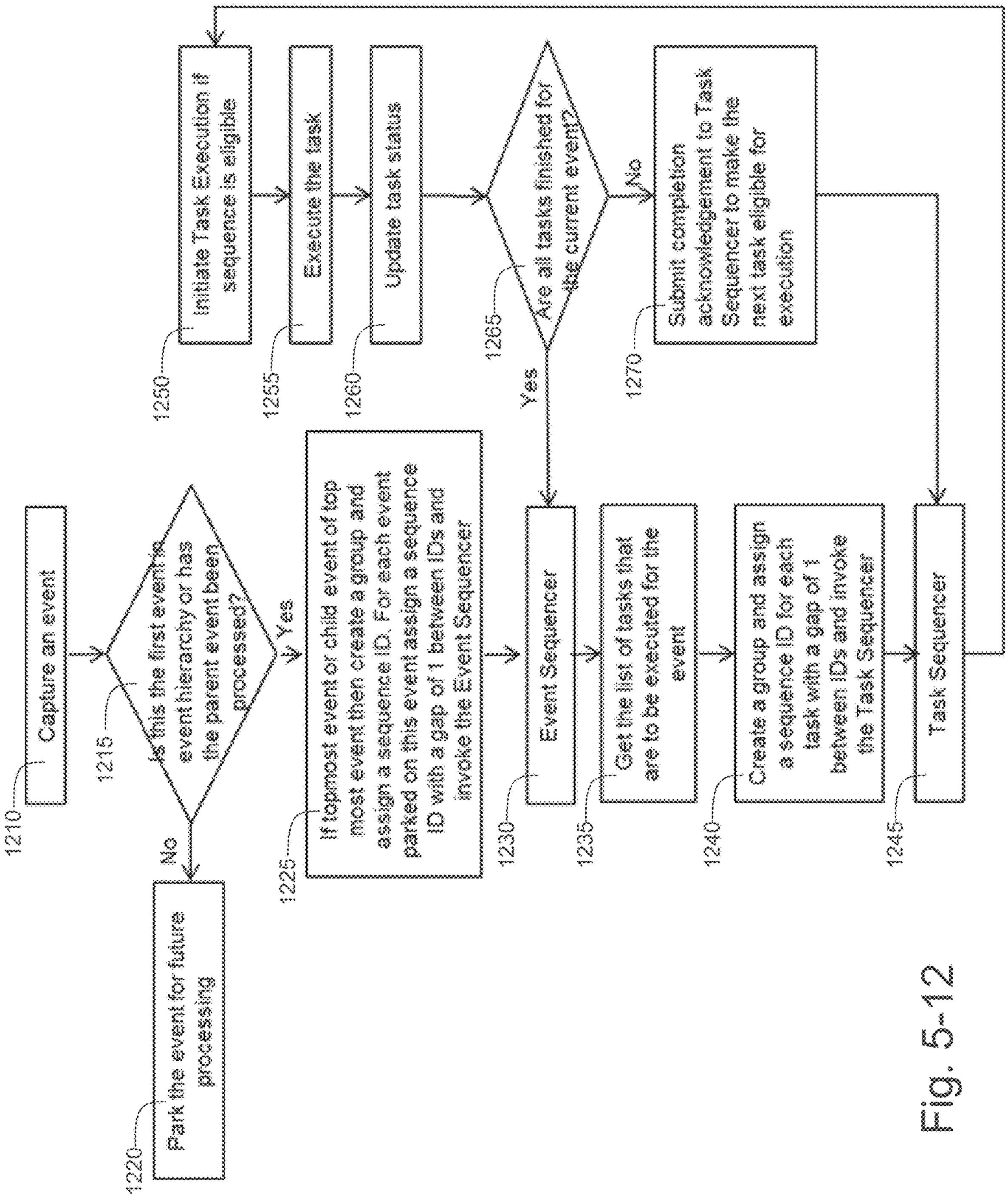
Figures 1, 6:
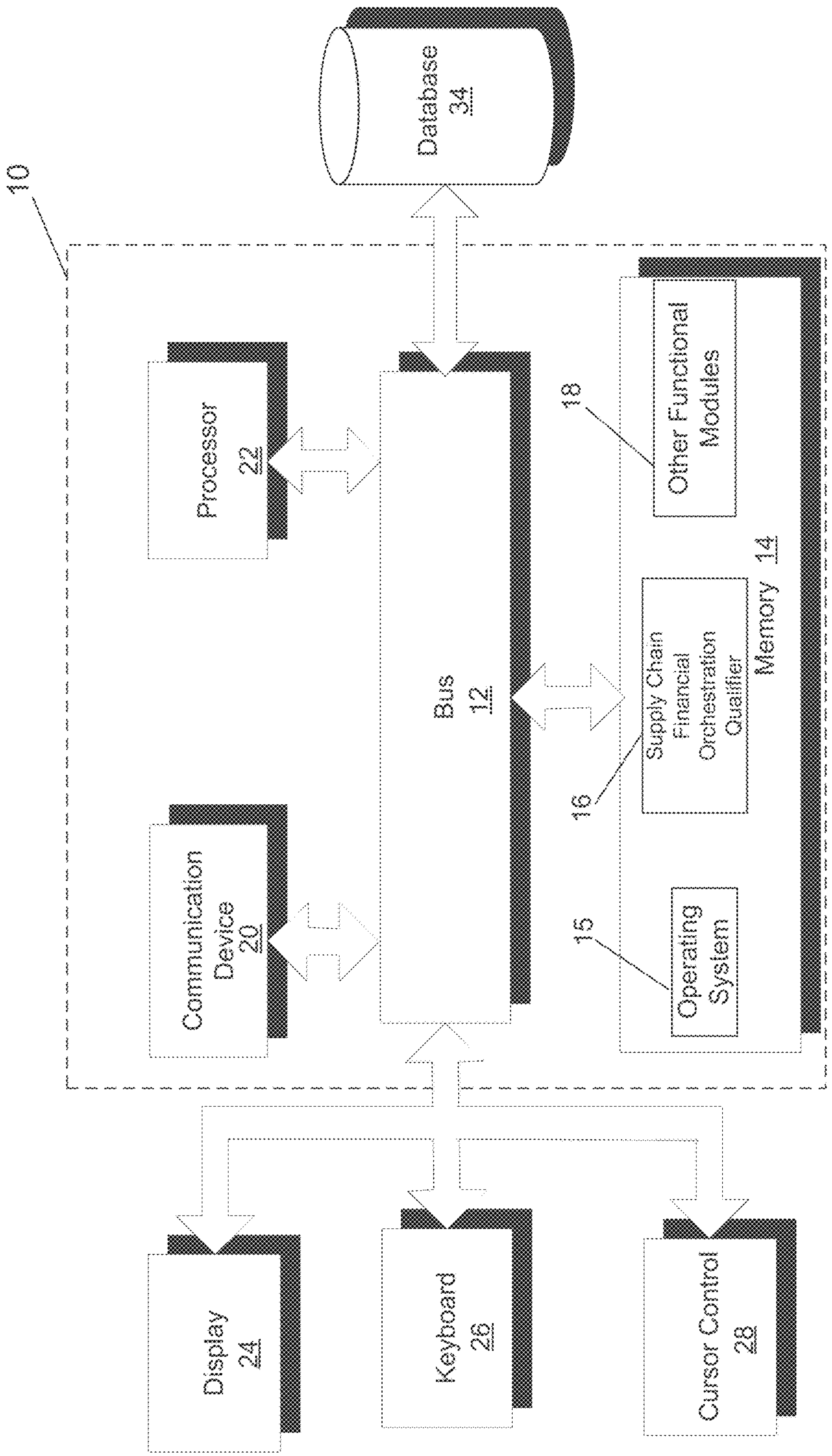
Figures 2, 6:
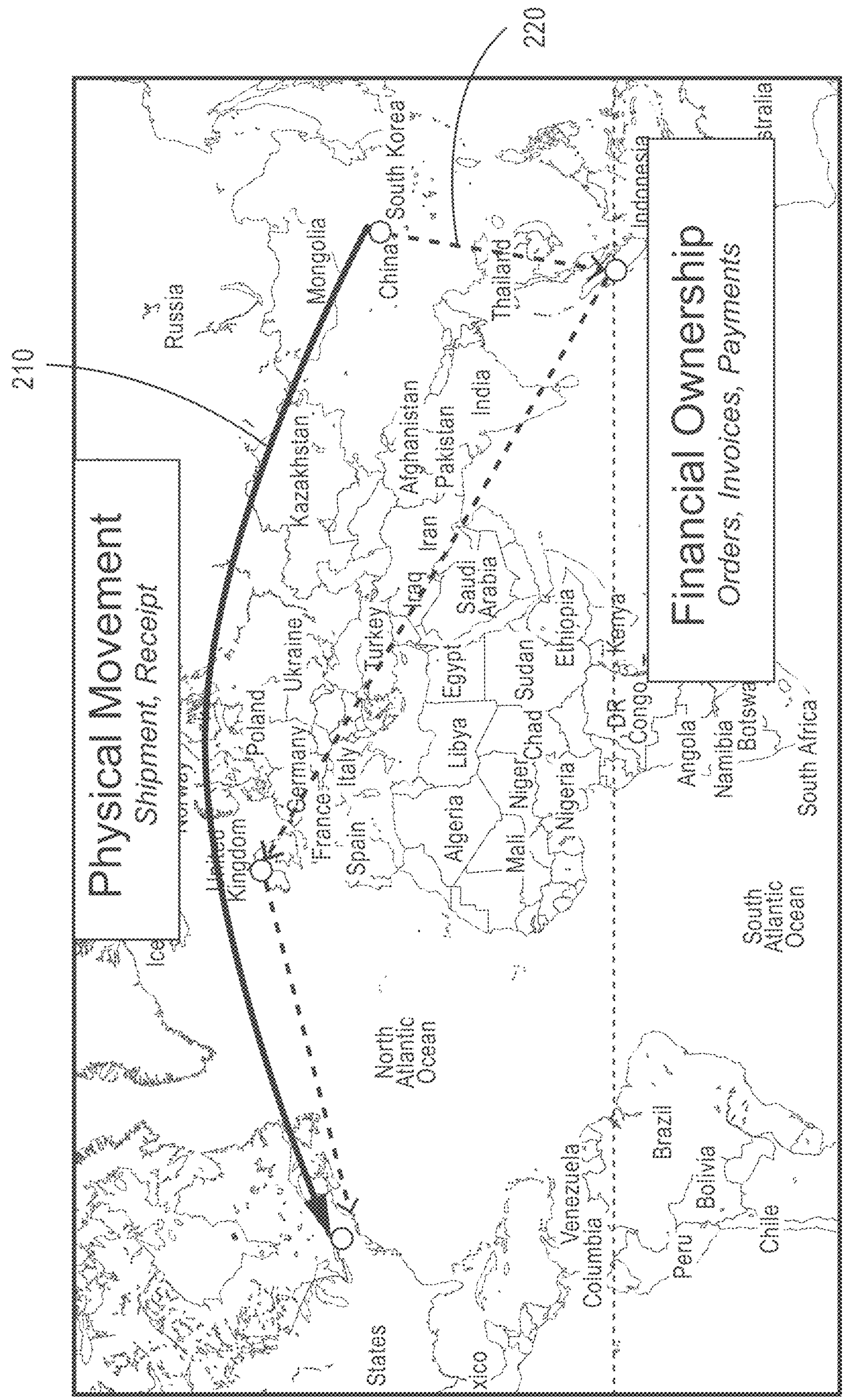
Figures 3, 6:
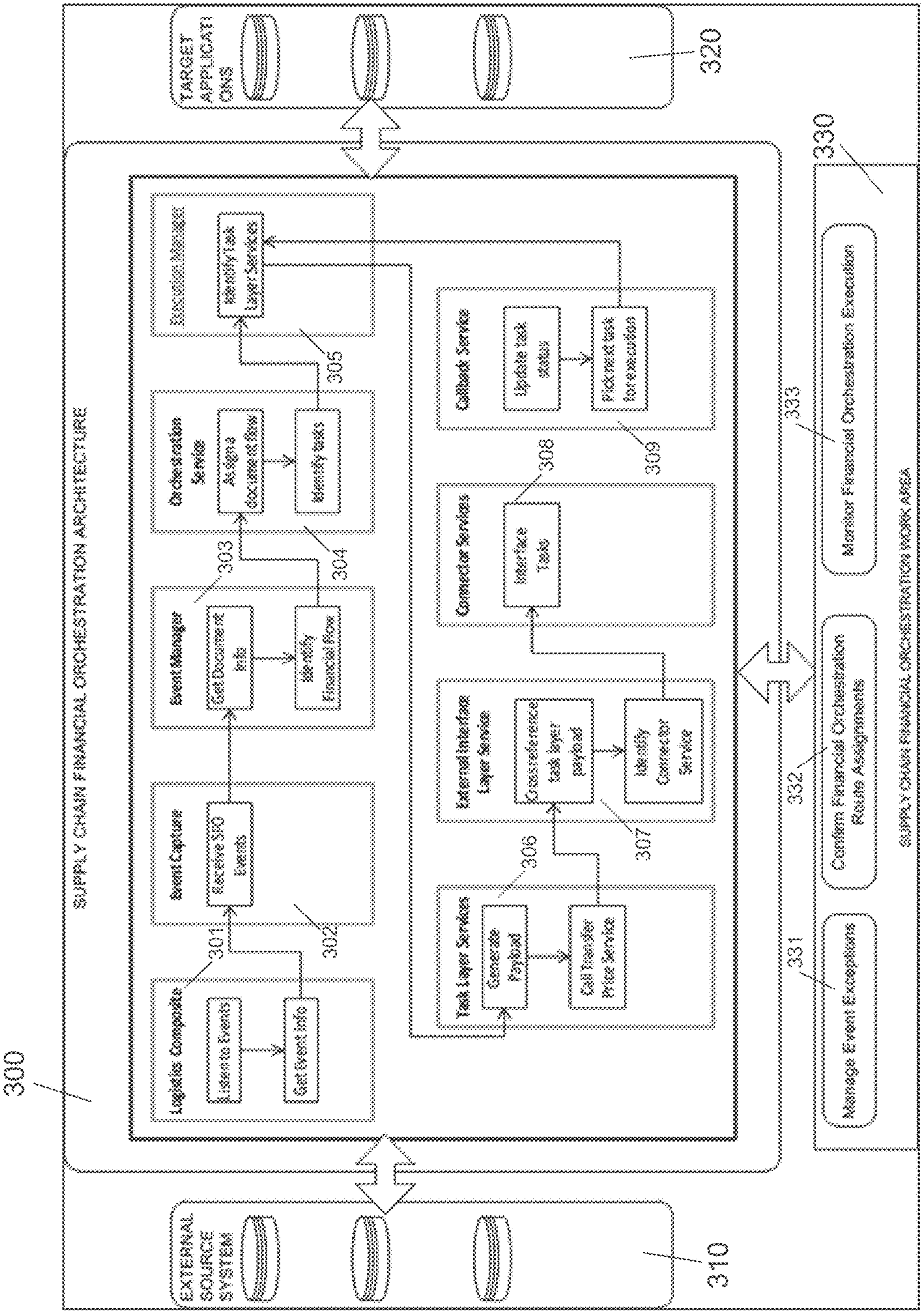
Figures 4, 6:
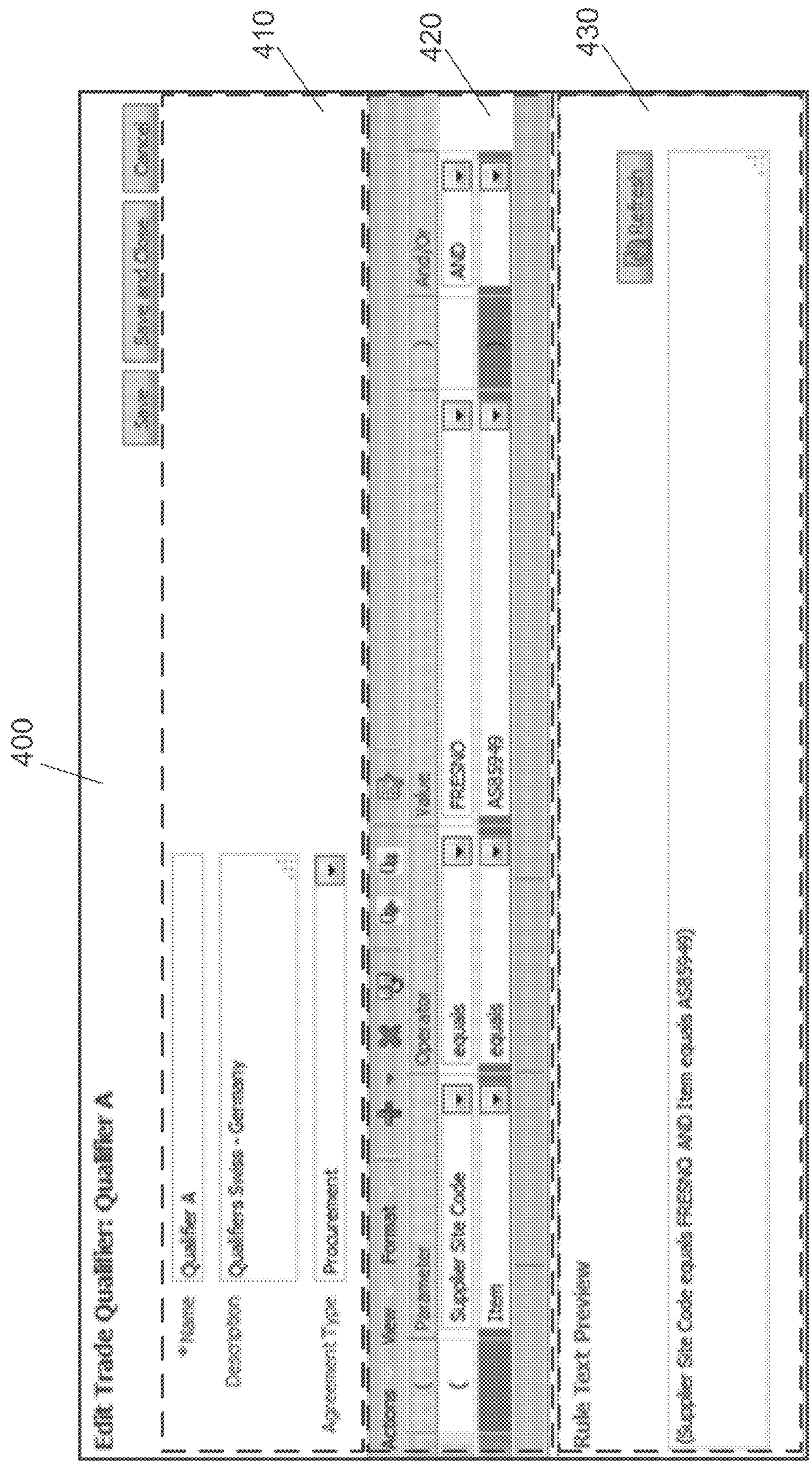
Figures 5, 6:
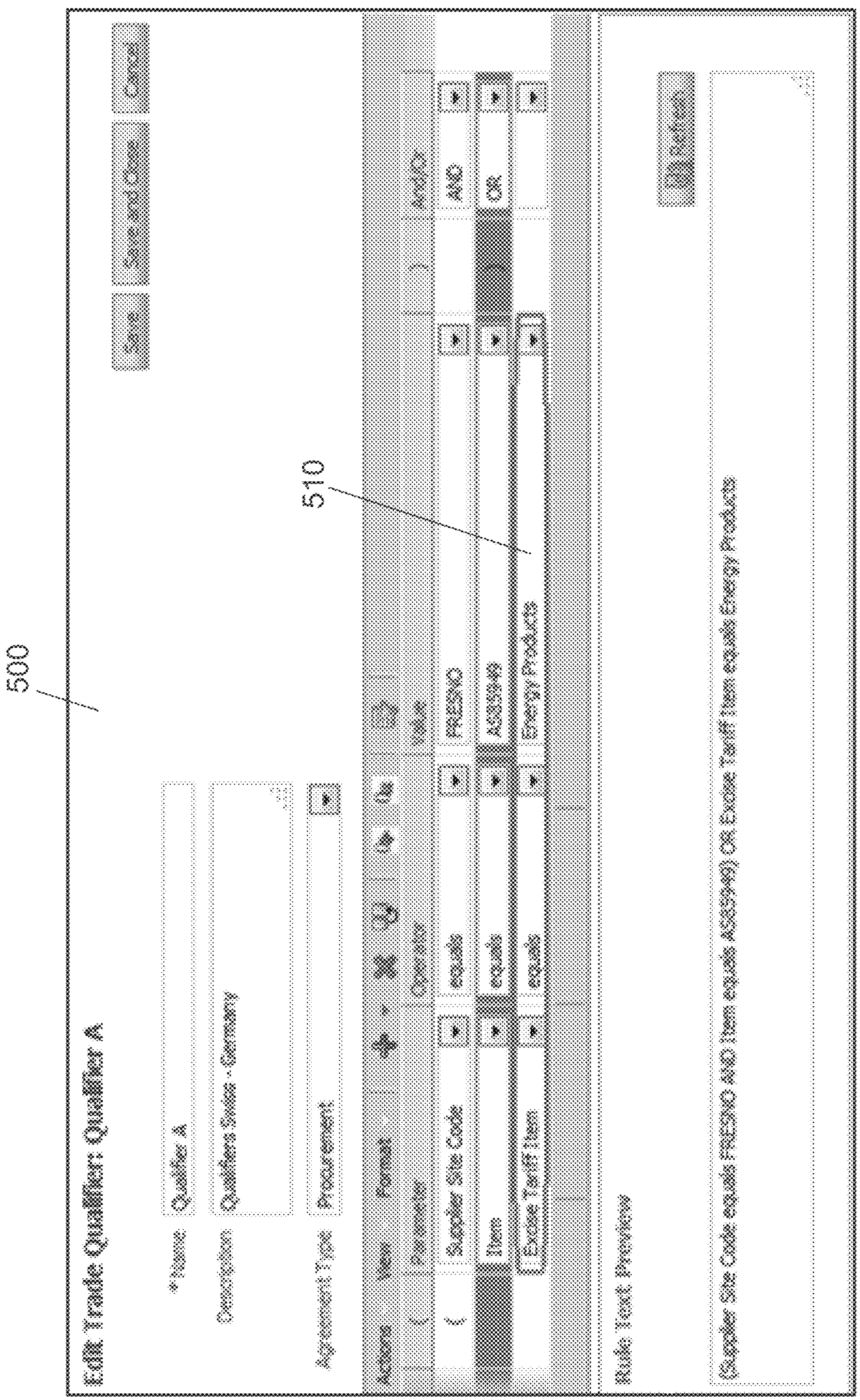
Figure 6:
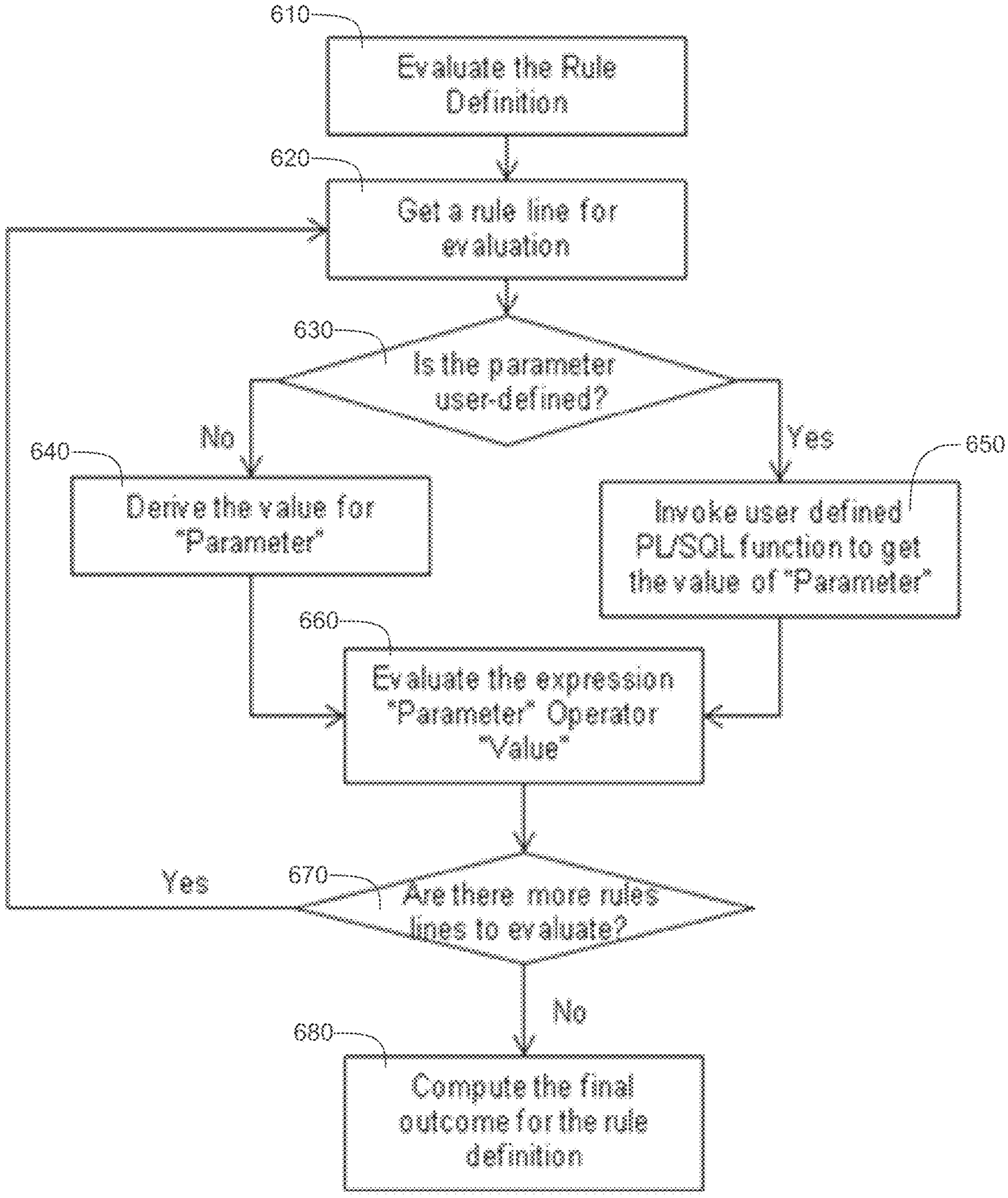
Figures 1, 7:
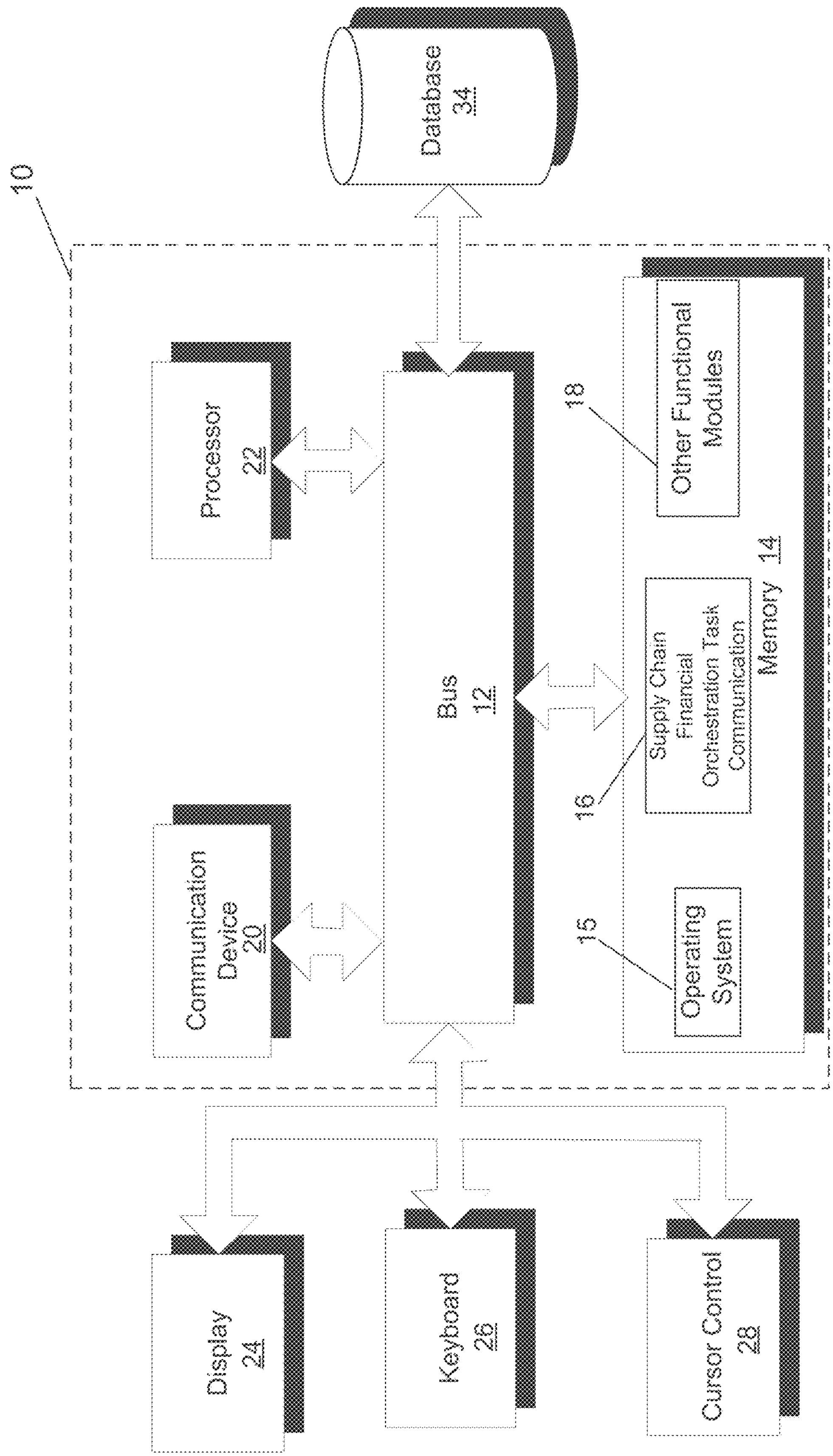
Figures 2, 7:
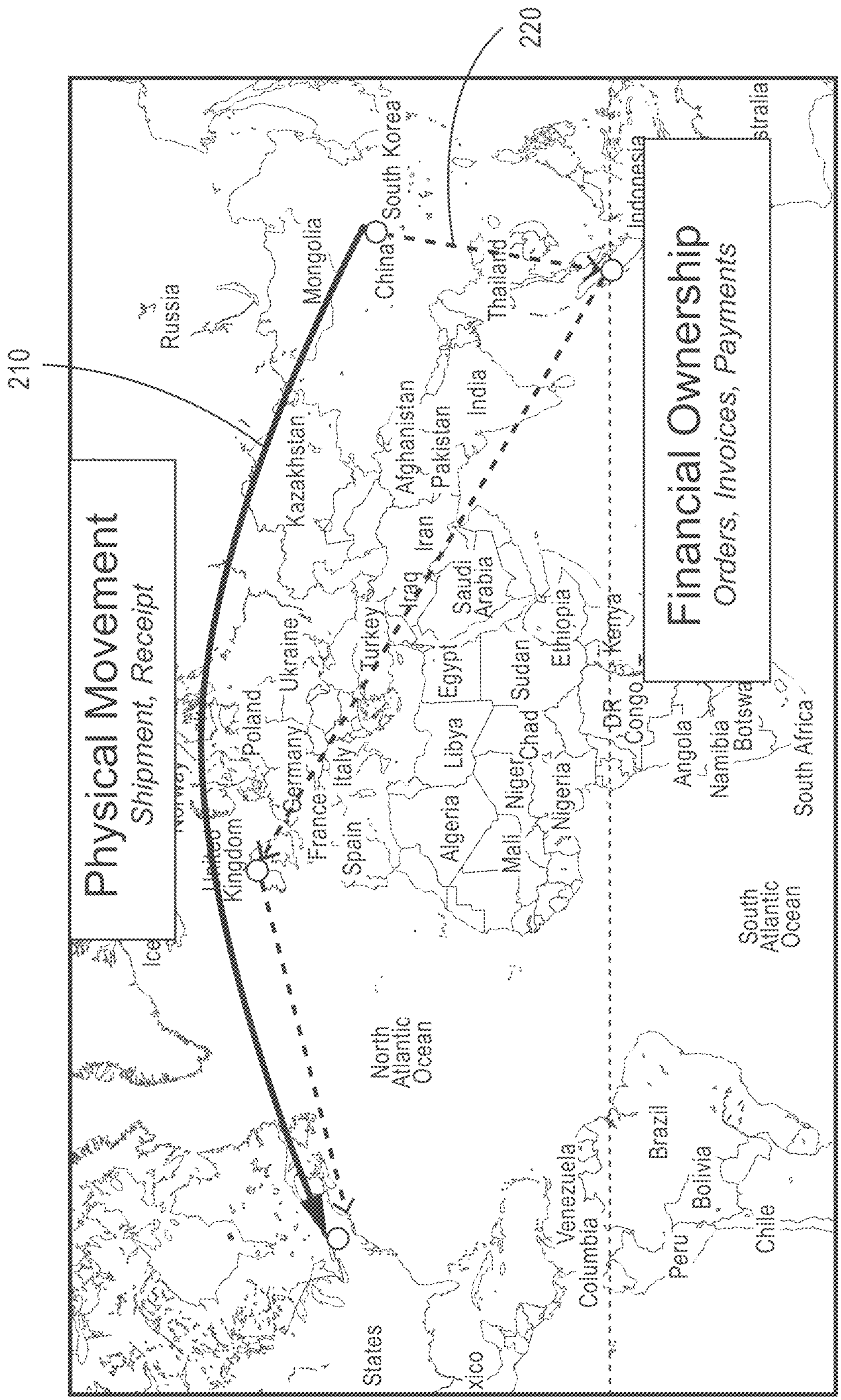
Figures 3, 7:
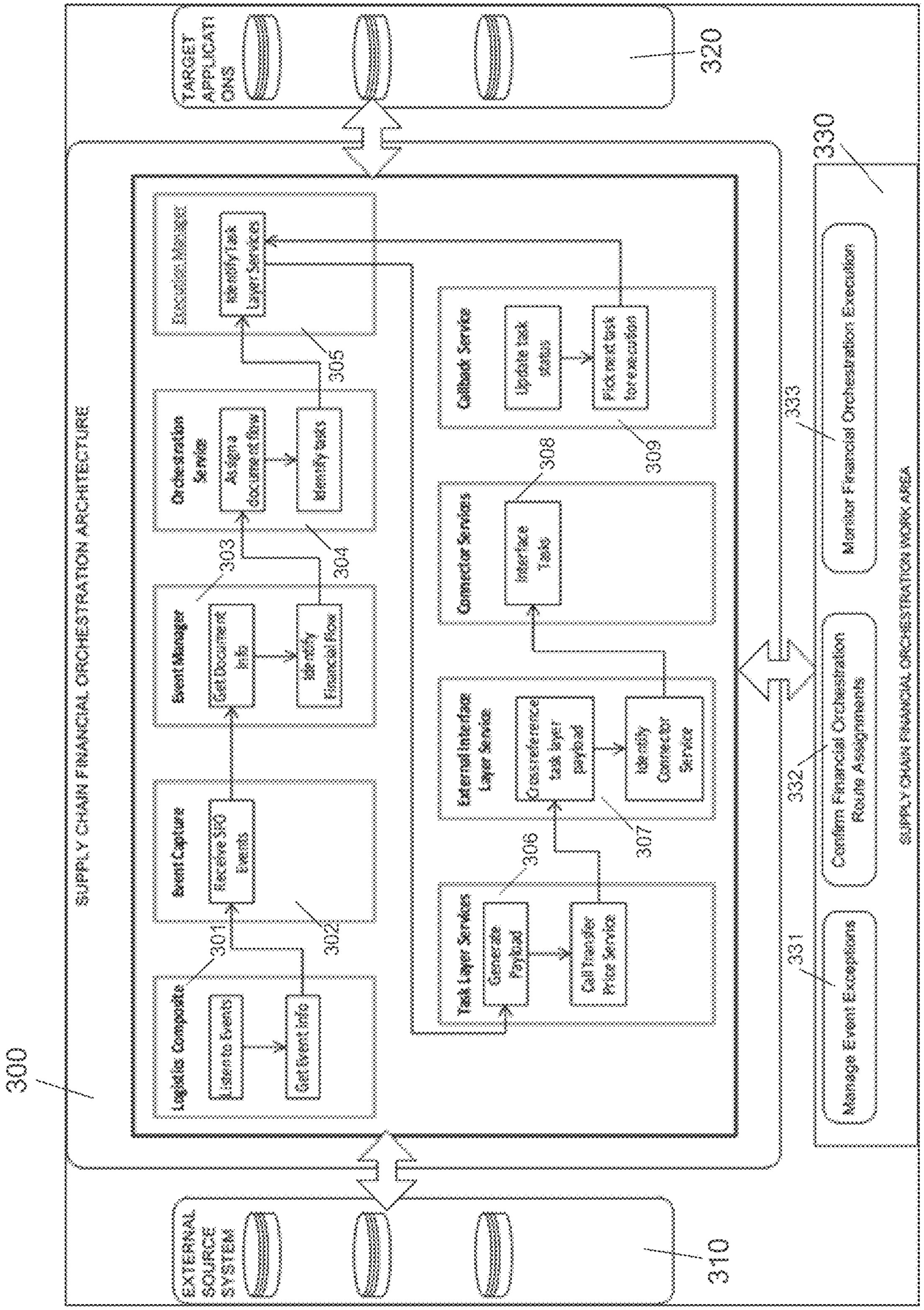
Figures 4, 7:
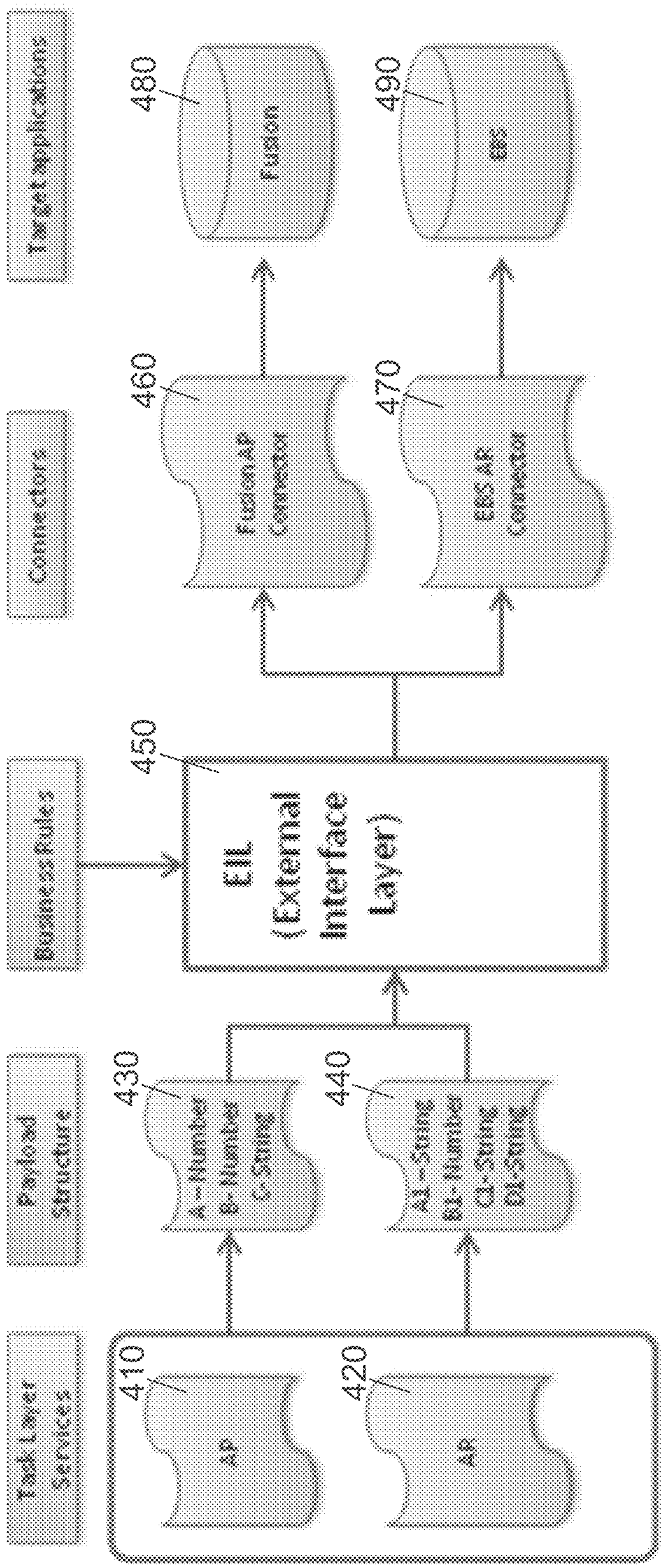
Figures 5, 7:
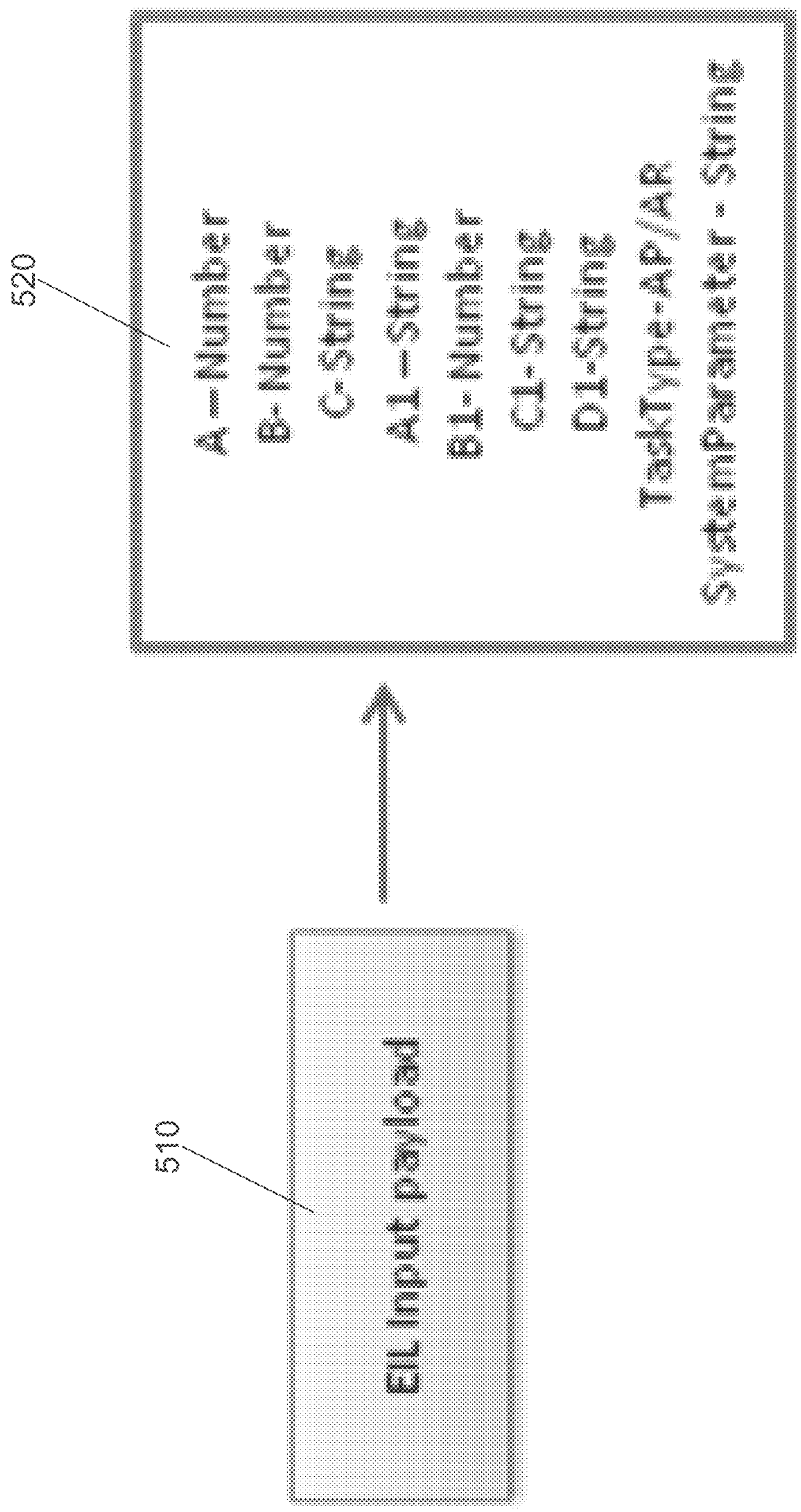
Figures 6, 7:
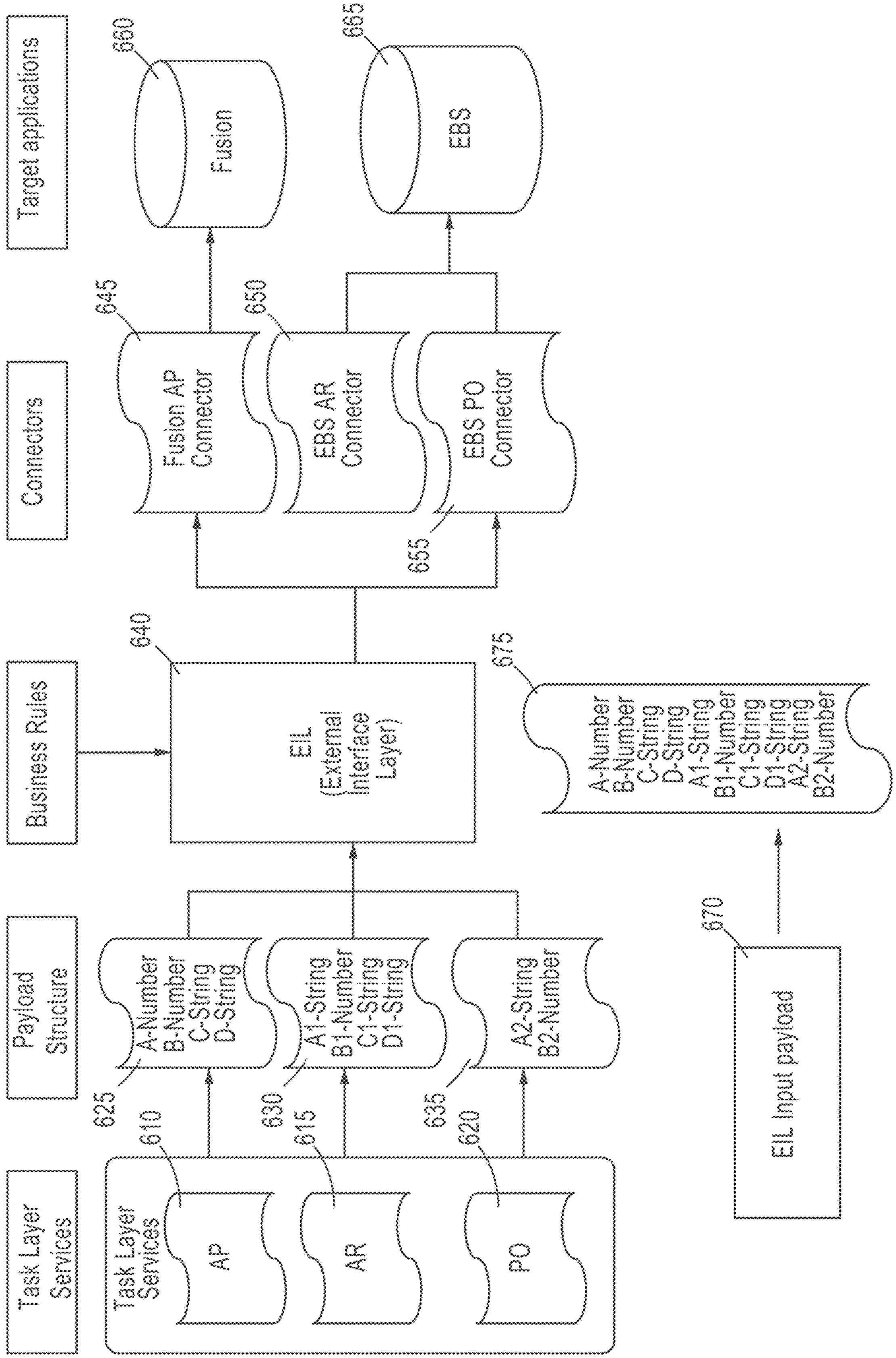
Figure 7:
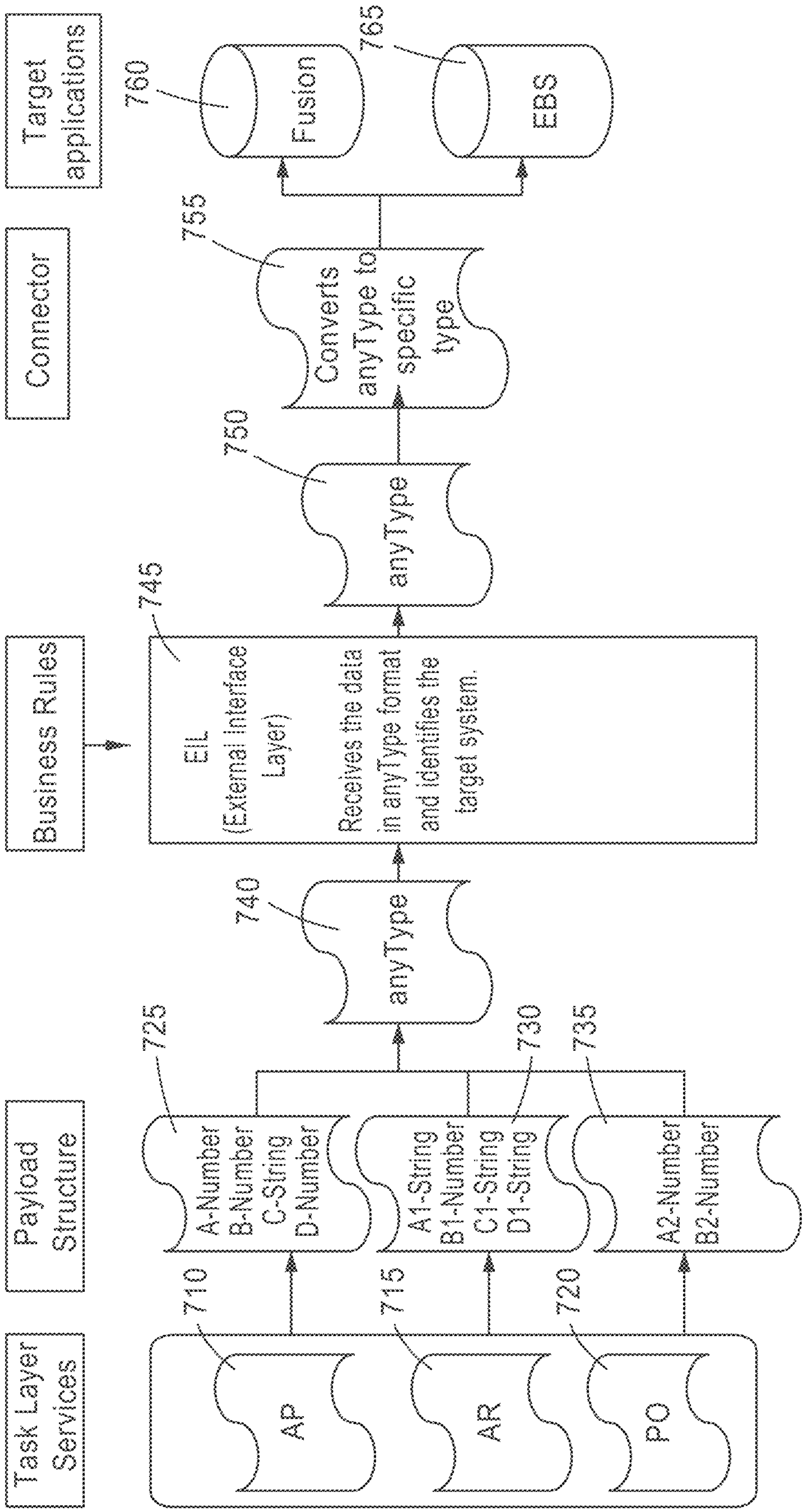
Figures 7, 8:
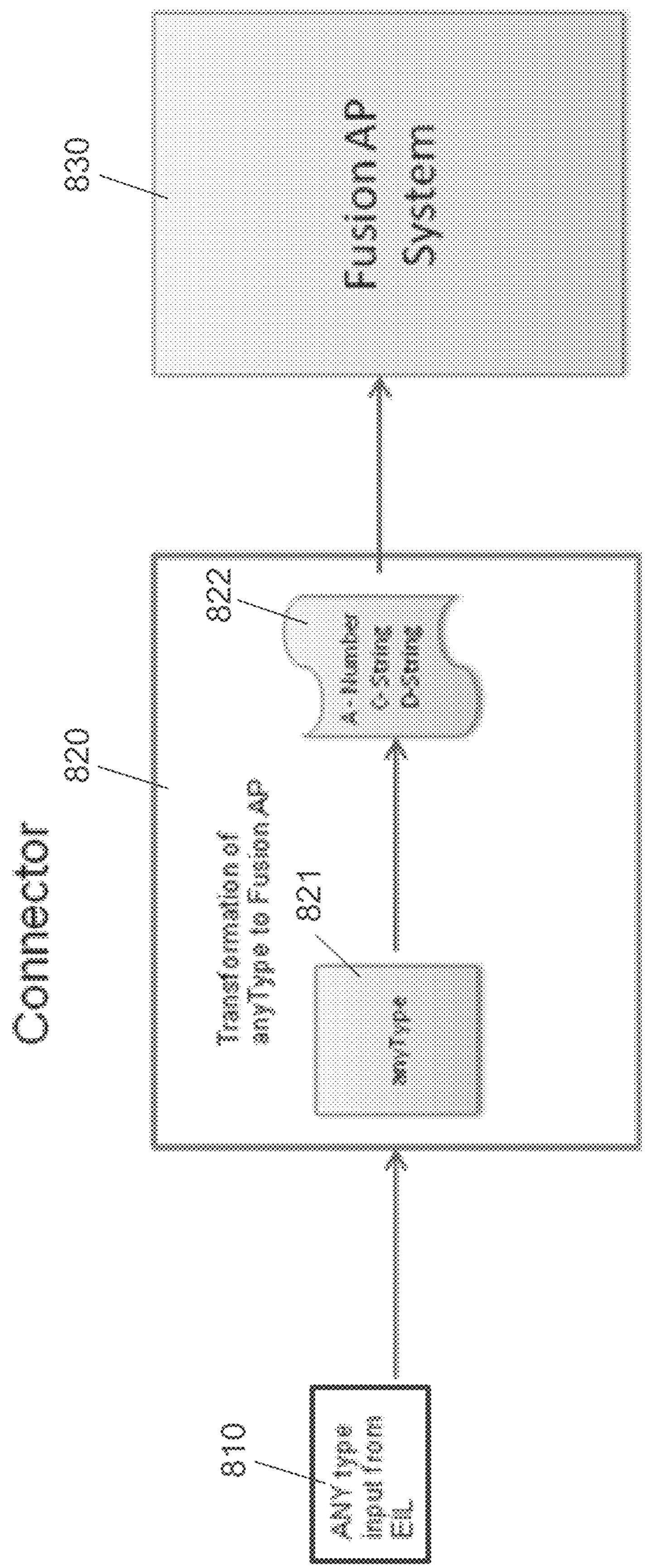
Figures 7, 8, 9:
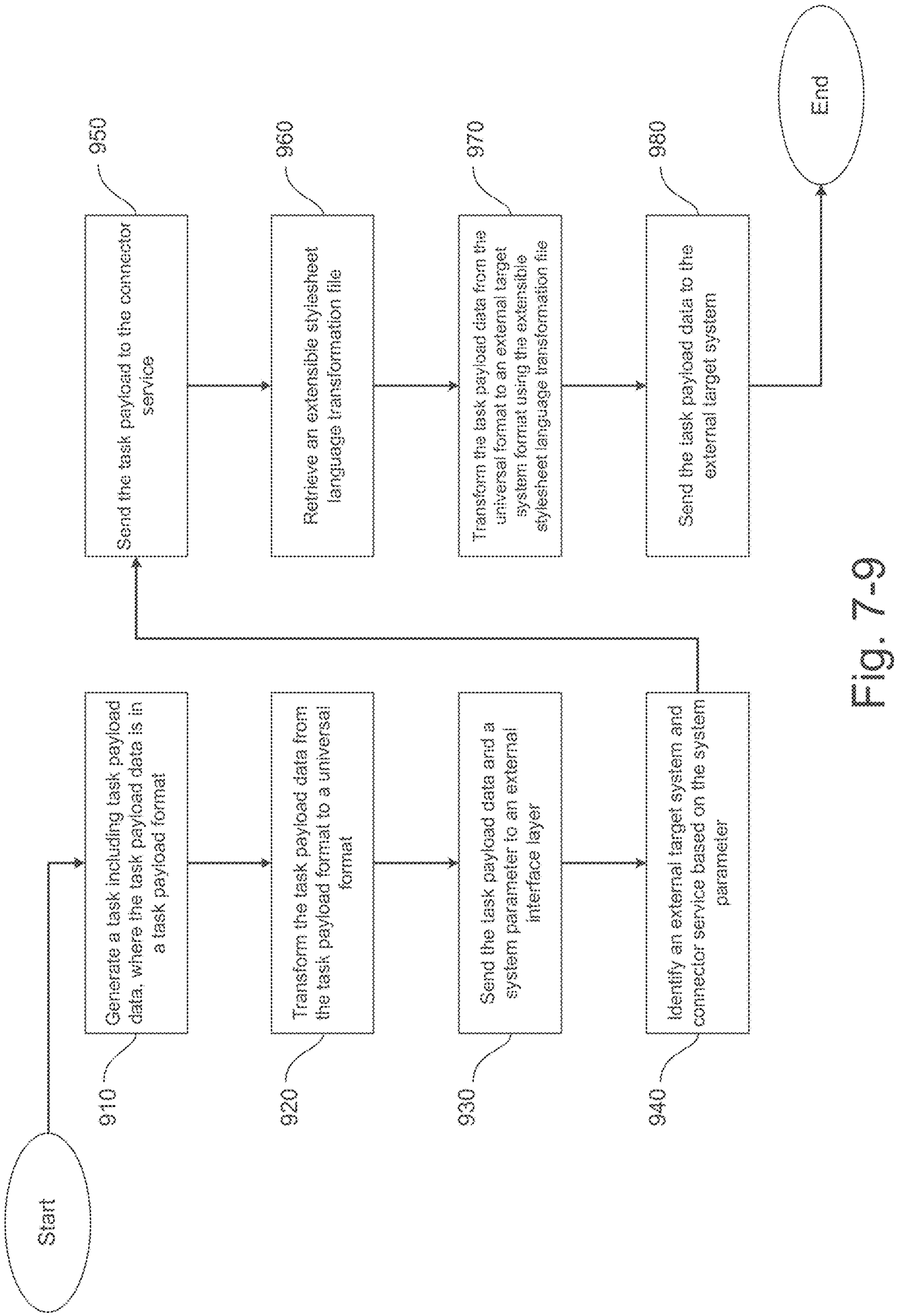

FIG. 1-9A illustrates trade accounting events generated for a forward flow of an internal transfer flow, according to an embodiment of the invention. An internal transfer flow is a supply chain financial orchestration flow where the goods are physically delivered from a shipping location of an enterprise to another physical location of an enterprise. However, the financial obligations go through one or more intermediate entities. According to the embodiment, the internal transfer flow includes a shipping legal entity, an intermediate legal entity, and a receiving legal entity. A shipping legal entity represents a legal entity and profit center business unit that ships the goods. An intermediate legal entity represents a legal entity and profit center business unit that purchases the goods from the shipping legal entity, and that sells the goods to a downstream entity. A receiving legal entity represents a legal entity and profit center business unit that purchases the goods from the intermediate entity, and also takes physical custody of the goods. Most typically, the trade between the shipping legal entity and the intermediate legal entity, and the trade between the intermediate legal entity and the receiving legal entity happens at a transfer price different from a purchase order price. As described below in greater detail, ownership of the goods moves from the shipping legal entity to the intermediate legal entity, from the intermediate legal entity to the receiving entity, and from the receiving legal entity to a customer. Further, the flow of costs through the supply chain entities is illustrated in FIG. 9A (and in other scenarios, FIGS. 1-9B, 1-9C, and 1-9D).

First, a physical execution event, transfer order shipment 901, is generated. At this point in the internal transfer flow, the ownership of an item associated with the internal transfer flow belongs to the shipping legal entity. Further, a cost accounting event, trade sales issue 902, is generated. Subsequently, the ownership of the item is transferred to the intermediate legal entity. Thus, a receipt accounting event, trade receipt accrual 903, is generated, and two cost accounting events, trade in-transit receipt 904 and trade in-transit issue 905, are generated. Subsequently, the ownership of the item is transferred to the receiving legal entity. Thus, a receipt accounting event, trade receipt accrual 906, and a cost accounting event, trade in-transit receipt 907, are generated. Further, two physical execution events, transfer order receipt 908 and transfer order deliver 909, are generated.

FIG. 1-9B illustrates trade accounting events generated for a return flow of an internal transfer flow, according to an embodiment of the invention. In the return flow, goods are returned to a shipping location. Costs booked on the forward flow illustrated in FIG. 1-9A are reversed. Similar to the embodiment illustrated in FIG. 1-9A, the internal transfer flow includes a shipping legal entity, an intermediate legal entity, and a receiving legal entity. First, a receipt accounting event, trade return accrual 910, and a cost accounting event, trade in-transit return 911, are generated. Further, two physical execution events, transfer order return to receiving 912 and transfer order return to vendor 913, are generated. At this point in the internal transfer flow, the ownership of an item associated with the return flow of the internal transfer flow belongs to the receiving legal entity. Subsequently, the ownership of the item is transferred back to the intermediate legal entity. Thus, a receipt accounting event, trade return accrual 914, is generated, and two cost accounting events, trade in-transit return 915 and trade in-transit return receipt 916, are generated. Subsequently the ownership of the item is transferred back to the shipping legal entity. Thus, a physical execution event, transfer order return receipt 917, and a cost accounting event, trade sales return 918, are generated.

FIG. 1-9C illustrates trade accounting events generated for a forward flow of an internal transfer flow within a single profit center business unit, according to an embodiment of the invention. This is a supply chain financial orchestration flow where a transfer of goods is within a same business unit. The transfer can happen at cost. Even in this flow, the trade accounting events remain the same. The goods can go out of a physical inventory, can get into an accounting in-transit, and can get into a physical inventory of a receiving legal entity. According to the embodiment, the internal transfer flow includes a shipping legal entity and a receiving legal entity. First, a physical execution event, transfer order shipment 919, is generated. At this point in the internal transfer flow, the ownership of an item associated with the internal transfer flow belongs to the shipping legal entity. Further, a cost accounting event, trade sales issue 920, is generated. Subsequently, the ownership of the item is transferred to the receiving legal entity. Thus, a receipt accounting event, trade receipt accrual 921, and a cost accounting event, trade in-transit receipt 922, are generated. Further, two physical execution events, transfer order receipt 923 and transfer order deliver 924, are generated.

FIG. 1-9D illustrates trade accounting events generated for a return flow of an internal transfer flow within a single profit center business unit, according to an embodiment of the invention. Similar to the embodiment illustrated in FIG. 1-9C, the internal transfer flow includes a shipping legal entity and a receiving legal entity. First, a receipt accounting event, trade return accrual 925, and a cost accounting event, trade in-transit return 926, are generated. Further, two physical execution events, transfer order return to receiving 927 and transfer order return to vendor 928, are generated. At this point in the internal transfer flow, the ownership of an item associated with the global procurement flow belongs to the receiving legal entity. Subsequently the ownership of the item is transferred back to the shipping legal entity. Thus, a physical execution event, transfer order return receipt 929, and a cost accounting event, trade sales return 930, are generated.

FIG. 1-9E illustrates forward and return variations of an internal transfer flow, according to an embodiment of the invention. According to the embodiment, the internal transfer flow includes two legal entities of a China trade ops business unit, legal entities 931 and 932, and a legal entity of a United States ops business unit, legal entity 933. As illustrated in FIG. 1-9E, a forward flow of a customer shipment flow can proceed from legal entity 931 to legal entity 933. However, as also illustrated in FIG. 1-9E, a return flow of an internal transfer flow can proceed in one of two manners. First, a return flow can proceed from legal entity 933 to legal entity 931. Second, a return flow can proceed from legal entity 933 to legal entity 932.

In one embodiment, a supply chain financial orchestration system can also include a gross margin reporting data model that can report a gross margin for a supply chain financial orchestration flow. A gross margin is a difference between a revenue associated with an item and a cost associated with the item, before accounting for certain other costs. Generally, a gross margin can be calculated as a difference of a transfer price of an item and a COGS for the item, where a COGS is a cost of the item. According to the embodiment, the gross margin reporting data model can calculate and store a gross margin for each item of a supply chain financial orchestration flow as the item moves through the supply chain financial orchestration flow. Thus, for an internal trade, such as an inter-company trade or an intra-company trade, the gross margin reporting data model can calculate and store a gross margin for each item associated with the internal trade.

In one embodiment, the gross margin reporting data model can include the following elements: (1) revenue data and COGS data can be captured within a standard format that rationalizes disparate sources; (2) key dimensions can be supported (such as business unit, item, item category, inventory organization, cost organization, etc.); and (3) deeper visibility on COGS data (such as cost element, analysis groups, etc.) can be provided. Further, an interactive user interface that analyzes a gross margin and cost structure through the supply chain can be provided. The user interface can provide: (1) multi-dimensional analysis; (2) graphs; and (3) geographic maps with ability to analyze a company's hierarchy and understand associated metrics.

FIG. 1-10 illustrates an example gross margin reporting data model 1000, according to an embodiment of the invention. Gross margin reporting data model 1000 includes a revenue object 1010. Revenue object 1010 contains revenue data associated with a supply chain financial orchestration flow. The revenue data can be obtained from various sources, such as an accounts receivable interface, and a cost distributions interface. More specifically, the revenue data can be obtained from one or more trade accounting events that are generated and processed by a cost accounting system, where the one or more trade accounting events are based on one or more trade events generated by a supply chain financial orchestration system. The revenue data contained within revenue object 1010 can include: a supply chain financial orchestration flow instance identifier that identifies an instance of a supply chain financial orchestration flow; an item identifier that identifies an item of a supply chain financial orchestration flow; a profit center business unit identifier that identifies a profit center business unit of a supply chain financial orchestration flow; a legal entity identifier that identifies a legal entity of a supply chain financial orchestration flow; and a supply chain financial orchestration agreement identifier that identifies a supply chain financial orchestration agreement associated with a supply chain financial orchestration flow.

Gross margin reporting data model 1000 further includes a COGS object 1020. COGS object 1020 contains COGS data associated with a supply chain financial orchestration flow. The COGS data can be obtained from various sources, such as a cost distributions interface. More specifically, the COGS data can be obtained from one or more trade accounting events that are generated and processed by a cost accounting system, where the one or more trade accounting events are based on one or more trade events generated by a supply chain financial orchestration system. The COGS data contained within COGS object 1020 can include: a supply chain financial orchestration flow instance identifier that identifies an instance of a supply chain financial orchestration flow; an item identifier that identifies an item of a supply chain financial orchestration flow; a profit center business unit identifier that identifies a profit center business unit of a supply chain financial orchestration flow; a legal entity identifier that identifies a legal entity of a supply chain financial orchestration flow; and a supply chain financial orchestration agreement identifier that identifies a supply chain financial orchestration agreement associated with a supply chain financial orchestration flow.

FIG. 1-11 illustrates a flow diagram for a process that collects COGS and revenue data for a COGS object 1110 and a revenue object 1120 of a gross margin reporting data model, according to an embodiment of the invention. In accordance with the embodiment, the process does the following: (1) identifies multiple sources of revenue and COGS; (2) transforms the multiple sources of revenue and COGS into a unified format of revenue and COGS; (3) defines the unified format of revenue and COGS as a single source of truth used to calculate gross margins; (4) makes the single source of truth available as a source for various presentation options, such as a business intelligence publisher ("BIP") report, analysis user interface, or other business intelligence too; and (5) reduces the complexity of calculating gross margins, which results in consistent results across different presentation options.

According to the embodiment, COGS object 1110 receives COGS data associated with a supply chain financial orchestration flow from intercompany COGS data 1121, deferred COGS ("DCOGS") data 1122 and COGS data 1123. Further, intercompany COGS data 1121, DCOGS data 1122, and COGS data 1123 can be generated from distributions process 1130. Distributions process 1130 can generate COGS data based on input from cost processor 1140. Similarly, according to the embodiment, revenue object 1120 receives revenue data associated with a supply chain financial orchestration flow from customer invoices 1151 and intercompany invoices 1152. Further, customer invoices 1151 and intercompany invoices 1152 can be generated from match revenue to COGS process 1160. The COGS data stored within COGS object 1110, and the revenue data stored within revenue object 1120, can be displayed to a user using at least one of, BIP report 1170, analysis user interfaces 1180, or business intelligence applications ("OBIA") views 1190.

FIG. 1-12 illustrates an example user interface 1200 of a gross margin reporting data model, according to an embodiment of the invention. According to the embodiment, user interface 1200 includes financial data window 1210. Financial data window 1210 displays financial data for a profit center business unit. According to the illustrated embodiment, financial data window 1210 displays a revenue amount and a COGS amount for the profit center business unit. The revenue amount displayed within financial data window 1210 can be based on revenue data that is retrieved from a revenue object of the gross margin reporting data model associated with the profit center business unit. Further, the COGS amount displayed within financial data window 1210 can be based on COGS data that is retrieved from a COGS object of the gross margin reporting data model associated with the profit center business unit. A gross margin amount and gross margin percentage are each calculated based on the retrieved revenue data and retrieved COGS data, and are also displayed within financial data window 1210.

FIG. 1-13 illustrates another example user interface 1300 of a gross margin reporting data model, according to an embodiment of the invention. According to the embodiment, user interface 1300 includes financial data window 1310. Financial data window 1310 displays financial data for an enterprise. The financial data that is displayed within financial data window 1310 can be sorted by organization, legal entity, or profit center business unit. Further, for each organization, legal entity, or profit center business unit of the enterprise, financial data window can display a revenue amount, a COGS amount, and a gross margin amount of the organization, legal entity, or profit center business unit. The revenue amount of the organization, legal entity, or profit center business unit displayed within financial data window 1310 can be based on revenue data that is retrieved from a revenue object of the gross margin reporting data model associated with each organization, legal entity, or profit center business unit of the enterprise. Further, the COGS amount of the organization, legal entity, or profit center business unit displayed within financial data window 1310 can be based on COGS data that is retrieved from a COGS object of the gross margin reporting data model associated with each organization, legal entity, or profit center business unit of the enterprise. The gross margin amount of the organization, legal entity, or profit center business unit displayed within financial data window 1310 can be calculated based on the retrieved revenue data and retrieved COGS data. The financial data that is displayed within financial data window 1310 can be further sorted by revenue, COGS, or gross margin.

According to the embodiment, a user can either "analyze," or "drill-down" into, the financial data displayed within financial window 1310, so that user interface 1300 displays more detailed financial data. More specifically, a user can "click" within financial data window 1310 (over a displayed gross margin for a profit center business unit, for example), and can cause analysis window 1320 to be displayed within user interface 1300. Analysis window 1320 allows a user to analyze financial data, such as revenue data or COGS data, according to a characteristic, such as a cost element or an analysis group. In the illustrated embodiment, when a user selects to analyze the COGS data according to a cost element, financial data window 1330 is displayed within user interface 1300, where financial data window 1330 displays COGS data for a profit center business unit that is broken-down by cost element. Financial data window 1330 further displays a total revenue amount for the profit center business unit, a total COGS amount for the profit center business unit, a gross margin amount for the profit center business unit, and a gross margin percentage for the profit center business unit. Further, in the illustrated embodiment, when a user selects to analyze the COGS data according to an analysis group, financial data window 1340 is displayed within user interface 1300, where financial data window 1340 displays COGS data for a profit center business unit that is broken down by analysis group. Financial data window 1340 further displays a total revenue amount for the profit center business unit, a total COGS amount for the profit center business unit, a gross margin amount for the profit center business unit, and a gross margin percentage for the profit center business unit.

Alternatively, a user can "click" within financial data window 1310 (over a displayed gross margin for a profit center business unit, for example), and can cause drill-down window 1350 to be displayed within user interface 1300. Drill-down window 1350 allows a user to drill-down into financial data, such as revenue data or COGS data, according to a characteristic, such as an item category, an inventory organization, and item, a customer, or an internal sale. In the illustrated embodiment, when a user selects to drill-down into the financial data according to an item category (or other characteristic), financial data window 1360 is displayed within user interface 1300, where financial data window 1360 displays a drill-down view of revenue data and COGS data for a profit center business unit based on item category (or other characteristic). Financial data window 1360 further displays a gross margin amount and a gross margin percentage for each item category (or other characteristic).

Further, a user can "click" within financial data window 1360 (over a displayed gross margin for an item category of a profit center business unit, for example), and can cause analysis window 1370 to be displayed within user interface 1300. Analysis window 1370 allows a user to analyze the financial data displayed within financial data window 1360, such as revenue data or COGS data, according to a characteristic, such as a cost element or an analysis group. In the illustrated embodiment, when a user selects to analyze the COGS data according to a cost element, financial data window 1370 is displayed within user interface 1300, where financial data window 1370 displays a pie-chart representation of financial data (such as gross margin percentage) for each cost element of the item category of the business unit.

FIG. 1-14 illustrates a flow diagram of the functionality of a supply chain financial trade accounting module (such as supply chain financial trade accounting module 16 of FIG. 1-1), according to an embodiment of the invention. In one embodiment, the functionality of the flow diagram of FIG. 1-14, and the functionality of the flow diagram of FIG. 1-15, are each implemented by software stored in memory or other computer-readable or tangible medium, and executed by a processor. In other embodiments, each functionality may be performed by hardware (e.g., through the use of an application specific integrated circuit ("ASIC"), a programmable gate array ("PGA"), a field programmable gate array ("FPGA"), etc.), or any combination of hardware and software. Further, certain embodiments may not include all of the functionality of the flow diagram of FIG. 1-14, or all of the functionality of the flow diagram of FIG. 1-15.

The flow begins and proceeds to 1400. At 1400, one or more events associated with a supply chain financial orchestration flow are defined to indicate an ownership change of an item between a first entity and a second entity. In certain embodiments, the supply chain financial orchestration flow can be either an inter-company trade or an intra-company trade. The flow then proceeds to 1410.

At 1410, an agreement is defined, where the agreement is associated with the supply chain financial orchestration flow. The agreement can define a transfer price, one or more documentation and accounting rules for the supply chain financial orchestration flow, and one or more transfer pricing rules for the supply chain financial orchestration flow. The flow then proceeds to 1420.

At 1420, an accounting policy is defined, where the accounting policy is associated with the supply chain financial orchestration flow. The accounting policy can define whether an invoice is generated for a trade accounting event, and/or whether a profit is tracked for a trade accounting event. The flow then proceeds to 1430.

At 1430, one or more events associated with the supply chain financial orchestration flow are received. The event(s) can be raised by a transaction associated with the supply chain financial orchestration flow. The flow then proceeds to 1440.

At 1440, it is determined whether at least one event indicates an ownership change of an item between the first entity and the second entity. The flow then proceeds to 1450.

At 1450, one or more trade events are generated where at least one event indicates an ownership change. Each trade event can indicate a change in ownership of the item from the first entity to the second entity. The flow then proceeds to 1460.

At 1460, the one or more trade events are sent to a cost accounting system, where the cost accounting system performs accounting based on the trade event(s), and generates one or more trade accounting events. Each trade accounting event can indicate accounting performed in association with the change in ownership of the item from the first entity to the second entity. The flow then proceeds to 1470.

At 1470, one or more accounting attributes are also sent to the cost accounting system. In these embodiments, the cost accounting system further performs the accounting based on the accounting attribute(s). The accounting attribute(s) can include at least one of: a pricing attribute that defines a transfer price; an accounting template attribute that defines an accounting template that includes one or more documentation and accounting rules and/or one or more transfer pricing rules, or a profit tracking attribute that defines whether to track a profit for the supply chain financial orchestration flow. The flow then proceeds to 1480.

At 1480, one or more physical execution events associated with the supply chain financial orchestration flow are received. Each physical execution event can indicate a physical movement of the item. The flow then proceeds to 1490.

At 1490, the one or more physical execution events are sent to the cost accounting system, where the cost accounting system performs accounting based on the physical execution event(s). Thus, the trade event(s) is/are separate from the physical execution event(s). This means that the accounting that is performed based on the trade event(s) is independent of the accounting that is performed based on the physical execution event(s). The flow then ends.

FIG. 1-15 illustrates a flow diagram of the functionality of a supply chain financial trade accounting module (such as supply chain financial trade accounting module 16 of FIG. 1-1) that utilizes a unified gross margin computation model for intercompany trade events as well as physical sales order flows, according to another embodiment of the invention. In certain embodiments, the functionality of the flow diagram of FIG. 1-15 is implemented after the functionality of the flow diagram of FIG. 1-14 is implemented.

The flow begins and proceeds to 1510. At 1510, a revenue amount and a COGS amount of an item are calculated based on one or more trade accounting events. The flow then proceeds to 1520. At 1520, the revenue amount and the COGS amount of the item are stored as revenue data and COGS data. The flow then proceeds to 1530. At 1530, a gross margin amount and a gross margin percentage are calculated based on the revenue data and the COGS data. The flow then proceeds to 1540. At 1540, the gross margin amount and the gross margin percentage are displayed within a user interface. The flow then ends.

FIG. 1-16 illustrates an example supply chain financial orchestration flow, according to an embodiment of the invention. The supply chain financial orchestration flow is between a shipping entity in China and a receiving entity in the United States. As illustrated in FIG. 1-16, the supply chain financial orchestration flow includes a physical movement flow 1610 and a financial flow 1620. Physical movement flow 1610 represents the physical movement of items from the shipping entity in China, to the receiving entity in the United States, and can involve the physical movement through one or more intermediate entities. Physical movement flow 1610 can include one or more physical transactions that are executed in association with the physical movement of the items (such as shipments, receipts, etc.). Financial flow 1620 represents the change in financial ownership of items from the shipping entity in China, to the receiving entity in the United States, and can involve the change in financial ownership of one or more intermediate entities. Financial flow 1620 can include one or more financial transactions that are executed in association with the change in financial ownership of the items (such as orders, invoices, payments, etc.). As illustrated in FIG. 1-16, a physical movement flow can be separate and independent of a financial flow within a supply chain financial orchestration system.

FIG. 1-17 illustrates a block diagram of an example architecture of a supply chain financial orchestration system 1700, according to an embodiment of the invention. According to the embodiment, supply chain financial orchestration system 1700 is a configurable system that manages internal trade relationships between entities belonging to an enterprise, where the enterprise is typically spread across geographies. Supply chain financial orchestration system 1700 can define a nature of trade relationships, business rules, internal controls, regulatory compliances, and other terms and conditions required to execute, monitor, and evaluate trade transactions emanating out of such relationships. More specifically, supply chain financial orchestration system 1700 can listen to events that occur in supply chain transactions in various external source systems, and can identify internal transactions (such as inter-company transactions and intra-company transactions) based on pre-defined trade relationships. Once the internal transactions are identified, supply chain financial orchestration system 1700 can create necessary accounting and documentations required to be generated for the internal transactions according to the business rules defined in supply chain financial orchestration system 1700.

According to the illustrated embodiment, supply chain financial orchestration system 1700 includes event mediator 1701, event capture 1702, event manager 1703, orchestration service 1704, execution manager 1705, task layer service 1706, external interface layer service 1707, connector service 1708, and callback service 1709. Event mediator 1701 listens for events generated by an external source system (i.e., application) of external source systems (i.e., applications) 1710. If an event is of interest to supply chain financial orchestration system 1700, event mediator 1701 can also call a web service exposed by the external source system of external source systems 1710 to enrich the event details. Event mediator 1701 then sends the event to event capture 1702. Event capture 1702 validates the event details retrieved after enrichment, and stores the event in an external source system format.

Subsequently, event manager 1703 identifies a source document enrichment web service based on a source order type, and calls the source document enrichment web service for enrichment. The source document enrichment service is exposed by an external source system of external source systems 1710 where the source order originated. Event manager 1703 can pass a source document identifier as an input parameter to the enrichment web service and can retrieve the source document information, where a source document identifier is a unique identifier of the source document that is communicated to the external source system of external source systems 1710. The external source system of external source systems 1710 that is responsible for capturing the physical transaction can be responsible for passing the source document identifier as part of event information. Supply chain financial orchestration system 1700 can maintain an association between a supply chain event and a source document type. Event manager 1703 can further transform the source document information into a format that is understandable by supply chain financial orchestration system 1700, and can identify a supply chain financial orchestration flow based on qualifiers, source document type, physical route, parties involved in an internal trade, and a priority of the supply chain financial orchestration flow. Further, a supply chain financial orchestration flow can be date effective. This means that any modification to a supply chain financial orchestration flow can cause a new effective date to be associated with the supply chain financial orchestration flow. Thus, transactions pertaining to a source document created before the effective date of the modification can be associated with the original supply chain financial orchestration flow, and transactions pertaining to a source document created after the effective date of the modification can be associated with the modified supply chain financial orchestration flow.

Orchestration service 1704 verifies whether a supply chain financial orchestration flow is already assigned to a source document or not. If the supply chain financial orchestration flow is not already assigned, orchestration service 1704 can assign the supply chain financial orchestration flow to the source document, and can generate the tasks that are to be performed between internal entities based on the documentation and accounting rules setup for the supply chain financial orchestration flow (such as a global procurement flow, a customer shipment flow, and an internal transfer flow). As previously described, a global procurement flow is a supply chain financial orchestration flow where a central buying entity buys goods from suppliers on behalf of one or more internal entities. The supplier liability is borne by the purchasing entity. The purchasing and requesting entity settle the transaction among themselves using a transfer price (sometimes through one or more intermediary entities). A customer shipment flow is a supply chain financial orchestration flow in which a selling business unit is different from a profit center business unit of the entity that owns and ships the goods. The selling entity receives an order from a customer, and the shipping entity ships the goods directly to the customer. The shipping entity is settled financially by the selling entity (sometimes through one or more intermediary entities). A customer shipment flow can be an internal drop shipment flow, which is a forward customer shipment flow, or a customer drop shipment flow, or a return customer shipment flow. An internal transfer flow is a supply chain financial orchestration flow in which physical movement of goods happens between internal entities. The internal entities settle the financial transactions among themselves using a transfer price.

The tasks can be specific to a forward flow and a return flow for the supply chain financial orchestration flow. A forward flow is a flow of events that proceeds in a specific direction (such as from a supplier entity to a purchaser entity), and a return flow is a flow of events that proceeds in a reverse direction (such as from a purchaser entity to a supplier entity). In addition to ownership transfer between internal entities, events indicating ownership transfer from a supplier entity to a purchasing entity can also be setup in a supply chain financial orchestration flow definition. When an event designated as a supplier ownership change event occurs, orchestration service 1704 can generate the tasks for creating trade distributions to book supplier accrual and costs in a costing system, as well. Execution manager 1705 invokes a task layer service based on a task type. Generally, the tasks are performed in a defined sequence, and if there is any dependency from a previous task, execution manager 1705 can wait for the previous task to complete. Example task types can include inter-company trade documents (e.g., purchase order and sales order), trade distribution tasks related to costing, inter-company receivable invoices related to inter-company receivable, payables invoice, or credit memo tasks that are set in documentation and accounting rules. Task types can also include user-defined tasks.

Task layer service 1706 creates a task layer service payload. Task layer service 1706 can include logic to populate the payload data depending on a global procurement flow, a customer shipment flow, or an internal transfer flow. Task layer service 1706 can also call a transfer price service to get a transfer price, where the transfer price is a price in which a selling entity sells goods to a purchasing entity, where the selling entity and the purchasing entity are involved in an internal trade. External interface layer service 1707 identifies a target system (i.e., application) of target systems (i.e., applications) 1720, and obtains a connector service (e.g., connector service 1708) for the target system of target systems 1720 based on the task type. Connector service 1708 transforms the task layer service payload into a format which is understandable by the target system of target systems 1720. Once the task data is transformed according to a target system format, connector service 1708 calls a web service to interface tasks in interface tables of the target system of target systems 1720. Callback service 1709 receives responses from the target system of target systems 1720 and updates the task status. If the task is a last task in a sequence, then the supply chain financial orchestration is complete. Otherwise, the next task in the sequence is selected, and execution manager 1705 is invoked with the task type.

Supply chain financial orchestration system 1700 further includes a supply chain financial orchestration work area 1730 that includes a plurality of user interfaces that allow a user to interact with supply chain financial orchestration system 1700. Supply chain financial orchestration work area 1730 includes manage event exceptions 1731, confirm financial orchestration route assignments 1732, and monitor financial orchestration execution 1733. Manage event exceptions 1731 is a user interface that allows users to view, troubleshoot, and manage events which faulted due to a setup or technical reason. Confirm financial orchestration route assignments 1732 is a user interface that allows a user to confirm a supply chain financial orchestration flow before the tasks of the supply chain financial orchestration flow are initiated by orchestration service 1704. Monitor financial orchestration execution 1733 is a user interface that allows user to monitor supply chain financial orchestration flows that are in progress, that have not started, and that have completed.

Thus, in one embodiment, a supply chain financial orchestration system that includes a trade accounting model is provided. The trade accounting model can provide a separation of physical execution event flows from financial trade buy-sell event flows. This allows for accurate tracking of ownership changes throughout the supply chain financial orchestration flow, even if the ownership change is not coupled with a physical movement. The trade accounting model can also provide an ability to track product costs and internal mark-ups throughout the supply chain to enable true product cost/gross margin visibility, as well as an ability to eliminate internal mark-ups in a consolidated financial statement. These abilities solve some of the largest business problems that large enterprises face. Further, the trade accounting model can also provide an accurate cost accounting of trade buy-sell events and additional overhead costs. This is a functionality not found in many typical ERP systems.

The features, structures, or characteristics of the invention described throughout this specification may be combined in any suitable manner in one or more embodiments. For example, the usage of "one embodiment," "some embodiments," "certain embodiment," "certain embodiments," or other similar language, throughout this specification refers to the fact that a particular feature, structure, or characteristic described in connection with the embodiment may be included in at least one embodiment of the present invention. Thus, appearances of the phrases "one embodiment," "some embodiments," "a certain embodiment," "certain embodiments," or other similar language, throughout this specification do not necessarily all refer to the same group of embodiments, and the described features, structures, or characteristics may be combined in any suitable manner in one or more embodiments.

One having ordinary skill in the art will readily understand that the invention as discussed above may be practiced with steps in a different order, and/or with elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

DETAILED DESCRIPTION—SECTION 2

According to an embodiment, a supply chain financial orchestration system is provided that can configure one or more transfer pricing rules pertaining to calculation of a transfer price for an internal transaction. A transfer price is a price at which one internal entity transacts with another internal entity for a sale or transfer of goods, service assets, or funds. For example, goods and/or services from one division of a business may be sold to another division, or goods and/or services from a parent company may be sold to a foreign subsidiary. The transfer price determines the allocation of profit and loss among different parts of an enterprise which may fall into different tax regimes. Given the importance of transfer price determination, the supply chain financial orchestration system can provide a "one-stop" setup to configure all the rules pertaining to the calculation of transfer price for both accounting and taxation purposes. This setup allows a user to configure multiple transfer pricing rules from a variety of available options, where a transfer pricing rule is a rule for automatically calculating a transfer price for an internal transaction based on information associated with the transaction (i.e., transaction information). The transfer pricing rules can subsequently be associated with buy and sell terms defined between specific internal entities. Once the transfer pricing rules have been associated with the buy and sell terms, the transfer pricing rules can be used to automatically calculate a transfer price for an internal transaction of a supply chain financial orchestration flow.

FIG. 2-1 illustrates a block diagram of a supply chain financial orchestration system 10 that may implement one embodiment of the invention. Supply chain financial orchestration system 10 includes a bus 12 or other communications mechanism for communicating information between components of supply chain financial orchestration system 10. Supply chain financial orchestration system 10 also includes a processor 22, operatively coupled to bus 12, for processing information and executing instructions or operations. Processor 22 may be any type of general or specific purpose processor. Supply chain financial orchestration system 10 further includes a memory 14 for storing information and instructions to be executed by processor 22. Memory 14 can be comprised of any combination of random access memory ("RAM"), read only memory ("ROM"), static storage such as a magnetic or optical disk, or any other type of machine or computer-readable medium. Supply chain financial orchestration system 10 further includes a communication device 20, such as a network interface card or other communications interface, to provide access to a network. As a result, a user may interface with supply chain financial orchestration system 10 directly, or remotely through a network or any other method.

A computer-readable medium may be any available medium that can be accessed by processor 22. A computer-readable medium may include both a volatile and nonvolatile medium, a removable and non-removable medium, a communication medium, and a storage medium. A communication medium may include computer readable instructions, data structures, program modules or other data in a modulated data signal such as a carrier wave or other transport mechanism, and may include any other form of information delivery medium known in the art. A storage medium may include RAM, flash memory, ROM, erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

Processor 22 can also be operatively coupled via bus 12 to a display 24, such as a Liquid Crystal Display ("LCD"). Display 24 can display information to the user. A keyboard 26 and a cursor control device 28, such as a computer mouse, can also be operatively coupled to bus 12 to enable the user to interface with supply chain financial orchestration system 10.

According to one embodiment, memory 14 can store software modules that may provide functionality when executed by processor 22. The modules can include an operating system 15, a supply chain financial orchestration transfer pricing module 16, as well as other functional modules 18. Operating system 15 can provide an operating system functionality for supply chain financial orchestration system 10. Supply chain financial orchestration transfer pricing module 16 can provide functionality for calculating a transfer price based on a transfer pricing rule, as is described in more detail below. In certain embodiments, supply chain financial orchestration transfer pricing module 16 can comprise a plurality of modules that each provide specific individual functionality for calculating a transfer price based on a transfer pricing rule. Supply chain financial orchestration system 10 can also be part of a larger system. Thus, supply chain financial orchestration system 10 can include one or more additional functional modules 18 to include the additional functionality. For example, functional modules 18 may include modules that provide additional functionality, such as one or more "Oracle Fusion Applications" from Oracle Corporation. In another example, functional modules 18 may include enterprise resource planning ("ERP") modules of an ERP system, where an ERP system is a computer system that integrates several data sources and processes of an organization into a unified system.

Processor 22 can also be operatively coupled via bus 12 to a database 34. Database 34 can store data in an integrated collection of logically-related records or files. Database 34 can be an operational database, an analytical database, a data warehouse, a distributed database, an end-user database, an external database, a navigational database, an in-memory database, a document-oriented database, a real-time database, a relational database, an object-oriented database, or any other database known in the art.

FIG. 2-2 illustrates an example supply chain financial orchestration flow, according to an embodiment of the invention. The supply chain financial orchestration flow is between a shipping entity in China and a receiving entity in the United States. As illustrated in FIG. 2-2, the supply chain financial orchestration flow includes a physical movement flow 210 and a financial flow 220. Physical movement flow 210 represents the physical movement of items from the shipping entity in China, to the receiving entity in the United States, and can involve the physical movement through one or more intermediate entities. Physical movement flow 210 can include one or more physical transactions that are executed in association with the physical movement of the items (such as shipments, receipts, etc.). Financial flow 220 represents the change in financial ownership of items from the shipping entity in China, to the receiving entity in the United States, and can involve the change in financial ownership of one or more intermediate entities. Financial flow 220 can include one or more financial transactions that are executed in association with the change in financial ownership of the items (such as orders, invoices, payments, etc.). As illustrated in FIG. 2-2, a physical movement flow can be separate and independent of a financial flow within a supply chain financial orchestration system.

FIG. 2-3 illustrates a block diagram of an example architecture of a supply chain financial orchestration system 300, according to an embodiment of the invention. According to the embodiment, supply chain financial orchestration system 300 is a configurable system that manages internal trade relationships between entities belonging to an enterprise, where the enterprise is typically spread across geographies. Supply chain financial orchestration system 300 can define a nature of trade relationships, business rules, internal controls, regulatory compliances, and other terms and conditions required to execute, monitor, and evaluate trade transactions emanating out of such relationships. More specifically, supply chain financial orchestration system 300 can listen to events that occur in supply chain transactions in various external source systems, and can identify internal transactions (such as inter-company transactions and intra-company transactions) based on pre-defined trade relationships. Once the internal transactions are identified, supply chain financial orchestration system 300 can create necessary accounting and documentations required to be generated for the internal transactions according to the business rules defined in supply chain financial orchestration system 300.

According to the illustrated embodiment, supply chain financial orchestration system 300 includes event mediator 301, event capture 302, event manager 303, orchestration service 304, execution manager 305, task layer service 306, external interface layer service 307, connector service 308, and callback service 309. Event mediator 301 listens for events generated by an external source system (i.e., application) of external source systems (i.e., applications) 310. If an event is of interest to supply chain financial orchestration system 300, event mediator 301 can also call a web service exposed by the external source system of external source systems 310 to enrich the event details. Event mediator 301 then sends the event to event capture 302. Event capture 302 validates the event details retrieved after enrichment, and stores the event in an external source system format.

Subsequently, event manager 303 identifies a source document enrichment web service based on a source order type, and calls the source document enrichment web service for enrichment. The source document enrichment service is exposed by an external source system of external source systems 310 where the source order originated. Event manager 303 can pass a source document identifier as an input parameter to the enrichment web service and can retrieve the source document information, where a source document identifier is a unique identifier of the source document that is communicated to the external source system of external source systems 310. The external source system of external source systems 310 that is responsible for capturing the physical transaction can be responsible for passing the source document identifier as part of event information. Supply chain financial orchestration system 300 can maintain an association between a supply chain event and a source document type. Event manager 303 can further transform the source document information into a format that is understandable by supply chain financial orchestration system 300, and can identify a supply chain financial orchestration flow based on qualifiers, source document type, physical route, parties involved in an internal trade, and a priority of the supply chain financial orchestration flow. Further, a supply chain financial orchestration flow can be date effective. This means that any modification to a supply chain financial orchestration flow can cause a new effective date to be associated with the supply chain financial orchestration flow. Thus, transactions pertaining to a source document created before the effective date of the modification can be associated with the original supply chain financial orchestration flow, and transactions pertaining to a source document created after the effective date of the modification can be associated with the modified supply chain financial orchestration flow.

Orchestration service 304 verifies whether a supply chain financial orchestration flow is already assigned to a source document or not. If the supply chain financial orchestration flow is not already assigned, orchestration service 304 can assign the supply chain financial orchestration flow to the source document, and can generate the tasks that are to be performed between internal entities based on the documentation and accounting rules setup for the supply chain financial orchestration flow (such as a global procurement flow, a customer shipment flow, and an internal transfer flow). A global procurement flow is a supply chain financial orchestration flow where a central buying entity buys goods from suppliers on behalf of one or more internal entities. The supplier liability is borne by the purchasing entity. The purchasing and requesting entity settle the transaction among themselves using a transfer price (sometimes through one or more intermediary entities). A customer shipment flow is a supply chain financial orchestration flow in which a selling business unit is different from a profit center business unit of the entity that owns and ships the goods. The selling entity receives an order from a customer, and the shipping entity ships the goods directly to the customer. The shipping entity is settled financially by the selling entity (sometimes through one or more intermediary entities). A customer shipment flow can be an internal drop shipment flow, which is a forward customer shipment flow, or a customer drop shipment flow, or a return customer shipment flow. An internal transfer flow is a supply chain financial orchestration flow in which physical movement of goods happens between internal entities. The internal entities settle the financial transactions among themselves using a transfer price.

The tasks that are to be performed can be specific to a forward flow and a return flow for the supply chain financial orchestration flow. A forward flow is a flow of events that proceeds in a specific direction (such as from a supplier entity to a purchaser entity), and a return flow is a flow of events that proceeds in a reverse direction (such as from a purchaser entity to a supplier entity). In addition to ownership transfer between internal entities, events indicating ownership transfer from a supplier entity to a purchasing entity can also be setup in a supply chain financial orchestration flow definition. When an event designated as a supplier ownership change event occurs, orchestration service 304 can generate the tasks for creating trade distributions to book supplier accrual and costs in a costing system, as well. Execution manager 305 invokes a task layer service based on a task type. Generally, the tasks are performed in a defined sequence, and if there is any dependency from a previous task, execution manager 305 can wait for the previous task to complete. Example task types can include inter-company trade documents (e.g., purchase order and sales order), trade distribution tasks related to costing, inter-company receivable invoices related to inter-company receivable, payables invoice, or credit memo tasks that are set in documentation and accounting rules. Task types can also include user-defined tasks.

Task layer service 306 creates a task layer service payload. Task layer service 306 can include logic to populate the payload data depending on a global procurement flow, a customer shipment flow, or an internal transfer flow. Task layer service 306 can also call a transfer price service to get a transfer price, where the transfer price is a price in which a selling entity sells goods to a purchasing entity, where the selling entity and the purchasing entity are involved in an internal trade. External interface layer service 307 identifies a target system (i.e., application) of target systems (i.e., applications) 320, and obtains a connector service (e.g., connector service 308) for the target system of target systems 320 based on the task type. Connector service 308 transforms the task layer service payload into a format which is understandable by the target system of target systems 320. Once the task data is transformed according to a target system format, connector service 308 calls a web service to interface tasks in interface tables of the target system of target systems 320. Callback service 309 receives responses from the target system of target systems 320 and updates the task status. If the task is a last task in a sequence, then the supply chain financial orchestration is complete. Otherwise, the next task in the sequence is selected, and execution manager 305 is invoked with the task type.

Supply chain financial orchestration system 300 further includes a supply chain financial orchestration work area 330 that includes a plurality of user interfaces that allow a user to interact with supply chain financial orchestration system 300. Supply chain financial orchestration work area 330 includes manage event exceptions 331, confirm financial orchestration route assignments 332, and monitor financial orchestration execution 333. Manage event exceptions 331 is a user interface that allows users to view, troubleshoot, and manage events which faulted due to a setup or technical reason. Confirm financial orchestration route assignments 332 is a user interface that allows a user to confirm a supply chain financial orchestration flow before the tasks of the supply chain financial orchestration flow are initiated by orchestration service 304. Monitor financial orchestration execution 333 is a user interface that allows user to monitor supply chain financial orchestration flows that are in progress, that have not started, and that have completed.

In one embodiment, a supply chain financial orchestration system can have the capability of defining rules for a financial route selection by providing a qualifier rule. The qualifier rule can be evaluated, and can provide a highest priority financial route for the supply chain financial orchestration system. More specifically, an agreement that is defined by a user can define a financial route along with one or more buy/sell terms, one or more pricing rules, and/or one or more documentation and accounting rules to be used for an internal transactions. A user may wish to identify a suitable agreement based on different business parameters, such as supplier, item category, entity, etc. For example, a user may wish to use “Agreement A” for item category “Electronics” and “Agreement B” for item category “Machinery.” Thus, these business parameters can act as qualifiers for agreement identification. According to the embodiment, a qualifier rule can be defined and attached to an agreement. During an execution of a supply chain financial orchestration flow, one or more agreements that are defined for a pair of buying and selling entities of a transaction can be identified, and the one or more qualifier rules attached to the one or more identified agreements can be evaluated, and the appropriate agreement to be used for the transaction can be identified and selected. Without qualifier rules, it can be very difficult to identify an agreement for different combinations of business parameters, and it could require the customization of the source code, including "hard-coding" the agreement usage for different set of business parameters. Qualifier rules can make the process of associating an agreement with a supply chain financial orchestration flow easier.

Additionally, in one embodiment, a supply chain financial orchestration system can orchestrate tasks of a supply chain financial orchestration flow based on a defined date effective setup (i.e., a defined effective start date and a defined effective end date). More specifically, different objects (such as transfer pricing rules or tasks) can be defined in a date effective manner (i.e., defined with an effective start date and an effective end date) within an agreement. A modification to the object (e.g., transfer pricing rule or task) can be made independently for any particular date range without affecting the other objects. Once setup data is identified for a source document, the same setup data can be used for the events arising for that source document, irrespective of the changes made to the setup data after the first event arrival.

For example, when a trigger event arises, an appropriate agreement and tasks for the agreement can be identified for a specified date associated with the event within a table, as shown below:

| Task Name | Effective Start Date | Effective End Date |
|---|---|---|
| T1 | 1 Jan. 2010 | 31 Dec. 2012 |
| T2 | 1 Jan. 2010 | 31 Dec. 2012 |
| T3 | 1 Jan. 2010 | 31 Dec. 2012 |

In the example, an event can be received with a date of "1 Feb. 2010" for a purchase order document, "PO111." The tasks to be performed are tasks T1, T2, and T3. As shown above, one or more entries can be made in the table for a source document, and the effective date can be used for identifying the tasks. The effective date can then be used to identify the tasks when further events are triggered for that source document. This can ensure that when a setup is changed, future events for the source document will use the already-identified effective date, select the tasks corresponding to the appropriate date range that includes the effective date, and orchestrate the tasks.

In the above example, if an entity needs to additionally perform task T0 for new purchase order documents created in 2011 and onwards, but continue to only perform tasks T1, T2, and T3 for older purchase order documents created in 2010 or earlier, the table can be modified as follows:

| Task Name | Effective Start Date | Effective End Date |
|---|---|---|
| T0 | 1 Jan. 2011 | 31 Dec. 2012 |
| T1 | 1 Jan. 2010 | 31 Dec. 2012 |
| T2 | 1 Jan. 2010 | 31 Dec. 2012 |
| T3 | 1 Jan. 2010 | 31 Dec. 2012 |

When another event is received for the purchase order document, "PO111," on Feb. 1, 2011, the supply chain financial orchestration system can refer to the previous entry that was made for the purchase order document, "PO111," select the effective date as "1 Feb. 2010," and only perform the tasks T1, T2, and T3. If an event is received for a new purchase order document, "PO222," on Feb. 1, 2011, then tasks T0, T1, T2, and T3 can be performed. Further, one or more task layer services that prepare a payload can also refer to the effective date indicated in the table, and select the data for the appropriate date range. Thus, a date effectivity feature can assist a user in adding or removing transfer pricing rules or tasks for any given date range. Without this feature, it is very difficult for a user to specify different sets of transfer pricing rules and/or tasks for an agreement with different date ranges. Thus, the date effectivity feature can help a user configure a setup in accordance with modifications to business requirements.

Further, in one embodiment, a supply chain financial orchestration system can provide objects (such as transfer pricing rules or tasks) with both date effectivity and multiple language support ("MLS"). Thus, the supply chain financial orchestration system can enable a user to create multilingual objects that also extend the date effectivity behavior previously described. By extending the date effectivity behavior into MLS-enabled attributes, the supply chain financial orchestration system can keep track of modifications to MLS-enabled attributes. The supply chain financial orchestration system can enable support for date effective operations, such as "Create," "Retrieve," "Insert," "Correct," "End Date," and "Delete," as well as operations, such as import and export of setup data between systems. By utilizing this framework, a user can enable date effective behavior for MLS entities. Without this framework, a user would likely have to manually create source code to support date effective operations for translatable attributes, or would have to drop either the date effectivity behavior or the MLS-enabled attributes.

FIG. 2-4 illustrates an example user interface 400 for creating a transfer pricing rule, according to an embodiment of the invention. According to the embodiment, user interface 400 includes transfer pricing rule options 410, where transfer pricing rule options 410 include one or more options for defining a transfer pricing rule.

One option for defining a transfer pricing rule is a pricing strategy-based transfer price option that defines a pricing strategy-based transfer pricing rule. A pricing strategy-based transfer pricing rule calculates a transfer price based on a pricing strategy, where a pricing strategy is a collection of one or more pricing rules that define an approach for achieving a specific goal associated with selling and pricing products, where the specific goal can be targeted at a pricing segment and/or a specific selling situation. The one or more rules can be defined in a pricing system, and the collection of the one or more defined rules can form a pricing strategy. More specifically, a pricing system allows a user to create one or more pricing strategies, where each pricing strategy can include one or more price lists, one or more currency conversion lists, one or more shipping charge policies, and/or one or more costs lists, that can be evaluated in a precedence-based manner to price items for a supply chain financial orchestration flow. The user can also set up one or more rules used by the pricing system to determine an applicable pricing strategy based on conditions, or qualifiers, such as the buy and sell terms, an item type, an item category, a supplier, a customer, etc. An appropriate pricing strategy can be determined and applied by the pricing system at a time of pricing a supply chain financial orchestration flow based on the rules set up in the pricing system.

Another option for defining a transfer pricing rule is a transaction cost-based transfer price option that defines a transaction cost-based transfer pricing rule. A transaction cost-based transfer pricing rule calculates a transfer price by applying a positive or negative markup over a cost incurred by a selling entity for an item or service (i.e., a transaction cost). The markup can be a standard markup, which can be specified as a percentage. The markup can be an advanced markup defined using one or more pricing term rules of a pricing system. A pricing term rule is a rule which defines how a price of an item or service can be adjusted or defined. For example, a product price adjustment term can have one or more qualifying conditions, which can be defined in a sale agreement or a promotion, for example. A pricing term rule can also determine a price of an item or service based on conditions or qualifies such as the buy and sell terms, an item type, an item category, a supplier, a customer, etc.

Another option for defining a transfer pricing rule is a source document price-based transfer price option that defines a source document price-based transfer pricing rule. A source document price-based transfer pricing rule calculates a transfer price by applying a positive or negative markup over a source document price, such as a purchase order price or a sales order price.

According to the embodiment, user interface 400 also includes multiple options criteria 420, where multiple options criteria 420 is a feature that enables a combination of multiple transfer pricing rules options. Thus, a transfer pricing rule can calculate a transfer pricing using multiple options, and thus, produce multiple transfer prices, and a transfer price can be selected from the multiple transfer prices. Based on a selection that the user makes within multiple options criteria 420, either a highest transfer price from the multiple transfer prices can be selected, or a lowest transfer price from the multiple transfer prices can be selected. For example, a transfer pricing rule can calculate both a transaction-cost based transfer price and a source document price-based transfer price, and select the highest price as the transfer price.

In one embodiment, a transfer pricing rule that is created using user interface 400 can be date effective. A date effective object (e.g., a date effective transfer pricing rule) is an object that has attributes whose values change over time. The date effective object can retain a complete history of all modifications and the time periods during which each modification is available for use in transactions. In other words, "date effective" allows users to make modifications to an object (e.g., transfer pricing rule) that can take effect in the future. Thus, for a date effective transfer pricing rule, any modifications to the date effective transfer pricing rule can be created with an effective date for the modification. Transactions associated with new source documents created after an effective date can utilize the modified transfer pricing rule to calculate a transfer price, while transactions associated with original source documents created before the effective date can utilize the original transfer price rule to calculate the transfer price. A supply chain financial orchestration system, when deriving the transfer pricing rules for calculating a transfer price, can retrieve the transfer pricing rules that are effective as of an effective date for a source document.

FIG. 2-5 illustrates another example user interface 500 for creating a transfer pricing rule, according to an embodiment of the invention. User interface 500 allows a user to define a transfer pricing rule, created using user interface 400 of FIG. 2-4, to calculate an assessable value for an internal transaction. An assessable value is the value of an internal transaction for tax calculation purposes. A separate assessable value can be calculated for a seller of the internal transaction, and a buyer of the internal transaction. While user interface 500 can allow the user to define the transfer pricing rule to calculate a seller's assessable value, a similar user interface can be displayed that allows the user to define the transfer pricing rule to calculate a buyer's assessable value.

According to the embodiment, user interface 500 includes assessable value calculation options 510. Assessable value calculation options 510 provide an option to either use a transfer price as an assessable value, or define a separate rule (or set of rules) to calculate the assessable value. If the option to define a separate rule (or set of rules) to calculate the assessable value is selected, then user interface 500 can also include assessable value rule options 520, where assessable value rule options 520 include one or more options for defining a rule to calculate the assessable value. Assessable value rule options 520 are similar to transfer pricing rule options 420 of FIG. 2-4, previously described.

FIG. 2-6 illustrates an example user interface 600 selecting a transfer pricing rule from an external pricing system, according to an embodiment of the invention. According to the embodiment, another option for defining a transfer pricing rule is to define the transfer pricing rule as an external pricing service transfer pricing rule, where an external pricing service transfer pricing rule calculates a transfer price using an external pricing service of an external pricing system. According to the embodiment, by selecting third party pricing service option 610 within user interface 600, rather than selecting a transfer pricing rule defined using either user interface 400 of FIG. 2-4 or user interface 500 of FIG. 2-5, the transfer pricing rule can be defined to calculate a transfer price using an external pricing service of an external pricing system.

FIG. 2-7 illustrates a block diagram of a calculate transfer price service 700, according to an embodiment of the invention. Calculate transfer price service 700 is a web service that can be called when either a transfer price needs to be estimated, or an actual transfer price needs to be calculated for a given transaction. Thus, calculate transfer price service 700 can calculate a transfer price for one or more transactions of a supply chain financial orchestration system. Based on transaction information provided as input, and a transfer pricing rule configuration, calculate transfer price service 700 calculates the transfer price and provides the transfer price as output.

More specifically, as illustrated in FIG. 2-7, calculate transfer price service 700 can receive transaction information from supply chain financial orchestration task layer services 710. Calculate transfer price service 700 can further receive additional information depending upon a transfer pricing rule. Calculate transfer price service 700 can further use the received transaction information and the received additional information to produce a transfer price. Calculate transfer price service 700 can then provide the transfer price to a service 720 that either requires a transfer price estimate, or an actual transfer price for a transaction.

According to the embodiment, where a transfer pricing rule is a transaction cost-based transfer pricing rule, calculate transfer price service 700 can receive a transaction cost from costing system 730, and apply a markup to the received transaction cost to produce the transfer price. When a transfer pricing rule is a source document price-based transfer pricing rule, calculate transfer price service 700 can receive a document price from source documents 740, and can apply a markup to the received document price to produce the transfer price. When a transfer pricing rule is a pricing strategy-based transfer pricing rule, calculate transfer price service 700 can receive a pricing strategy from pricing system 750, and apply the received pricing strategy to the received transaction information to produce a transfer price. When a transfer pricing rule is an external pricing service transfer pricing rule, calculate transfer price service 700 can call an external pricing service of external pricing system 760 to produce a transfer price.

Calculate transfer price service 700 can be called in synchronous or asynchronous mode. Further, calculate transfer price service 700 can be called in quote mode when an estimation of a transfer price is required. In quote mode, calculate transfer price service 700 does not store the transfer price calculated for a transaction. When called in non-quote mode, calculate transfer price service 700 can store a transfer price calculated between two entities in a financial trade relationship for a specific source document. For subsequent calls made for a transfer price between the same financial trade relationship and same source document, the stored transfer price can be retrieved and returned.

FIG. 2-8 illustrates a flow diagram of the functionality of a supply chain financial orchestration transfer pricing module (such as supply chain financial orchestration transfer pricing module 16 of FIG. 2-1), according to an embodiment of the invention. In one embodiment, the functionality of the flow diagram of FIG. 2-8 is implemented by software stored in memory or other computer-readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

The flow begins and proceeds to 805. At 805, a call is made to a calculate transfer price service (such as calculate transfer price service 700 of FIG. 2-7) to calculate a transfer price for a transaction. The call to the transfer price service can provide transaction information (i.e., information regarding the transaction). In certain embodiments, the transaction information can include a transaction identifier, a transaction date, an item identifier, a financial trade relationship identifier, and/or a source document identifier. A call to a calculate transfer price service can be either for an estimate of a transfer price, or for a calculation of an actual transfer price. The flow proceeds to 810.

At 810, the calculate transfer price service retrieves transaction information (i.e., information regarding the transaction). In certain embodiments, the transaction information can include a transaction identifier, a transaction date, an item identifier, a financial trade relationship identifier, and/or a source document identifier. Also, in certain embodiments, the calculate transfer price service can retrieve source document information (i.e., information regarding a source document associated with the transaction). In certain embodiments, the source document information can include a document price, a currency, a unit of measure, an item, an item category, a supplier, and/or a customer.

In certain embodiments, the calculate transfer price service also determines the effective dates, currency, and/or unit of measure in which the transfer price needs to be calculated. This can be specified in one or more document and accounting rules associated with the transaction. The currency of the transfer price can be user-defined. For example, the currency of the transfer price can be one of: a selling entity's accounting currency, a buyer entity's accounting currency, a source document's currency, or a user-defined currency. The flow proceeds to 815.

At 815, the calculate transfer price service determines whether a transfer price is already available in the currency and the unit of measure for the source document and the financial trade relationship. If a transfer price is already available, the flow proceeds to 885, where the transfer price is returned. If a transfer price is not already available, the flow proceeds to 820.

At 820, the calculate transfer price service identifies a transfer pricing rule. This is because a transfer price is required to be calculated using a transfer pricing rule if it is determined at 815 that a transfer price is not already available. The transfer pricing rule can be a transfer pricing rule that is defined for a financial trade relationship. The transfer pricing rule that is defined for the financial trade relationship can indicate a method and one or more rules used to calculate a transfer price. The flow proceeds to 825.

At 825, the calculate transfer price service determines whether the identified transfer pricing rule is a source document price-based transfer pricing rule. If the identified transfer pricing rule is a source document price-based transfer pricing rule, the flow proceeds to 830. Otherwise, the flow proceeds to 845.

At 830, the calculate transfer price service retrieves a document price. The flow then proceeds to 835.

At 835, the calculate transfer price service converts the document price to the transfer price currency and/or unit of measure if the document price is not available in the same currency and/or unit of measure as the transfer price currency. The flow then proceeds to 840.

At 840, the calculate transfer price service applies a markup to the document price to produce the transfer price. The markup can be a positive markup or a negative markup. Further, the markup can be a simple markup or an advanced markup. When the markup is an advanced markup, the calculate transfer price service can make a call to a pricing system to apply the markup based on one or more rules configured within the pricing system. The pricing system can allow a user to configure one or more rules to apply different markup values based on different transaction attributes. In certain embodiments, the transaction attributes can include a supplier, a customer, an item type, an item number, and/or an item category. The flow then proceeds to 880.

At 845, the calculate transfer price service determines whether the identified transfer pricing rule is a transaction cost-based transfer pricing rule. If the identified transfer pricing rule is a transaction cost-based transfer pricing rule, the flow proceeds to 850. Otherwise, the flow proceeds to 860.

At 850, the calculate transfer price service retrieves a transaction cost. The flow then proceeds to 855.

At 855, the calculate transfer price service applies a markup to the transaction cost to produce the transfer price. The markup can be a positive markup or a negative markup. Further, the markup can be a simple markup or an advanced markup. When the markup is an advanced markup, the calculate transfer price service can make a call to a pricing system to apply the markup based on one or more rules configured within the pricing system. The pricing system can allow a user to configure one or more rules to apply different markup values based on different transaction attributes. In certain embodiments, the transaction attributes can include a supplier, a customer, an item type, an item number, and/or an item category. The flow then proceeds to 880.

At 860, the calculate transfer price service determines whether the identified transfer pricing rule is a pricing strategy-based transfer pricing rule. If the identified transfer pricing rule is a pricing strategy-based transfer pricing rule, the flow proceeds to 865. Otherwise, the flow proceeds to 870.

At 865, the calculate transfer price service calls a pricing service of a pricing system to calculate the transfer price. In certain embodiments, by calling the pricing service, the calculate transfer price service selects a pricing strategy from one or more plurality of pricing strategies of the pricing system, where a pricing strategy includes one or more pricing rules. The calculate transfer price service further applies the pricing strategy to the received transaction information to produce the transfer price The flow then proceeds to 880.

At 870, the calculate transfer price service determines whether the identified transfer pricing rule is an external pricing service transfer pricing rule. If the identified transfer pricing rule is an external pricing service transfer pricing rule, then the flow proceeds to 875. If the identified transfer pricing rule is not an external pricing service transfer pricing rule, then in certain embodiments, the flow ends (not illustrated in FIG. 2-8). In alternate embodiments, if the identified transfer pricing rule is not an external pricing service transfer pricing rule, then the calculate transfer price service determines that the identified transfer pricing rule is another type of transfer pricing rule and applies the identified transfer pricing rule appropriately to calculate the transfer price (also not illustrated in FIG. 2-8).

At 875, the calculate transfer price service calls an external pricing service of an external pricing system to produce the transfer price. The flow then proceeds to 880. In certain embodiments, in addition to calculating the transfer price, the calculate transfer price service can also calculate an assessable value for both a buying entity and a selling entity. In certain embodiments, the calculate transfer price service can use the identified transfer pricing rule to calculate the assessable value for the buying entity and/or the selling entity. In other embodiments, the calculate transfer price service can use an alternate rule to calculate the assessable value for the buying entity and/or the selling entity.

At 880, if the call to the calculate transfer price service is for a calculation of an actual transfer price, the calculate transfer price service stores the transfer price (and optionally the assessable values) within a database. The storing can involve storing the transfer price (and optionally the assessable values) within a transfer price table of the database. This allows the transfer price to be retrieved for a subsequent transaction involving the same trade agreement relationship and the same source document. The flow then proceeds to 885.

At 885, the transfer price is provided to the service that called the calculate transfer price service. The flow then ends.

Thus, in one embodiment, a supply chain financial orchestration system can allow a user to choose from one or more transfer pricing options for calculating a transfer price for an internal transaction. The supply chain financial orchestration system can further calculate assessable values to determine taxable efficiency of tax-efficient supply chain models. Thus, the supply chain financial orchestration system can provide for a more robust calculation of transfer prices for internal transactions, which can lead to a more efficient supply chain flow for an entity.

The features, structures, or characteristics of the invention described throughout this specification may be combined in any suitable manner in one or more embodiments. For example, the usage of "one embodiment," "some embodiments," "certain embodiment," "certain embodiments," or other similar language, throughout this specification refers to the fact that a particular feature, structure, or characteristic described in connection with the embodiment may be included in at least one embodiment of the present invention. Thus, appearances of the phrases "one embodiment," "some embodiments," "a certain embodiment," "certain embodiments," or other similar language, throughout this specification do not necessarily all refer to the same group of embodiments, and the described features, structures, or characteristics may be combined in any suitable manner in one or more embodiments.

One having ordinary skill in the art will readily understand that the invention as discussed above may be practiced with steps in a different order, and/or with elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

DETAILED DESCRIPTION—SECTION 3

According to an embodiment, a supply chain financial orchestration system is provided that can configure one or more supply chain events as task generating events that indicate one or more tasks to be executed by the supply chain financial orchestration system. One example of a task generating event is an ownership change event that indicates an ownership change of an item from a first entity to a second entity for an internal transaction. A supply chain event is an event that occurs in a process of execution of a supply chain financial orchestration flow. A supply chain event can be a physical event, such as a shipment of goods, a transit of goods to a named port or other destination, or a receipt of goods at a delivery location. A supply chain event can also be a non-physical event, such as a receipt or dispatch of a commercial invoice, a customs clearance at a port of entry, or a confirmation of a fulfillment of a service. As previously described, in any supply chain financial orchestration flow that involves a buy, sell, or transfer of goods, the buyer and seller agree upon the event, or events, when the cost and risk of carrying the goods, as well as the title of the goods, transfer from the buyer to the seller. When this event occurs (or these events occur), it is expected that the seller accounts for the cost, revenue, and receivables, and the buyer accounts for the inventory cost and liability for payment. Thus, the supply chain financial orchestration system can determine when a supply chain event is an ownership change event that indicates an ownership change of an item from a first entity to a second entity, and can perform one or more tasks to effectuate the ownership change in response to receiving the ownership change event. Another example of a task generating event is a documentation creation event that indicates a creation of one or more documents. Thus, the supply chain financial orchestration system can determine when a supply chain event is a documentation creation event that indicates a creation of one or more documents, and that can perform one or more tasks to create the one or more documents in response to receiving the documentation creation event.

FIG. 3-1 illustrates a block diagram of a supply chain financial orchestration system 10 that may implement one embodiment of the invention. Supply chain financial orchestration system 10 includes a bus 12 or other communications mechanism for communicating information between components of supply chain financial orchestration system 10. Supply chain financial orchestration system 10 also includes a processor 22, operatively coupled to bus 12, for processing information and executing instructions or operations. Processor 22 may be any type of general or specific purpose processor. Supply chain financial orchestration system 10 further includes a memory 14 for storing information and instructions to be executed by processor 22. Memory 14 can be comprised of any combination of random access memory ("RAM"), read only memory ("ROM"), static storage such as a magnetic or optical disk, or any other type of machine or computer-readable medium. Supply chain financial orchestration system 10 further includes a communication device 20, such as a network interface card or other communications interface, to provide access to a network. As a result, a user may interface with supply chain financial orchestration system 10 directly, or remotely through a network or any other method.

A computer-readable medium may be any available medium that can be accessed by processor 22. A computer-readable medium may include both a volatile and nonvolatile medium, a removable and non-removable medium, a communication medium, and a storage medium. A communication medium may include computer readable instructions, data structures, program modules or other data in a modulated data signal such as a carrier wave or other transport mechanism, and may include any other form of information delivery medium known in the art. A storage medium may include RAM, flash memory, ROM, erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

Processor 22 can also be operatively coupled via bus 12 to a display 24, such as a Liquid Crystal Display ("LCD"). Display 24 can display information to the user. A keyboard 26 and a cursor control device 28, such as a computer mouse, can also be operatively coupled to bus 12 to enable the user to interface with supply chain financial orchestration system 10.

According to one embodiment, memory 14 can store software modules that may provide functionality when executed by processor 22. The modules can include an operating system 15, a supply chain financial orchestration event module 16, as well as other functional modules 18. Operating system 15 can provide an operating system functionality for supply chain financial orchestration system 10. Supply chain financial orchestration event module 16 can provide functionality for processing supply chain events as is described in more detail below. In certain embodiments, supply chain financial orchestration event module 16 can comprise a plurality of modules that each provide specific individual functionality for processing supply chain events. Supply chain financial orchestration system 10 can also be part of a larger system. Thus, supply chain financial orchestration system 10 can include one or more additional functional modules 18 to include the additional functionality. For example, functional modules 18 may include modules that provide additional functionality, such as "Oracle Fusion Applications" from Oracle Corporation. In another example, functional modules 18 may include enterprise resource planning ("ERP") modules of an ERP system, where an ERP system is a computer system that integrates several data sources and processes of an organization into a unified system.

Processor 22 can also be operatively coupled via bus 12 to a database 34. Database 34 can store data in an integrated collection of logically-related records or files. Database 34 can be an operational database, an analytical database, a data warehouse, a distributed database, an end-user database, an external database, a navigational database, an in-memory database, a document-oriented database, a real-time database, a relational database, an object-oriented database, or any other database known in the art.

FIG. 3-2 illustrates an example supply chain financial orchestration flow, according to an embodiment of the invention. The supply chain financial orchestration flow is between a shipping entity in China and a receiving entity in the United States. As illustrated in FIG. 3-2, the supply chain financial orchestration flow includes a physical movement flow 210 and a financial flow 220. Physical movement flow 210 represents the physical movement of items from the shipping entity in China, to the receiving entity in the United States, and can involve the physical movement through one or more intermediate entities. Physical movement flow 210 can include one or more physical transactions that are executed in association with the physical movement of the items (such as shipments, receipts, etc.). Financial flow 220 represents the change in financial ownership of items from the shipping entity in China, to the receiving entity in the United States, and can involve the change in financial ownership of one or more intermediate entities. Financial flow 220 can include one or more financial transactions that are executed in association with the change in financial ownership of the items (such as orders, invoices, payments, etc.). As illustrated in FIG. 3-2, a physical movement flow can be separate and independent of a financial flow within a supply chain financial orchestration system.

FIG. 3-3 illustrates a block diagram of an example architecture of a supply chain financial orchestration system 300, according to an embodiment of the invention. According to the embodiment, supply chain financial orchestration system 300 is a configurable system that manages internal trade relationships between entities belonging to an enterprise, where the enterprise is typically spread across geographies. Supply chain financial orchestration system 300 can define a nature of trade relationships, business rules, internal controls, regulatory compliances, and other terms and conditions required to execute, monitor, and evaluate trade transactions emanating out of such relationships. More specifically, supply chain financial orchestration system 300 can listen to events (such as supply chain events) that occur in supply chain transactions in various external source systems, and can identify internal transactions (such as inter-company transactions and intra-company transactions) based on pre-defined trade relationships. Once the internal transactions are identified, supply chain financial orchestration system 300 can create necessary accounting and documentation required to be generated for the internal transactions according to the business rules defined in supply chain financial orchestration system 300.

According to the illustrated embodiment, supply chain financial orchestration system 300 includes event mediator 301, event capture 302, event manager 303, orchestration service 304, execution manager 305, task layer service 306, external interface layer service 307, connector service 308, and callback service 309. Event mediator 301 listens for events generated by an external source system (i.e., application) of external source systems (i.e., applications) 310. If an event is of interest to supply chain financial orchestration system 300, event mediator 301 can also call a web service exposed by the external source system of external source systems 310 to enrich the event details. Event mediator 301 then sends the event to event capture 302. Event capture 302 validates the event details retrieved after enrichment, and stores the event in an external source system format.

Subsequently, event manager 303 identifies a source document enrichment web service based on a source order type, and calls the source document enrichment web service for enrichment. The source document enrichment service is exposed by an external source system of external source systems 310 where the source order originated. Event manager 303 can pass a source document identifier as an input parameter to the enrichment web service and can retrieve the source document information, where a source document identifier is a unique identifier of the source document that is communicated to the external source system of external source systems 310. The external source system of external source systems 310 that is responsible for capturing the physical transaction can be responsible for passing the source document identifier as part of event information. Supply chain financial orchestration system 300 can maintain an association between a supply chain event and a source document type. Event manager 303 can further transform the source document information into a format that is understandable by supply chain financial orchestration system 300, and can identify a supply chain financial orchestration flow based on qualifiers, source document type, physical route, parties involved in an internal trade, and a priority of the supply chain financial orchestration flow. Further, a supply chain financial orchestration flow can be date effective. This means that any modification to a supply chain financial orchestration flow can cause a new effective date to be associated with the supply chain financial orchestration flow. Thus, transactions pertaining to a source document created before the effective date of the modification can be associated with the original supply chain financial orchestration flow, and transactions pertaining to a source document created after the effective date of the modification can be associated with the modified supply chain financial orchestration flow.

Orchestration service 304 verifies whether a supply chain financial orchestration flow is already assigned to a source document or not. If the supply chain financial orchestration flow is not already assigned, orchestration service 304 can assign the supply chain financial orchestration flow to the source document, and can generate the tasks that are to be performed between internal entities based on the documentation and accounting rules setup for the supply chain financial orchestration flow (such as a global procurement flow, a customer shipment flow, and an internal transfer flow). A global procurement flow is a supply chain financial orchestration flow where a central buying entity buys goods from suppliers on behalf of one or more internal entities. The supplier liability is borne by the purchasing entity. The purchasing and requesting entity settle the transaction among themselves using a transfer price (sometimes through one or more intermediary entities). A customer shipment flow is a supply chain financial orchestration flow in which a selling business unit is different from a profit center business unit of the entity that owns and ships the goods. The selling entity receives an order from a customer, and the shipping entity ships the goods directly to the customer. The shipping entity is settled financially by the selling entity (sometimes through one or more intermediary entities). A customer shipment flow can be an internal drop shipment flow, which is a forward customer shipment flow, or a customer drop shipment flow, or a return customer shipment flow. An internal transfer flow is a supply chain financial orchestration flow in which physical movement of goods happens between internal entities. The internal entities settle the financial transactions among themselves using a transfer price.

The tasks that are to be performed can be specific to a forward flow and a return flow for the supply chain financial orchestration flow. A forward flow is a flow of events that proceeds in a specific direction (such as from a supplier entity to a purchaser entity), and a return flow is a flow of events that proceeds in a reverse direction (such as from a purchaser entity to a supplier entity). In addition to ownership transfer between internal entities, events indicating ownership transfer from a supplier entity to a purchasing entity can also be setup in a supply chain financial orchestration flow definition. When an event designated as a supplier ownership change event occurs, orchestration service 304 can generate the tasks for creating trade distributions to book supplier accrual and costs in a costing system, as well. Execution manager 305 invokes a task layer service based on a task type. Generally, the tasks are performed in a defined sequence, and if there is any dependency from a previous task, execution manager 305 can wait for the previous task to complete. Example task types can include inter-company trade documents (e.g., purchase order and sales order), trade distribution tasks related to costing, inter-company receivable invoices related to inter-company receivable, payables invoice, or credit memo tasks that are set in documentation and accounting rules. Task types can also include user-defined tasks.

Task layer service 306 creates a task layer service payload. Task layer service 306 can include logic to populate the payload data depending on a global procurement flow, a customer shipment flow, or an internal transfer flow. Task layer service 306 can also call a transfer price service to get a transfer price, where the transfer price is a price in which a selling entity sells goods to a purchasing entity, where the selling entity and the purchasing entity are involved in an internal trade. External interface layer service 307 identifies a target system (i.e., application) of target systems (i.e., applications) 320, and obtains a connector service (e.g., connector service 308) for the target system of target systems 320 based on the task type. Connector service 308 transforms the task layer service payload into a format which is understandable by the target system of target systems 320. Once the task data is transformed according to a target system format, connector service 308 calls a web service to interface tasks in interface tables of the target system of target systems 320. Callback service 309 receives responses from the target system of target systems 320 and updates the task status. If the task is a last task in a sequence, then the supply chain financial orchestration is complete. Otherwise, the next task in the sequence is selected, and execution manager 305 is invoked with the task type.

Supply chain financial orchestration system 300 further includes a supply chain financial orchestration work area 330 that includes a plurality of user interfaces that allow a user to interact with supply chain financial orchestration system 300. Supply chain financial orchestration work area 330 includes manage event exceptions 331, confirm financial orchestration route assignments 332, and monitor financial orchestration execution 333. Manage event exceptions 331 is a user interface that allows users to view, troubleshoot, and manage events which faulted due to a setup or technical reason. Confirm financial orchestration route assignments 332 is a user interface that allows a user to confirm a supply chain financial orchestration flow before the tasks of the supply chain financial orchestration flow are initiated by orchestration service 304. Monitor financial orchestration execution 333 is a user interface that allows a user to monitor supply chain financial orchestration flows that are in progress, that have not started, and that have completed.

In one embodiment, a supply chain financial orchestration system can have the capability of defining rules for a financial route selection by providing a qualifier rule. The qualifier rule can be evaluated, and can provide a highest priority financial route for the supply chain financial orchestration system. More specifically, an agreement that is defined by a user can define a financial route along with one or more buy/sell terms, one or more pricing rules, and/or one or more documentation and accounting rules to be used for an internal transactions. A user may wish to identify a suitable agreement based on different business parameters, such as supplier, item category, entity, etc. For example, a user may wish to use "Agreement A" for item category "Electronics" and "Agreement B" for item category "Machinery." Thus, these business parameters can act as qualifiers for agreement identification. According to the embodiment, a qualifier rule can be defined and attached to an agreement. During an execution of a supply chain financial orchestration flow, one or more agreements that are defined for a pair of buying and selling entities of a transaction can be identified, and the one or more qualifier rules attached to the one or more identified agreements can be evaluated, and the appropriate agreement to be used for the transaction can be identified and selected. Without qualifier rules, it can be very difficult to identify an agreement for different combinations of business parameters, and it could require the customization of the source code, including "hard-coding" the agreement usage for different set of business parameters. Qualifier rules can make the process of associating an agreement with a supply chain financial orchestration flow easier.

Additionally, in one embodiment, a supply chain financial orchestration system can orchestrate tasks of a supply chain financial orchestration flow based on a defined date effective setup (i.e., a defined effective start date and a defined effective end date). More specifically, different objects (such as transfer pricing rules or tasks) can be defined in a date effective manner (i.e., defined with an effective start date and an effective end date) within an agreement. A modification to the object (e.g., transfer pricing rule or task) can be made independently for any particular date range without affecting the other objects. Once setup data is identified for a source document, the same setup data can be used for the events arising for that source document, irrespective of the changes made to the setup data after the first event arrival.

For example, when a trigger event arises, an appropriate agreement and tasks for the agreement can be identified for a specified date associated with the event within a table, as shown below:

| Task Name | Effective Start Date | Effective End Date |
|---|---|---|
| T1 | 1 Jan. 2010 | 31 Dec. 2012 |
| T2 | 1 Jan. 2010 | 31 Dec. 2012 |
| T3 | 1 Jan. 2010 | 31 Dec. 2012 |

In the example, an event can be received with a date of "1 Feb. 2010" for a purchase order document, "PO111." The tasks to be performed are tasks T1, T2, and T3. As shown above, one or more entries can be made in the table for a source document, and the effective date can be used for identifying the tasks. The effective date can then be used to identify the tasks when further events are triggered for that source document. This can ensure that when a setup is changed, future events for the source document will use the already-identified effective date, select the tasks corresponding to the appropriate date range that includes the effective date, and orchestrate the tasks.

In the above example, if an entity needs to additionally perform task T0 for new purchase order documents created in 2011 and onwards, but continue to only perform tasks T1, T2, and T3 for older purchase order documents created in 2010 or earlier, the table can be modified as follows:

| Task Name | Effective Start Date | Effective End Date |
|---|---|---|
| T0 | 1 Jan. 2011 | 31 Dec. 2012 |
| T1 | 1 Jan. 2010 | 31 Dec. 2012 |
| T2 | 1 Jan. 2010 | 31 Dec. 2012 |
| T3 | 1 Jan. 2010 | 31 Dec. 2012 |

When another event is received for the purchase order document, "PO111," on Feb. 1, 2011, the supply chain financial orchestration system can refer to the previous entry that was made for the purchase order document, "PO111," select the effective date as "1 Feb. 2010," and only perform the tasks T1, T2, and T3. If an event is received for a new purchase order document, "PO222," on Feb. 1, 2011, then tasks T0, T1, T2, and T3 can be performed. Further, one or more task layer services that prepare a payload can also refer to the effective date indicated in the table, and select the data for the appropriate date range. Thus, a date effectivity feature can assist a user in adding or removing transfer pricing rules or tasks for any given date range. Without this feature, it is very difficult for a user to specify different sets of transfer pricing rules and/or tasks for an agreement with different date ranges. Thus, the date effectivity feature can help a user configure a setup in accordance with modifications to business requirements.

Further, in one embodiment, a supply chain financial orchestration system can provide objects (such as transfer pricing rules or tasks) with both date effectivity and multiple language support ("MLS"). Thus, the supply chain financial orchestration system can enable a user to create multilingual objects that also extend the date effectivity behavior previously described. By extending the date effectivity behavior into MLS-enabled attributes, the supply chain financial orchestration system can keep track of modifications to MLS-enabled attributes. The supply chain financial orchestration system can enable support for date effective operations, such as "Create," "Retrieve," "Insert," "Correct," "End Date," and "Delete," as well as operations, such as import and export of setup date between systems. By utilizing this framework, a user can enable date effective behavior for MLS entities. Without this framework, a user would likely have to manually create source code to support date effective operations for translatable attributes, or would have to drop either the date effectivity behavior or the MLS-enabled attributes.

According to an embodiment, as previously described, a supply chain financial orchestration system can configure one or more supply chain events as task generating events that indicate tasks to be executed. An example of a task generating event is an ownership change event that indicates an ownership change of an item from a first entity to a second entity for an internal transaction associated with a supply chain financial orchestration flow. The one or more supply chain events can be pre-defined events, where the supply chain events are defined by the supply chain financial orchestration system. For example, for a global procurement flow: an advanced shipment notice event can be defined to indicate that goods are shipped or are ready for shipment or delivery; a purchase order ("PO") receipt event can be defined to indicate receipt of goods at a warehouse, or a fulfillment of a service against a PO; a return to vendor event can be defined to indicate a return of goods to a supplier; and an accounts payable ("AP") invoice match can be defined to indicate a receipt and booking of an invoice received from a supplier. For a customer shipment flow: a sales order ("SO") shipment event can be defined to indicate a shipment of goods against a sales order; and a return material authorization ("RMA") receipt event can be defined to indicate a receipt of goods returned by a customer against an RMA. For an internal transfer flow: an internal shipment event can be defined to indicate a shipment of goods from one internal location (such as a warehouse) to another internal location against an internal transaction or a transfer order; and an internal receipt event can be defined to indicate a receipt of goods against an internal transaction or a transfer order. In alternate embodiments, other supply chain events can be configured as ownership change events by the supply chain financial orchestration system. Another example of a task generating event is a documentation creation event that indicates a creation of one or more documents. The documentation creation event can trigger the creation of one or more documents.

FIG. 3-4 illustrates an example user interface 400 for defining a supply chain event type, according to an embodiment of the invention. According to an embodiment, in addition to pre-defined supply chain events, a supply chain financial orchestration system can support creation of user-defined supply chain event types. A supply chain event type is an event definition that can be used by the supply chain financial orchestration system to create one or more instances of the supply chain event type (i.e., one or more supply chain events). Further, a user-defined supply chain event type is a supply chain event type that can be created by a user of a supply chain financial orchestration system, rather than by the supply chain financial orchestration system itself.

According to the illustrated embodiment, a user-defined event type can be defined to include a code using code window 410, where a code is a unique identifier of the user-defined event type. Further, a user-defined event type can be defined so that instances of the user-defined event type can be used in either a forward flow or a return flow of a supply chain financial orchestration flow using flow type 420. Instances of the user-defined event type can also be defined to be used in one or more supply chain financial orchestration flow types (identified in FIG. 3-4 as "business process types") using business process type window 430. Example supply chain financial orchestration flow types include a global procurement flow (identified in FIG. 3-4 as "Procurement"), an internal drop shipment flow (identified in FIG. 3-4 as "Shipment"), a customer drop shipment flow (identified in FIG. 3-4 as "Dropship"), or an internal transfer flow (identified in FIG. 3-4 as "Internal Transfer").

FIG. 3-5 illustrates an example user interface 500 for assigning a sequence number to a supply chain event type, according to an embodiment of the invention. According to the embodiment, one or more supply chain events (where the one or more supply chain events can be instances of a supply chain event type) that are used in a supply chain financial orchestration flow can be assigned to a unique sequence number which specifies the order in which the one or more supply chain events occur in the supply chain financial orchestration flow. For example, a receipt against a purchase order event is generally expected to occur after an advance shipment notice event is sent by a supplier. In a scenario where a supply chain financial orchestration system receives a supply chain event before receiving the supply chain event's predecessor supply chain event (generally due to technical reasons), the use of the unique sequence number allows the supply chain financial orchestration system to wait for the predecessor supply chain event to be interfaced before processing the subsequent supply chain event.

According to the illustrated embodiment of FIG. 3-5, user interface 400 can further include sequence number window 440. As illustrated in FIG. 3-5, user interface 400 can display a similar sequence number window for each supply chain financial orchestration flow type that the user-defined supply chain event type is associated with. Using sequence number window 440 (or a similar sequence number window for a different supply chain financial orchestration flow type), a user can assign a unique sequence number to the user-defined supply chain event type for a supply chain financial orchestration flow type, where the unique sequence number defines when instances of the user-defined supply chain event type occur with respect to instances of other supply chain event types defined for the supply chain financial orchestration flow type. Further, as illustrated in FIG. 3-5, user interface 500 can be displayed to indicate the supply chain event types associated with the supply chain financial orchestration flow type, and the sequence number assigned to each supply chain event type.

FIG. 3-6 illustrates an example supply chain financial orchestration flow, according to an embodiment of the invention. As previously described, an accounting of ownership transfers are generally tied to a physical transaction. For example, a liability to a supplier can be recognized in a buyer's books when goods are received in the buyer's warehouse. However, as also previous described, in an international trade, generally, an ownership transfer between entities may not necessarily occur on receipt of goods at the destination. For example, the ownership may be transferred to the buyer when the goods have crossed an international border. Accounting principles mandate that the account books be updated to reflect the actual ownership changes. Thus, in this example, the financial flow deviates from the physical flow.

The example supply chain financial orchestration flow illustrated in FIG. 3-6 is another example of a separation of a physical flow from a financial flow. According to the illustrated embodiment, the supply chain financial orchestration flow includes business flow 610, physical flow 620, financial flow 630, and documentation flow 640. Business flow 610, physical flow 620, financial flow 630, and documentation flow 640 each represent a different type of event flow.

Business flow 610 is an event flow that includes one or more business events. According to the illustrated embodiment, a business group headquartered in Ireland has legal entities registered in Ireland, China, and Germany. A manufacturing business unit in Hamburg, Germany belongs to the Germany legal entity. A business unit performing procurement functions for the business group belongs to the China legal entity. All purchases sourced from China can be required to be procured through the China legal entity. Thus, a requisition placed for demand of supplies in the Hamburg manufacturing business unit (illustrated in FIG. 3-6 as Germany business unit 613), when identified to be procured from China, is picked up by the procurement business unit in China (illustrated in FIG. 3-6 as China business unit 612). The procurement business unit in China (i.e., China business unit 612) creates a purchase order and sends the purchase order to a supplier in China (illustrated in FIG. 3-6 as supplier 611), instructing the supplier in China (i.e., supplier 611) to ship the goods to the Hamburg manufacturing business unit (i.e., Germany business unit 613). The business group's supply chain policies, in order to achieve tax efficiency, can mandate that all intercompany flows are to be routed through the group headquarters in Ireland.

Physical flow 620 is an event flow that includes one or more physical events. According to the illustrated embodiment, once the goods are ready for shipment, the supplier hands over the goods to the buyer's shipping agent to ship the goods to Hamburg through sea. The supplier sends an advance shipment notice to the buyer, the China legal entity, before shipment. The supplier also generates an invoice and sends the invoice to the China legal entity for payment. Thus, as illustrated in FIG. 3-6, significant physical events, such as the shipping of the goods from the supplier's warehouse (illustrated in FIG. 3-6 as physical event 621), the loading of the goods at the Shanghai port (illustrated in FIG. 3-6 as physical event 622), the unloading of the goods at the Hamburg port (illustrated in FIG. 3-6 as physical event 623), and delivery of the goods at the Hamburg warehouse (illustrated in FIG. 3-6 as physical event 624), occur during the transportation of the goods from the supplier's warehouse in China to the warehouse in Hamburg, Germany.

Financial flow 630 is an event flow that includes one or more ownership change events. According to the illustrated embodiment, the ownership of the goods is transferred from the supplier to the China legal entity when the goods are shipped out of the supplier's warehouse (illustrated in FIG. 3-6 as ownership change event 631, where ownership change event 631 corresponds to physical event 621). At this point in time, the China legal entity entities to the ownership of the goods and also is liable to play the supplier. The ownership of the goods is subsequently transferred from the China legal entity to the Ireland legal entity when the goods arrive in the Shanghai port (illustrated in FIG. 3-6 as ownership change events 632 and 633, where ownership change events 632 and 633 correspond to physical event 622). At this point in time, the China legal entity can account for the revenue and the cost of the goods sold to the Ireland legal entity in its accounting books. Further, at this point in time, the Ireland legal entity entitles the goods and also is liable to pay the China legal entity. The ownership of the goods is subsequently transferred from the Ireland legal entity to the Germany legal entity when the goods are received in the Germany warehouse (illustrated in FIG. 3-6 as ownership change events 634 and 635, where ownership change events 634 and 635 correspond to physical event 624). At this point in time, the Ireland legal entity can account for the revenue and the cost of goods sold to the Germany legal entity in its accounting books. Further, at this point in time, the Germany legal entity entitles the goods and also is liable to pay the Ireland legal entity. Thus, the different aspects the ownership transfer of goods, such as the cost, revenue, receivables and payables, can be booked in the accounting books of the parties involved in the trade at the appropriate point in time.

Documentation flow 640 is an event flow that includes one or more documentation creation events. In a transaction involving ownership transfer, receivable and payable invoices can be generated and booked in both seller's and buyer's accounting books, usually at a time of ownership transfer. However, there can also be a need for additional documents to be generated, such as shipping documents that can be created by different entities before, or after, ownership transfer.

According to the illustrated embodiment, all trade involving the China legal entity can be backed by documentation, such as purchase orders and/or sales orders. Thus, a sales order document is generated by the China legal entity with the Ireland legal entity as customer when the goods are shipped out of the supplier's warehouse in China (illustrated in FIG. 3-6 as documentation creation event 641, where documentation creation event 641 corresponds to physical event 621). At the same time, a purchase order document is generated by the Ireland legal entity with the China legal entity as the supplier (illustrated in FIG. 3-6 as documentation creation event 643, where documentation creation event 643 also corresponds to physical event 621). The sales order and purchase order documents may be required to be generated right at the time of shipment before the actual ownership transfer happens between the China legal entity and the Ireland legal entity, since these documents can become the documents based on which shipping documents and/or other financial documents are generated. Additionally, if shipping documents are required, at the same time, one or more shipping documents can be generated (illustrated in FIG. 3-6 as documentation creation event 642, where documentation creation event 642 also corresponds to physical event 621).

Further, a receivables invoice to the Ireland legal entity is generated and an invoice payment to the China legal entity is also generated when the goods are loaded at the Shanghai port (illustrated in FIG. 3-6 as documentation creation events 644 and 645, where documentation creation events 644 and 645 correspond to physical event 622). Additionally, the unloading of the goods at the Hamburg port may require the generation of customs documents. In this scenario, one or more customs documents can be generated (illustrated in FIG. 3-6 as documentation creation event 646, where documentation creation event 646 corresponds to physical event 623). Finally, a receivables invoice to the Germany legal entity is generated and an invoice payment to the Ireland legal entity is also generated when the goods are received at the Germany warehouse (illustrated in FIG. 3-6 as documentation creation events 644 and 645, where documentation creation events 644 and 645 correspond to physical event 622).

Thus, the orchestration of supply chain financial orchestration flows involving multiple business units can require that the supply chain financial orchestration system identify the different events and trigger the ownership change accounting and financial documentation creation at the appropriate time. In order to effectuate such identifying and triggering, one or more supply chain events can be configured as ownership change events and/or documentation creation events, as is described below in greater detail.

FIG. 3-7 illustrates an example user interface 700 for configuring a supply chain event as an ownership change event by defining a documentation and accounting rule, according to an embodiment of the invention. A documentation and accounting rule is a rule that can define one or more tasks to be performed in response to a supply chain event. According to the embodiment, a supply chain event can be configured as a task generating event within the documentation and accounting rule, where the task generating event triggers the execution of the one or more tasks. Thus, when a supply chain financial orchestration system receives a supply chain event that can be raised as part of a transaction associated with a supply chain financial orchestration flow, and applies the documentation and accounting rule, the supply chain financial orchestration system can determine that the supply chain event is the task generating event and execute the one or more tasks. The documentation and accounting rule can be defined as part of an agreement (also identified as a "buy and sell term"), where the agreement is defined between two entities, and where the agreement associated with the supply chain financial orchestration flow. In one embodiment, the task generating event can be an ownership change event, and the one or more tasks can be financial tasks that effect an ownership change of an item from a first entity to a second entity. In another embodiment, the task generating event can be a documentation creation event, and the one or more tasks can be tasks that create one or more documents (such as a purchase order, a sales order, or a customs invoice) either prior to, or subsequent to, an ownership change of the item from the first entity to the second entity.

According to the illustrated embodiment, one or more supply chain events can be defined as task generating events using task generating event window 710. Each supply chain event can be defined as a task generating event for a supply chain financial orchestration flow type (i.e., business process type). Example supply chain financial orchestration flow types include a global procurement flow (identified in FIG. 3-7 as "Procurement"), an internal drop shipment flow (identified in FIG. 3-7 as "Shipment"), a customer drop shipment flow (identified in FIG. 3-7 as "Drop Ship"), or an internal transfer flow (identified in FIG. 3-7 as "Internal Transfer"). Further, according to the illustrated embodiment, one or more task generating events can be grouped into a task group using task group window 720. A task group is a collection of one or more logically-related tasks, where the one or more logically-related tasks may need to be executed upon a reception of a supply chain event. Example task groups can include "Purchase Order & Sales Order" and "Trade Distributions & Intercompany Invoices." The task group "Purchase Order & Sales Order" can include the tasks "Purchase Order" and "Sales Order." Further, the task group "Trade Distributions & Intercompany Invoices" can include the tasks "Trade In-transit Issue," "Trade Receipt Accrual," "Trade In-transit Receipt," "Intercompany AR Invoice," and "Intercompany AP Invoice." As is described below in greater detail in conjunction with FIG. 3-7, a user can further create one or more user-defined tasks, and can assign the user-defined tasks to pre-defined task groups or user-defined task groups.

Also according to the illustrated embodiment, one or more supply chain events can be defined as task generating events for a forward flow using forward flow tab 730, and an additional set of one or more supply chain events can be defined as task generating events for a return flow using return flow tab 740. As previously described, a supply chain financial orchestration flow can include a forward flow and a return flow, where a forward flow is a flow of events that proceeds in a specific direction (such as from a supplier entity to a purchaser entity), and where a return flow is a flow of events that proceeds in a reverse direction (such as from a purchaser entity to a supplier entity).

In one embodiment, a documentation and accounting rule that is defined using user interface 700 can be defined to be date effective, using effective date window 750. A date effective object (e.g., a date effective documentation and accounting rule) is an object that has attributes whose values change over time. The date effective object can retain a complete history of all modifications and the time periods during which each modification is available for use in transactions. In other words, "date effective" allows users to make modifications to an object (e.g., documentation and accounting rule) that can take effect in the future. Thus, for a date effective documentation and accounting rule, any modifications to the date effective documentation and accounting rule can be created with an effective date for the modification. Transactions associated with new source documents created after an effective date can utilize the modified documentation and accounting rule to identify a supply chain event as a task generating event and to execute one or more tasks, while transactions associated with original source documents created before the effective date can utilize the original documentation and accounting rule to identify a supply chain event as a task generating event and to execute one or more tasks. A supply chain financial orchestration system, when deriving the documentation and accounting rules for identifying a supply chain event as a task generating event and for executing one or more tasks, can retrieve the documentation and accounting rules that are effective as of an effective date for a source document.

FIG. 3-8 illustrates an example user interface 800 for defining one or more tasks for a documentation and accounting rule, according to an embodiment of the invention. According to the illustrated embodiment, a user can select a task group within user interface 700 of FIG. 3-7, and cause user interface 800 to be displayed. User interface 800 displays one or more tasks of the task group, and further displays whether each task is pre-defined or user-defined. A user can add one or more new tasks to the task group, or can delete one or more existing tasks from the task group.

FIG. 3-9 illustrates an example user interface 900 for configuring a supply chain event as a supplier ownership change event, according to an embodiment of the invention. As previously described, in addition to ownership transfer between internal entities, events indicating ownership transfer from a supplier entity to a purchasing entity can also be configured within an agreement that is defined for a supply chain financial orchestration flow. When an event designated as a supplier ownership change event occurs, a supply chain financial orchestration system can generate the tasks for creating trade distributions to book supplier accrual and costs in a costing system. According to the illustrated embodiment, one or more supply chain events can be defined as supplier ownership change events using supplier ownership change event window 910. Each supply chain event can be defined as a supplier ownership change event for a supply chain financial orchestration flow type (i.e., business flow type). Further, a supply chain event can be defined as a supplier ownership change event for a forward flow, and a separate supply chain event can be defined as a supplier ownership change event for a return flow.

FIG. 3-10 illustrates a block diagram of an event framework 1000 that receives and processes supply chain events, according to an embodiment of the invention. According to the embodiment, an execution of a supply chain financial orchestration flow can produce supply chain events (illustrated in FIG. 3-10 as supply chain events 1010). As previously described, a supply chain event is an event that occurs in a process of execution of a supply chain financial orchestration flow. A supply chain financial orchestration system can listen for occurrences of these supply chain events. More specifically, a supply chain financial orchestration system can receive a supply chain event by one of the following three methods: (1) receiving a supply chain event through a business event that is raised within an event delivery network (illustrated in FIG. 3-10 as business events 1020) at an event mediator service (illustrated in FIG. 3-10 as event mediator 1030), where the business event is raised by an external application; (2) receiving a supply chain event through a direct service invocation from an event interface (illustrated in FIG. 3-10 as event interface 1040) at an event capture service (illustrated in FIG. 3-10 as event capture 1050); or (3) receiving a manually created supply chain event (illustrated in FIG. 3-10 as manual events 1060) at the event capture service. In certain embodiments, event mediator 1030 of FIG. 3-10 is identical to event mediator 301 of FIG. 3-3. Further, in certain embodiments, event capture 1050 of FIG. 3-10 is identical to event capture 302 of FIG. 3-3.

With respect to (1), an event delivery network is a middleware component that utilizes a publish-subscribe model to push business events to one or more subscribers. A business event is a one-way, asynchronous event used to send a notification of a business occurrence, where a publisher does not rely on any specific service component receiving the business event to complete. An event-driven language is a schema that can be used to build one or more business event definitions, where a business event is an instance of a business event definition. In one embodiment, the event-driven language can include a JAVA® package name and a payload definition. According to the embodiment, an external application raises one or more business events. The raised business events are then published to an event delivery network. The event delivery network can run within every service-oriented architecture ("SOA") instance. The raised business events are then delivered by the event delivery network to one or more subscribing service components. One or more event mediator services (such as event mediator 1030 of FIG. 3-10), and optionally one or more business process execution language ("BPEL") services, can subscribe to, and publish, the raised business events. According to the embodiment, the publisher (e.g., the external application) does not care if any other service components receive the business events, and is not required to know where the other subscribers (if any) are, or what the other subscribers do with the data contained within the raised business events.

Further, with respect to (1), supply chain events that are raised as business events within the event driven network are received by an event mediator service (illustrated in FIG. 3-10 as event mediator 1030), which subscribes to business events raised within the event driven network. Once these supply chain events are received, if the supply chain events are configured as task generating events, one or more web services of the source application (illustrated in FIG. 3-10 as event interface 1040) are called in order to get additional information required to process the supply chain events.

With respect to (2), a direct service invocation, unlike a business event, relies on a web services description language ("WSDL") file contract, such as a simple object access protocol ("SOAP") service client. If an author of a supply chain event depends on a receiver of the supply chain event, then the messaging is typically accomplished through a service invocation rather than through a business event. Unlike a business event, a direct service invocation does not separate an author of a supply chain event from a receiver. Thus, supply chain events that are raised as direct service invocations to an event capture service (illustrated in FIG. 3-10 as event capture 1050) are received by the event capture service. The event capture service then determines whether the supply chain events are configured as task generating events. The event capture service subsequently processes the supply chain events when the supply chain events are determined to be configured as task generating services.

With respect to (3), manual supply chain events are received by the event capture service (illustrated in FIG. 3-10 as event capture 1050). The event capture service then determines whether the supply chain events are configured as task generating events. The event capture service subsequently processes the supply chain events when the supply chain events are configured as determined to be task generating services. Manual supply chain events are further described below in greater detail in conjunction with FIG. 3-10.

Subsequently, the supply chain events that are received according to one of the aforementioned three methods are populated in a table of a database (illustrated in FIG. 3-10 as events table 1070 of FIG. 3-10). The supply chain events are then available for processing by one or more downstream processes.

FIG. 3-11 illustrates an example user interface 1100 for manually creating an ownership change event, according to an embodiment of the invention. In addition to the aforementioned methods for automatic interface of supply chain events to a supply chain financial orchestration system, user interface 1100 is provided that allows a user to manually create a supply chain event (specifically, an ownership change event) by manually entering details of the supply chain event, and manually submitting the supply chain event to an event capture service. According to the illustrated embodiment, examples of event details include: an event identifier, an event date, an event source system, a trade event type, a source order system, and a source order type. User interface 1100 can be used for a type of supply chain event that rarely occurs, and thus, building and maintaining an automatic interface could be relatively expensive. User interface 1100 can also be used to update a supply chain financial orchestration system with supply chain events that were lost in an automatic interface due to technical reasons.

FIG. 3-12 illustrates an example user interface 1200 for managing supply chain event exceptions, according to an embodiment of the invention. According to the embodiment, user interface 1200 is a workbench that can be provided by a supply chain financial orchestration system in order for a user to view supply chain events that raised one or more exceptions due to technical or functional reasons. Such situations where an exception can be raised include: (a) event data validation failure; (b) unavailability of a service; or (c) absence of an eligible supply chain financial orchestration flow that is configured by a user. User interface 1200 can further provide an option to submit a supply chain event that raised one or more exceptions for re-processing.

FIG. 3-13 illustrates a flow diagram of the functionality of a supply chain financial orchestration event module (such as supply chain financial orchestration event module 16 of FIG. 3-1), according to an embodiment of the invention. In one embodiment, the functionality of the flow diagram of FIG. 3-13 is implemented by software stored in memory or other computer-readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

The flow begins and proceeds to 1310. At 1310, a supply chain event type is defined. A supply chain event type is an event definition that can be used to create one or more instances of the supply chain event type (i.e., one or more supply chain events). A supply chain event is an event that occurs in a process of execution of a supply chain financial orchestration flow. A supply chain event can be a physical event, such as a shipment of goods, a transit of goods in a named port or other destination, or a receipt of goods at a delivery location. A supply chain event can also be a non-physical event, such as a receipt or dispatch of a commercial invoice, a customs clearance at a port of entry, or a confirmation of a fulfillment of a service. In some embodiments, the supply chain event type is defined by a supply chain financial orchestration system. In other embodiments, the supply chain event type is user-defined. A user-defined supply chain event type is a supply chain event type that can be defined by a user of a supply chain financial orchestration system, rather than by the supply chain financial orchestration system itself. Further, a supply chain financial orchestration flow defines a trade relationship between a first entity and a second entity. In certain embodiments, the supply chain financial orchestration flow can be an internal transaction, the first entity can be a first internal entity, and the second entity can be a second internal entity. The flow then proceeds to 1320.

At 1320, a supply chain event of the supply chain event type is configured as a task generating event, where the task generating event indicates that one or more tasks that are defined for the supply chain financial orchestration flow are to be executed. In certain embodiments, the task generating event can be an ownership change event, where the ownership change event indicates an ownership change of an item from the first entity to the second entity. In some of these embodiments, the ownership change event can be a supplier ownership change event, where the first entity can be an internal entity, and the second entity can be an external entity. In other embodiments, the task generating event can be a documentation creation event, where the documentation creation event indicates a creation of one or more documents.

In certain embodiments, in order to configure the supply chain event as the task generating event, the following actions are performed. First, an agreement associated with the supply chain financial orchestration flow is defined. Next, a documentation and accounting rule for the agreement is defined. Subsequently, the one or more tasks are defined for the documentation and accounting rule. Next, the one or more tasks are grouped into a task group. Finally, the supply chain event is defined as a task generating event for the task group.

In some of these embodiments, where the supply chain financial orchestration flow includes a forward flow and a return flow, in order to configure the supply chain event as the task generating event, the following actions are also performed. First, a forward flow and a return flow are defined for the documentation and accounting rule. Next, one or more tasks are defined for the forward flow, and one or more tasks are defined for the return flow. Subsequently, one or more tasks are grouped for the forward flow and one or more tasks are grouped for the return flow. Finally, the supply chain event is defined as the task generating event for both the forward flow and the return flow.

Further, in some of these embodiments where there are multiple supply chain financial orchestration flows, in order to configure the supply chain event as the task generating event, the following actions are also performed. First, a plurality of supply chain financial orchestration flows are defined for the documentation and accounting rule. Next, one or more tasks are defined for each supply chain financial orchestration flow. Subsequently, one or more tasks of each supply chain financial orchestration flow are grouped into a supply chain financial orchestration flow task group. Finally, the supply chain event is defined as the task generating event for each supply chain financial orchestration flow task group. The flow then proceeds to 1330.

At 1330, a supply chain event is received, where the supply chain event is associated with the supply chain financial orchestration flow. Once the supply chain event is received, it is determined whether the supply chain event is a task generating event. The flow then proceeds to 1340.

At 1340, if the supply chain event is a task generating event, the one or more tasks that are defined for the supply chain financial orchestration flow are executed. In embodiments where the task generating event is an ownership change event, the one or more tasks can include one or more financial tasks that change the ownership of the item from the first entity to the second entity. In some of these embodiments, at least one of the financial tasks can perform accounting based on the ownership change of the item from the first entity to the second entity. In other embodiments where the task generating event is a documentation creation event, the one or more tasks can include one or more tasks that create one or more documents. The flow then ends.

Thus, in one embodiment, a supply chain financial orchestration system can allow a user to configure one or more supply chain events as task generating events, such as ownership change events or documentation creation events. This provides added flexibility in configuring a supply chain financial orchestration flow, as a user can select a supply chain event from multiple supply chain events to define as a task generating event, or even define his or her own user-defined supply chain event as a task generating event. Thus, the supply chain financial orchestration system can provide for a more robust configuration of a supply chain f low.

The features, structures, or characteristics of the invention described throughout this specification may be combined in any suitable manner in one or more embodiments. For example, the usage of "one embodiment," "some embodiments," "certain embodiment," "certain embodiments," or other similar language, throughout this specification refers to the fact that a particular feature, structure, or characteristic described in connection with the embodiment may be included in at least one embodiment of the present invention. Thus, appearances of the phrases "one embodiment," "some embodiments," "a certain embodiment," "certain embodiments," or other similar language, throughout this specification do not necessarily all refer to the same group of embodiments, and the described features, structures, or characteristics may be combined in any suitable manner in one or more embodiments.

One having ordinary skill in the art will readily understand that the invention as discussed above may be practiced with steps in a different order, and/or with elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

DETAILED DESCRIPTION—SECTION 4

According to an embodiment, a supply chain financial orchestration system is provided that can provide an infrastructure and framework to define supply chain financial orchestration flows, where a supply chain financial orchestration flow defines a trade relationship between a first entity and a second entity. In defining supply chain financial orchestration flows, the supply chain financial orchestration system can manage the internal trade relationships between the first entity and the second entity (where the first entity and the second entity may belong to a large enterprise that can be spread across geographies), by defining the nature of trade relationships, business rules, internal controls, regulatory compliances, and other terms and conditions that can be used to execute, monitor and evaluate transactions emanating out of such trade relationships. The supply chain financial orchestration system can further orchestrate supply chain events that arise out of a transaction associated with the supply chain financial orchestration flow and that are received from external source systems. Through orchestrating the supply chain events, the supply chain financial orchestration system can initiate the execution of tasks associated with the supply chain financial orchestration flow, where the tasks can be executed at external target systems. Thus, given a transaction that involves a specific movement of goods within the supply chain financial orchestration flow, the supply chain financial orchestration system can generate a series of financial movement of goods that can give equitable distribution of the product margin to countries and tax jurisdictions involved in the transaction.

FIG. 4-1 illustrates a block diagram of a supply chain financial orchestration system 10 that may implement one embodiment of the invention. Supply chain financial orchestration system 10 includes a bus 12 or other communications mechanism for communicating information between components of supply chain financial orchestration system 10. Supply chain financial orchestration system 10 also includes a processor 22, operatively coupled to bus 12, for processing information and executing instructions or operations. Processor 22 may be any type of general or specific purpose processor. Supply chain financial orchestration system 10 further includes a memory 14 for storing information and instructions to be executed by processor 22. Memory 14 can be comprised of any combination of random access memory ("RAM"), read only memory ("ROM"), static storage such as a magnetic or optical disk, or any other type of machine or computer-readable medium. Supply chain financial orchestration system 10 further includes a communication device 20, such as a network interface card or other communications interface, to provide access to a network. As a result, a user may interface with supply chain financial orchestration system 10 directly, or remotely through a network or any other method.

A computer-readable medium may be any available medium that can be accessed by processor 22. A computer-readable medium may include both a volatile and nonvolatile medium, a removable and non-removable medium, a communication medium, and a storage medium. A communication medium may include computer readable instructions, data structures, program modules or other data in a modulated data signal such as a carrier wave or other transport mechanism, and may include any other form of information delivery medium known in the art. A storage medium may include RAM, flash memory, ROM, erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

Processor 22 can also be operatively coupled via bus 12 to a display 24, such as a Liquid Crystal Display ("LCD"). Display 24 can display information to the user. A keyboard 26 and a cursor control device 28, such as a computer mouse, can also be operatively coupled to bus 12 to enable the user to interface with supply chain financial orchestration system 10.

According to one embodiment, memory 14 can store software modules that may provide functionality when executed by processor 22. The modules can include an operating system 15, a supply chain financial orchestration flow module 16, as well as other functional modules 18. Operating system 15 can provide an operating system functionality for supply chain financial orchestration system 10. Supply chain financial orchestration flow module 16 can provide functionality for orchestrating a supply chain event, as is described in more detail below. In certain embodiments, supply chain financial orchestration flow module 16 can comprise a plurality of modules that each provide specific individual functionality orchestrating a supply chain event. Supply chain financial orchestration system 10 can also be part of a larger system. Thus, supply chain financial orchestration system 10 can include one or more additional functional modules 18 to include the additional functionality. For example, functional modules 18 may include modules that provide additional functionality, such as one or more "Oracle Fusion Applications" from Oracle Corporation. In another example, functional modules 18 may include enterprise resource planning ("ERP") modules of an ERP system, where an ERP system is a computer system that integrates several data sources and processes of an organization into a unified system.

Processor 22 can also be operatively coupled via bus 12 to a database 34. Database 34 can store data in an integrated collection of logically-related records or files. Database 34 can be an operational database, an analytical database, a data warehouse, a distributed database, an end-user database, an external database, a navigational database, an in-memory database, a document-oriented database, a real-time database, a relational database, an object-oriented database, or any other database known in the art.

FIG. 4-2 illustrates an example supply chain financial orchestration flow, according to an embodiment of the invention. The supply chain financial orchestration flow is between a shipping entity in China and a receiving entity in the United States. As illustrated in FIG. 4-2, the supply chain financial orchestration flow includes a physical movement flow 210 and a financial flow 220. Physical movement flow 210 represents the physical movement of items from the shipping entity in China, to the receiving entity in the United States, and can involve the physical movement through one or more intermediate entities. Physical movement flow 210 can include one or more physical transactions that are executed in association with the physical movement of the items (such as shipments, receipts, etc.). Financial flow 220 represents the change in financial ownership of items from the shipping entity in China, to the receiving entity in the United States, and can involve the change in financial ownership of one or more intermediate entities. Financial flow 220 can include one or more financial transactions that are executed in associate with the change in financial ownership of the items (such as orders, invoices, payments, etc.). As illustrated in FIG. 4-2, a physical movement flow can be separate and independent of a financial flow within a supply chain financial orchestration system.

FIG. 4-3 illustrates a block diagram of an example architecture of a supply chain financial orchestration system 300, according to an embodiment of the invention. According to the embodiment, supply chain financial orchestration system 300 is a configurable system that manages internal trade relationships between entities belonging to an enterprise, where the enterprise is typically spread across geographies. Supply chain financial orchestration system 300 can define a nature of trade relationships, business rules, internal controls, regulatory compliances, and other terms and conditions required to execute, monitor, and evaluate trade transactions emanating out of such relationships. More specifically, supply chain financial orchestration system 300 can listen to events that occur in supply chain transactions in various external source systems, and can identify internal transactions (such as inter-company transactions and intra-company transactions) based on pre-defined trade relationships. Once the internal transactions are identified, supply chain financial orchestration system 300 can create necessary accounting and documentations required to be generated for the internal transactions according to the business rules defined in supply chain financial orchestration system 300.

According to the illustrated embodiment, supply chain financial orchestration system 300 includes event mediator 301, event capture 302, event manager 303, orchestration service 304, execution manager 305, task layer service 306, external interface layer service 307, connector service 308, and callback service 309. Event mediator 301 listens for events generated by an external source system (i.e., application) of external source systems (i.e., applications) 310. If an event is of interest to supply chain financial orchestration system 300, event mediator 301 can also call a web service exposed by the external source system of external source systems 310 to enrich the event details. Event mediator 301 then sends the event to event capture 302. Event capture 302 validates the event details retrieved after enrichment, and stores the event in an external source system format.

Subsequently, event manager 303 identifies a source document enrichment web service based on a source order type, and calls the source document enrichment web service for enrichment. The source document enrichment service is exposed by an external source system of external source systems 310 where the source order originated. Event manager 303 can pass a source document identifier as an input parameter to the enrichment web service and can retrieve the source document information, where a source document identifier is a unique identifier of the source document that is communicated to the external system of external source systems 310. The external source system of external source systems 310 that is responsible for capturing the physical transaction can be responsible for passing the source document identifier as part of event information. Supply chain financial orchestration system 300 can maintain an association between a supply chain event and a source document type. Event manager 303 can further transform the source document information into a format that is understandable by supply chain financial orchestration system 300, and can identify a supply chain financial orchestration flow based on qualifiers, source document type, physical route, parties involved in an internal trade, and a priority of the supply chain financial orchestration flow. Further, a supply chain financial orchestration flow can be date effective. This means that any modification to a supply chain financial orchestration flow can cause a new effective date to be associated with the supply chain financial orchestration flow. Thus, transactions pertaining to a source document created before the effective date of the modification can be associated with the original supply chain financial orchestration flow, and transactions pertaining to a source document created after the effective date of the modification can be associated with the modified supply chain financial orchestration flow.

Orchestration service 304 verifies whether a supply chain financial orchestration flow is already assigned to a source document or not. If the supply chain financial orchestration flow is not already assigned, orchestration service 304 can assign the supply chain financial orchestration flow to the source document, and can generate the tasks that are to be performed between internal entities based on the documentation and accounting rules setup for the supply chain financial orchestration flow (such as a global procurement flow, a customer shipment flow, and an internal transfer flow). A global procurement flow is a supply chain financial orchestration flow where a central buying entity buys goods from suppliers on behalf of one or more internal entities. The supplier liability is borne by the purchasing entity. The purchasing and requesting entity settle the transaction among themselves using a transfer price (sometimes through one or more intermediary entities). A customer shipment flow is a supply chain financial orchestration flow in which a selling business unit is different from a profit center business unit of the entity that owns and ships the goods. The selling entity receives an order from a customer, and the shipping entity ships the goods directly to the customer. The shipping entity is settled financially by the selling entity (sometimes through one or more intermediary entities). A customer shipment flow can be an internal drop shipment flow, which is a forward customer shipment flow, or a customer drop shipment flow, or a return customer shipment flow. An internal transfer flow is a supply chain financial orchestration flow in which physical movement of goods happens between internal entities. The internal entities settle the financial transactions among themselves using a transfer price.

The tasks that are to be performed can be specific to a forward flow and a return flow for the supply chain financial orchestration flow. A forward flow is a flow of events that proceeds in a specific direction (such as from a supplier entity to a purchaser entity), and a return flow is a flow of events that proceeds in a reverse direction (such as from a purchaser entity to a supplier entity). In addition to ownership transfer between internal entities, events indicating ownership transfer from a supplier entity to a purchasing entity can also be setup in a supply chain financial orchestration flow definition. When an event designated as a supplier ownership change event occurs, orchestration service 304 can generate the tasks for creating trade distributions to book supplier accrual and costs in a costing system, as well. Execution manager 305 invokes a task layer service based on a task type. Generally, the tasks are performed in a defined sequence, and if there is any dependency from a previous task, execution manager 305 can wait for the previous task to complete. Example task types can include inter-company trade documents (e.g., purchase order and sales order), trade distribution tasks related to costing, inter-company receivable invoices related to inter-company receivable, payables invoice, or credit memo tasks that are set in documentation and accounting rules. Task types can also include user-defined tasks.

Task layer service 306 creates a task layer service payload. Task layer service 306 can include logic to populate the payload data depending on a global procurement flow, a customer shipment flow, or an internal transfer flow. Task layer service 306 can also call a transfer price service to get a transfer price, where the transfer price is a price in which a selling entity sells goods to a purchasing entity, where the selling entity and the purchasing entity are involved in an internal trade. External interface layer service 307 identifies a target system (i.e., application) of target systems (i.e., applications) 320, and obtains a connector service (e.g., connector service 308) for the target system of target systems 320 based on the task type. Connector service 308 transforms the task layer service payload into a format which is understandable by the target system of target systems 320. Once the task data is transformed according to a target system format, connector service 308 calls a web service to interface tasks in interface tables of the target system of target systems 320. Callback service 309 receives responses from the target system of target systems 320 and updates the task status. If the task is a last task in a sequence, then the supply chain financial orchestration is complete. Otherwise, the next task in the sequence is selected, and execution manager 305 is invoked with the task type.

Supply chain financial orchestration system 300 further includes a supply chain financial orchestration work area 330 that includes a plurality of user interfaces that allow a user to interact with supply chain financial orchestration system 300. Supply chain financial orchestration work area 330 includes manage event exceptions 331, confirm financial orchestration route assignments 332, and monitor financial orchestration execution 333. Manage event exceptions 331 is a user interface that allows users to view, troubleshoot, and manage events which faulted due to a setup or technical reason. Manage event exceptions 331 is further described below in greater detail in conjunction with FIGS. 4-13, 4-14, and 4-15. Confirm financial orchestration route assignments 332 is a user interface that allows a user to confirm a supply chain financial orchestration flow before the tasks of the supply chain financial orchestration flow are initiated by orchestration service 304. Confirm financial orchestration route assignments 332 is further described below in greater detail in conjunction with FIG. 4-16. Monitor financial orchestration execution 333 is a user interface that allows user to monitor supply chain financial orchestration flows that are in progress, that have not started, and that have completed. Monitor financial orchestration execution 333 is further described below in greater detail in conjunction with FIGS. 4-17, 4-18, 4-19, and 4-20.

In one embodiment, a supply chain financial orchestration system can have the capability of defining rules for a financial route selection by providing a qualifier rule. The qualifier rule can be evaluated, and can provide a highest priority financial route for the supply chain financial orchestration system. More specifically, an agreement that is defined by a user can define a financial route along with one or more buy/sell terms, one or more pricing rules, and/or one or more documentation and accounting rules to be used for an internal transactions. A user may wish to identify a suitable agreement based on different business parameters, such as supplier, item category, entity, etc. For example, a user may wish to use "Agreement A" for item category "Electronics" and "Agreement B" for item category "Machinery." Thus, these business parameters can act as qualifiers for agreement identification. According to the embodiment, a qualifier rule can be defined and attached to an agreement. During an execution of a supply chain financial orchestration flow, one or more agreements that are defined for a pair of buying and selling entities of a transaction can be identified, and the one or more qualifier rules attached to the one or more identified agreements can be evaluated, and the appropriate agreement to be used for the transaction can be identified and selected. Without qualifier rules, it can be very difficult to identify an agreement for different combinations of business parameters, and it could require the customization of the source code, including "hard-coding" the agreement usage for different set of business parameters. Qualifier rules can make the process of associating an agreement with a supply chain financial orchestration flow easier.

Additionally, in one embodiment, a supply chain financial orchestration system can orchestrate tasks of a supply chain financial orchestration flow based on a defined date effective setup (i.e., a defined effective start date and a defined effective end date). More specifically, different objects (such as transfer pricing rules or tasks) can be defined in a date effective manner (i.e., defined with an effective start date and an effective end date) within an agreement. A modification to the object (e.g., transfer pricing rule or task) can be made independently for any particular date range without affecting the other objects. Once setup data is identified for a source document, the same setup data can be used for the events arising for that source document, irrespective of the changes made to the setup data after the first event arrival.

For example, when a trigger event arises, an appropriate agreement and tasks for the agreement can be identified for a specified date associated with the event within a table, as shown below:

| Task Name | Effective Start Date | Effective End Date |
|---|---|---|
| T1 | 1 Jan. 2010 | 31 Dec. 2012 |
| T2 | 1 Jan. 2010 | 31 Dec. 2012 |
| T3 | 1 Jan. 2010 | 31 Dec. 2012 |

In the example, an event can be received with a date of "1 Feb. 2010" for a purchase order document, "PO111." The tasks to be performed are tasks T1, T2, and T3. As shown above, one or more entries can be made in the table for a source document, and the effective date can be used for identifying the tasks. The effective date can then be used to identify the tasks when further events are triggered for that source document. This can ensure that when a setup is changed, future events for the source document will use the already-identified effective date, select the tasks corresponding to the appropriate date range that includes the effective date, and orchestrate the tasks.

In the above example, if an entity needs to additionally perform task T0 for new purchase order documents created in 2011 and onwards, but continue to only perform tasks T1, T2, and T3 for older purchase order documents created in 2010 or earlier, the table can be modified as follows:

| Task Name | Effective Start Date | Effective End Date |
|---|---|---|
| T0 | 1 Jan. 2011 | 31 Dec. 2012 |
| T1 | 1 Jan. 2010 | 31 Dec. 2012 |
| T2 | 1 Jan. 2010 | 31 Dec. 2012 |
| T3 | 1 Jan. 2010 | 31 Dec. 2012 |

When another event is received for the purchase order document, "PO111," on Feb. 1, 2011, the supply chain financial orchestration system can refer to the previous entry that was made for the purchase order document, "PO111," select the effective date as "1 Feb. 2010," and only perform the tasks T1, T2, and T3. If an event is received for a new purchase order document, "PO222," on Feb. 1, 2011, then tasks T0, T1, T2, and T3 can be performed. Further, one or more task layer services that prepare a payload can also refer to the effective date indicated in the table, and select the data for the appropriate date range. Thus, a date effectivity feature can assist a user in adding or removing transfer pricing rules or tasks for any given date range. Without this feature, it is very difficult for a user to specify different sets of transfer pricing rules and/or tasks for an agreement with different date ranges. Thus, the date effectivity feature can help a user configure a setup in accordance with modifications to business requirements.

Further, in one embodiment, a supply chain financial orchestration system can provide objects (such as transfer pricing rules or tasks) with both date effectivity and multiple language support ("MLS"). Thus, the supply chain financial orchestration system can enable a user to create multi-lingual objects that also extend the date effectivity behavior previously described. By extending the date effectivity behavior into MLS-enabled attributes, the supply chain financial orchestration system can keep track of modifications to MLS-enabled attributes. The supply chain financial orchestration system can enable support for date effective operations, such as "Create," "Retrieve," "Insert," "Correct," "End Date," and "Delete," as well as operations, such as import and export of setup data between systems. By utilizing this framework, a user can enable date effective behavior for MLS entities. Without this framework, a user would likely have to manually create source code to support date effective operations for translatable attributes, or would have to drop either the date effectivity behavior or the MLS-enabled attributes.

FIG. 4-4 illustrates an example enterprise structure 400, according to an embodiment of the invention. Enterprise structure 400 is an enterprise structure of ABC enterprise 410 (a large corporation) spread across different countries involved in internal trade relationships. More specifically, ABC enterprise 410 is a multinational company that includes a China legal entity 420, an Ireland legal entity 430, and a Germany legal entity 440. A China business unit 450 is a profit center that belongs to China legal entity 420. China business unit 450 operates as a purchasing affiliate in China. An Ireland business unit 460 is principal profit center that belongs to Ireland legal entity 430. Ireland business unit 460 falls under a low tax jurisdiction. A Germany business unit 470 and a Berlin business unit 480 are profit centers that belong to Germany legal entity 440. Germany business unit 470 and Berlin business unit 480 operate as manufacturing hubs in Europe.

An internal trade relationship can be of two types: a relationship for an inter-company trade and a relationship for an intra-company trade. An inter-company trade is a trade of goods or services between two business units belonging to a common group of legal entities. An example inter-company trade is a trade between China business unit 450 and Germany business unit 470, which belong to different legal entities (i.e., China legal entity 420 and Germany legal entity 440). An intra-company trade is a trade of goods or services between two business units that belong to a single legal entity. An example intra-company trade is a trade between Germany business unit 470 and Berlin business unit 480, which belong to a single legal entity (i.e., Germany legal entity 440).

According to the embodiment, there can be a separate physical flow and financial flow for an internal trade relationship between business units of ABC enterprise 410. For the physical flow, a supplier located in China can ship the goods to Germany business unit 470. However, for the financial flow, the supplier in China can transfer the ownership of goods to China business unit 450 when the goods are received at a Germany warehouse owned by Germany business unit 470. China business unit 450 entitles to the ownership of the goods and is also liable to pay the supplier in China at this point in time. This is also the point in time when the ownership of goods passes from China business unit 450 to Germany business unit 470. At this point, Germany business unit 470 entitles the goods and is also liable to pay China business unit 450. The financial settlement between China business unit 450 and Germany business unit 470 can be routed through Ireland business unit 460, in order to attain significant tax benefit along with optimizing operational efficiencies. Receivables and payables invoices can be generated and booked in the seller's and buyer's accounting books, typically at the time of ownership transfer.

FIG. 4-5 illustrates a flow diagram of the functionality of a supply chain financial orchestration flow module (such as supply chain financial orchestration flow module 16 of FIG. 4-1), according to an embodiment of the invention. In one embodiment, the functionality of the flow diagram of FIG. 4-5, and the functionality of the flow diagram of FIG. 4-12, are each implemented by software stored in memory or other computer-readable or tangible medium, and executed by a processor. In other embodiments, each functionality may be performed by hardware (e.g., through the use of an application specific integrated circuit ("ASIC"), a programmable gate array ("PGA"), a field programmable gate array ("FPGA"), etc.), or any combination of hardware and software. In certain embodiments, some, but not all, of each functionality may be implemented.

According to the embodiment, a supply chain financial orchestration flow module can define one or more supply chain financial orchestration flows. As previously describes, a supply chain financial orchestration flow can define a trade relationship between two entities. In certain embodiments, the two entities can be two internal legal entities of an overall enterprise. In other embodiments, a first entity can be an internal legal entity of an overall enterprise, and a second entity can be an external entity. According to the embodiment, a supply chain financial orchestration flow can include one or more documentation and accounting rules, one or more transfer pricing rules, one or more agreements (i.e., buy and sell terms), and/or one or more qualifier rules (i.e., one or more qualifiers). Each of the one or more documentation and accounting rules, transfer pricing rules, agreements, and/or qualifiers can define aspects of the trade relationship between the two entities, as is described below in greater detail.

The flow begins and proceeds to 510. At 510, it is determined which actions are to be taken to define one or more supply chain financial orchestration flows. The actions can include at least one of: defining one or more documentation and accounting rules; defining one or more transform pricing rules; defining one or more agreements; defining one or more supply chain financial orchestration flows; or defining one or more qualifiers. The flow then proceeds to either 520 or 550. In certain embodiments, at least one of 520, 530, and 540 is performed, as well as 550, when 550 can be performed at any time.

At 520, one or more documentation and accounting rules are defined. A documentation and accounting rule defines one or more tasks to be executed. In certain embodiments, the one or more tasks can be financial tasks that effect an ownership change of an item from a first entity to a second entity. In other embodiments, the one or more tasks can be tasks that create one or more documents (such as a purchase order, a sales order, or a customs invoice). The one or more documents can be created either prior to, or subsequent to, an ownership change of the item from the first entity to the second entity. A documentation and accounting rule can be defined as part of (i.e., associated with) a supply chain financial orchestration flow. More specifically, in certain embodiments, a documentation and accounting rule can be defined as part of (i.e., associated with) an agreement, where the agreement is defined as part of (i.e., associated with) the supply chain financial orchestration flow. Documentation and accounting rules are further described below in greater detail in conjunction with FIG. 4-6. In certain embodiments, where one or more documentation and accounting rules have already been defined, 520 can be omitted. The flow then proceeds to 530.

At 530, one or more transfer pricing rules are defined. A transfer pricing rule is a rule for automatically calculating a transfer price for an internal transaction. A transfer pricing rule can be defined as part of (i.e., associated with) a supply chain financial orchestration flow. More specifically, in certain embodiments, a transfer pricing rule can be defined as part of (i.e., associated with) an agreement, where the agreement is defined as part of (i.e., associated with) the supply chain financial orchestration flow. Transfer pricing rules are further described below in greater detail in conjunction with FIG. 4-7. In certain embodiments, where one or more transfer pricing rules have already been defined, 530 can be omitted. The flow then proceeds to 540.

At 540, one or more agreements (identified in FIG. 4-5 as "buy and sell terms") are defined. An agreement defines a trade relationship between two entities. One or more documentation and accounting rules can be defined as part of (i.e., associated with) an agreement. Further, one or more transfer pricing rules can be defined as part (i.e., associated with) an agreement. An agreement can be defined as part of (i.e., associated with) a supply chain financial orchestration flow. Agreements are further described below in greater detail in conjunction with FIGS. 4-8 and 4-9. In certain embodiments, where one or more agreements have already been defined, 540 can be omitted. The flow then proceeds to 560.

At 550, one or more qualifiers are defined. A qualifier is a rule for determining an applicability of a supply chain financial orchestration flow. One or more qualifiers can be defined as part of (i.e., associated with) a supply chain financial orchestration flow. Qualifiers are further described below in greater detail in conjunction with FIG. 4-10. Further, defining one or more qualifiers can be independent from defining one or more documentation and accounting rules, one or more transfer pricing rules and/or one or more agreements. In certain embodiments, where one or more qualifiers have already been defined, 550 can be omitted. The flow then proceeds to 560.

At 560, one or more supply chain financial orchestration flows are defined. A supply chain financial orchestration flow defines a trade relationship between a first entity and a second entity. More specifically, a supply chain financial orchestration flow defines a physical flow of goods from the first entity to the second entity and a financial flow of goods from the first entity to the second entity, where the physical flow can be independent of the financial flow. An agreement can be defined as part of (i.e., associated with) a supply chain financial orchestration flow. Further, one or more documentation and accounting rules and/or one or more transfer pricing rules can be defined as part of (i.e., associated with) an agreement. Additionally, one or more qualifiers can be defined as part of (i.e., associated with) a supply chain financial orchestration flow. Supply chain financial orchestration flows are further described below in greater detail in conjunction with FIGS. 4-11A and 4-11B. The flow then ends.

FIG. 4-6 illustrates an example user interface 600 for defining a documentation and accounting rule, according to an embodiment of the invention. As previously described, a documentation and accounting rule defines one or more tasks to be executed. In certain embodiments, the one or more tasks can be financial tasks that effect an ownership change of an item from a first entity to a second entity. In other embodiments, the one or more tasks can be tasks that create one or more documents (such as a purchase order, a sales order, or a customs invoice). The one or more tasks can be grouped into one or more task groups depending on a time when the one or more tasks are required to be created. Additionally, in some embodiments, one or more supply chain events that are ownership change events can be associated with the one or more task groups. The one or more supply chain events can include pre-defined supply chain events and/or user-defined supply chain events. A pre-defined supply chain event is a supply chain event that can be created by a supply chain financial orchestration system. A user-defined supply chain event is a supply chain event that can be created by a user of a supply chain financial orchestration system, rather than by the supply chain financial orchestration system itself.

According to the embodiment, user interface 600 includes documentation and accounting rule details window 610. Documentation and accounting rules details window 610 displays details of the displayed documentation and accounting rule, such as name, description, accounting currency option, conversion type, one or more task groups, effective start date, and effective end date. A name can define a name of the documentation and accounting rule. A description can define a description of the documentation and accounting rule. An accounting currency option can define a trading currency option used to specify a currency in which transactions associated with the documentation and accounting rule, such as internal transactions, will be denominated. Example accounting currency options can include: seller's currency (i.e., a currency of a selling entity); buyer's currency (i.e., a currency of a purchasing entity); a document currency (i.e., a currency of a source document); or a user-defined currency (i.e., a currency defined by a user). A conversion type can define a conversion of a first currency to a second currency. A task group can define a group of one or more tasks defined for the documentation and accounting rule.

An effective start date can define an effective start date for the documentation and accounting rule, and an effective end date can define an effective end date for the documentation and accounting rule. More specifically, a documentation and accounting rule can be date effective. This means that any modification to a documentation and accounting rule can cause a new effective date to be associated with the documentation and accounting rule. Thus, a source document created before the effective date of the modification can follow the original documentation and accounting rule, and a source document created after the effective date of the modification can follow the modified documentation and accounting rule.

User interface 600 further includes documentation and accounting rule tasks window 620. Documentation and accounting rule tasks window 620 displays one or more task groups. Example task groups can include "Purchase Order & Sales Order" and "Trade Distributions & Intercompany Invoices." Documentation and accounting rule tasks window 620 further displays one or more supply chain events that are defined as task generating events, where each supply chain event can be defined as a task generating event for a supply chain financial orchestration flow type (i.e., business process type). Example supply chain financial orchestration flow types include a global procurement flow (identified in FIG. 4-6 as "Procurement"), an internal drop shipment flow (identified in FIG. 4-6 as "Shipment"), a customer drop shipment flow (identified in FIG. 4-6 as "Drop Ship"), or an internal transfer flow (identified in 1 FIG. 4-6 as "Internal Transfer"). Also according to the illustrated embodiment, one or more supply chain events can be defined as task generating events for a forward flow using a forward flow tab, and an additional set of one or more supply chain events can be defined as task generating events for a return flow using a return flow tab. According to certain embodiments, a supply chain financial orchestration flow can include a forward flow and a return flow, where a forward flow is a flow of events that proceeds in a specific direction (such as from a supplier entity to a purchaser entity), and where a return flow is a flow of events that proceeds in a reverse direction (such as from a purchaser entity to a supplier entity).

According to the illustrated embodiment, a user can select a task group within documentation and accounting rule tasks window 620 of FIG. 4-6, and cause task group tasks window 630 to be displayed. Task group tasks window 630 displays one or more tasks of a task group, and further displays whether each task is pre-defined or user-defined. A user can add one or more new tasks to the task group, or can delete one or more existing tasks from the task group.

Further, a documentation and accounting rule can be configured to meet country-specific inter-company or intra-company regulatory requirements. For example, in a supply chain financial orchestration flow for a global procurement, documents such as purchase orders or sales orders may be required to be created at a time of shipment of goods from the supplier as part of the document. However, the ownership can be transformed from a purchasing entity that is purchasing the goods from a supplier, to a receiving entity that receives the goods only when the goods are received at the destination.

FIG. 4-7 illustrates an example user interface 700 for defining a transfer pricing rule, according to an embodiment of the invention. As previously described, a transfer pricing rule is a rule for automatically calculating a transfer price for an internal transaction. According to the embodiment, user interface 700 includes transfer pricing rule details window 710. Transfer pricing rule details window 710 displays details of the displayed transfer pricing rule, such as name, description, effective start date, and effective end date. A name can define a name of the transfer pricing rule. A description can define a description of the transfer pricing rule.

An effective start date can define an effective start date for the transfer pricing rule, and an effective end date can define an effective end date for the transfer pricing rule. More specifically, a transfer pricing rule can be date effective. This means that any modification to a transfer pricing rule can cause a new effective date to be associated with the transfer pricing rule. Thus, transactions associated with new source documents created after an effective date can utilize the modified transfer pricing rule to calculate a transfer price, while transactions associated with original source documents created before the effective date can utilize the original transfer price rule to calculate the transfer price. A supply chain financial orchestration system, when deriving the transfer pricing rules for calculating a transfer price, can retrieve the transfer pricing rules that are effective as of an effective date for a source document.

User interface 700 further includes transfer pricing options window 720. Transfer pricing options window 720 allows a user to select one or more options for defining a transfer pricing rule. One option for defining a transfer pricing rule is a pricing strategy-based transfer price option that defines a pricing strategy-based transfer pricing rule. A pricing strategy-based transfer pricing rule calculates a transfer price based on a pricing strategy, where a pricing strategy is a collection of one or more pricing rules that define an approach for achieving a specific goal associated with selling and pricing products, where the specific goal can be targeted at a pricing segment and/or a specific selling situation. The one or more rules can be defined in a pricing system, and the collection of the one or more defined rules can form a pricing strategy. Another option for defining a transfer pricing rule is a transaction cost-based transfer price option that defines a transaction cost-based transfer pricing rule. A transaction cost-based transfer pricing rule calculates a transfer price by applying a positive or negative markup over a cost incurred by a selling entity for an item or service (i.e., a transaction cost). The markup can be a standard markup, which can be specified as a percentage. The markup can be an advanced markup defined using one or more pricing term rules of a pricing system. A pricing term rule is a rule which defines how a price of an item or service can be adjusted or defined. Another option for defining a transfer pricing rule is a source document price-based transfer price option that defines a source document-based transfer pricing rule. A source document price-based transfer pricing rule calculates a transfer price by applying a positive or negative markup over a source document price, such as a purchase order price or a sales order price.

According to the embodiment, transfer pricing options window 720 further includes a multiple options criteria, where a multiple options criteria is a feature that enables a combination of multiple transfer pricing rules options. Thus, a transfer pricing rule can calculate a transfer pricing using multiple options, and thus, produce multiple transfer prices, and a transfer price can be selected from the multiple transfer prices. Based on a selection that the user makes, either a highest transfer price from the multiple transfer prices can be selected, or a lowest transfer price from the multiple transfer prices can be selected.

Further, according to the embodiment, transfer pricing options window 720 allows a user to define a transfer pricing rule to calculate an assessable value for an internal transaction. An assessable value is the value of an internal transaction for tax calculation purposes. A separate assessable value can be calculated for a seller of the internal transaction, and a buyer of the internal transaction. Transfer pricing options window further provides an option to either use a transfer price as an assessable value, or define a separate rule (or set of rules) to calculate the assessable value.

FIG. 4-8 illustrates an example user interface 800 for defining an agreement (identified in FIG. 4-8 as a "buy and sell term"; also identified as a "financial orchestration flow"), according to an embodiment of the invention. In any supply chain financial orchestration flow that includes a purchase or transfer of goods, the purchasing entity and the selling entity (or the two transferring entities) agree upon one or more supply chain events that define a transfer of title, cost, and risk of the goods, from the selling entity to the purchasing entity (or from the first transferring entity to the second transferring entity). This may be explicitly agreed upon in an agreement (i.e., buy and sell term). As previously described, a supply chain event is an event that occurs in the process of execution of a supply chain flow. A supply chain event can be a physical execution event, such as a shipment or receipt of goods, or a trade event, such as a transfer of ownership of the goods.

According to the embodiment, user interface 800 allows a user to define a trade relationship between two entities, such as profit center business units involved in an internal transaction. The definition can be a reusable definition, where a single defined agreement can be referred to across multiple supply chain financial orchestration flows between the two entities. There can also be more than one agreement defined between the same pair of entities.

According to the embodiment, user interface 800 includes agreement details window 810. Agreement details window 810 displays details of the displayed agreement, such as name, description, selling business unit, selling legal entity, buying business unit, buying legal entity, effective start date, and effective end date. A name can define a name of the agreement. A description can define a description of the agreement. A selling business unit can define a business unit of a selling entity. A selling legal entity can define a selling entity. A buying business unit can define a business unit of a purchasing entity. A buying legal entity can define a purchasing entity.

An effective start date can define an effective start date for the agreement, and an effective end date can define an effective end date for the agreement. More specifically, an agreement can be date effective. This means that any modification to an agreement can cause a new effective date to be associated with the agreement. Thus, transactions associated with a new source document created after the effective date can follow the new agreement while transactions associated with an original source document created before the effective date can follow the original agreement.

According to the embodiment, user interface 800 includes pricing and accounting rules window 820. Pricing and accounting rules window 820 allows a user to define a transfer pricing rule and a documentation and accounting rule for the displayed agreement. User interface 800 further includes default buy side tax determinants window 830 and default sell side tax determinants window 840. Default buy side tax determinants window 830 allows a user to define a tax jurisdiction for a purchasing entity. Default sell side tax determinants window 840 allows a user to define a tax jurisdiction for a selling entity.

In the illustrated embodiment, the agreement displayed within user interface 800 is an agreement between a China business unit and an Ireland business unit. According to the embodiment, the agreement can be defined for a first portion of a supply chain financial orchestration flow between a China business unit and a Germany business unit, where a second portion is further described below in greater detail in conjunction with FIG. 4-9.

FIG. 4-9 illustrates another example user interface 900 for defining an agreement (identified in FIG. 4-9 as a "buy and sell term"; also identified as a "financial orchestration flow"), according to another embodiment of the invention. User interface 900 is identical to user interface 800, but user interface 900 displays an agreement between an Ireland business unit and a Germany business unit. According to the embodiment, the agreement can be defined for second portion of a supply chain financial orchestration flow between a China business unit and a Germany business unit, where a first portion is previously described in conjunction with FIG. 4-8. Thus, as illustrated in FIGS. 4-8 and 4-9, different agreements can be defined for different portions of a supply chain financial orchestration flow, which means that different documentation and accounting rules and/or transfer pricing rules can be applied to different portions of a supply chain financial orchestration flow.

FIG. 4-10 illustrates an example user interface 1000 for defining a qualifier (identified in FIG. 4-10 as a "financial orchestration qualifier"), according to an embodiment of the invention. As previously described, a qualifier is a rule for determining an applicability of a supply chain financial orchestration flow. More specifically, a qualifier can be used to determine whether a supply chain financial orchestration flow is applicable to a transaction or source document. The qualifier can include a specific number of conditions. If a sufficient amount of conditions of the qualifier are met, then the supply chain financial orchestration flow is applicable to the transaction or source document. If a sufficient amount of conditions of the qualifier are not met, then the supply chain financial orchestration flow is not applicable to the transaction or source document. A qualifier can be configurable by a user. Further, applicable attributes of a supply chain financial orchestration flow that are defined within a qualifier depend on a supply chain financial orchestration flow type (i.e., business process type).

According to the embodiment, user interface 1000 includes qualifier details window 1010. Qualifier details window 1010 displays details of the displayed qualifier, such as name, description, and supply chain financial orchestration flow type (identified in FIG. 4-10 as "business process type"). A name can define a name of the qualifier. A description can define a description of the qualifier. A supply chain financial orchestration flow type can define a type of supply chain financial orchestration flow that the qualifier can be associated with, and further defines the parameters that can be displayed within qualifier conditions window 1020, described below in greater detail. Example supply chain financial orchestration flow types can include a global procurement flow, a customer shipment flow, and an internal transfer flow.

User interface 1000 further includes qualifier conditions window 1020. Qualifier conditions window 1020 displays one or more conditions for determining an applicability of a supply chain financial orchestration flow. Each condition can include a parameter, a value, an operator, and an "and/or" indicator. A parameter can define an attribute of either a transaction or a source document. A value can define a value for the parameter. An operator can define a relationship between the parameter and the value. Example operators include "equals" and "does not equals." An "and/or" indicator can define either a logical conjunction of two conditions (e.g., "condition 1 AND condition 2" evaluates to true when both condition 1 and condition 2 are true) or a logical disjunction of two conditions (e.g., "condition 1 OR condition 2" evaluates to true when condition 1 is true, or condition 2 is true, or both condition 1 and condition 2 are true).

User interface 1000 further includes qualifier rule text preview window 1030. Qualifier rule text preview window 1030 displays a preview of a text representation of the qualifier, which includes the one or more conditions of the qualifier. In the illustrated embodiments, the qualifier can determine whether a supplier country attribute is equal to "China," whether an item attribute is equal to "ITEM-A," and whether a supplier attribute is not equal to "4084." Based on these determinations, the qualifier can determine whether the supply chain financial orchestration flow is applicable to the transaction or source document.

FIG. 4-11A illustrates a portion of an example user interface 1100 for defining a supply chain financial orchestration flow, according to an embodiment of the invention. As previously described, a supply chain financial orchestration flow defines a trade relationship between a first entity and a second entity. More specifically, a supply chain financial orchestration flow defines a physical flow of goods from the first entity to the second entity and a financial flow of goods from the first entity to the second entity, where the physical flow can be independent of the financial flow.

According to the illustrated embodiment, user interface 1100 includes supply chain financial orchestration flow details window 1110. Supply chain financial orchestration flow details window 1110 displays details of the displayed supply chain financial orchestration flow, such as name, description, supply chain financial orchestration flow type (illustrated in FIG. 4-11A as "business process type"), priority, status, auto confirm financial flow, effective start date, and effective end date. A name can define a name of the supply chain financial orchestration flow. A description can define a description of the supply chain financial orchestration flow. A supply chain financial orchestration flow type can define a type of the supply chain financial orchestration flow. Example supply chain financial orchestration flow types can include a global procurement flow, a customer shipment flow, and an internal transfer flow. A priority can define a priority that can be assigned to the supply chain financial orchestration flow. The assigned priority can be used to determine which supply chain financial orchestration flow to assign to the source document, when there is more than one supply chain financial orchestration flow available. In certain embodiments, the priority can be expressed as a number, so that a lower number has a higher priority. A status can define a status of the supply chain financial orchestration flow (i.e., whether the supply chain financial orchestration flow is available for orchestration). Example statuses can include "Active," "Draft," and "Cancelled." An auto confirm financial flow is an attribute that can define whether the supply chain financial orchestration flow automatically starts orchestration of tasks for trade accounting and financial transactions, or else whether the supply chain financial orchestration flow waits for a user interaction to confirm the supply chain financial orchestration flow.

An effective start date can define an effective start date for the supply chain financial orchestration flow, and an effective end date can define an effective end date for the supply chain financial orchestration flow. More specifically, a supply chain financial orchestration flow can be date effective. This means that any modification to a supply chain financial orchestration flow can cause a new effective date to be associated with the supply chain financial orchestration flow. Thus, transactions associated with a new source document created after the effective date can follow the new supply chain financial orchestration flow while transactions associated with an original source document created before the effective date can follow the original supply chain financial orchestration flow.

User interface 1100 further includes physical route window 1120. Physical route window 1120 displays a physical route for a supply chain financial orchestration flow, where the physical route represents the physical movement of goods throughout the supply chain financial orchestration flow. The physical movement of goods can depend on a supply chain financial orchestration flow type. In the illustrated embodiment, physical route window 1120 displays a supplier basis, a supplier country, a receiving entity basis, and a receiving legal entity.

User interface 1100 further includes supplier ownership change event window 1130. Supplier ownership change event window 1130 displays one or more supplier ownership change events for a supply chain financial orchestration flow, where a supplier ownership change event is an event that indicates an ownership transfer from a supplier to a purchasing entity. A supplier ownership change event can trigger a task layer service to create logical receipt costing transactions for the purchasing entity. According to the illustrated embodiment, a supplier ownership change event can be defined for a forward flow of the supply chain financial orchestration flow and a separate supplier ownership change event can be defined for a return flow of the supply chain financial orchestration flow.

User interface 1100 further includes qualifier window 1140. Qualifier window 1140 displays a qualifier defined for a supply chain financial orchestration flow. As previously described, a qualifier is a rule for determining an applicability of a supply chain financial orchestration flow. As also previously described, a qualifier can be used to determine whether a supply chain financial orchestration flow is applicable to a transaction or source document. The qualifier can include a specific number of conditions. If a sufficient amount of conditions of the qualifier are met, then the supply chain financial orchestration flow is applicable to the transaction or source document. If a sufficient amount of conditions of the qualifier are not met, then the supply chain financial orchestration flow is not applicable to the transaction or source document.

FIG. 4-11B illustrates another portion of an example user interface 1100 for defining a supply chain financial orchestration flow, according to an embodiment of the invention. According to the illustrated embodiment, user interface 1100 includes primary route window 1150. Primary route window 1150 displays one or more primary routes for a supply chain financial orchestration flow, where a primary route establishes a supply chain execution partnership between two legal entities and their business units. A primary route further defines a financial flow for transacting goods and service between two primary trade partners. In certain embodiments, a first entity represents an internal selling entity, and a second entity represents an internal purchasing entity.

User interface 1100 further includes financial route window 1160. Financial route window 1160 displays one or more financial routes for a supply chain financial orchestration flow, where a financial route defines a financial trade relationship through which financial obligations are settled. A supply chain financial orchestration flow can have one or more financial trade relationships depending on the number of intermediary parties included within the supply chain financial orchestration flow.

FIG. 4-12 illustrates a flow diagram of the functionality of a supply chain financial orchestration flow module, according to another embodiment of the invention. According to the embodiment, a supply chain financial orchestration flow module can orchestrate one or more supply chain events based on a supply chain financial orchestration flow. Thus, the supply chain financial orchestration flow module can support configurable event-based orchestration arising due to ownership transfer of good, and can integrate with several external systems.

As previously described, supply chain trade relationships of large corporations or global companies are typically spread across geographic locations and typically span multiple external systems. Physical movement and legal ownership of goods are often independent of each other, and financial transactions resulting in such trade relationship may need to support strict legal, tax, and management reporting requirements. Supply chain events, such as physical execution events or trade events, can be raised on transactions such as a shipment or receipt of goods at an agreed location, or a transit of goods to a port or destination. The source of these supply chain events can be different execution systems. When a supply chain event that indicates an ownership transfer of goods from a selling entity to a purchasing entity is raised, the selling entity can be required to account for costs, revenue, and receivables in his accounting books, and the purchasing entity can be required to account for inventory costs and payment liability in his accounting books. Further, an invoice may be generated and sent by the selling entity to the purchasing entity, which can become a legal document representing the accounting and payments.

An example flow for orchestrating a purchase order receipt supply chain event is described below, and illustrated in FIG. 4-12, where the purchase order receipt supply chain event is raised when goods sent by a supplier entity are received in a warehouse in Germany, where the purchase order receipt supply chain event indicates a transfer of ownership of goods from a selling entity to a purchasing entity, where the goods are associated with a purchase order. However, the example flow is not limited to the aforementioned supply chain event, and can apply to any supply chain event. According to the embodiment, the purchase order receipt supply chain event is defined as a task generating event within a supply chain financial orchestration system, and the supply chain financial orchestration system listens for the occurrence of a purchase order receipt supply chain event.

The flow begins and proceeds to 1201. A purchase order (or another source document, in other embodiments) is generated within an external source system. The flow then proceeds to 1202. At 1202, a purchase order receipt supply chain event (or another supply chain event, in other embodiments) is generated at an external logistics system and sent to an event mediator, where the supply chain event references the source document generated within the external source system. The flow then proceeds to 1203. At 1203, the supply chain event is received at the event mediator. The flow then proceeds to 1204. At 1204, the event mediator invokes a web service of the external logistics system and retrieves supply chain event information associated with the supply chain event from the external logistics system using the invoked web service. The flow then proceeds to 1205. At 1205, the supply chain event information associated with the supply chain event is validated at an event capture component, and the supply chain event is stored in an external source system format at the event capture component. The flow then proceeds to 1206.

At 1206, an event manager retrieves source document information associated with the source document generated within the external source system and referenced by the supply chain event. In one embodiment, the event manager retrieves the source document information by invoking a source document enrichment service exposed by the external source system. The event manager passes a source document identifier as an input parameter to the source document enrichment service and retrieves the source document information from the source document enrichment service. The source document identifier can be part of the supply chain event information previously retrieved from the external source system. The flow then proceeds to 1207. At 1207, the event manager transforms (identified in FIG. 4-12 as "cross-refer") the source document information into an internal format. The flow then proceeds to 1208. At 1208, the event manager identifies a supply chain financial orchestration flow for the source document. In one embodiment, the event manager can identify a supply chain financial orchestration flow using at least one of: a qualifier, a source document type, a physical route, a selling entity, a purchasing entity, a priority, an effective start date, or an effective end date. The flow then proceeds to 1209. At 1209, it is determined at an orchestration service whether the identified supply chain financial orchestration flow is assigned to the source document. If the identified supply chain financial orchestration flow is assigned to the source document, the flow proceeds to 1211. If the identified supply chain financial orchestration flow is not assigned to the source document, the flow proceeds to 1210. At 1210, the orchestration service assigns the identified supply chain financial orchestration flow to the source document. The flow then proceeds to 1211. At 1211, the orchestration service identifies and selects one or more tasks defined for the supply chain financial orchestration flow based on one or more documentation and accounting rules. In one embodiment, the one or more tasks can be defined for the one or more documentation and accounting rules, and the orchestration service can identify and select the one or more tasks defined for the one or more documentation and accounting rules. Further, in one embodiment, the orchestration service can identify and select one or more tasks defined for a supply chain financial orchestration type. Even further, in one embodiment, the orchestration service can identify and select one or more tasks defined for either a forward flow or a return flow. The orchestration service further initiates the one or more tasks. The flow then proceeds to 1212.

At 1212, for a task of the one or more tasks, an execution manager invokes a task layer service based on a task type of the task. Example task types can include internal trade documents (such as a purchase order and a sales order), trade distribution tasks, and intercompany invoices. A task type can also be a user-defined task type. The flow then proceeds to 1213. At 1213, the invoked task layer service generates a task layer service payload. In one embodiment, the task layer service includes logic to populate the task layer service payload with data depending on a supply chain financial orchestration flow type of the supply chain financial orchestration flow. The flow then proceeds to 1214. At 1214, the task layer service calls a transfer price service, where the transfer price service calculates a transfer price for the task, and the task layer service retrieves the transfer price from the transfer price service. The flow then proceeds to 1215. At 1215, an external interface layer service selects an external target system to execute the task. In one embodiment, the external interface layer service selects an external target system based on a task type of the task. The flow then proceeds to 1216. At 1216, the external interface selects a connector service for the selected external target system. In one embodiment, the external interface layer service also selects the connector service based on a task type of the task. The flow then proceeds to 1217. As 1217, the selected connector service transforms (identified in FIG. 4-12 as "cross-refer") the task layer service payload into an external target system format (i.e., a format that is understood by the selected external target system). The flow then proceeds to 1218. At 1218, the selected connector service calls a web service of the selected external target system to interface with the selected external target system to execute the task. In one embodiment, the selected connector service can call the web service to interface the task within one or more interface tables of the selected external target system. The flow then proceeds to 1219.

At 1219, the selected external target system interfaces the task. The flow then proceeds to 1220. At 1220, the selected external target system sends a callback response to a callback service upon an execution of the task within the selected external target system. In one embodiment, the callback response is sent upon an importation or creation of a transaction in the selected external target system. The flow then proceeds to 1221. At 1221, the callback service receives the callback response sent from the selected external target system, and updates a status of the task. The flow then proceeds to 1222. At 1222, the callback service determines whether the executed task is the last task to be executed. If the executed task is the last task to be executed, the flow ends. If the executed task is not the last task to be executed, the flow proceeds to 1223. At 1223, the callback service selects the next task for execution. The flow then returns to 1212.

FIG. 4-13 illustrates an example user interface 1300 for managing supply chain event exceptions, according to an embodiment of the invention. According to the embodiment, a user can utilize user interface 1300 to view, troubleshoot and manage supply chain events which faulted due to a setup or technical reason. User interface 1300 includes search window 1310, which allows a user to enter supply chain event criteria. Example supply chain event criteria can include: a supply chain event type, a supply chain event identifier, a supply chain event date, an item identifier, a source document identifier, or an inter-organization transaction identifier. User interface 1300 further includes search results window 1320, which displays one or more supply chain event exceptions that arise during capture of a supply chain event and during processing of a supply chain event by an event manager, where the supply chain event meets the supply chain event criteria entered within search window 1310. In other words, all the supply chain events that both: (a) raise an exception; and (b) meet the supply chain criteria entered within search window 1310, are displayed within search results window 1320.

FIG. 4-14 illustrates a portion 1400 of an example user interface 1300 for managing supply chain event exceptions, where user interface portion 1400 can display a supply chain event exception message, according to an embodiment of the invention. According to the embodiment, user interface portion 1400 can display messages logged by a supply chain financial orchestration system, where each message is logged when an exception arises during processing of a supply chain event. A user is able to view each message within user interface portion 1400 and troubleshoot each message. More specifically, for each message, user interface portion 1400 displays a message type 1410, a message category 1420, and message detail 1430. Message type 1410 indicates a type of a message, when an example message type is an exception message. Message category 1420 indicates a category of error that triggered the exception. Example message categories include "application error," "invalid event data," "supply chain financial orchestration flow not found," "event submission failed," and "referenced events." Message detail 1430 indicates the actual content of the message. In certain embodiments, a supply chain event exception arises if: (a) the supply chain event data is invalid, or required attributes for processing the flow are missing; (b) retrieval of the source document fails as the service is down; (c) no valid supply chain financial orchestration flow is identified for a source document; (d) a submitted user action fails to raise supply chain events for reprocessing of supply chain events which met with an exception; or (e) a return flow supply chain event has a reference to a forward flow, and the forward flow is not executed.

FIG. 4-15 illustrates a portion 1500 of an example user interface 1300 for managing supply chain event exceptions, where user interface portion 1500 can submit supply chain events for re-processing, according to an embodiment of the invention. According to the embodiment, if a user desires to re-process one or more supply chain events which raised an exception, a user can use user interface portion 1500 to query one or more supply chain events based on message category. A user can then select submit all button 1510 to re-process the queried supply chain event(s). Submit all button 1510 raises the queried supply chain event(s) to an event manager (such as event manager 303 of FIG. 4-3), and the event manager re-processes the supply chain event(s). If the action is successful, and the supply chain event(s) raised on submission is/are successfully acknowledged by the event manager for re-processing, the acknowledgement is displayed within user interface portion 1500 as an icon (such as a green check icon). If the supply chain event submission fails due to a technical reason, the failure is displayed within user interface portion 1500 as a different icon (such as a red error icon).

FIG. 4-16 illustrates a user interface 1600 for confirming an assignment of a supply chain financial orchestration flow, according to an embodiment of the invention. According to the embodiment, user interface 1600 allows a user to confirm a supply chain financial orchestration flow has been correctly defined and assigned to a source document, before the tasks defined for the supply chain financial orchestration flow are initiated by an orchestration service for creation of accounting and financial transactions in external target systems. There is a possibility that a referenced supply chain financial orchestration flow is not defined, or that an incorrect supply chain financial orchestration flow gets assigned to a source document, due to an incorrect setup. Thus, user interface 1600 gives an option to a user to validate a supply chain financial orchestration flow and confirm that the supply chain financial orchestration flow is correctly assigned to a source document before the tasks are initiated.

User interface 1600 includes search window 1610, which allows a user to enter supply chain financial orchestration flow criteria. Example supply chain financial orchestration flow criteria can include: a supply chain financial orchestration flow identifier, a supply chain financial orchestration flow type (i.e., business process type), a source business unit, a destination business unit, a source document type, a source document, an order date, or an item identifier. User interface 1600 further includes search results window 1620, which displays one or more source documents, where each source document is assigned to a supply chain financial orchestration flow that meets the supply chain financial orchestration flow criteria entered within search window 1610. Each source document that is assigned to a supply chain financial orchestration flow can be identified by a unique identifier (identified in FIG. 4-16 as "orchestration number"). Thus, a user can view the source documents that are assigned to supply chain financial orchestration flows, where the source documents displayed within search results window 1620. If the user determines that the supply chain financial orchestration flow is correctly assigned to the source document, the user can confirm the assignment of the supply chain financial orchestration flow using user interface 1600. If the user determines that the supply chain financial orchestration flow is not correctly assigned, the user can re-assign a new supply chain financial orchestration flow to the source document using user interface 1600, provided that the new supply chain financial orchestration flow is defined, and that it qualifies to be assigned to the source document. In certain embodiments, search results window 1620 can display source documents assigned to a supply chain financial orchestration flow, where an automatic confirm financial flow attribute of each supply chain financial orchestration flow is assigned to "NO." As previously described, an automatic confirm financial flow attribute is a flag that can be set when defining a supply chain financial orchestration flow.

FIG. 4-17 illustrates an example user interface 1700 for monitoring an execution of a supply chain financial orchestration flow, according to an embodiment of the invention. According to the embodiment, user interface 1700 allows a user to monitor an execution of one or more tasks associated with the supply chain financial orchestration flow. The user can further manage any exceptions that arise due to functional or technical reasons as previously described. Once a supply chain financial orchestration flow is identified for a source document, and the one or more tasks associated with a supply chain financial orchestration flow are picked up by an orchestration service, the user can monitor and manage the execution of the one or more tasks using user interface 1700.

User interface 1700 includes search window 1710, which allows a user to enter supply chain financial orchestration flow criteria. Example supply chain financial orchestration flow criteria can include: a supply chain financial orchestration flow identifier, a supply chain financial orchestration flow type (i.e., business process type), a status, a message type, a message category, a source document identifier, or an item identifier. User interface 1700 further includes search results window 1720, which displays one or more source documents, where each source document is assigned to a supply chain financial orchestration flow that meets the supply chain financial orchestration flow criteria entered within search window 1710. Each source document that is assigned to a supply chain financial orchestration flow can be identified by a unique identifier (identified in FIG. 4-17 as "orchestration number"). Search results window 1720 can display a collective status of the one or more tasks associated with each supply chain financial orchestration flow, where the collective status is a roll-up of a task status for each task of the one or more status. Example collective statuses can include "Not Started," "In Progress," or "Completed." Any task which has raised an exception due to a functional or technical reason can cause search results windows 1720 to display an error status as the collective status for the supply chain financial orchestration flow. Example error statuses can include "Error," or "Warning."

FIG. 4-18 illustrates a portion 1800 of an example user interface 1700 for, an execution of a supply chain financial orchestration flow, where user interface portion 1800 can display details of a monitored supply chain financial orchestration flow, according to an embodiment of the invention. According to the embodiment, user interface portion 1800 includes supply chain financial orchestration flow details window 1810 and task details window 1820. Supply chain financial orchestration flow details window 1810 displays one or more financial routes associated with the supply chain financial orchestration flow that is assigned to a source document. Supply chain financial orchestration flow details window 1810 further displays one or more exceptions raised during execution of one or more tasks associated with the supply chain financial orchestration flow, as is further described in greater detail in conjunction with FIG. 4-19. Task details window 1820 displays one or more received supply chain events for a selected financial route in supply chain financial orchestration flow details window 1810. For each supply chain event, task details window 1820 displays one or more tasks being orchestrated based on the agreement for the financial route referred to in the supply chain financial orchestration flow.

FIG. 4-19 illustrates a portion 1900 of an example user interface 1700 for monitoring an execution of a supply chain financial orchestration flow, where user interface portion 1900 can display one or more exception messages for a monitored supply chain financial orchestration flow, according to an embodiment of the invention. According to the embodiment, user interface portion 1900 includes exception message window 1910. Exception message window 1910 displays a message category and message details for each exception that is raised during execution of a supply chain financial orchestration flow. This can allow a user to troubleshoot a cause for the exception, and resolve any issue. The message category broadly categorizes whether exception is due to application error, setup error, or submission error. An application error arises whenever any component of a supply chain financial orchestration system is down or not available, or a call to an internal or external service fails. A setup error arises due to a functional reason, such as missing setup data. A submission error arises if an event is not raised on a user action due to a technical reason. The message details include the specific details of the exception.

FIG. 4-20 illustrates a portion 2000 of an example user interface 1700 for monitoring an execution of a supply chain financial orchestration flow, where user interface portion 2000 can perform a recover action for a supply chain financial orchestration flow, according to an embodiment of the invention. According to the embodiment, user interface portion 2000 allows a user to either recover the supply chain financial orchestration flow, which re-performs all the tasks associated with the supply chain financial orchestration flow, or to recover one or more individual tasks associated with the supply chain financial orchestration flow, which re-performs the one or more individual tasks associated with the supply chain financial orchestration. Further, by selecting recover selected button 2010, a user can recover one or more supply chain financial orchestration flows selected within user interface portion 2000. By selecting recover all button 2020, a user can recover all the supply chain financial orchestration flows displayed within user interface portion 2000.

Thus, in one embodiment, a supply chain financial orchestration system can define a supply chain financial orchestration flow that can be utilized to indicate ownership of goods within supply chain transactions. The supply chain financial orchestration system can further orchestrate one or more supply chain events associated with the supply chain financial orchestration flow. Thus, the supply chain financial orchestration system can provide a robust foundation for integration with disparate business systems, as well as support for streamlined and configurable supply chain business processes, and support for complex financial flows typically spread across geographies.

The features, structures, or characteristics of the invention described throughout this specification may be combined in any suitable manner in one or more embodiments. For example, the usage of "one embodiment," "some embodiments," "certain embodiment," "certain embodiments," or other similar language, throughout this specification refers to the fact that a particular feature, structure, or characteristic described in connection with the embodiment may be included in at least one embodiment of the present invention. Thus, appearances of the phrases "one embodiment," "some embodiments," "a certain embodiment," "certain embodiments," or other similar language, throughout this specification do not necessarily all refer to the same group of embodiments, and the described features, structures, or characteristics may be combined in any suitable manner in one or more embodiments.

One having ordinary skill in the art will readily understand that the invention as discussed above may be practiced with steps in a different order, and/or with elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

DETAILED DESCRIPTION—SECTION 5

According to an embodiment, a supply chain financial orchestration system is provided that can act as an event-based orchestration system. For each event received by the supply chain financial orchestration system, the supply chain financial orchestration system can initiate one or more tasks for execution. The tasks that are to be executed can be grouped and sequenced by the supply chain financial orchestration system. Further, the supply chain financial orchestration system can sequence the tasks so that a task can only be initiated when its predecessor task has completed execution, and the supply chain financial orchestration system has received a task completion acknowledgement indicating that the predecessor task has completed execution. This can be accomplished by assigning task sequence identifiers to the tasks, where there is a gap between a task sequence identifier for a predecessor task and a task sequence identifier for a successor task, if the predecessor task has not completed execution. The supply chain financial orchestration system can further sequence events so that tasks related to an event are not initiated for execution until all tasks related to a predecessor event have completed execution. This can be accomplished by assigning event sequence identifiers to the events, where there is a gap between an event sequence identifier for a predecessor event and an event sequence identifier for a successor event, if the tasks for the predecessor event have not completed execution. The supply chain financial orchestration system can further process multiple child events for a specific parent event by creating multiple event groups and assigning the multiple child events into different event groups.

FIG. 5-1 illustrates a block diagram of a supply chain financial orchestration system 10 that may implement one embodiment of the invention. Supply chain financial orchestration system 10 includes a bus 12 or other communications mechanism for communicating information between components of supply chain financial orchestration system 10. Supply chain financial orchestration system 10 also includes a processor 22, operatively coupled to bus 12, for processing information and executing instructions or operations. Processor 22 may be any type of general or specific purpose processor. Supply chain financial orchestration system 10 further includes a memory 14 for storing information and instructions to be executed by processor 22. Memory 14 can be comprised of any combination of random access memory ("RAM"), read only memory ("ROM"), static storage such as a magnetic or optical disk, or any other type of machine or computer-readable medium. Supply chain financial orchestration system 10 further includes a communication device 20, such as a network interface card or other communications interface, to provide access to a network. As a result, a user may interface with supply chain financial orchestration system 10 directly, or remotely through a network or any other method.

A computer-readable medium may be any available medium that can be accessed by processor 22. A computer-readable medium may include both a volatile and nonvolatile medium, a removable and non-removable medium, a communication medium, and a storage medium. A communication medium may include computer readable instructions, data structures, program modules or other data in a modulated data signal such as a carrier wave or other transport mechanism, and may include any other form of information delivery medium known in the art. A storage medium may include RAM, flash memory, ROM, erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

Processor 22 can also be operatively coupled via bus 12 to a display 24, such as a Liquid Crystal Display ("LCD"). Display 24 can display information to the user. A keyboard 26 and a cursor control device 28, such as a computer mouse, can also be operatively coupled to bus 12 to enable the user to interface with supply chain financial orchestration system 10.

According to one embodiment, memory 14 can store software modules that may provide functionality when executed by processor 22. The modules can include an operating system 15, a supply chain financial orchestration sequencer module 16, as well as other functional modules 18. Operating system 15 can provide an operating system functionality for supply chain financial orchestration system 10. Supply chain financial orchestration sequencer module 16 can provide functionality for sequencing a plurality of tasks for a plurality of events, as is described in more detail below. In certain embodiments, supply chain financial orchestration sequencer module 16 can comprise a plurality of modules that each provide specific individual functionality for sequencing a plurality of tasks for a plurality of events. Supply chain financial orchestration system 10 can also be part of a larger system. Thus, supply chain financial orchestration system 10 can include one or more additional functional modules 18 to include the additional functionality. For example, functional modules 18 may include modules that provide additional functionality, such as an "Oracle Fusion Applications" product from Oracle Corporation. In another example, functional modules 18 may include enterprise resource planning ("ERP") modules of an ERP system, where an ERP system is a computer system that integrates several data sources and processes of an organization into a unified system.

Processor 22 can also be operatively coupled via bus 12 to a database 34. Database 34 can store data in an integrated collection of logically-related records or files. Database 34 can be an operational database, an analytical database, a data warehouse, a distributed database, an end-user database, an external database, a navigational database, an in-memory database, a document-oriented database, a real-time database, a relational database, an object-oriented database, or any other database known in the art.

FIG. 5-2 illustrates an example supply chain financial orchestration flow, according to an embodiment of the invention. The supply chain financial orchestration flow is between a shipping entity in China and a receiving entity in the United States. As illustrated in FIG. 5-2, the supply chain financial orchestration flow includes a physical movement flow 210 and a financial flow 220. Physical movement flow 210 represents the physical movement of items from the shipping entity in China, to the receiving entity in the United States, and can involve the physical movement through one or more intermediate entities. Physical movement flow 210 can include one or more physical transactions that are executed in association with the physical movement of the items (such as shipments, receipts, etc.). Financial flow 220 represents the change in financial ownership of items from the shipping entity in China, to the receiving entity in the United States, and can involve the change in financial ownership of one or more intermediate entities. Financial flow 220 can include one or more financial transactions that are executed in associate with the change in financial ownership of the items (such as orders, invoices, payments, etc.). As illustrated in FIG. 5-2, a physical movement flow can be separate and independent of a financial flow within a supply chain financial orchestration system.

FIG. 5-3 illustrates a block diagram of an example architecture of a supply chain financial orchestration system 300, according to an embodiment of the invention. According to the embodiment, supply chain financial orchestration system 300 is a configurable system that manages internal trade relationships between entities belonging to an enterprise, where the enterprise is typically spread across geographies. Supply chain financial orchestration system 300 can define a nature of trade relationships, business rules, internal controls, regulatory compliances, and other terms and conditions required to execute, monitor, and evaluate trade transactions emanating out of such relationships. More specifically, supply chain financial orchestration system 300 can listen to events that occur in supply chain transactions in various external source systems, and can identify internal transactions (such as inter-company transactions and intra-company transactions) based on pre-defined trade relationships. Once the internal transactions are identified, supply chain financial orchestration system 300 can create necessary accounting and documentations required to be generated for the internal transactions according to the business rules defined in supply chain financial orchestration system 300.

According to the illustrated embodiment, supply chain financial orchestration system 300 includes event mediator 301, event capture 302, event manager 303, orchestration service 304, execution manager 305, task layer service 306, external interface layer service 307, connector service 308, and callback service 309. Event mediator 301 listens for events generated by an external source system (i.e., application) of external source systems (i.e., applications) 310. If an event is of interest to supply chain financial orchestration system 300, event mediator 301 can also call a web service exposed by the external source system of external source systems 310 to enrich the event details. Event mediator 301 then sends the event to event capture 302. Event capture 302 validates the event details retrieved after enrichment, and stores the event in an external source system format.

Subsequently, event manager 303 identifies a source document enrichment web service based on a source order type, and calls the source document enrichment web service for enrichment. The source document enrichment service is exposed by an external source system of external source systems 310 where the source order originated. Event manager 303 can pass a source document identifier as an input parameter to the enrichment web service and can retrieve the source document information, where a source document identifier is a unique identifier of the source document that is communicated to the external source system of external source systems 310. The external source system of external source systems 310 that is responsible for capturing the physical transaction can be responsible for passing the source document identifier as part of event information. Supply chain financial orchestration system 300 can maintain an association between a supply chain event and a source document type. Event manager 303 can further transform the source document information into a format that is understandable by supply chain financial orchestration system 300, and can identify a supply chain financial orchestration flow based on qualifiers, source document type, physical route, parties involved in an internal trade, and a priority of the supply chain financial orchestration flow. Further, a supply chain financial orchestration flow can be date effective. This means that any modification to a supply chain financial orchestration flow can cause a new effective date to be associated with the supply chain financial orchestration flow. Thus, transactions pertaining to a source document created before the effective date of the modification can be associated with the original supply chain financial orchestration flow, and transactions pertaining to a source document created after the effective date of the modification can be associated with the modified supply chain financial orchestration flow.

Orchestration service 304 verifies whether a supply chain financial orchestration flow is already assigned to a source document or not. If the supply chain financial orchestration flow is not already assigned, orchestration service 304 can assign the supply chain financial orchestration flow to the source document, and can generate the tasks that are to be performed between internal entities based on the documentation and accounting rules setup for the supply chain financial orchestration flow (such as a global procurement flow, a customer shipment flow, and an internal transfer flow). A global procurement flow is a supply chain financial orchestration flow where a central buying entity buys goods from suppliers on behalf of one or more internal entities. The supplier liability is borne by the purchasing entity. The purchasing and requesting entity settle the transaction among themselves using a transfer price (sometimes through one or more intermediary entities). A customer shipment flow is a supply chain financial orchestration flow in which a selling business unit is different from a profit center business unit of the entity that owns and ships the goods. The selling entity receives an order from a customer, and the shipping entity ships the goods directly to the customer. The shipping entity is settled financially by the selling entity (sometimes through one or more intermediary entities). A customer shipment flow can be an internal drop shipment flow, which is a forward customer shipment flow, or a customer drop shipment flow, or a return customer shipment flow. An internal transfer flow is a supply chain financial orchestration flow in which physical movement of goods happens between internal entities. The internal entities settle the financial transactions among themselves using a transfer price.

The tasks that are to be performed can be specific to a forward flow and a return flow for the supply chain financial orchestration flow. A forward flow is a flow of events that proceeds in a specific direction (such as from a supplier entity to a purchaser entity), and a return flow is a flow of events that proceeds in a reverse direction (such as from a purchaser entity to a supplier entity). In addition to ownership transfer between internal entities, events indicating ownership transfer from a supplier entity to a purchasing entity can also be setup in a supply chain financial orchestration flow definition. When an event designated as a supplier ownership change event occurs, orchestration service 304 can generate the tasks for creating trade distributions to book supplier accrual and costs in a costing system, as well. Execution manager 305 invokes a task layer service based on a task type. Generally, the tasks are performed in a defined sequence, and if there is any dependency from a previous task, execution manager 305 can wait for the previous task to complete. Example task types can include inter-company trade documents (e.g., purchase order and sales order), trade distribution tasks related to costing, inter-company receivable invoices related to inter-company receivable, payables invoice, or credit memo tasks that are set in documentation and accounting rules. Task types can also include user-defined tasks.

Task layer service 306 creates a task layer service payload. Task layer service 306 can include logic to populate the payload data depending on a global procurement flow, a customer shipment flow, or an internal transfer flow. Task layer service 306 can also call a transfer price service to get a transfer price, where the transfer price is a price in which a selling entity sells goods to a purchasing entity, where the selling entity and the purchasing entity are involved in an internal trade. External interface layer service 307 identifies a target system (i.e., application) of target systems (i.e., applications) 320, and obtains a connector service (e.g., connector service 308) for the target system of target systems 320 based on the task type. Connector service 308 transforms the task layer service payload into a format which is understandable by the target system of target systems 320. Once the task data is transformed according to a target system format, connector service 308 calls a web service to interface tasks in interface tables of the target system of target systems 320. Callback service 309 receives responses from the target system of target systems 320 and updates the task status. If the task is a last task in a sequence, then the supply chain financial orchestration is complete. Otherwise, the next task in the sequence is selected, and execution manager 305 is invoked with the task type.

Supply chain financial orchestration system 300 further includes a supply chain financial orchestration work area 330 that includes a plurality of user interfaces that allow a user to interact with supply chain financial orchestration system 300. Supply chain financial orchestration work area 330 includes manage event exceptions 331, confirm financial orchestration route assignments 332, and monitor financial orchestration execution 333. Manage event exceptions 331 is a user interface that allows users to view, troubleshoot, and manage events which faulted due to a setup or technical reason. Confirm financial orchestration route assignments 332 is a user interface that allows a user to confirm a supply chain financial orchestration flow before the tasks of the supply chain financial orchestration flow are initiated by orchestration service 304. Monitor financial orchestration execution 333 is a user interface that allows user to monitor supply chain financial orchestration flows that are in progress, that have not started, and that have completed.

As previously described, a supply chain financial orchestration system can be an event-based orchestration system. This means that, for each event received by the supply chain financial orchestration system, a dynamic set of tasks can be initiated for execution. The events can represent internal transactions, and the tasks can be pre-defined as part of internal trade relationships. The tasks to be executed can be required to follow a sequence setup in the trade relationships. Thus, a given task can be prohibited from being executed unless its predecessor task has completed its execution. As the set of tasks is dynamic, and the sequence of their execution can be guaranteed, the supply chain financial orchestration system can include a mechanism for queuing these tasks.

According to an embodiment, a mediator resequencer can be used to queue the tasks. A resequencer is a system component that can rearrange a stream of related but out-of-sequence messages into a sequential order. When incoming messages arrive at a resequencer, they may be in a random order. The resequencer can order the messages based on sequential or chronological information. The resequencer can further send the messages to one or more external target services in an orderly manner. In accordance with the embodiment, the resequencer can work with two central concepts: groups and sequence identifiers. A sequence identifier is an identifying part of a message, and messages can be rearranged based on the sequence identifier. Messages arriving for resequencing can be split into groups, and the messages within a group can be sequenced according to the sequence identifier. Sequencing of messages within a group can be independent of the sequencing of messages in any other group. Thus, groups are not dependent on each other, and can be processed independently of each other. Examples of groups include task groups, which include one or more tasks and each task is associated with a task sequence identifier, and event groups, which include one or more events and each event is associated with an event sequence identifier.

The tasks that are initiated for execution by the supply chain financial orchestration system for a given event can be grouped and sequenced by a mediator resequencer. The default behavior of the mediator resequencer can be that the mediator resequencer does not wait for a predecessor task to complete its execution before the mediator resequencer initiates execution of a successor task. For example, if tasks T1, T2, and T3 are the tasks that are to be initiated for execution, and if the tasks are submitted to the mediator resequencer with sequence identifiers of 1, 2, 3, then tasks T1, T2, and T3 are all submitted for execution together. This default behavior can be a limitation for the supply chain financial orchestration system, as it may be required to have task T2 wait for the completion of task T1, and it may be required to have task T3 wait for the completion of task T2.

Thus, according to an embodiment, a mediator resequencer can create a task group and assign tasks to the task group with a gap of sequence identifiers between the tasks. In accordance with this embodiment, the mediator resequencer can be identified as a task sequencer within a supply chain financial orchestration system. Thus, in the aforementioned example, tasks T1, T2, and T3 can be submitted to a task sequencer (i.e., a mediator resequencer) with task sequence identifiers of 1, 3, and 5, respectively. Upon completion of task T1, the supply chain financial orchestration system can send a task completion acknowledgment for task T1 as a task to the task group created by the mediator resequencer with a task sequence identifier of 2. Since the task group now includes a task with a task sequence identifier of 2, the tasks with task sequence identifiers of 2 and 3 (which includes task T2) are submitted for execution. Similarly, when task T2 completes its execution, the supply chain financial orchestration system can send a task completion acknowledgment for task T2 as a task with a task sequence identifier of 4, and the tasks with task sequence identifiers 4 and 5 (which includes task T3) are submitted for execution.

According to an embodiment, a task sequencer (i.e., mediator resequencer) can be a component of an execution manager (such as execution manager 305 of FIG. 5-3). An orchestration service (such as orchestration service 304 of FIG. 5-3) can identify a set of tasks to be performed for a received event, can create a task group in the task sequencer, and can assign task sequence identifiers to the tasks with a gap of 1 between the task sequence identifiers. A callback service (such as callback service 309) can update a status of the current task and when the status is "Success" (i.e., the current task has completed execution), the callback service can invoke the execution manager and inform the execution manager to submit the task completion acknowledgment to the task sequencer with a task sequence identifier of the current task+1. The task sequencer subsequently submits the next task for execution.

FIG. 5-4 illustrates a block diagram of an event triggering an execution of tasks, according to an embodiment of the invention. More specifically, an inventory receipt event 410 is received at a supply chain financial orchestration system. The receipt of inventory receipt event 410 triggers a creation of a purchase order invoice, a sales order invoice, an accounts receivable invoice, and an accounts payable invoice between two entities. Thus, the receipt of inventory receipt event causes the supply chain financial orchestration system to initiate an execution of a purchase order task 420, a sales order task 430, an accounts receivable task 440, and an accounts payable task 450.

FIG. 5-5 illustrates a block diagram of tasks that are submitted to a task group with a sequence identifier, according to an embodiment of the invention. More specifically, a task group 510 is created within a task sequencer (i.e., a mediator resequencer). Task group 510 can be named using a format EventType_Event_ID_EventSystem ID (e.g., RCV_RCV1001_1234). Further, a purchase order task 520, a sales order task 540, an accounts receivable task 560, and an accounts payable task 580, can be submitted to task group 510 within the task sequencer with a gap of 1 in their task sequence identifiers (e.g., 1, 3, 5, and 7, respectively). When execution of purchase order task 520 is complete, a purchase order task completion acknowledgment 530 can be submitted to task group 510 within the task sequencer with a task sequence identifier of 2, where the submission of purchase order task completion acknowledgment 530 can make the next task in task group 510 (i.e., sales order task 540) eligible for execution. When execution of sales order task 540 is complete, a sales order task complete acknowledgment 550 can be submitted to task group 510 with a task sequence identifier of 4, where the submission of sales order task completion acknowledgement 550 can make the next task in task group 510 (i.e., accounts receivable task 560) eligible for execution. When execution of accounts receivable task 560 is complete, an accounts receivable task completion acknowledgment 570 can be submitted to task group 510 with a task sequence identifier of 6, where the submission of accounts receivable task completion acknowledgement 570 can make the next task in task group 510 (i.e., accounts payable task 580) eligible for execution.

FIG. 5-6 illustrates a flow diagram of the task sequencer functionality of a supply chain financial orchestration sequencer module (such as supply chain financial orchestration sequencer module 16 of FIG. 5-1), according to an embodiment of the invention. In one embodiment, the functionality of the flow diagram of FIG. 5-6, as well as the functionality of the flow diagram of FIG. 5-9 and the functionality of the flow diagram of FIG. 5-12, are each implemented by software stored in memory or other computer-readable or tangible medium, and executed by a processor. In other embodiments, each functionality may be performed by hardware (e.g., through the use of an application specific integrated circuit ("ASIC"), a programmable gate array ("PGA"), a field programmable gate array ("FPGA"), etc.), or any combination of hardware and software.

The flow begins and proceeds to 610. At 610, a list of tasks that are to be executed for an event are selected. The tasks can be defined for a supply chain financial orchestration flow, where a supply chain financial orchestration flow defines a trade relationship between a first entity and a second entity. Each task can be a financial accounting task associated with an internal transaction. The event can also be defined as a task generating event for the supply chain financial orchestration flow. The flow then proceeds to 620.

At 620, a task group is created that includes the selected tasks. A task sequence identifier is assigned to each task of the task group, where there is a gap between two task sequence identifiers. In certain embodiments, each task sequence identifier can be a numeric value, and the gap between two task sequence identifiers can be a gap of one. In certain embodiments, there can be a gap between more than two task sequence identifiers. A task sequencer is subsequently invoked. A task sequencer can be a mediator resequencer, where a mediator resequencer is a system component that can rearrange a stream of related but out-of-sequence messages into a sequential order. The flow then proceeds to 630.

At 630, the task sequencer receives the task group that includes the selected tasks. The flow then proceeds to 640.

At 640, the task sequencer initiates an execution of a task of the selected tasks if the task is eligible for execution. The flow then proceeds to 650.

At 650, the task is executed. In certain embodiments, an external target system can execute the task. The flow then proceeds to 660.

At 660, a task status is updated. In certain embodiments, a callback service updates the task status. Also in certain embodiments, the task status is updated to a status that indicates the task has completed execution. If there are no more tasks of the selected tasks to be executed, the flow ends. However, if there are tasks of the selected tasks to be executed, a task completion acknowledgement is submitted to the task sequencer, where the task completion acknowledgment makes a subsequent task of the selected tasks eligible for execution, and the flow returns to 630. Subsequently, an execution of a subsequent task is initiated, and even further, an execution of each task of the selected tasks is ultimately initiated.

In one embodiment, a supply chain financial orchestration system can be required to honor a sequence of events in an order that is pre-defined by a user of the supply chain financial orchestration system. Since external source systems can be different, a time at which the external source systems raise the events can also be different. A mediator resequencer can be used to queue the events in a pre-defined order. An event group can be created, and the events can be sequenced so that tasks related to a successor event (e.g., event E2) are not initiated for execution until all the tasks related to a predecessor event (e.g., event E1) have completed execution. This allows the supply chain financial orchestration system to honor the sequence of the events (e.g., events E1 and E2) in the pre-defined order. If the successor event (e.g., event E2) is received before the predecessor event (e.g., event E1) is received, then the successor event (e.g., event E2) is parked for further processing. Once the predecessor event (e.g., event E1) is received, the supply chain financial orchestration system initiates execution of both events (e.g., events E1 and E2) using the mediator resequencer. In accordance with this embodiment, the mediator resequencer can be identified as an event sequencer within a supply chain financial orchestration system. An event group can be created in the event sequencer (i.e., mediator resequencer), when an event is captured (e.g., event E1) and any parked events (e.g., event E2) are selected and pushed to the event sequencer (i.e., mediator resequencer) with a gap between the two event sequence identifiers.

FIG. 5-7 illustrates a block diagram of a sequence of occurrence of events and their occurrence timings, according to an embodiment of the invention. According to the embodiment, an event hierarchy can be defined by a user, where an expected order of execution of events is as follows: first, an advanced shipment notice ("ASN") event, and its related tasks, are executed; second, a receipt of goods ("RCV") event, and its related tasks, are executed; and third, a consumption of goods ("CON") event, and its related tasks, are executed. Thus, an ASN event is a parent event of an RCV event, the RCV event is the child event of the ASN event, the RCV event is a parent event of a CON event, and the CON event is a child event of the RCV event.

However, a supply chain financial orchestration system may not receive the events in the order defined by the event hierarchy. For example, as illustrated in FIG. 5-7, the supply chain orchestration system may receive event 720 (i.e., event RCV1) at time T1, may receive event 710 (i.e., event ASN1) at time T2, and may receive event 730 (i.e., event CON1) at time T3. Because event 720 is not eligible for execution at time T1 (due to the fact that event 710, event 720's parent event, has not yet been received by the supply chain financial orchestration system), event 720 is parked. This is further described in conjunction with FIG. 5-8.

FIG. 5-8 includes a block diagram of an event group that includes events and event completion acknowledgements, according to an embodiment of the invention. More specifically, an event group 810 is created within an event sequencer (i.e., a mediator resequencer). Event group 810 can be named using a format DocNum_SystemID_DocType_(EventType1+Occurrence)_(EventType2+Occurrence)_. . . _(EventType(n−1)+Occurrence) (e.g., DN101_S1_PO_ASN1_RCV1). As previously described in conjunction with FIG. 5-7, a supply chain orchestration system can receive event 840 (i.e., event RCV1) at time T1, may receive event 820 (i.e., event ASN1) at time T2, and may receive event 860 (i.e., event CON1) at time T3. Because event 840 is not eligible for execution at time T1 (due to the fact that event 820, event 840's parent event, has not yet been received by the supply chain financial orchestration system), event 840 is parked. When event 820 is received by the supply chain orchestration system, events 820 and 840 are pushed to event group 810, and event sequence identifiers of 1 and 3 are assigned to events 820 and 840, respectively. When event 860 is received by the supply chain financial orchestration system, then event 860 is pushed to event group 810 with the event sequence identifier of either 4 or 5 based on a status of completion of tasks related to event 840. More specifically, an event sequence identifier of 4 is assigned to event 860 when all the tasks related to event 840 have completed their execution. Otherwise, an event sequence identifier of 5 is assigned to event 860. This is illustrated in the following table:

| Event | Parent Event | Event Group Name | Event Sequence Identifier |
|---|---|---|---|
| ASN | | DN101_S1_PO_ASN1_RCV1 | 1 |
| RCV | ASN | DN101_S1_PO_ASN1_RCV1 | 3 |
| CON | RCV | DN101_S1_PO_ASN1_RCV1 | 4 or 5 |

According to the embodiment, event sequence identifiers are set with a gap of 1 so that the tasks related to successor event are not initiated for execution until the completion of all the tasks related to predecessor event. When all of the tasks related to an event have completed their execution, an event completion acknowledgment is sent to the event sequencer so that the tasks related to the next event can be submitted to a task sequencer for execution. In the illustrated embodiment, when all the tasks related to event 820 have completed their execution, an event completion acknowledgement 830 (i.e., ASN event completion acknowledgment) is submitted to the event sequencer, which pushes all the tasks related to event 840 to the task sequencer for execution. Similarly, when all the tasks related to event 840 have completed their execution, an event completion acknowledgment 850 (i.e., RCV event completion acknowledgement) is submitted to the event sequencer, which pushes all the tasks related to event 860 to the task sequencer for execution.

FIG. 5-9 illustrates a flow diagram of the event sequencer functionality of a supply chain financial orchestration sequencer module, according to another embodiment of the invention. The flow begins and proceeds to 910. At 910, an event is received. In certain embodiments, the event can be an event of a plurality of events. The flow then proceeds to 915.

At 915, it is determined whether the event is a first event in an event hierarchy or whether a parent event of the event has been processed. The event hierarchy can define an order of execution of the plurality of events. A predecessor event can be a parent event of a successor event within the event hierarchy. Further, the successor event can be a child event of the predecessor event within the event hierarchy. If it is determined that the event is not a first event in the event hierarchy, and that the parent event of the event has not been processed, the flow proceeds to 920. If it is determined that the event is a first event in the event hierarchy, or that the parent event of the event has been processed, the flow proceeds to 925.

At 920, the event is parked within an event sequencer for future processing. An event sequencer can be a mediator resequencer, where a mediator resequencer is a system component that can rearrange a stream of related but out-of-sequence messages into a sequential order. The flow then ends.

At 925, if the event is a topmost event of an event hierarchy (i.e., if the event is the first event received in the event hierarchy), then an event group is created that includes the plurality of events. An event sequence identifier is assigned to the event. If there are any events parked and waiting for the current event, then, for all the parked events and the current event, an event sequence identifier is assigned that includes a gap between the event sequence identifier of each event and the event sequence identifier of a predecessor event. Thus, an event sequence identifier is assigned to each event of the plurality of events, where there is a gap between two event sequence identifiers. In certain embodiments, each event sequence identifier can be a numeric value, and the gap between two event sequence identifiers can be a gap of one. In certain embodiments, there can be a gap between more than two event sequence identifiers. An event sequencer is subsequently invoked. The flow then proceeds to 930.

At 930, the event sequencer receives the event group that includes the plurality of events. The flow then proceeds to 935.

At 935, a list of tasks that are to be executed for the event are selected. The tasks can be defined for a supply chain financial orchestration flow, where a supply chain financial orchestration flow defines a trade relationship between a first entity and a second entity. Each task can be a financial accounting task associated with an internal transaction. The event can also be defined as a task generating event for the supply chain financial orchestration flow. The flow then proceeds to 940.

At 940, a task group is created that includes the selected tasks. A task sequence identifier is assigned to each task of the task group, where there is a gap between two task sequence identifiers. In certain embodiments, each task sequence identifier can be a numeric value, and the gap between two task sequence identifiers can be a gap of one. In certain embodiments, there can be a gap between more than two task sequence identifiers. A task sequencer is subsequently invoked. A task sequencer can be a mediator resequencer, where a mediator resequencer is a system component that can rearrange a stream of related but out-of-sequence messages into a sequential order. The flow then proceeds to 945.

At 945, the task sequencer receives the task group that includes the selected tasks. The flow then proceeds to 950.

At 950, the task sequencer initiates an execution of a task of the selected tasks if the task is eligible for execution. The flow then proceeds to 955.

At 955, the task is executed. In certain embodiments, an external target system can execute the task. The flow then proceeds to 960.

At 960, a task status is updated. In certain embodiments, a callback service updates the task status. Also in certain embodiments, the task status is updated to a status that indicates the task has completed execution. The flow then proceeds to 965.

At 965, it is determined whether all the selected tasks for the event have completed their execution. If it is determined that all the selected tasks for the event have completed their execution and it is further determined that there are no remaining events of the plurality of events to process, the flow ends. However, if it is determined that all the selected tasks for the event have completed their execution, and it is further determined that there is at least one remaining event of the plurality of events to process, an event completion acknowledgement is submitted to the event sequencer, where the event completion acknowledgment makes a plurality of tasks for a subsequent event of the plurality of events eligible for execution, and the flow returns to 930. If it is determined that all the selected tasks for the event have not completed their execution, then the flow proceeds to 970.

At 970, a task completion acknowledgement is submitted to the task sequencer, where the task completion acknowledgment makes a subsequent task of the selected tasks eligible for execution, and then the flow returns to 945. Subsequently, an execution of a subsequent task is initiated, and even further, an execution of each task of the selected tasks is ultimately initiated.

In one embodiment, a supply chain financial orchestration system can handle a repetition of events. A repetition of events means that there are multiple child events possible for a given parent event. For example, there can be multiple CON events that refer to a single RCV event, or there can be multiple RCV events for a given ASN event. It can be difficult to handle the events when they arrive in repetition without a mechanism of queuing the events in a pre-defined order of their occurrence hierarchy. An event sequencer (i.e., mediator resequencer) can help in achieving this via multiple groups, where the group name and the sequence in the group handles the processing of the events in the order queued in it.

FIG. 5-10 illustrates a block diagram of a repetitive event occurrence hierarchy and the events' occurrence timings, according to an embodiment of the invention. According to the embodiment, an event hierarchy can be defined by a user, where an expected order of execution of events is as follows: first, an ASN event, and its related tasks, are executed; second, an RCV event, and its related tasks, are executed; and third, a CON event, and its related tasks, are executed. Thus, an ASN event is a parent event of an RCV event, the RCV event is the child event of the ASN event, the RCV event is a parent event of a CON event, and the CON event is a child event of the RCV event.

According to an embodiment, a supply chain financial orchestration system can receive the events in an order that is different from the order defined by the event hierarchy. For example, as illustrated in FIG. 5-10, the supply chain orchestration system may receive event 1020 (i.e., event RCV1) at time T1, may receive event 1010 (i.e., event ASN1) at time T2, may receive event 1030 (i.e., event CON1) at time T3, may receive event 1040 (i.e., event CON02) at time T4, may receive event 1050 (i.e., event RCV02) at time T5, and may receive event 1060 (i.e., event CON03) at time T6. Because event 1020 is not eligible for execution at time T1 (due to the fact that event 1010, event 1020's parent event, has not yet been received by the supply chain financial orchestration system), event 1020 is parked. When event 1010 is received, all the events that were previously parked are picked up and submitted to an event group (i.e., event group 1070) and are each assigned an event sequence identifier. When events 1030 and 1040 are received, these events are pushed to event group 1070, and also assigned event sequence identifiers. When event 1050 is received, a new event group (event group 1080) is created. Events 1050 and 1060 are pushed to event group 1080, and are also assigned event sequence identifiers. This is further described in conjunction with FIG. 5-11.

FIG. 5-11 illustrates a block diagram of event groups that include events and event completion acknowledgments, according to an embodiment of the invention. More specifically, an event group 1110 is created within an event sequencer (i.e., mediator resequencer). Event group 1110 can be named using a format DocNum_SystemID_DocType_(EventType1+Occurrence)_EventType2+Occurrence)_. . . _(EventType(n−1)+Occurrence) (e.g., DN101_S1_PO_ASN1_RCV1). As previously described in conjunction with FIG. 5-10, a supply chain financial orchestration system can receive event 1113 (i.e., event RCV1) at time T1, can receive event 1111 (i.e., event ASN01) at time T2, can receive event 1115 (i.e., event CON01) at time T3, can receive event 1116 (i.e., event CON02) at time T4, can receive event 1122 (i.e., event RCV02) at time T5, and can receive event 1124 (i.e., event CON03) at time T6. Because event 1113 is not eligible for execution at time T1 (due to the fact that event 1111, event 1113's parent event, has not yet been received by the supply chain financial orchestration system, event 1113 is parked. When event 1111 is received by the supply chain financial orchestration system, events 1111 and 1113 are pushed to event group 1110, and event sequence identifiers of 1 and 3 are assigned to events 1111 and 1113, respectively.

According to the embodiment, an event sequence identifier can be calculated based on a completion status of the previous event (i.e., the parent event type). If the previous event has completed execution before the reception of the current event, then the event sequence identifier for the current identifier can be assigned as the previous event's event sequence identifier+1. If the previous event has not completed execution before the reception of the current event, then the event sequence identifier for the current event can be assigned as the previous event's event sequence identifier+2.

When events 1115 and 1116 are received by the supply chain financial orchestration system (in that order), then events 1115 and 1116 are pushed to event group 1110 with the event sequence identifiers of 4 and 5, or 5 and 6, based on the completion of the execution of the tasks related to event 1113. That is, event sequence identifiers of 4 and 5 are assigned to events 1115 and 1116 when all the tasks related to event 1113 have completed execution. Event sequence identifiers of 5 and 6 are assigned to events 1115 and 1116 when all the tasks related to event 1113 have not completed execution. According to the embodiment, events 1115 and 1116 can be assigned sequential event sequence identifiers since they are not dependent on each other (i.e., they can be executed in parallel).

When event 1122 is received, a new event group (i.e., event group 1120) is created because event 1122 is a new child event occurrence of event 1111, and all child events of event 1122 are queued within event group 1120. An event sequence identifier of event 1122 is set to either 1 or 2 based on the completion of the execution of the tasks related to event 1111. Further, when event 1124 is received, event 1124 is pushed to event group 1120, and assigned an event sequence identifier of either 2, 3, or 4, based on the completion of the execution of the tasks related to event 1111 and the completion of the execution of the tasks related to event 1122. This is illustrated in the following table:

| Event | Parent Event | Group Name | Event Sequence Identifier |
|---|---|---|---|
| ASN01 | | DN101_S1_PO_ASN1_RCV1 | 1 |
| RCV01 | ASN01 | DN101_S1_PO_ASN1_RCV1 | 3 |
| CON01 | RCV01 | DN101_S1_PO_ASN1_RCV1 | 4 or 5 |
| CON02 | RCV01 | DN101_S1_PO_ASN1_RCV1 | 5 or 6 |
| RCV02 | ASN01 | DN101_S1_PO_ASN1_RCV2 | 1 or 2 |
| CON03 | RCV02 | DN101_S1_PO_ASN1_RCV2 | 2 or 3 OR 3 or 4 |

When all of the tasks related to an event have completed their execution, an event completion acknowledgment is sent to the event sequencer so that the tasks related to the next event can be submitted to a task sequencer for execution. In the illustrated embodiment, when all the tasks related to event 1111 have completed their execution, an event completion acknowledgement 1112 (i.e., ASN event completion acknowledgment) is submitted to the event sequencer, which pushes all the tasks related to event 1113 to the task sequencer for execution. Further, an event completion acknowledgement 1121 (i.e., ASN event completion acknowledgment) is also submitted to the event sequencer, which pushes all the tasks related to event 1122 to the task sequencer for execution. Similarly, when all the tasks related to event 1113 have completed their execution, an event completion acknowledgment 1114 (i.e., RCV event completion acknowledgement) is submitted to the event sequencer, which pushes all the tasks related to event 1115 and related to event 1116 (as both events can run in parallel) to the task sequencer for execution. Likewise, when all the tasks related to event 1122 have completed their execution, an event completion acknowledgment 1123 (i.e., RCV event completion acknowledgment) is submitted to the event sequencer, which pushes all the tasks related to event 1124 to the task sequencer for execution.

FIG. 5-12 illustrates a flow diagram of the repetitive event sequencer functionality of a supply chain financial orchestration sequencer module, according to another embodiment of the invention. The flow begins and proceeds to 1210. At 1210, an event is received. In certain embodiments, the event can be an event of a plurality of events. The flow then proceeds to 1215.

At 1215, it is determined whether the event is a first event in an event hierarchy or whether a parent event of the event has been processed. The event hierarchy can define an order of execution of the plurality of events. A predecessor event can be a parent event of a successor event within the event hierarchy. Further, the successor event can be a child event of the predecessor event within the event hierarchy. If it is determined that the event is not a first event in the event hierarchy, and that the parent event of the event has not been processed, the flow proceeds to 1220. If it is determined that the event is a first event in the event hierarchy, or that the parent event of the event has been processed, the flow proceeds to 1225.

At 1220, the event is parked for future processing. An event sequencer can be a mediator resequencer, where a mediator resequencer is a system component that can rearrange a stream of related but out-of-sequence messages into a sequential order. The flow then ends.

At 1225, if the event is a topmost event of an event hierarchy (i.e., if the event is the first event received of the event hierarchy), or if the event is a child event of the topmost event, then an event group is created that includes the plurality of events. An event sequence identifier is assigned to the event. If any event is parked and waiting on the current event, then an event sequence identifier is assigned to the parked events that includes a gap between the event sequence identifier of the event and the event sequence identifier of a predecessor event. Thus, an event sequence identifier is assigned to each event of the plurality of events, where there is a gap between two event sequence identifiers. In certain embodiments, each event sequence identifier can be a numeric value, and the gap between two event sequence identifiers can be a gap of one. In certain embodiments, there can be a gap between more than two event sequence identifiers. An event sequencer is subsequently invoked. The flow then proceeds to 1230.

At 1230, the event sequencer receives the event group that includes the plurality of events. The flow then proceeds to 1235.

At 1235, a list of tasks that are to be executed for the event are selected. The tasks can be defined for a supply chain financial orchestration flow, where a supply chain financial orchestration flow defines a trade relationship between a first entity and a second entity. Each task can be a financial accounting task associated with an internal transaction. The event can also be defined as a task generating event for the supply chain financial orchestration flow. The flow then proceeds to 1240.

At 1240, a task group is created that includes the selected tasks. A task sequence identifier is assigned to each task of the task group, where there is a gap between two task sequence identifiers. In certain embodiments, each task sequence identifier can be a numeric value, and the gap between two task sequence identifiers can be a gap of one. In certain embodiments, there can be a gap between more than two task sequence identifiers. A task sequencer is subsequently invoked. A task sequencer can be a mediator resequencer, where a mediator resequencer is a system component that can rearrange a stream of related but out-of-sequence messages into a sequential order. The flow then proceeds to 1245.

At 1245, the task sequencer receives the task group that includes the selected tasks. The flow then proceeds to 1250.

At 1250, the task sequencer initiates an execution of a task of the selected tasks if the task is eligible for execution. The flow then proceeds to 1255.

At 1255, the task is executed. In certain embodiments, an external target system can execute the task. The flow then proceeds to 1260.

At 1260, a task status is updated. In certain embodiments, a callback service updates the task status. Also in certain embodiments, the task status is updated to a status that indicates the task has completed execution. The flow then proceeds to 1265.

At 1265, it is determined whether all the selected tasks for the event have completed their execution. If it is determined that all the selected tasks for the event have completed their execution and it is further determined that there are no remaining events of the plurality of events to process, the flow ends. However, if it is determined that all the selected tasks for the event have completed their execution, and it is further determined that there is at least one remaining event of the plurality of events to process, an event completion acknowledgement is submitted to the event sequencer, where the event completion acknowledgment makes a plurality of tasks for a subsequent event of the plurality of events eligible for execution, and the flow returns to 1230. If it is determined that all the selected tasks for the event have not completed their execution, then the flow proceeds to 1270.

At 1270, a task completion acknowledgement is submitted to the task sequencer, where the task completion acknowledgment makes a subsequent task of the selected tasks eligible for execution, and then the flow returns to 1245. Subsequently, an execution of a subsequent task is initiated, and even further, an execution of each task of the selected tasks is ultimately initiated.

Thus, in one embodiment, a supply chain financial orchestration system can receive an event and initiate execution of one or more tasks, when a successor task is not initiated until a predecessor task has completed its execution. The supply chain financial orchestration system can further sequence a plurality of received events, where tasks for a successor event are not initiated until all tasks of a predecessor event have completed their execution. Further, the supply chain financial orchestration system can queue multiple child events for a given parent event so that the event are processed in a prescribed order of their occurrence hierarchy. This allows the supply chain financial orchestration system to maintain a sequence defined by a trade relationship. Such a sequence can allow for more precise orchestration of supply chain financial orchestration tasks associated with an internal transaction.

The features, structures, or characteristics of the invention described throughout this specification may be combined in any suitable manner in one or more embodiments. For example, the usage of "one embodiment," "some embodiments," "certain embodiment," "certain embodiments," or other similar language, throughout this specification refers to the fact that a particular feature, structure, or characteristic described in connection with the embodiment may be included in at least one embodiment of the present invention. Thus, appearances of the phrases "one embodiment," "some embodiments," "a certain embodiment," "certain embodiments," or other similar language, throughout this specification do not necessarily all refer to the same group of embodiments, and the described features, structures, or characteristics may be combined in any suitable manner in one or more embodiments.

One having ordinary skill in the art will readily understand that the invention as discussed above may be practiced with steps in a different order, and/or with elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

DETAILED DESCRIPTION—SECTION 6

According to an embodiment, a supply chain financial orchestration system is provided that can provide one or more qualifier rules (i.e., "qualifiers"), where the qualifiers can be user-defined qualifiers. A qualifier is a rule for determining an applicability of a supply chain financial orchestration flow, where a supply chain financial orchestration flow defines a trade relationship between a first entity and a second entity. More specifically, a qualifier can be used to determine whether a supply chain financial orchestration flow is applicable to a transaction or source document. The qualifier can include a number of conditions. If a sufficient amount of conditions of the qualifier are met, then the supply chain financial orchestration flow is applicable to the transaction or source document. If a sufficient amount of conditions of the qualifier are not met, then the supply chain financial orchestration flow is not applicable to the transaction or source document. One or more qualifiers can be defined as part of (i.e., associated with) a supply chain financial orchestration flow. A qualifier can invoke an external user-defined computer program to generate a value for a parameter for one or more conditions of the qualifier. The external user-defined computer program can be registered and stored within a definition of the qualifier for invocation at run-time during evaluation of the one or more conditions of the qualifier.

FIG. 6-1 illustrates a block diagram of a supply chain financial orchestration system 10 that may implement one embodiment of the invention. Supply chain financial orchestration system 10 includes a bus 12 or other communications mechanism for communicating information between components of supply chain financial orchestration system 10. Supply chain financial orchestration system 10 also includes a processor 22, operatively coupled to bus 12, for processing information and executing instructions or operations. Processor 22 may be any type of general or specific purpose processor. Supply chain financial orchestration system 10 further includes a memory 14 for storing information and instructions to be executed by processor 22. Memory 14 can be comprised of any combination of random access memory ("RAM"), read only memory ("ROM"), static storage such as a magnetic or optical disk, or any other type of machine or computer-readable medium. Supply chain financial orchestration system 10 further includes a communication device 20, such as a network interface card or other communications interface, to provide access to a network. As a result, a user may interface with supply chain financial orchestration system 10 directly, or remotely through a network or any other method.

A computer-readable medium may be any available medium that can be accessed by processor 22. A computer-readable medium may include both a volatile and nonvolatile medium, a removable and non-removable medium, a communication medium, and a storage medium. A communication medium may include computer readable instructions, data structures, program modules or other data in a modulated data signal such as a carrier wave or other transport mechanism, and may include any other form of information delivery medium known in the art. A storage medium may include RAM, flash memory, ROM, erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

Processor 22 can also be operatively coupled via bus 12 to a display 24, such as a Liquid Crystal Display ("LCD"). Display 24 can display information to the user. A keyboard 26 and a cursor control device 28, such as a computer mouse, can also be operatively coupled to bus 12 to enable the user to interface with supply chain financial orchestration system 10.

According to one embodiment, memory 14 can store software modules that may provide functionality when executed by processor 22. The modules can include an operating system 15, a supply chain financial orchestration qualifier module 16, as well as other functional modules 18. Operating system 15 can provide an operating system functionality for supply chain financial orchestration system 10. Supply chain financial orchestration qualifier module 16 can provide functionality for defining and evaluating qualifiers with at least one custom parameter, as is described in more detail below. In certain embodiments, supply chain financial orchestration qualifier module 16 can comprise a plurality of modules that each provide specific individual functionality for defining and evaluating qualifiers with at least one custom parameter. Supply chain financial orchestration system 10 can also be part of a larger system. Thus, supply chain financial orchestration system 10 can include one or more additional functional modules 18 to include the additional functionality. For example, functional modules 18 may include modules that provide additional functionality, such as an "Oracle Fusion Applications" product from Oracle Corporation. In another example, functional modules 18 may include enterprise resource planning ("ERP") modules of an ERP system, where an ERP system is a computer system that integrates several data sources and processes of an organization into a unified system.

Processor 22 can also be operatively coupled via bus 12 to a database 34. Database 34 can store data in an integrated collection of logically-related records or files. Database 34 can be an operational database, an analytical database, a data warehouse, a distributed database, an end-user database, an external database, a navigational database, an in-memory database, a document-oriented database, a real-time database, a relational database, an object-oriented database, or any other database known in the art.

FIG. 6-2 illustrates an example supply chain financial orchestration flow, according to an embodiment of the invention. The supply chain financial orchestration flow is between a shipping entity in China and a receiving entity in the United States. As illustrated in FIG. 6-2, the supply chain financial orchestration flow includes a physical movement flow 210 and a financial flow 220. Physical movement flow 210 represents the physical movement of items from the shipping entity in China, to the receiving entity in the United States, and can involve the physical movement through one or more intermediate entities. Physical movement flow 210 can include one or more physical transactions that are executed in association with the physical movement of the items (such as shipments, receipts, etc.). Financial flow 220 represents the change in financial ownership of items from the shipping entity in China, to the receiving entity in the United States, and can involve the change in financial ownership of one or more intermediate entities. Financial flow 220 can include one or more financial transactions that are executed in associate with the change in financial ownership of the items (such as orders, invoices, payments, etc.). As illustrated in FIG. 6-2, a physical movement flow can be separate and independent of a financial flow within a supply chain financial orchestration system.

FIG. 6-3 illustrates a block diagram of an example architecture of a supply chain financial orchestration system 300, according to an embodiment of the invention. According to the embodiment, supply chain financial orchestration system 300 is a configurable system that manages internal trade relationships between entities belonging to an enterprise, where the enterprise is typically spread across geographies. Supply chain financial orchestration system 300 can define a nature of trade relationships, business rules, internal controls, regulatory compliances, and other terms and conditions required to execute, monitor, and evaluate trade transactions emanating out of such relationships. More specifically, supply chain financial orchestration system 300 can listen to events that occur in supply chain transactions in various external source systems, and can identify internal transactions (such as inter-company transactions and intra-company transactions) based on pre-defined trade relationships. Once the internal transactions are identified, supply chain financial orchestration system 300 can create necessary accounting and documentations required to be generated for the internal transactions according to the business rules defined in supply chain financial orchestration system 300.

According to the illustrated embodiment, supply chain financial orchestration system 300 includes event mediator 301, event capture 302, event manager 303, orchestration service 304, execution manager 305, task layer service 306, external interface layer service 307, connector service 308, and callback service 309. Event mediator 301 listens for events generated by an external source system (i.e., application) of external source systems (i.e., applications) 310. If an event is of interest to supply chain financial orchestration system 300, event mediator 301 can also call a web service exposed by the external source system of external source systems 310 to enrich the event details. Event mediator 301 then sends the event to event capture 302. Event capture 302 validates the event details retrieved after enrichment, and stores the event in an external source system format.

Subsequently, event manager 303 identifies a source document enrichment web service based on a source order type, and calls the source document enrichment web service for enrichment. The source document enrichment service is exposed by an external source system of external source systems 310 where the source order originated. Event manager 303 can pass a source document identifier as an input parameter to the enrichment web service and can retrieve the source document information, where a source document identifier is a unique identifier of the source document that is communicated to the external source system of external source systems 310. The external source system of external source systems 310 that is responsible for capturing the physical transaction can be responsible for passing the source document identifier as part of event information. Supply chain financial orchestration system 300 can maintain an association between a supply chain event and a source document type. Event manager 303 can further transform the source document information into a format that is understandable by supply chain financial orchestration system 300, and can identify a supply chain financial orchestration flow based on qualifiers, source document type, physical route, parties involved in an internal trade, and a priority of the supply chain financial orchestration flow. Further, a supply chain financial orchestration flow can be date effective. This means that any modification to a supply chain financial orchestration flow can cause a new effective date to be associated with the supply chain financial orchestration flow. Thus, transactions pertaining to a source document created before the effective date of the modification can be associated with the original supply chain financial orchestration flow, and transactions pertaining to a source document created after the effective date of the modification can be associated with the modified supply chain financial orchestration flow.

Orchestration service 304 verifies whether a supply chain financial orchestration flow is already assigned to a source document or not. If the supply chain financial orchestration flow is not already assigned, orchestration service 304 can assign the supply chain financial orchestration flow to the source document, and can generate the tasks that are to be performed between internal entities based on the documentation and accounting rules setup for the supply chain financial orchestration flow (such as a global procurement flow, a customer shipment flow, and an internal transfer flow). A global procurement flow is a supply chain financial orchestration flow where a central buying entity buys goods from suppliers on behalf of one or more internal entities. The supplier liability is borne by the purchasing entity. The purchasing and requesting entity settle the transaction among themselves using a transfer price (sometimes through one or more intermediary entities). A customer shipment flow is a supply chain financial orchestration flow in which a selling business unit is different from a profit center business unit of the entity that owns and ships the goods. The selling entity receives an order from a customer, and the shipping entity ships the goods directly to the customer. The shipping entity is settled financially by the selling entity (sometimes through one or more intermediary entities). A customer shipment flow can be an internal drop shipment flow, which is a forward customer shipment flow, or a customer drop shipment flow, or a return customer shipment flow. An internal transfer flow is a supply chain financial orchestration flow in which physical movement of goods happens between internal entities. The internal entities settle the financial transactions among themselves using a transfer price.

The tasks that are to be performed can be specific to a forward flow and a return flow for the supply chain financial orchestration flow. A forward flow is a flow of events that proceeds in a specific direction (such as from a supplier entity to a purchaser entity), and a return flow is a flow of events that proceeds in a reverse direction (such as from a purchaser entity to a supplier entity). In addition to ownership transfer between internal entities, events indicating ownership transfer from a supplier entity to a purchasing entity can also be setup in a supply chain financial orchestration flow definition. When an event designated as a supplier ownership change event occurs, orchestration service 304 can generate the tasks for creating trade distributions to book supplier accrual and costs in a costing system, as well. Execution manager 305 invokes a task layer service based on a task type. Generally, the tasks are performed in a defined sequence, and if there is any dependency from a previous task, execution manager 305 can wait for the previous task to complete. Example task types can include inter-company trade documents (e.g., purchase order and sales order), trade distribution tasks related to costing, inter-company receivable invoices related to inter-company receivable, payables invoice, or credit memo tasks that are set in documentation and accounting rules. Task types can also include user-defined tasks.

Task layer service 306 creates a task layer service payload. Task layer service 306 can include logic to populate the payload data depending on a global procurement flow, a customer shipment flow, or an internal transfer flow. Task layer service 306 can also call a transfer price service to get a transfer price, where the transfer price is a price in which a selling entity sells goods to a purchasing entity, where the selling entity and the purchasing entity are involved in an internal trade. External interface layer service 307 identifies a target system (i.e., application) of target systems (i.e., applications) 320, and obtains a connector service (e.g., connector service 308) for the target system of target systems 320 based on the task type. Connector service 308 transforms the task layer service payload into a format which is understandable by the target system of target systems 320. Once the task data is transformed according to a target system format, connector service 308 calls a web service to interface tasks in interface tables of the target system of target systems 320. Callback service 309 receives responses from the target system of target systems 320 and updates the task status. If the task is a last task in a sequence, then the supply chain financial orchestration is complete. Otherwise, the next task in the sequence is selected, and execution manager 305 is invoked with the task type.

Supply chain financial orchestration system 300 further includes a supply chain financial orchestration work area 330 that includes a plurality of user interfaces that allow a user to interact with supply chain financial orchestration system 300. Supply chain financial orchestration work area 330 includes manage event exceptions 331, confirm financial orchestration route assignments 332, and monitor financial orchestration execution 333. Manage event exceptions 331 is a user interface that allows users to view, troubleshoot, and manage events which faulted due to a setup or technical reason. Confirm financial orchestration route assignments 332 is a user interface that allows a user to confirm a supply chain financial orchestration flow before the tasks of the supply chain financial orchestration flow are initiated by orchestration service 304. Monitor financial orchestration execution 333 is a user interface that allows user to monitor supply chain financial orchestration flows that are in progress, that have not started, and that have completed.

FIG. 6-4 illustrates an example user interface 400 for defining a qualifier, according to an embodiment of the invention. As previously described, a qualifier is a rule for determining an applicability of a supply chain financial orchestration flow. More specifically, a qualifier can be used to determine whether a supply chain financial orchestration flow is applicable to a transaction or source document. The qualifier can include a computer program definition, where the computer program definition includes a specific number of conditions. When the qualifier is executed and applied against a transaction or source document, the conditions included within the computer program definition are evaluated using parameter values from the transaction or source document. If a sufficient amount of conditions of the qualifier are met, then the supply chain financial orchestration flow is applicable to the transaction or source document. If a sufficient amount of conditions of the qualifier are not met, then the supply chain financial orchestration flow is not applicable to the transaction or source document. Further, applicable attributes of a supply chain financial orchestration flow that are defined within a qualifier depend on a supply chain financial orchestration flow type (i.e., business process type). As previously described, example supply chain financial orchestration flow types include a global procurement flow, a customer shipment flow, and an internal transfer flow. Thus, user interface 400 can display a qualifier definition, where the qualifier definition defines the qualifier.

According to the embodiment, user interface 400 includes qualifier details window 410. Qualifier details window 410 displays details of the displayed qualifier, such as name, description, and supply chain financial orchestration flow type (identified in FIG. 6-4 as "agreement type"). A name can define a name of the qualifier. In the illustrated embodiment, the name of the qualifier displayed within user interface 400 is "Qualifier A." A description can define a description of the qualifier. In the illustrated embodiment, the description of the qualifier displayed within user interface 400 is "Qualifiers Swiss—Germany." A supply chain financial orchestration flow type can define a type of supply chain financial orchestration flow that the qualifier can be associated with, and further defines the parameters that can be displayed within qualifier conditions window 420, described below in greater detail. In the illustrated embodiment, the supply chain financial orchestration flow type of the qualifier displayed within user interface 400 is a global procurement flow.

User interface 400 further includes qualifier conditions window 420. Qualifier conditions window 420 displays one or more conditions for determining an applicability of a supply chain financial orchestration flow. Each condition can include a parameter, a value, an operator, and an "and/or" indicator. A parameter can define an attribute of either a transaction or a source document. A value can define a value for the parameter. An operator can define a relationship between the parameter and the value. Example operators include "equals" and "does not equals." An "and/or" indicator can define either a logical conjunction of two conditions (e.g., "condition 1 AND condition 2" evaluates to true when both condition 1 and condition 2 are true) or a logical disjunction of two conditions (e.g., "condition 1 OR condition 2" evaluates to true when condition 1 is true, or condition 2 is true, or both condition 1 and condition 2 are true).

User interface 400 further includes qualifier rule text preview window 430. Qualifier rule text preview window 430 displays a preview of a text representation of the qualifier, which includes the one or more conditions of the qualifier. In the illustrated embodiment, the qualifier can determine whether a supplier site code parameter is equal to "FRESNO," and whether an item parameter is equal to "AS85949." Based on these determinations, the qualifier can determine whether the supply chain financial orchestration flow is applicable to the transaction or source document.

Thus, according to the illustrated embodiment, an example qualifier definition is provided that includes two conditions, where the qualifier definition is displayed within user interface 400. The qualifier definition is applicable to global procurement flows. Each condition of the qualifier definition is evaluated at run-time to "TRUE" or "FALSE" by applying an operator of the condition between the data defined for a value of the condition and a run-time value of a parameter of the condition. For example, the first condition of the qualifier definition displayed within user interface 400 is substituted with a run-time value of a supplier site code parameter, where the run-time value is equated with the value, "FRESNO." If the run-time value of the supplier site code parameter is "FRESNO," then the condition evaluates to "TRUE." If the run-time value of the supplier site code parameter is not "FRESNO," then the condition evaluates to "FALSE." Similarly, all conditions of the qualifier definition are evaluated, and a final outcome of "TRUE" or "FALSE" is determined for the qualifier definition.

FIG. 6-5 illustrates an example user interface 500 for defining a qualifier with a custom parameter, according to an embodiment of the invention. As previously described, a qualifier can invoke an external user-defined computer program to generate a value for a parameter for one or more conditions of the qualifier. While a supply chain financial orchestration system allows the user to define qualifiers based on pre-defined parameters in the conditions, a user may require the flexibility of using their own information to identify a supply chain financial orchestration flow. If a supply chain financial orchestration system does not provide user-defined qualifier parameter support, then a user would have to customize a pre-defined computer program definition for a qualifier that is "built-in" within the supply chain financial orchestration system. Such a customization can get overwritten, when the computer program definition is updated, and can lead to increased maintenance overhead.

Thus, an external user-defined computer program (such as a procedural language/structured query language ("PL/SQL") function) can be defined, where the external user-defined computer program can include one or more functions for generating a value for a parameter of a condition. The external user-defined computer program can be registered and stored within a computer program definition of the qualifier for invocation at run-time during evaluation of the one or more conditions of the qualifier.

According to the illustrated embodiment, the qualifier definition displayed within user interface 500 is identical to the qualifier definition displayed within user interface 400 of FIG. 6-4, except that the qualifier definition displayed within user interface 500 includes a third condition, condition 510. Further, condition 510, includes an excise tariff item parameter, which is an example of a custom parameter. A custom parameter is a parameter that indicates that an external user-defined computer program (e.g., PL/SQL function) is used to generate a value for the custom parameter, rather than retrieving the value from an attribute of either a transaction or a source document. In other words, rather than the qualifier generating the value of the custom parameter by retrieving the value from an attribute of either a transaction or a source document, the qualifier invokes an external user-defined computer program to generate the value for the custom parameter.

A user can register the external user-defined computer program, and the external user-defined computer program can be stored as part of the qualifier definition. Upon run-time, when applying the qualifier displayed within user interface 500, the supply chain financial orchestration system can invoke the external user-defined computer program, which generates the value for the custom parameter, and returns the value to the supply chain financial orchestration system. Thus, in the illustrated embodiment, the external user-defined computer program can be invoked to generate a value for the excise tariff item parameter, the external user-defined computer program can return the generated value to the supply chain financial orchestration system, and the supply chain financial orchestration system can evaluate whether the generated value is equal to "Energy Products." If the generated value is equal to "Energy Products," condition 510 can be evaluated to "TRUE." If the generated value is not equal to "Energy Products," condition 510 can be evaluated to "FALSE."

In one embodiment, a user can define the external user-defined computer program by first creating source code for the external user-defined computer program. The custom parameter can be stored within a row of a qualifier definition database table. For example, the custom parameter can be stored within a row of a first qualifier definition database table, FOS_QUALIFIER_DEFINITIONS_B, and within a row of a second qualifier definition database table, FOS_QUALIFIER_DEFINITIONS_TL. Qualifier definition database tables FOS_QUALIFIER_DEFINITIONS_B and FOS_QUALIFIER_DEFINITIONS_TL can include the database columns, GP_QUALIFIER_FLAG, IMT_QUALIFIER_FLAG, SHIPMENT_QUALIFIER_FLAG, and DROP_SHIP_QUALIFIER_FLAG. Each of the database columns can be set to the value "Y" based on the custom parameter's applicability to global procurement flows, internal transfer flows, internal drop shipment flows, or customer drop shipment flows, respectively. Further, the name of the external user-defined computer program can be stored within a database column of the qualifier definition database table, FOS_QUALIFIER_DEFINITIONS_B (e.g., FOS_QUALIFIER_DEFINITIONS_B.CUSTOM_QUALIFIER_HOOK_PROGRAM). The external user-defined computer program referenced within the database column of the qualifier definition database table can include one or more parameters that can retrieve a context of a supply chain financial orchestration flow identification.

At run-time, according to the embodiment, when a condition that includes the custom parameter is evaluated, the external user-defined computer program referenced within the database column of the qualifier definition database table can be invoked to generate the value for the custom parameter. The generated value can then be used to evaluate the condition and to determine the outcome of the condition (e.g., whether the condition evaluates to "TRUE" or "FALSE"). The evaluated condition can then be used to evaluate the overall qualifier, and to determine the outcome of the overall qualifier (e.g., whether the overall qualifier evaluates to "TRUE" or "FALSE").

FIG. 6-6 illustrates a flow diagram of the functionality of a supply chain financial orchestration qualifier module (such as supply chain financial orchestration qualifier module 16 of FIG. 6-1), according to an embodiment of the invention. In one embodiment, the functionality of the flow diagram of FIG. 6-6 is implemented by software stored in memory or other computer-readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

The flow begins, and proceeds to 610. At 610, a qualifier definition (identified in FIG. 6-6 as a "rule definition") is selected and evaluated. According to the embodiment, a qualifier is associated with a supply chain financial orchestration flow, where a supply chain financial orchestration flow defines a trade relationship between a first entity and a second entity. The qualifier can determine an applicability of the supply chain financial orchestration flow regarding a transaction or a source document. Further, a qualifier definition is a computer-program definition that can include one or more conditions. The qualifier definition can be stored within a qualifier definition table. The flow then proceeds to 620.

At 620, a condition (identified in FIG. 6-6 as a "rule line") is selected for evaluation. According to the embodiment, the condition can include a parameter, a condition, and a value. The condition can also include an "and/or" indicator. The flow then proceeds to 630.

At 630, it is determined whether the parameter is a custom parameter (identified in FIG. 6-6 as a "user-defined" parameter). If the parameter is not a custom parameter, the flow proceeds to 640. If the parameter is a custom parameter, the flow proceeds to 650.

According to the embodiment, a custom parameter indicates that an external user-defined computer program is used to generate value for the custom parameter. The external user-defined computer program can be defined independently from the computer program code definition of the qualifier definition. In an embodiment, the external user-defined computer program can be a PL/SQL function. Further, the external user-defined computer program can include a user-defined function that generates a value for the custom parameter at run-time.

In one embodiment, the external user-defined computer program can be stored within the qualifier definition. More specifically, the external user-defined computer program can be stored within the qualifier definition database table. The external user-defined computer program can be linked with the custom parameter. Further, in one embodiment, the external user-defined computer program can include one or more parameters that retrieve a context of the supply chain financial orchestration flow.

At 640, a value is derived for the parameter. According to an embodiment, the value can be retrieved from a transaction or a source document. The flow then proceeds to 660.

At 650, the external user-defined computer program (identified in FIG. 6-6 as the "user defined PL/SQL function") is invoked to generate a value for the custom parameter. The flow then proceeds to 660.

At 660, the condition (identified in FIG. 6-6 as "'Parameter' Operator 'Value'") is evaluated using the generated value. According to the embodiment, the generated value can be compared with the value of the condition, and a status value (e.g., "TRUE" or "FALSE") can be determined for the condition. The flow then proceeds to 670.

At 670, it is determined whether there are any more conditions (identified in FIG. 6-6 as "rule lines") to evaluate If there are more conditions to evaluate, the flow returns to 620. Thus, some or all of 620, 630, 640, 650, and 660 can be implemented for the one or more conditions of the qualifier definition that were not selected In certain embodiments, this can involve: determining that a parameter of at least one condition is a separate custom parameter; invoking a separate external user-denied computer program to generate a separate value for the separate custom parameter; and evaluating the condition using the separate generated value.

At 680, a final outcome for the qualifier definition (identified in FIG. 6-6 as a "rule definition") is computed. In other words, the qualifier definition is evaluated using the one or more evaluated conditions, and an overall status value of the qualifier definition is generated based on the one or more evaluated conditions. The flow then ends.

Thus, in one embodiment, a supply chain financial orchestration system can allow a user to define an external custom computer program for generating a value, assign the external custom computer program to a custom parameter, and invoke the external custom computer program to generate the value at run-time, as part of a qualifier definition. This can provide for user-defined qualifier parameter support, which can improve flexibility in defining a qualifier to select a supply chain financial orchestration flow, and to reduce maintenance of computer program source code.

The features, structures, or characteristics of the invention described throughout this specification may be combined in any suitable manner in one or more embodiments. For example, the usage of "one embodiment," "some embodiments," "certain embodiment," "certain embodiments," or other similar language, throughout this specification refers to the fact that a particular feature, structure, or characteristic described in connection with the embodiment may be included in at least one embodiment of the present invention. Thus, appearances of the phrases "one embodiment," "some embodiments," "a certain embodiment," "certain embodiments," or other similar language, throughout this specification do not necessarily all refer to the same group of embodiments, and the described features, structures, or characteristics may be combined in any suitable manner in one or more embodiments.

One having ordinary skill in the art will readily understand that the invention as discussed above may be practiced with steps in a different order, and/or with elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

DETAILED DESCRIPTION—SECTION 7

According to an embodiment, a supply chain financial orchestration system is provided that can communicate different types of payload data for different supply chain tasks (such as purchase order tasks, sales order tasks, payable tasks, or receivable tasks) with different external target systems using a universal format, where the different types of task payload data can have different formats, and where the different external target systems can also have different formats. The supply chain financial orchestration system can further handle modifications to the task payload data (such as modifications to a task payload data structure or the integration of new tasks) without requiring modifications to the universal format. As understood by one of ordinary skill in the art, payload data is data contained within a data communication, where an example of a data communication is a message.

FIG. 7-1 illustrates a block diagram of a supply chain financial orchestration system 10 that may implement one embodiment of the invention. Supply chain financial orchestration system 10 includes a bus 12 or other communications mechanism for communicating information between components of supply chain financial orchestration system 10. Supply chain financial orchestration system 10 also includes a processor 22, operatively coupled to bus 12, for processing information and executing instructions or operations. Processor 22 may be any type of general or specific purpose processor. Supply chain financial orchestration system 10 further includes a memory 14 for storing information and instructions to be executed by processor 22. Memory 14 can be comprised of any combination of random access memory ("RAM"), read only memory ("ROM"), static storage such as a magnetic or optical disk, or any other type of machine or computer-readable medium. Supply chain financial orchestration system 10 further includes a communication device 20, such as a network interface card or other communications interface, to provide access to a network. As a result, a user may interface with supply chain financial orchestration system 10 directly, or remotely through a network or any other method.

A computer-readable medium may be any available medium that can be accessed by processor 22. A computer-readable medium may include both a volatile and nonvolatile medium, a removable and non-removable medium, a communication medium, and a storage medium. A communication medium may include computer readable instructions, data structures, program modules or other data in a modulated data signal such as a carrier wave or other transport mechanism, and may include any other form of information delivery medium known in the art. A storage medium may include RAM, flash memory, ROM, erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

Processor 22 can also be operatively coupled via bus 12 to a display 24, such as a Liquid Crystal Display ("LCD"). Display 24 can display information to the user. A keyboard

26 and a cursor control device 28, such as a computer mouse, can also be operatively coupled to bus 12 to enable the user to interface with supply chain financial orchestration system 10.

According to one embodiment, memory 14 can store software modules that may provide functionality when executed by processor 22. The modules can include an operating system 15, a supply chain financial orchestration task communication module 16, as well as other functional modules 18. Operating system 15 can provide an operating system functionality for supply chain financial orchestration system 10. Supply chain financial orchestration task communication module 16 can provide functionality for communicating tasks, as is described in more detail below. In certain embodiments, supply chain financial orchestration task communication module 16 can comprise a plurality of modules that each provide specific individual functionality for communicating tasks. Supply chain financial orchestration system 10 can also be part of a larger system. Thus, supply chain financial orchestration system 10 can include one or more additional functional modules 18 to include the additional functionality. For example, functional modules 18 may include modules that provide additional functionality, such as an "Oracle Fusion Applications" product from Oracle Corporation. In another example, functional modules 18 may include enterprise resource planning ("ERP") modules of an ERP system, where an ERP system is a computer system that integrates several data sources and processes of an organization into a unified system.

Processor 22 can also be operatively coupled via bus 12 to a database 34. Database 34 can store data in an integrated collection of logically-related records or files. Database 34 can be an operational database, an analytical database, a data warehouse, a distributed database, an end-user database, an external database, a navigational database, an in-memory database, a document-oriented database, a real-time database, a relational database, an object-oriented database, or any other database known in the art.

FIG. 7-2 illustrates an example supply chain financial orchestration flow, according to an embodiment of the invention. The supply chain financial orchestration flow is between a shipping entity in China and a receiving entity in the United States. As illustrated in FIG. 7-2, the supply chain financial orchestration flow includes a physical movement flow 210 and a financial flow 220. Physical movement flow 210 represents the physical movement of items from the shipping entity in China, to the receiving entity in the United States, and can involve the physical movement through one or more intermediate entities. Physical movement flow 210 can include one or more physical transactions that are executed in association with the physical movement of the items (such as shipments, receipts, etc.). Financial flow 220 represents the change in financial ownership of items from the shipping entity in China, to the receiving entity in the United States, and can involve the change in financial ownership of one or more intermediate entities. Financial flow 220 can include one or more financial transactions that are executed in associate with the change in financial ownership of the items (such as orders, invoices, payments, etc.). As illustrated in FIG. 7-2, a physical movement flow can be separate and independent of a financial flow within a supply chain financial orchestration system.

FIG. 7-3 illustrates a block diagram of an example architecture of a supply chain financial orchestration system 300, according to an embodiment of the invention. According to the embodiment, supply chain financial orchestration system 300 is a configurable system that manages internal trade relationships between entities belonging to an enterprise, where the enterprise is typically spread across geographies. Supply chain financial orchestration system 300 can define a nature of trade relationships, business rules, internal controls, regulatory compliances, and other terms and conditions required to execute, monitor, and evaluate trade transactions emanating out of such relationships. More specifically, supply chain financial orchestration system 300 can listen to events that occur in supply chain transactions in various external source systems, and can identify internal transactions (such as inter-company transactions and intra-company transactions) based on pre-defined trade relationships. Once the internal transactions are identified, supply chain financial orchestration system 300 can create necessary accounting and documentations required to be generated for the internal transactions according to the business rules defined in supply chain financial orchestration system 300.

According to the illustrated embodiment, supply chain financial orchestration system 300 includes event mediator 301, event capture 302, event manager 303, orchestration service 304, execution manager 305, task layer service 306, external interface layer service 307, connector service 308, and callback service 309. Event mediator 301 listens for events generated by an external source system (i.e., application) of external source systems (i.e., applications) 310. If an event is of interest to supply chain financial orchestration system 300, event mediator 301 can also call a web service exposed by the external source system of external source systems 310 to enrich the event details. Event mediator 301 then sends the event to event capture 302. Event capture 302 validates the event details retrieved after enrichment, and stores the event in an external source system format.

Subsequently, event manager 303 identifies a source document enrichment web service based on a source order type, and calls the source document enrichment web service for enrichment. The source document enrichment service is exposed by an external source system of external source systems 310 where the source order originated. Event manager 303 can pass a source document identifier as an input parameter to the enrichment web service and can retrieve the source document information, where a source document identifier is a unique identifier of the source document that is communicated to the external source system of external source systems 310. The external source system of external source systems 310 that is responsible for capturing the physical transaction can be responsible for passing the source document identifier as part of event information. Supply chain financial orchestration system 300 can maintain an association between a supply chain event and a source document type. Event manager 303 can further transform the source document information into a format that is understandable by supply chain financial orchestration system 300, and can identify a supply chain financial orchestration flow based on qualifiers, source document type, physical route, parties involved in an internal trade, and a priority of the supply chain financial orchestration flow. Further, a supply chain financial orchestration flow can be date effective. This means that any modification to a supply chain financial orchestration flow can cause a new effective date to be associated with the supply chain financial orchestration flow. Thus, transactions pertaining to a source document created before the effective date of the modification can be associated with the original supply chain financial orchestration flow, and transactions pertaining to a source document created after the effective date of the modification can be associated with the modified supply chain financial orchestration flow.

Orchestration service 304 verifies whether a supply chain financial orchestration flow is already assigned to a source document or not. If the supply chain financial orchestration flow is not already assigned, orchestration service 304 can assign the supply chain financial orchestration flow to the source document, and can generate the tasks that are to be performed between internal entities based on the documentation and accounting rules setup for the supply chain financial orchestration flow (such as a global procurement flow, a customer shipment flow, and an internal transfer flow). A global procurement flow is a supply chain financial orchestration flow where a central buying entity buys goods from suppliers on behalf of one or more internal entities. The supplier liability is borne by the purchasing entity. The purchasing and requesting entity settle the transaction among themselves using a transfer price (sometimes through one or more intermediary entities). A customer shipment flow is a supply chain financial orchestration flow in which a selling business unit is different from a profit center business unit of the entity that owns and ships the goods. The selling entity receives an order from a customer, and the shipping entity ships the goods directly to the customer. The shipping entity is settled financially by the selling entity (sometimes through one or more intermediary entities). A customer shipment flow can be an internal drop shipment flow, which is a forward customer shipment flow, or a customer drop shipment flow, or a return customer shipment flow. An internal transfer flow is a supply chain financial orchestration flow in which physical movement of goods happens between internal entities. The internal entities settle the financial transactions among themselves using a transfer price.

The tasks that are to be performed can be specific to a forward flow and a return flow for the supply chain financial orchestration flow. A forward flow is a flow of events that proceeds in a specific direction (such as from a supplier entity to a purchaser entity), and a return flow is a flow of events that proceeds in a reverse direction (such as from a purchaser entity to a supplier entity). In addition to ownership transfer between internal entities, events indicating ownership transfer from a supplier entity to a purchasing entity can also be setup in a supply chain financial orchestration flow definition. When an event designated as a supplier ownership change event occurs, orchestration service 304 can generate the tasks for creating trade distributions to book supplier accrual and costs in a costing system, as well. Execution manager 305 invokes a task layer service based on a task type. Generally, the tasks are performed in a defined sequence, and if there is any dependency from a previous task, execution manager 305 can wait for the previous task to complete. Example task types can include inter-company trade documents (e.g., purchase order and sales order), trade distribution tasks related to costing, inter-company receivable invoices related to inter-company receivable, payables invoice, or credit memo tasks that are set in documentation and accounting rules. Task types can also include user-defined tasks.

Task layer service 306 creates a task layer service payload. Task layer service 306 can include logic to populate the payload data depending on a global procurement flow, a customer shipment flow, or an internal transfer flow. Task layer service 306 can also call a transfer price service to get a transfer price, where the transfer price is a price in which a selling entity sells goods to a purchasing entity, where the selling entity and the purchasing entity are involved in an internal trade. External interface layer service 307 identifies a target system (i.e., application) of target systems (i.e., applications) 320, and obtains a connector service (e.g., connector service 308) for the target system of target systems 320 based on the task type. Connector service 308 transforms the task layer service payload into a format which is understandable by the target system of target systems 320. Once the task data is transformed according to a target system format, connector service 308 calls a web service to interface tasks in interface tables of the target system of target systems 320. Callback service 309 receives responses from the target system of target systems 320 and updates the task status. If the task is a last task in a sequence, then the supply chain financial orchestration is complete. Otherwise, the next task in the sequence is selected, and execution manager 305 is invoked with the task type.

Supply chain financial orchestration system 300 further includes a supply chain financial orchestration work area 330 that includes a plurality of user interfaces that allow a user to interact with supply chain financial orchestration system 300. Supply chain financial orchestration work area 330 includes manage event exceptions 331, confirm financial orchestration route assignments 332, and monitor financial orchestration execution 333. Manage event exceptions 331 is a user interface that allows users to view, troubleshoot, and manage events which faulted due to a setup or technical reason. Confirm financial orchestration route assignments 332 is a user interface that allows a user to confirm a supply chain financial orchestration flow before the tasks of the supply chain financial orchestration flow are initiated by orchestration service 304. Monitor financial orchestration execution 333 is a user interface that allows user to monitor supply chain financial orchestration flows that are in progress, that have not started, and that have completed.

FIG. 7-4 illustrates a block diagram of a task communication pattern for a system, such as a supply chain financial orchestration system. As previously described, upon on occurrence of an event, a supply chain financial orchestration system can generate tasks that are to be performed between internal entities based on a supply chain financial orchestration flow. As also previously described, the supply chain financial orchestration system can identify an external target system, and obtain a connector service based on the task type. The supply chain financial orchestration system can then send the task to the external target system using the connector service, where the task is executed at the external target system.

In one example, two tasks, an accounts payable ("AP") task and an accounts receivable ("AR") task are interfaced to an appropriate external target system. A task payload format of the AP task can be as follows:

| Parameter | Data Type |
|---|---|
| A | Number |
| B | Number |
| C | String |

Further, a task payload format of the AR task can be as follows:

| Parameter | Data Type |
|---|---|
| A1 | String |
| B1 | Number |

-continued

| Parameter | Data Type |
| --- | --- |
| C1 | String |
| D1 | String |

As illustrated in FIG. 7-4, AP task layer service 410 and AR task layer service 420 prepare task payload data for an AP task and an AR task, respectively. A task payload format (or "structure") of AP task layer service 410 is illustrated as AP task payload format 430, and a task payload format (or "structure") of AR task layer service 420 is illustrated as AR task payload format 440. AP task layer service 410 and AR task layer service 420 each send their respective task payload data to an external interface layer ("EIL") 450, which stores each task payload data (i.e., the task payload data of AP task layer service 410 and the task payload data of AR task layer service 420) in an EIL format. The EIL format of EIL 450 is further described below in greater detail in conjunction with FIG. 7-5. EIL 450 further sends the task payload data of AP task layer service 410 to AP connector service (or "connector") 460, and further sends the task payload data of AR task layer service 420 to AR connector service (or "connector") 470. AP connector 460 then performs a transformation of the task payload data of AP task layer service 410 to a format of external target system 480, and sends the transformed task payload data to external target system 480. Similarly, AR connector 470 performs a transformation of the task payload data of AR task layer service 420 to a format of external target system 490, and sends the transformed task payload data to external target system 490.

FIG. 7-5 illustrates a block diagram of an input payload of an external interface layer. More specifically, FIG. 7-5 illustrates an EIL input payload 510, which represents payload data that is stored within an EIL. Further, FIG. 7-5 illustrates an EIL input payload format 520. Input payload format 520 is a union of AP task payload format 430 and AR task payload format 440 of FIG. 7-4. EIL input payload format 520 also includes a task type parameter that identifies whether the payload data is associated with an AP task or an AR task. Further, EIL input payload format 420 also includes a system parameter that identifies an external target system that the payload data is associated with (and is to be sent to).

As illustrated in FIG. 7-4, an EIL (such as EIL 450) is located between a payload generating application (such as a task layer service) and a connector service for an external target system. The primary job of an EIL is to identify an appropriate connector service to which the payload data is to be sent. The identified connector service further identifies an appropriate external target system. A task layer service generates a task payload data, and sends the task payload data to the EIL, along with a system parameter, for further processing.

The EIL can refer to a setup table which contains a mapping between a target uniform resource locator ("URL") and one or more system parameters. The EIL, based on the input system parameters, can identify an external target system and target URL from the setup table. An example setup table is shown below:

| Task Type | System Parameter | Target URL | Target System |
| --- | --- | --- | --- |
| AP | S1 | http://Fusion/AP | Fusion |
| AR | S2 | http://Ebs/AR | Ebs |

Once an external target system is identified, the payload data can be routed to an appropriate connector service after transformation. The EIL can remain immune to business data and can focus on routing the payload data to a specific connector service. Any transformation of the payload data can be implemented by the appropriate connector service which interfaces with the external target system.

Since the EIL integrates with different task layer services, any payload modifications to a task layer service can affect the EIL payload format and also the corresponding connector service. Consider the following sample scenario: (1) a new parameter 'D' of type "String" is introduced to an AP task layer service; and (2) a new task layer service (i.e., a purchase order ("PO") task layer service) is added. As described below in conjunction with FIG. 7-6, such changes can require changes to specific task payload data formats, which require changes to an EIL payload format, and changes to corresponding connector service. Such modifications can also require redeployment of those components into the supply chain financial orchestration system.

FIG. 7-6 illustrates a block diagram of a task communication pattern after payload modification to the task layer services of a system, such as a supply chain financial orchestration system. More specifically, the block diagram illustrated in FIG. 7-6 includes AP task layer service 610, AR task layer service 615, and PO task layer service 620. The block diagram illustrated in FIG. 7-6 also includes AP task payload format 625 (which is a task payload format, or "structure," of AP task layer service 610), AR task payload format 630 (which is a task payload format of AR task layer service 615), and PO task payload format 635 (which is a task payload format of PO task layer service 615).

AP task layer service 610 is different from AP task layer service 410 of FIG. 7-4, as AP task layer service 610 is modified to populate the new parameter 'D' of type "String." Further, AP task payload format 625 is different from AP task payload format 430 of FIG. 7-4, as AP task payload format 625 is modified to include the new parameter 'D' of type "String." AR task layer service 615 and AR task payload format 630 are identical to AR task layer service 420 and AR task payload format 440 of FIG. 7-4, respectively, as no parameters of AR task layer service 615 are modified. PO task layer service 620 is a new task layer service that is not present in the block diagram illustrated in FIG. 7-4. Similarly, PO task payload format 635 is a new task payload format that is not present in the block diagram illustrated in FIG. 7-4.

The block diagram in FIG. 7-6 further includes EIL 640. EIL 640 is different from EIL 450 of FIG. 7-4 because the modifications to AP task payload format 625, as well as the inclusion of new PO task payload format 635, are reflected in EIL 640. More specifically, an EIL input payload of EIL 640 is modified, as an EIL input payload format of EIL 640 is a union of AP task payload format 625, AR task payload format 630, and PO task payload format 635, and the union of these task payload formats includes new parameters (i.e., new parameter 'D' of AP task payload format 625, and new parameters 'A2' and 'B2' of task payload format 635). Thus, the block diagram of FIG. 7-6 includes EIL input payload 670 and EIL input payload format 675, where EIL input payload 670 is different from EIL input payload 510 of FIG. 7-5, and EIL input payload format 675 is different from EIL input payload format 520 of FIG. 7-5, as EIL input payload format 675 includes new parameter 'D' of AP task payload format 625, and new parameters 'A2' and 'B2' of task payload format 635. Further, a mapping from AP task layer service 610 to EIL 640 is modified to incorporate a mapping of the new parameter 'D' of type "String."

The block diagram in FIG. 7-6 further includes AP connector service 645, AR connector service 650, and PO connector service 655. AP connector service 645 is different from AP connector service 460 of FIG. 7-4, as AP connector service 645 is modified to map the new parameter 'D' of type "String" to an external target system. Further, a mapping from EIL 640 to AP connector service 645 is modified to incorporate a mapping of the new parameter 'D' of type "String" from EIL 640 to AP connector service 645. AR connector service 650 is identical to AR connector service 470 of FIG. 7-4, as no parameters of AR connector service 650 are modified. PO connector service 655 is a new connector service, and is not present in FIG. 7-4

The block diagram illustrated in FIG. 7-6 also includes external target systems 660 and 665. External target systems 660 and 665 are identical to external target systems 480 and 490 of FIG. 7-4, respectively.

As previously described, most of the modifications described in conjunction with FIG. 7-6 require modification of the appropriate services (or the system components that produce the services). The services/components are then redeployed to the environment of the supply chain financial orchestration system. Thus, these modifications can be time consuming, and can require a careful analysis and testing procedure, as many system components of the supply chain financial orchestration system can be modified.

In accordance with certain embodiments of the invention, a supply chain financial orchestration system is provided that includes the following features: (1) usage of a universal format in communication between a task layer service and an EIL; (2) usage of a universal format in communication between the EIL and a connector service; and (3) usage of a setup-based transformation that leverages an extensible stylesheet language transformation ("XSLT") in a connector service for transforming data from the universal format to an external target system format. As is described below in greater detail, the supply chain financial orchestration can utilize the universal format to minimize changes in an EIL and connector service of a supply chain financial orchestration system, and to protect the EIL of a supply chain financial orchestration system from such changes.

According to certain embodiments, a universal format is a data format that does not contain any restriction or constraints on the data content, and thus, is compatible with any task payload format, as well as any external target system format. Thus, task payload data of any task payload format can be transformed from the task payload format to the universal format. Further, data that is stored using the universal format can be transformed from the universal format to any external target system format.

An example of a universal format is an "anyType" data type. An anyType data type is one of the data types used in an extensible markup language ("XML"), and is the root of all XML schema types. An anyType data type can contain any XML type data, such as primitive data types, complex data types, or user-defined data types. An anyType data type has no restrictions or constraints on the data content. Another example of a universal format is a "java.lang.Object" data type in a JAVA® programming language.

According to an embodiment, a task layer service can generate task payload data using a task payload format, and transform the task payload data from the task payload format to the anyType data type. The task layer service can subsequently send the transformed task payload data to an EIL. The task layer service can further send one or more parameters used to identify an external target system. By using an anyType data type as an input data type for EIL, the EIL can be protected from any modifications to a task payload format of a task layer service. No matter what the modification to the task payload format, the task layer service can transform the task payload data to the anyType data type, and send the task payload data to the EIL, without requiring any changes to the EIL. Further, an addition of a new task layer service can also be accomplished without requiring any changes to the EIL, because the new task layer service can also transform task payload data to the anyType data type, and send the task payload data to the EIL.

FIG. 7-7 illustrates a block diagram of a task communication pattern that includes a universal format, according to an embodiment of the invention. More specifically, the block diagram illustrated in FIG. 7-7 includes AP task layer service 710, AR task layer service 715, and PO task layer service 720. The block diagram illustrated in FIG. 7-7 also includes AP task payload format 725 (which is a task payload format, or "structure," of AP task layer service 710), AR task payload format 730 (which is a task payload format of AR task layer service 715), and PO task payload format 735 (which is a task payload format of PO task layer service 715).

According to the embodiment, similar to the scenario illustrated in FIG. 7-6, a new parameter 'D' of type "String" is introduced to an AP task layer service, and a new PO task layer service is added. AP task layer service 710 is different from AP task layer service 410 of FIG. 7-4, as AP task layer service 710 is modified to populate a new parameter 'D' of type "String." Further, AP task payload format 725 is different from AP task payload format 430 of FIG. 7-4, as AP task payload format 725 is modified to include the new parameter 'D' of type "String." AR task layer service 715 and AR task payload format 730 are identical to AR task layer service 420 and AR task payload format 440 of FIG. 7-4, respectively, as no parameters of AR task layer service 715 are modified. PO task layer service 720 is a new task layer service that is not present in the block diagram illustrated in FIG. 7-4. Similarly, PO task payload format 735 is a new task payload format that is not present in the block diagram illustrated in FIG. 7-4. However, as is described below in greater detail, different from the scenario illustrated in FIG. 7-6, no other components require modification even in light of the new parameter introduced to the AP task service and the new PO task service.

The block diagram in FIG. 7-7 further includes EIL 745. According to the embodiment, AP task layer service 710 transforms its payload data from task payload format 725 to an anyType data type 740, where anyType data type 740 is an example of a universal format. Similarly, AR task layer service 715 transforms its payload data from task payload format 730 to anyType data type 740, and PO task layer service 720 transforms its payload data from task payload format 735 to anyType data type 740. Subsequently, AP task layer service 710, AR task layer service 715, and PO task layer service 720 each send their respective payload data to EIL 745 using anyType data type 740. Because EIL 745 receives anyType data type 740 as its input payload, EIL 745 is identical to EIL 450 of FIG. 7-4, despite the modifications to AP task payload format 725, and the inclusion of a new task payload format (i.e., PO task payload format 735). This is due to the fact that EIL 745 receives anyType data type 740 no matter the modifications to any of the task payload formats (e.g., to AP task payload format 725, AR task payload format 730, or PO task payload format 735).

According to the embodiment, in addition to anyType data type 740, AP task layer service 710, AR task layer service 715, and PO task layer service 720 can each send one or more system parameters that identify an external target system. An example setup table that includes system parameters for an AP task type, an AR task type, and a PO task type is shown below:

| Task Type | System Parameter | Target URL | Target System |
|---|---|---|---|
| AP | S1 | http://Fusion/AP | Fusion |
| AR | S2 | http://Ebs/AR | Ebs |
| PO | S3 | http://Ebs/PO | Ebs |

Thus, according to the embodiment, for the task payload data of AP task layer service 710, EIL 745 uses the system parameter "S1" that is sent by AP task layer service 710 to determine an external target system and a target URL. Once the external target system is identified, EIL 745 sends the task payload data of AP task layer service 710 to connector service 755 using anyType data type 750. Likewise, for the task payload data of AP task layer service 715, EIL 745 uses the system parameter "S2" that is sent by AP task layer service 715 to determine an external target system and a target URL. Once the external target system is identified, EIL 745 sends the task payload data of AP task layer service 715 to connector service 755 using anyType data type 750. Similarly, for the task payload data of AP task layer service 720, EIL 745 uses the system parameter "S3" that is sent by AP task layer service 720 to determine an external target system and a target URL. Once the external target system is identified, EIL 745 sends the task payload data of AP task layer service 720 to connector service 755 using anyType data type 750.

For each task payload data, connector service 755 transforms the task payload data from the anyType data type to an external target system format that corresponds to the identified external target system. The transformation is further described in greater detail in conjunction with FIG. 7-8. Subsequently, for each task payload data connector service 755 sends the task payload data to the identified external target system (e.g., external target systems 760 or 765) using the external target system format.

FIG. 7-8 illustrates a block diagram of a connector service that transforms a universal format to an external target system format, according to an embodiment of the invention. According to the embodiment, the block diagram illustrated in FIG. 7-8 includes connector service 820 which receives EIL input data 810 from an EIL, where the format of EIL input data 810 is an anyType data type, which is an example of a universal format. EIL input data 810 is stored within connector service 820 using anyType data type 821. Connector service 820 transforms EIL input data 810 from anyType data type 821 to an external target system format 822. Connector service 820 then sends EIL input data 810 to external target system 830 using external target system format 822.

To perform this transformation, connector service 820 can retrieve an XSLT file from a setup table stored within connector service 820 (not illustrated in FIG. 7-8), where the XSLT file is used to transform EIL input data 810 from anyType data type 821 to an external target system format 822. As appreciated by of ordinary skill in the relevant art, XSL is a language for transforming XML documents from a first XML format to a second XML format. With XSLT, one can: (1) add or remove elements of an XML document; (2) rearrange or sort elements of an XML document; and (3) evaluate conditions and perform actions based on content of the elements.

An example setup table that can be stored within connector service 820 is shown below:

| Task Type | Target System | XSL Transformation |
|---|---|---|
| AP | Fusion | C:\APtoFusionAP.xsl |
| AR | EBS | C:\ARToEBSAR.xsl |
| PO | EBS | C:\POToEBSPO.xsl |

As shown in the example setup table, connector service 820 can read a corresponding XSLT file stored within the setup table based on a task type and external target system, and can transform EIL input data from anyType data type 821 to external target system format 822.

In the embodiment illustrated in FIG. 7-8, parameter 'B' is dropped while transforming EIL input data 810 from anyType data type 821 to external target system format 822. This can be because external target system 830 is not interested in the parameter 'B,' and thus, the parameter 'B' is not included within external target system format 822. This is just one example modification, and the transformation from an anyType data type to an external target system format can include many different types of modifications to the input data.

Thus, according to an embodiment, the aforementioned modifications to one or more task layer services (e.g., an addition of parameters, or an addition of new task types) can only require modifications to the task layer services to create the modified business logic (e.g., logic to populate new parameters, or logic to build the new task layer services). The aforementioned modifications can optionally require modifications to the setup tables stored within an EIL and a connector service (e.g., to store the new URLs, or to store the new XSLT files). Other than the modifications to the task layer services, such modifications constitute setup data modifications, which generally do not require any system component or service to be modified or redeployed. Thus, the aforementioned modifications to one or more task layer services (e.g., an addition of parameters, or an addition of new task types) can be made more simply and more quickly.

FIG. 7-9 illustrates a flow diagram of the functionality of a supply chain financial orchestration task communication module (such as supply chain financial orchestration task communication module 16 of FIG. 7-1), according to an embodiment of the invention. In one embodiment, the functionality of the flow diagram of FIG. 7-9 is implemented by software stored in memory or other computer-readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

The flow begins and proceeds to 910. At 910, a task is generated that includes task payload data, where the task payload data is in a task payload data format. The task can be defined for a supply chain financial orchestration flow, where the supply chain financial orchestration flow defines a trade relationship between a first entity and a second entity. The generation of the task can be performed at a task layer service. The flow then proceeds to 920.

At 920, the task payload data is transformed from the task payload format to a universal format. The universal format can be an anyType data type. The anyType data type can be compatible with any task payload format and any external target system format. The transformation of the task payload data from the task payload format to the universal format can be performed at the task layer service. The flow then proceeds to 930.

At 930, the task payload data and a system parameter are sent to an EIL. The task payload data can be sent in the universal format. Further, the system parameter can identify an external target system. The system parameter can be retrieved from a setup table based on a task type of the task. The sending of the task payload data and the system parameter can be performed at the task layer service. The flow then proceeds to 940.

At 940, a target execution system and connector service can be identified based on the system parameter. The identification of the target execution system and the connector service can be performed at an EIL. The flow then proceeds to 950.

At 950, the task payload data is sent to the connector service. The task payload data can be sent in the universal format. The sending of the task payload data can be performed at the EIL. The flow then proceeds to 960.

At 960, an XSLT file is retrieved. The XSLT file can be retrieved from a setup table based on a task type of the task and the external target system. The retrieval of the XSLT file can be performed at a connector service. The flow then proceeds to 970.

At 970, the task payload data is transformed from the universal format to an external target system format using the XSLT file. The transformation of the task payload data can be performed at the connector service. The flow then proceeds to 980.

At 980, the task payload data is sent to the external target system. The task payload data can be sent in the external target system format. The external target system can execute the task based on the task payload data that is in the external target system format. Further, in certain embodiments, the task payload format of the task can be modified where the universal format is not modified. The flow then ends.

Thus, in one embodiment, a supply chain financial orchestration system can utilize a universal format to facilitate communication of task data to external target systems. Thus, any modifications to a task payload format do not necessarily affect the supply chain financial orchestration system, as the supply chain financial orchestration system is not required to modify its universal format. Further, the supply chain financial orchestration system can utilize XSLT files to facilitate transformation of task data from the universal format to an external target system format. The creation and editing of the XSLT files can be a simple task that can be performed by a text editor. Thus, a user does not need to possess technical expertise to customize the transformations, and the actual transformation can be taken care of at run time. This can reduce the effort necessary to modify and customize the communication of task data to the external target systems.

The features, structures, or characteristics of the invention described throughout this specification may be combined in any suitable manner in one or more embodiments. For example, the usage of "one embodiment," "some embodiments," "certain embodiment," "certain embodiments," or other similar language, throughout this specification refers to the fact that a particular feature, structure, or characteristic described in connection with the embodiment may be included in at least one embodiment of the present invention. Thus, appearances of the phrases "one embodiment," "some embodiments," "a certain embodiment," "certain embodiments," or other similar language, throughout this specification do not necessarily all refer to the same group of embodiments, and the described features, structures, or characteristics may be combined in any suitable manner in one or more embodiments.

One having ordinary skill in the art will readily understand that the invention as discussed above may be practiced with steps in a different order, and/or with elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A non-transitory computer-readable medium having instructions stored thereon that, when executed by a processor, cause the processor to determine a transfer price based on a transfer pricing rule for transactions of an item within an enterprise that comprises a plurality of entities, the transactions of the item comprising a supply chain financial orchestration flow, the determining comprising:

defining for the supply chain financial orchestration flow one or more ownership events, each ownership event comprising an ownership change of the item between first entities of the plurality of entities, wherein a completion of the transaction comprises an ownership path where ownership moves among the first entities;

defining for the supply chain financial orchestration flow one or more physical execution events, each physical execution event comprising a physical movement of the item between second entities of the plurality of entities, wherein the completion of the transaction comprises a physical movement path among the second entities, wherein the ownership path is different than the physical movement path;

receiving a first event associated with the supply chain financial orchestration flow;

receiving a request to calculate a transfer price for a transaction between a first entity and a second entity of a supply chain financial orchestration flow, wherein the supply chain financial orchestration flow defines a trade relationship between the first entity and the second entity and further defines a transfer pricing rule for the trade relationship, the supply chain financial orchestration flow based on the trade relationship and a physical movement flow of the item to a third entity;

defining a plurality of transfer pricing rules that is associated with the supply chain financial orchestration flow, wherein each transfer pricing rule defines a rule to calculate a transfer price;

receiving transaction information associated with the transaction;

selecting the transfer pricing rule that is defined by the supply chain financial orchestration flow from a plurality of transfer pricing rules, wherein the transfer pricing rule defines a rule to calculate a transfer price;

calculating the transfer price for the transaction based on the received transaction information and the selected transfer pricing rule, the calculating the transfer price comprising calling an external pricing service to produce the transfer price, the calling comprising:

listening for events generated by the transactions by an event mediator;

in response to the listening, for each new event that is of interest to the supply chain financial orchestration system, the event mediator calling a source document enrichment web service to enrich the new event;

creating a task layer service payload by a task layer service for the new event; and transforming the task layer service payload into a format that is understandable by the external pricing service;

calling a web service of the external pricing system to interface with the external pricing system to execute the task; and providing the transfer price.

2. The non-transitory computer-readable medium of claim 1, wherein the transfer pricing rule comprises a source document price-based transfer pricing rule;

the determining further comprising:

receiving a document price of a source document;

receiving a currency and unit of measure; and applying a markup to the document price using the currency and the unit of measure to produce the transfer price.

3. The non-transitory computer-readable medium of claim 1, wherein the transfer pricing rule comprises a transaction cost-based transfer pricing rule;

the determining further comprising:

receiving a transaction cost; and applying a markup to the transaction cost to produce the transfer price.

4. The non-transitory computer-readable medium of claim 1, wherein the transfer pricing rule comprises a pricing strategy-based transfer pricing rule;

the determining further comprising:

selecting a pricing strategy comprising one or more pricing rules; and applying the pricing strategy to the received transaction information to produce the transfer price.

5. The non-transitory computer-readable medium of claim 1, wherein the transfer pricing rule comprises an external pricing service transfer pricing rule;

the determining further comprising:

calling an external pricing service to produce the transfer price.

6. The non-transitory computer-readable medium of claim 1, wherein the supply chain financial orchestration flow comprises one of: an inter-company trade; or an intra-company trade.

7. The non-transitory computer-readable medium of claim 1, the determining further comprising:

determining whether a transfer price has already been calculated for the transaction; and providing the already-calculated transfer price rather than calculating a new transfer price.

8. The non-transitory computer-readable medium of claim 1, the determining further comprising storing the transfer price.

9. The non-transitory computer-readable medium of claim 1, the determining further comprising defining at least one pricing rule of the plurality of pricing rules to be one of: a source document price-based transfer pricing rule; a transaction cost-based transfer pricing rule; a pricing strategy-based transfer pricing rule; or a an external pricing service transfer pricing rule.

10. The non-transitory computer-readable medium of claim 1, wherein the transaction information comprises at least one of:

a transaction identifier;

a transaction date;

an item identifier;

a financial trade relationship identifier; or a source document identifier.

11. A computer-implemented method for determining a transfer price based on a transfer pricing rule for transactions of an item within an enterprise that comprises a plurality of entities, the transactions of the item comprising a supply chain financial orchestration flow, the computer-implemented method comprising:

defining for the supply chain financial orchestration flow one or more ownership events, each ownership event comprising an ownership change of the item between first entities of the plurality of entities, wherein a completion of the transaction comprises an ownership path where ownership moves among the first entities;

defining for the supply chain financial orchestration flow one or more physical execution events, each physical execution event comprising a physical movement of the item between second entities of the plurality of entities, wherein the completion of the transaction comprises a physical movement path among the second entities, wherein the ownership path is different than the physical movement path; receiving a first event associated with the supply chain financial orchestration flow;

receiving a request to calculate a transfer price for a transaction between a first entity and a second entity of a supply chain financial orchestration flow, wherein the supply chain financial orchestration flow defines a trade relationship between the first entity and the second entity and further defines a transfer pricing rule for the trade relationship, the supply chain financial orchestration flow based on the trade relationship and a physical movement flow of the item to a third entity;

defining a plurality of transfer pricing rules that is associated with the supply chain financial orchestration flow, wherein each transfer pricing rule defines a rule to calculate a transfer price;

receiving transaction information associated with the transaction;

selecting the transfer pricing rule that is defined by the supply chain financial orchestration flow from a plurality of transfer pricing rules, wherein the transfer pricing rule defines a rule to calculate a transfer price;

calculating the transfer price for the transaction based on the received transaction information and the selected transfer pricing rule, the calculating the transfer price comprising calling an external pricing service to produce the transfer price, the calling comprising:

listening for events generated by the transactions by an event mediator;

in response to the listening, for each new event that is of interest to the supply chain financial orchestration system, the event mediator calling a source document enrichment web service to enrich the new event;

creating a task layer service payload by a task layer service for the new event; and transforming the task layer service payload into a format that is understandable by the external pricing service;

calling a web service of the external pricing system to interface with the external pricing system to execute the task; and providing the transfer price.

12. The computer-implemented method of claim 11, wherein the transfer pricing rule comprises a source document price-based transfer pricing rule;

the computer-implemented method further comprising:

receiving a document price of a source document;

receiving a currency and unit of measure;

applying a markup to the document price using the currency and the unit of measure to produce the transfer price.

13. The computer-implemented method of claim 11, wherein the transfer pricing rule comprises a transaction cost-based transfer pricing rule;

the computer-implemented method further comprising:

receiving a transaction cost;

applying a markup to the transaction cost to produce the transfer price.

14. The computer-implemented method of claim 11, wherein the transfer pricing rule comprises a pricing strategy-based transfer pricing rule;

the computer-implemented method further comprising:

selecting a pricing strategy comprising one or more pricing rules; and applying the pricing strategy to the received transaction information to produce the transfer price.

15. The computer-implemented method of claim 11, wherein the transfer pricing rule comprises an external pricing service transfer pricing rule;

the computer-implemented method further comprising:

calling an external pricing service to produce the transfer price.

16. A supply chain financial orchestration system for determining a transfer price based on a transfer pricing rule for transactions of an item within an enterprise that comprises a plurality of entities, the transactions of the item comprising a supply chain financial orchestration flow, the system comprising:

one or more processors executing instructions to perform the determining the transfer price that comprises:

defining for the supply chain financial orchestration flow one or more ownership events, each ownership event comprising an ownership change of the item between first entities of the plurality of entities, wherein a completion of the transaction comprises an ownership path where ownership moves among the first entities;

defining for the supply chain financial orchestration flow one or more physical execution events, each physical execution event comprising a physical movement of the item between second entities of the plurality of entities, wherein the completion of the transaction comprises a physical movement path among the second entities, wherein the ownership path is different than the physical movement path;

receiving a request to calculate a transfer price for a transaction between a first entity and a second entity of a supply chain financial orchestration flow, wherein the supply chain financial orchestration flow defines a trade relationship between the first entity and the second entity and further defines a transfer pricing rule for the trade relationship, the supply chain financial orchestration flow based on the trade relationship and a physical movement flow of the item to a third entity;

defining a plurality of transfer pricing rules that is associated with the supply chain financial orchestration flow, wherein each transfer pricing rule defines a rule to calculate a transfer price;

receiving transaction information associated with the transaction;

selecting the transfer pricing rule that is defined by the supply chain financial orchestration flow from a plurality of transfer pricing rules, wherein the transfer pricing rule defines a rule to calculate a transfer price;

calculating the transfer price for the transaction based on the received transaction information and the selected transfer pricing rule, the calculating the transfer price comprising calling an external pricing service to produce the transfer price, the calling comprising:

listening for events generated by the transactions by an event mediator;

in response to the listening, for each new event that is of interest to the supply chain financial orchestration system, the event mediator calling a source document enrichment web service to enrich the new event;

creating a task layer service payload by a task layer service for the new event; and transforming the task layer service payload into a format that is understandable by the external pricing service;

calling a web service of the external pricing system to interface with the external pricing system to execute the task; and providing the transfer price.

17. The system of claim 16, wherein the transfer pricing rule comprises a source document price-based transfer pricing rule;

wherein the transfer price calculation module is further configured to receive a document price of a source document;

wherein the transfer price calculation module is further configured to receive a currency and unit of measure; and wherein the transfer price calculation module is further configured to apply a markup to the document price using the currency and the unit of measure to produce the transfer price.

18. The system of claim 16, wherein the transfer pricing rule comprises a transaction cost-based transfer pricing rule;

wherein the transfer price calculation module is further configured to receive a transaction cost; and wherein the transfer price calculation module is further configured to apply a markup to the transaction cost to produce the transfer price.

19. The system of claim 16, wherein the transfer pricing rule comprises a pricing strategy-based transfer pricing rule;

wherein the transfer price calculation module is further configured to select a pricing strategy comprising one or more pricing rules; and wherein the transfer price calculation module is further configured to apply the pricing strategy to the received transaction information to produce the transfer price.

20. The system of claim 16, wherein the transfer pricing rule comprises an external pricing service transfer pricing rule; and wherein the transfer price calculation module is further configured to call an external pricing service to produce the transfer price.

* * * * *